(12) United States Patent
Long et al.

(10) Patent No.: US 12,725,835 B2
(45) Date of Patent: Sep. 1, 2026

(54) MULTI-REGIME ELECTROLYTE SYSTEM FOR STATIONARY LITHIUM-SULFUR BATTERIES

(71) Applicant: Lyten, Inc., San Jose, CA (US)

(72) Inventors: Jared Long, Sunnyvale, CA (US); Amruth Bhargav, Mountain View, CA (US); Babu Ganguli, Santa Clara, CA (US); Alexander Klevay, San Jose, CA (US)

(73) Assignee: LYTEN, INC., San Jose, CA (US)

( * ) Notice: Subject to any disclaimer, the term of this patent is extended or adjusted under 35 U.S.C. 154(b) by 0 days.

(21) Appl. No.: 19/205,858

(22) Filed: May 12, 2025

(65) Prior Publication Data

US 2025/0286144 A1 Sep. 11, 2025

Related U.S. Application Data

(63) Continuation-in-part of application No. 18/764,907, filed on Jul. 5, 2024.

(Continued)

(51) Int. Cl.
*H01M 10/0569* (2010.01)
*H01M 10/04* (2006.01)

(Continued)

(52) U.S. Cl.
CPC ... *H01M 10/0569* (2013.01); *H01M 10/0427* (2013.01); *H01M 10/052* (2013.01);

(Continued)

(58) Field of Classification Search
CPC ............................................ H01M 2300/0028
See application file for complete search history.

(56) References Cited

U.S. PATENT DOCUMENTS

| | | | |
|---|---|---|---|
| 4,009,052 | A | 2/1977 | Whittingham |
| 5,516,598 | A | 5/1996 | Visco et al. |

(Continued)

FOREIGN PATENT DOCUMENTS

| | | | |
|---|---|---|---|
| CN | 107785603 | A | 3/2018 |
| CN | 111816922 | A | 10/2020 |

(Continued)

OTHER PUBLICATIONS

Non-Final Office Action from U.S. Appl. No. 18/764,920, dated Aug. 27, 2024.

(Continued)

*Primary Examiner* — Osei K Amponsah
(74) *Attorney, Agent, or Firm* — Zilka-Kotab, P.C.

(57) ABSTRACT

The present disclosure provides a novel electrolyte system for lithium-based batteries in stationary storage applications. Unlike conventional electrolytes that suffer from limited cycle life and stability, this system incorporates strategically selected sacrificial additives that decompose in a predetermined sequence during cycling. This controlled breakdown forms a self-evolving electrode-electrolyte interface, addressing the limitations of existing technologies by mitigating polysulfide shuttling, enhancing long-term stability, and maintaining consistent ionic conductivity. The system's ability to adapt to changing operational conditions enables ultra-high cycle life, potentially revolutionizing the performance and longevity of stationary energy storage systems.

22 Claims, 23 Drawing Sheets

1800

Related U.S. Application Data

(60) Provisional application No. 63/562,167, filed on Mar. 6, 2024.

(51) Int. Cl.
*H01M 10/052* (2010.01)
*H01M 10/0567* (2010.01)
*H01M 10/0568* (2010.01)
*H01M 10/643* (2014.01)
*H01M 10/647* (2014.01)

(52) U.S. Cl.
CPC ... *H01M 10/0567* (2013.01); *H01M 10/0568* (2013.01); *H01M 10/643* (2015.04); *H01M 10/647* (2015.04); *H01M 2300/0028* (2013.01)

(56) References Cited

U.S. PATENT DOCUMENTS

| | | | | |
|---|---|---|---|---|
| 6,210,836 | B1 | 4/2001 | Takada et al. | |
| 7,354,680 | B2 | 4/2008 | Mikhaylik | |
| 10,522,827 | B2 | 12/2019 | Young et al. | |
| 10,734,683 | B2 | 8/2020 | Jilek et al. | |
| 11,081,722 | B2 | 8/2021 | Zhang et al. | |
| 11,258,097 | B2 | 2/2022 | Wang | |
| 12,009,531 | B1 | 6/2024 | Baucom et al. | |
| 12,438,194 | B2 | 10/2025 | Long et al. | |
| 2002/0192557 | A1 | 12/2002 | Choi et al. | |
| 2005/0014072 | A1 | 1/2005 | Yamaguchi et al. | |
| 2006/0210873 | A1 | 9/2006 | Hollenkamp et al. | |
| 2012/0007560 | A1 * | 1/2012 | Smart | H01M 4/525 429/188 |
| 2013/0230770 | A1 * | 9/2013 | Oya | H01M 50/434 429/188 |
| 2018/0048017 | A1 | 2/2018 | Jilek et al. | |
| 2019/0051940 | A1 * | 2/2019 | Park | H01M 10/0569 |
| 2019/0157701 | A1 | 5/2019 | Lu et al. | |
| 2019/0198865 | A1 | 6/2019 | Kim et al. | |
| 2019/0198933 | A1 | 6/2019 | Newhouse et al. | |
| 2020/0028165 | A1 | 1/2020 | Chiang et al. | |
| 2020/0176767 | A1 | 6/2020 | Fraga Trillo et al. | |
| 2020/0194786 | A1 | 6/2020 | Wang et al. | |
| 2020/0220216 | A1 | 7/2020 | Kim et al. | |
| 2020/0223702 | A1 * | 7/2020 | Zhang | C01B 32/921 |
| 2021/0296700 | A1 | 9/2021 | Shibata | |
| 2022/0231323 | A1 | 7/2022 | Chung et al. | |
| 2022/0359861 | A1 | 11/2022 | Kim et al. | |
| 2023/0101833 | A1 | 3/2023 | Best et al. | |
| 2023/0216039 | A1 | 7/2023 | Manthiram et al. | |
| 2023/0271833 | A1 | 8/2023 | Xu et al. | |
| 2024/0194955 | A1 | 6/2024 | Laicer et al. | |
| 2025/0286126 | A1 | 9/2025 | Long et al. | |
| 2025/0286127 | A1 | 9/2025 | Klevay et al. | |
| 2025/0286141 | A1 | 9/2025 | Bhargav et al. | |

FOREIGN PATENT DOCUMENTS

| | | | |
|---|---|---|---|
| CN | 112382792 | A | 2/2021 |
| CN | 113540567 | A | 10/2021 |
| CN | 114678591 | A | 6/2022 |
| EP | 3979385 | A1 | 4/2022 |
| WO | 2002044084 | A2 | 6/2002 |
| WO | 2011051275 | A1 | 5/2011 |
| WO | 2017019163 | A1 | 2/2017 |
| WO | 2020135694 | A1 | 7/2020 |
| WO | 2021213743 | A1 | 10/2021 |
| WO | 2022128233 | A1 | 6/2022 |
| WO | 2022174011 | A1 | 8/2022 |

OTHER PUBLICATIONS

Zhang et al., "Reforming the Uniformity of Solid Electrolyte Interphase by Nanoscale Structure Regulation for Stable Lithium Metal Batteries," Angewandte Chemie International Edition, vol. 62, 2023, and Supporting Information, 35 pages.

Cuisinier et al., "Unique Behaviour of Nonsolvents for Polysulphides in Lithium-Sulphur Batteries," Energy & Environmental Science, 2014, 10 pages.

Restriction Requirement from U.S. Appl. No. 18/765,011, dated Sep. 29, 2024.

Non-Final Office Action from U.S. Appl. No. 18/764,907, dated Oct. 1, 2024.

Final Office Action from U.S. Appl. No. 18/764,920, dated Oct. 18, 2024.

International Search Report and Written Opinion from PCT Application No. PCT/US 24/36938, dated Oct. 30, 2024, 14 pages.

Non-Final Office Action from U.S. Appl. No. 18/765,011, dated Dec. 19, 2024.

Final Office Action from U.S. Appl. No. 18/764,907, dated Feb. 6, 2025.

Non-Final Office Action from U.S. Appl. No. 18/764,920, dated Feb. 6, 2025.

Final Office Action from U.S. Appl. No. 18/765,011, dated Apr. 25, 2025.

Advisory Action from U.S. Appl. No. 18/764,907, filed May 8, 2025.

Wu et al., "Boosting High-Performance in Lithium-Sulfur Batteries via Dilute Electrolyte," Nano letters, 2020, 23 pages, retrieved from https://digital.csic.es/bitstream/10261/227155/1/Boosting%20High-Performance_Wu.pdf.

Wu et al., "Boosting High-Performance in Lithium-Sulfur Batteries via Dilute Electrolyte," Supporting information, Nano letters, 2020, 16 pages, https://digital.csic.es/bitstream/10261/227155/2/Boosting%20High-Performance_Wu_SI.pdf.

Notice of Allowance from U.S. Appl. No. 18/764,920, dated May 21, 2025.

Bhargav et al., U.S. Appl. No. 18/764,907, filed Jul. 5, 2024.

Long et al., U.S. Appl. No. 18/764,920, filed Jul. 5, 2024.

Klevay et al., U.S. Appl. No. 18/765,011, filed Jul. 5, 2024.

Aurbach et al., "On the Surface Chemical Aspects of Very High Energy Density, Rechargeable Li-Sulfur Batteries," Journal of the Electrochemical Society, vol. 156, 2009, pp. A694-A702.

Bi et al., "Protecting lithium metal anodes in lithium-sulfur batteries: A review," Energy Material Advances, 2023, pp. 1-23.

Buyuker et al., "Voltage and Temperature Limits of Advanced Electrolytes for Lithium-Metal Batteries," ACS Energy Letters, vol. 8, 2023, pp. 1735-1743.

Cheng et al., "Constructing a 700 Wh kg1-level rechargeable lithium-sulfur pouch cell," Journal of Energy Chemistry, vol. 76, 2023, pp. 181-186.

Du et al., "A comprehensive study on the electrolyte, anode and cathode for developing commercial type nonflammable sodium-ion battery," Energy Storage Materials, vol. 29, Aug. 2020, pp. 287-299.

Elabd et al., "Dual Functional High Donor Electrolytes for Lithium-Sulfur Batteries under Lithium Nitrate Free and Lean Electrolyte Conditions," ACS Energy Letters, vol. 7, 2022, pp. 2459-2468.

Li et al., "Synthesis, modification strategies and applications of coal-based carbon materials," Fuel Processing Technology, vol. 230, Jun. 1, 2022, pp. 1-18.

He et al., "Unraveling the Correlation between Solvent Properties and Sulfur Redox Behavior in Lithium-Sulfur Batteries," Journal of the Electrochemical Society, vol. 165, 2018, pp. A4027-A4033.

Wang et al., "Highly soluble organic nitrate additives for practical lithium metal batteries," Carbon Energy, 2022, pp. 1-9.

Hou et al., "Modification of Nitrate Ion Enables Stable Solid Electrolyte Interphase in Lithium Metal Batteries," Angewandte Chemie, Mar. 1, 2022, pp. 1-6.

Gupta et al., "Influence of Lithium Polysulfide Clustering on the Kinetics of Electrochemical Conversion in Lithium-Sulfur Batteries," ACS Chemistry of Materials Journal, Mar. 10, 2020, vol. 32, pp. 2070-2077.

Ji et al., "A highly ordered nanostructured carbon-sulphur cathode for lithium-sulphur batteries," Nature Materials, vol. 8, Jun. 2009, pp. 500-506.

(56) References Cited

OTHER PUBLICATIONS

Lee et al., "Directing the Lithium-Sulfur Reaction Pathway via Sparingly Solvating Electrolytes for High Energy Density Batteries," ACS Central Science, vol. 3, 2017, pp. 605-613.
Han et al., "Nitrogen-doped carbon nets with micro/mesoporous structures as electrodes for high-performance supercapacitors," Journal of Materials Chemistry A, 2016, pp. 16698-16705.
Liu et al., "An Organodiselenide Comediator to Facilitate Sulfur Redox Kinetics in Lithium-Sulfur Batteries with Encapsulating Lithium Polysulfide Electrolyte," Angewandte Chemie International Edition, vol. 62, 2023, pp. 1-9.
Liu et al., "An Organodiselenide Comediator to Facilitate Sulfur Redox Kinetics in Lithium-Sulfur Batteries with Encapsulating Lithium Polysulfide Electrolyte," Supporting Information, Angewandte Chemie International Edition, 2023, 38 pages.
Liu et al., "Electrolyte solutions design for lithium-sulfur batteries," Joule, vol. 5, Sep. 15, 2021, pp. 2323-2364.
Luo et al., "Electrolyte Design for Lithium Metal Anode-Based Batteries Toward Extreme Temperature Application," Advanced Science News, vol. 8, 2021, pp. 1-20.
Ma et al., "Effect of Building Block Connectivity and Ion Solvation on Electrochemical Stability and Ionic Conductivity in Novel Fluoroether Electrolytes," ACS Central Science, vol. 7, 2017, pp. 1232-1244.
Manavalan et al., "Electrochemically Modified Poly(dicyandiamide) Electrodes for Detecting Hydrazine in Neutral pH," Industrial & Engineering Chemistry Research, vol. 62, 2023, pp. 18271-18279.
Moon et al, "Non-fluorinated non-solvating cosolvent enabling superior performance of lithium metal negative electrode battery," Nature Communications, 2022, pp. 1-11.
Narayan et al., "Fluorinated solvents for better batteries," Nature Reviews, vol. 6, Jul. 2022, pp. 449-450.
Nie et al., "Development of Pyridine-Boron Trifluoride Electrolyte Additives for Lithium-Ion Batteries," Journal of the Electrochemical Society, vol. 162, 2015, pp. A1186-A1195.
Singaraj et al., "A Detailed Discourse on the Epistemology of Lithium-Sulfur Batteries," Chemical Engineering & Technology, Oct. 30, 2023, Chemical Engineering & Technology, vol. 46, 2023, pp. 1-23.
Su et al., "Establishment of Selection Rule for Hydrofluoroether as Electrolyte Co-solvent through Linear Free-Energy Relationship in Lithium-Sulfur Batteries," Author Manuscript, published in Angewandte Chemie International Edition, May 13, 2019, 15 pages.
Su et al., "A Selection Rule for Hydrofluoroether Electrolyte Cosolvent: Establishing a Linear Free-Energy Relationship in Lithium-Sulfur Batteries," Supporting Information, Angewandte Chemie International Edition, 2019, 13 pages, retrieved from anie_201904240_sm_miscellaneous_information.pdf.
Su et al., "Terminally fluorinated glycol ether electrolyte for lithium metal batteries," Nano Energy, vol. 110, 2023, pp. 1-8.
Su et al., "Terminally fluorinated glycol ether electrolyte for lithium metal batteries," Supplementary Information, Nano Energy, vol. 110, 2023, 29 pages, retrieved from https://www.osti.gov/servlets/purl/2361042.
Wang et al., "Towards durable practical lithium-metal batteries: advancing the feasibility of poly-DOL-based quasi-solid-state electrolytes via a novel nitrate based additive" Energy & Environmental Science, 2023, 2023, 9 pages.
Wang et al., "Development of High Energy Density Li-Sulfur Cells," presentation, Penn State, 17 pages, retrieved on Aug. 2, 2024, from https://www.energy.gov/eere/vehicles/articles/development-high-energy-density-lithium-sulfur-cells.
Watanabe et al., "Discharge Behavior within Lithium-Sulfur Batteries Using Li-Glyme Solvate Ionic Liquids," The Journal of Physical Chemistry C, vol. 127, 2023, pp. 6645-6654.
Wu et al., "An Environmentally Friendly Class of Fluoropolyether: $\alpha$, $\omega$-Dialkoxyfluoropolyethers," Applied Sciences, vol. 2, 2012, pp. 351-367.
Xie et al., "Fluoropyridine family: Bifunction as electrolyte solvent and additive to achieve dendrites-free lithium metal batteries," Journal of Materials Science & Technology, vol. 74, 2021. pp. 119-127.
Ma et al., "Ionic liquid/poly(ionic liquid)-based electrolytes for lithium batteries," Industrial Chemistry & Materials, vol. 1, 2023, pp. 39-59.
Liang et al., "Porous 2D Carbon Nanosheets synthesized via Organic Groups Triggered Polymer Particles Exfoliation: An effective Cathode Catalyst for Polymer Electrolyte Membrane Fuel Cells," Electrochimica Acta, Feb. 2020, 47 pages, retrieved from https://www.semanticscholar.org/paper/Porous-2D-carbon-nanosheets-synthesized-via-organic-Liang-Zhang/028219609da7132c39ae2110aa517d0ff1047821.
Yu et al., "Molecular design for electrolyte solvents enabling energy-dense and long-cycling lithium metal batteries," Nature Energy, vol. 5, 2020, pp. 526-533, retrieved from https://www.nature.com/articles/s41560-020-0634-5.
Zhang et al., "A monofluoride ether-based electrolyte solution for fast-charging and low-temperature non-aqueous lithium metal batteries," Nature Communications, Feb. 25, 2023, pp. 1-13.
Zhang et al., "A monofluoride ether-based electrolyte solution for fast-charging and low-temperature non-aqueous lithium metal batteries," Supplementary Information, Nature Communications, 2023, 38 pages, retrieved from https://www.nature.com/articles/s41467-023-40318-6.
Meisner et al., "Lithium-sulfur battery with partially fluorinated ether electrolytes: Interplay between capacity, coulombic efficiency and Li anode protection," Journal of Power Sources, vol. 438, 2019, pp. 1-9.
Zhang et al., "Reforming the Uniformity of Solid Electrolyte Interphase by Nanoscale Structure Regulation for Stable Lithium Metal Batteries," Angewandte Chemie, Jul. 13, 2023, pp. 1-7.
Zhao et al., "Fluorinated ether electrolyte with controlled solvation structure for high voltage lithium metal batteries," Nature Communications, vol. 113, pp. 1-9.
Zhao et al., "Electrolyte engineering via ether solvent fluorination for developing stable non-aqueous lithium metal batteries," Nature Communications, vol. 14, 2023, pp. 1-10.
Zhao et al., "Targeted Functionalization of Cyclic Ether Solvents for Controlled Reactivity in High-Voltage Lithium Metal Batteries," ACS Energy Letters, vol. 8, 2023, pp. 3180-3187.
Zheng et al., "High-Fluorinated Electrolytes for Li—S Batteries," Advanced Energy Materials, vol. 9, 2019, pp. 1-9.
Zhao et al., "An Organodiselenide Comediator to Facilitate Sulfur Redox Kinetics in Lithium-Sulfur Batteries," Advanced Materials, 2021, pp. 1-9.
Zhao et al., "An Organodiselenide Comediator to Facilitate Sulfur Redox Kinetics in Lithium-Sulfur Batteries," Supplementary Information, Advanced Materials, 2021, 27 pages.
Zhao et al., "Promoting the sulfur redox kinetics by mixed organodiselenides in high-energy-density lithium-sulfur batteries," with supporting figures, eScience, vol. 1, 2021, pp. 44-52.
Corrected Notice of Allowance from U.S. Appl. No. 18/764,920, dated Jun. 4, 2025.
Long, J., U.S. Appl. No. 19/372,067, filed Oct. 28, 2025.
Gao et al., "Electrolytes with moderate lithium polysulfide solubility for high-performance long-calendar-life lithium-sulfur batteries," PNAS, vol. 120, 2023, 10 pages.
Ji et al., "Anchoring Lithium Polysulfides via Affinitive Interactions: Electrostatic Attraction, Hydrogen Bonding, or in Parallel?" The Journal of Physical Chemistry C, 2015, pp. 20495-20502.
Non-Final Office Action from U.S. Appl. No. 18/764,907, dated Nov. 5, 2025.
Examiner's Answer to Appeal Brief from U.S. Appl. No. 18/765,011, dated Jan. 28, 2026.
Final Office Action from U.S. Appl. No. 18/764,907, dated Feb. 25, 2026.
Mahankali et al., U.S. Appl. No. 19/643,630, filed Apr. 9, 2026.

* cited by examiner

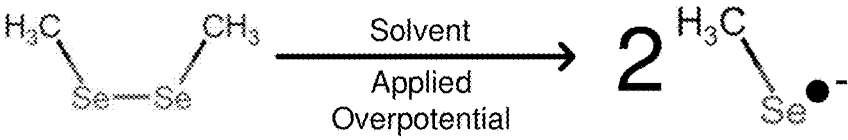
Figure 3
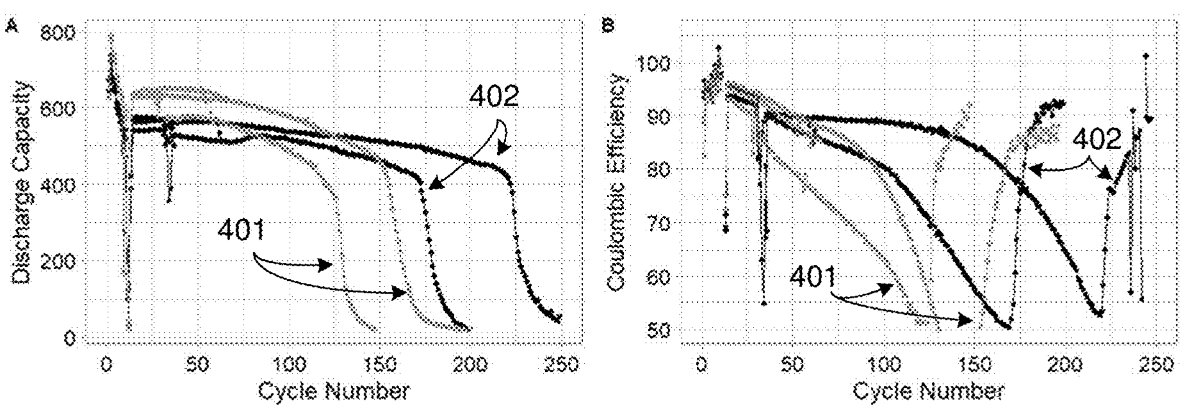
Figure 4A
Figure 4B
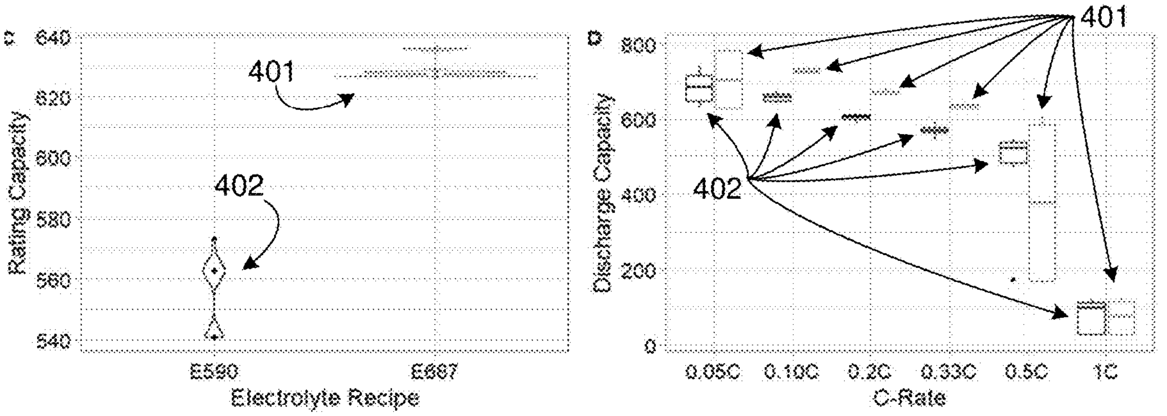
Figure 4C
Figure 4D

Dicyandiamide (DCDA)
FIG. 6A
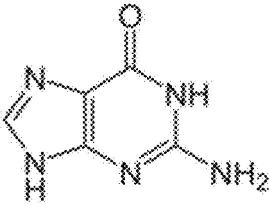
Guanine
FIG. 6B
Guanidine Nitrate
FIG. 6C
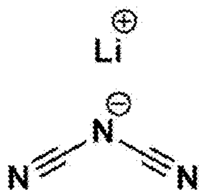
Lithium Dicyanamide
FIG. 6D

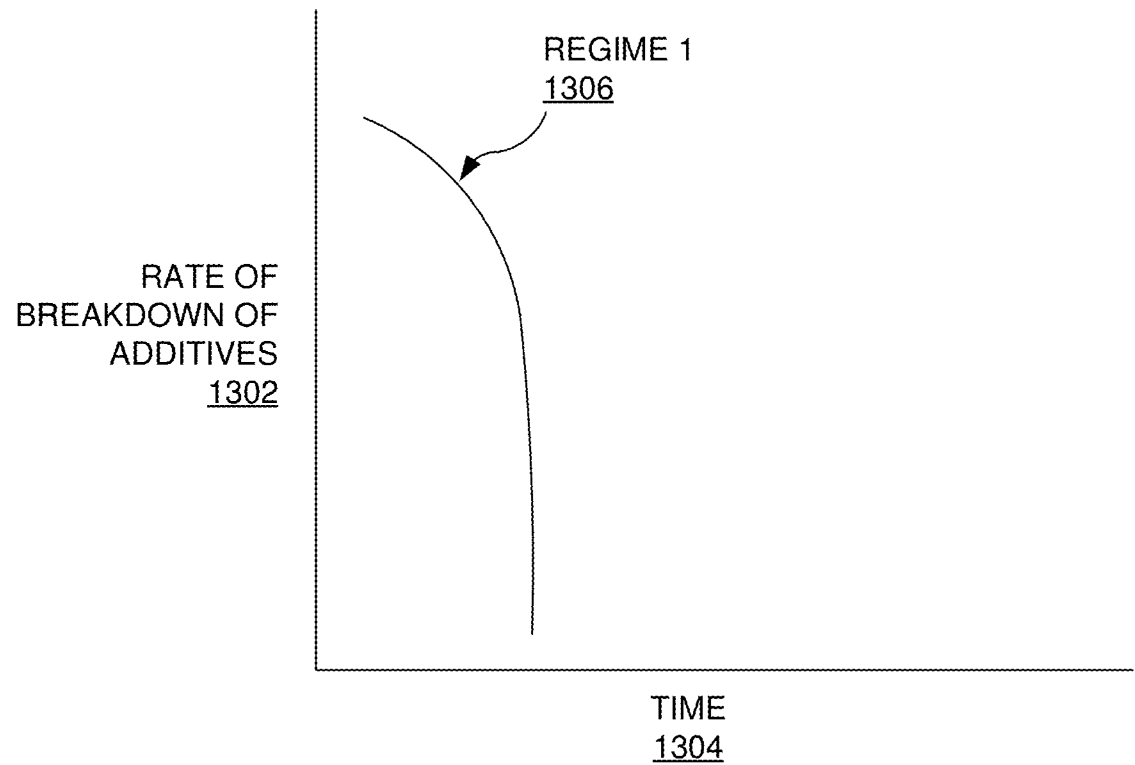
FIG. 13

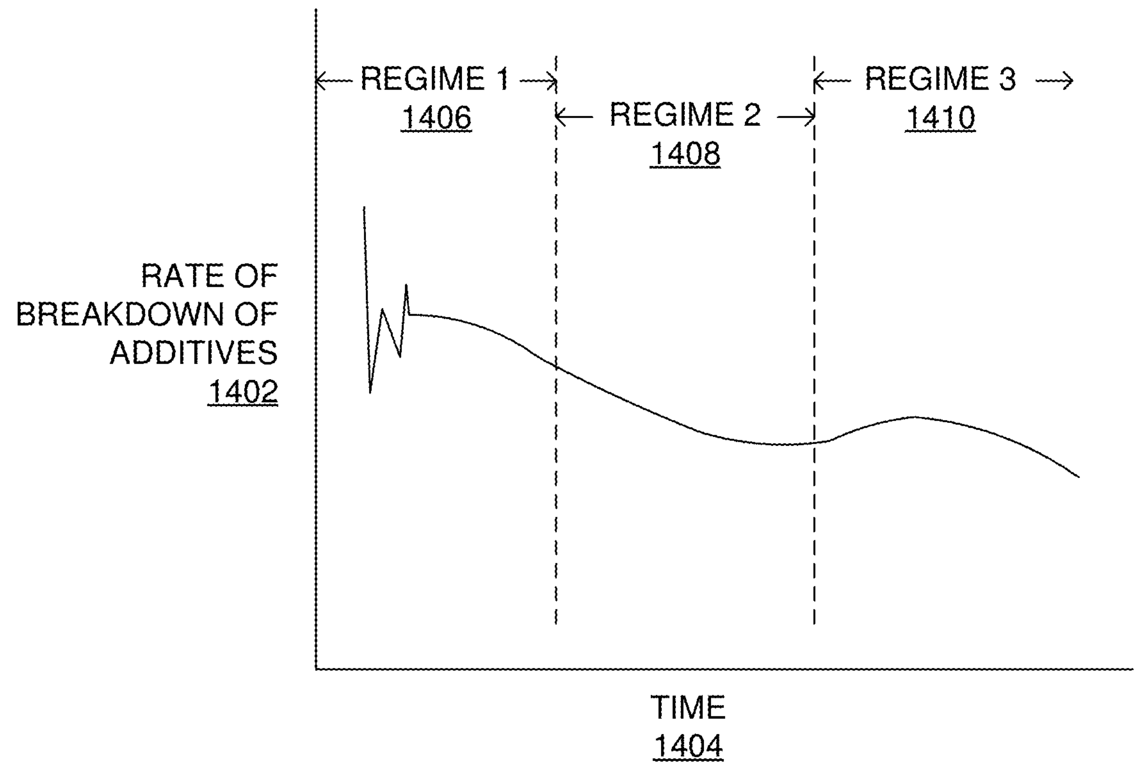
FIG. 14

1500

| LISTING OF FLUOROETHER ADDITIVES |
|---|
| 2,2,3,3-tetrafluoro-1,4-dimethoxybutane (FDMB) |
| bis(2,2,2,trifluoroethyl)ether(BTFE) |
| 1H,1H,5H-octafluoropentyl1,1,2,2-tetrafluoroethylether (OFE) |
| (1,1,2,2-tetrafluoroethyl2,2,3,3-tetrafluoropropylether(TTE) |
| 2,2,2-trifluoroethyl1,1,2,2-tetrafluoroethylether (TFETFE) |
| 1,1,2,2-tetrafluoroethylisobutylether (TFEIE) |
| 1,1,2,3,3,3-hexafluoropropyl2,2,2-trifluoroethylether (THE) |
| methoxyperfluorobutane(MPB) |
| bis(2,2-difluoroethyl)ether(DFE) |
| 2,2,2-trifluoroethylmethylether(TFEME) |
| bis(2-fluoroethyl)ether(BFE) |
| 3-fluoropyridine(3FP |
| 1,2-(1,1,2,2-tetrafluoroethoxy)ethane(TFEE) |
| 1,2-dimethoxy-1,1,2,2-tetrafluoroethane(DMETF) |
| 2-methyl-1(1,1,2,2-tetrafluoroethoxy)propane(TFEIBE) |
| bis(2,2,3,3,3-pentafluoropropyl)ether(BPFPE) |
| allyl2,2,3,3,3-pentafluoropropylether(APFPE) |
| 2,2-dimethoxy-4-trifluoromethyl-1,3-dioxolaneether(DTDL) |
| 1,1,1-trifluoro-2-(2-(2-(2,2,2-trifluoroethoxy)ethoxy)ethoxy)ethane(FDG) |
| 1,1,1,14,14,14-hexafluoro-3,6,9,12-tetraoxatetradecane(FTrG) |
| 1,1,1,17,17,17-hexafluoro-3,6,9,12,15-pentaoxaheptadecane(FTeG) |
| 2,2,2-trifluoroethyl2-fluoroethylether(TFFE) |
| 1,1-difluoroethyl-2-fluoroethylether(DFE) |
| fluorinated1,4-dimethoxylbutane(FDMB) |
| bis(2,2,3,3-tetrafluoropropyl)ether)(BTFPE) |
| 2,2,2-trifluoroethyl1,1,2,2-tetrafluoroethylether(TFTFE) |
| tris(2,2,2-trifluoroethyl)phosphate |
| bis(2,2,2-trifluoroethyl)methylphosphonate |
| alpha-beta functionalized isosorbide (ISDN) |

| LISTING OF LITHIUM SALT ADDITIVES |
| --- |
| lithium bis(trifluoromethanesulfonyl)imide (LiTFSI)<br>lithium nitrate (LiNO3)<br>lithium Perchlorate (LiClO4)<br>lithium difluoro(oxalato)borate (LiDFOB)<br>lithium bis (oxalato)borate (LiBOB)<br>lithium trifilate (LiTf)<br>lithium bis(pentafluoroethanesulfonyl)imide (LiBETi)<br>lithium bis(fluorosulfonyl)imide (LiFSI)<br>Lithium trifluoroacetate (LiTFAc)<br>lithium iodide<br>lithium bromide<br>Lithium tetrafluoroborate |

| LISTING OF SEI-FORMING ADDITIVES |
|---|
| Dicyandiamide (DCDA) |
| acetonitrile |
| azobisisobutyronitrile (AIBN) |
| cyanamide |
| lithium dicyanamide |
| dicyandiamide (DCDA) |
| guanine |
| guanidine nitrate |
| guanidine thiocyante |
| guanidine p-tolunesulfonate |
| guanidine trifluoromethanolate |
| 2-guanidinobenzimidazole |
| guanidine hydrochloride |
| guanidine carbonate |
| guanidine bromide |
| guanidine iodide |
| guanidine acetate |
| guanidine sulfate |
| guanidine phosphate |
| succionitrile |
| 2,5-dichloropyrazine |
| 2,6-dichloropyrazine |
| 4-Mercaptopyridine |
| Pyridine-4-thiol |
| Amyl Nitrate |
| Cerium Nitrate |
| 2-bromoacetamide |
| 1, 1, 2, 2, 3, 3-hexafluoropropane-1, 3-disulfonimide potassium salt |
| Polyvinylpyrolidine |
| cis-diamminedichloroplatinum(II) (CDDP) |
| H2O |
| 1,3,6-hexanetricarbonitrile |
| dimethylformamide (DMF) |
| Magnesium Nitrate |
| N-Methyl-2-pyrrolidone (NMP |
| N,N-dimethyltrifluoromethanesulfonamide (DMCF3SA) |
| N-Propyl-N-methylpyrrolidinium Bis(fluorosulfonyl)imide (PYR13 TFSI) |
| 2,3-Dichloro-5,6-dicyano-1,4-benzoquinone (DDQ) |
| 2,6-Dichloro-5,6-dicyano-1,4-benzoquinone (DCBQ) |
| 1,2-Dimethyl-3-propylimidazolium Iodide |
| Ethoxy (pentafluoro) cyclotriphosphazene (PFPN) |
| methyl trifluoroacetate |
| 3,5-Bis(trifluoromethyl)benzenethiol (BTB) |
| 1,2-Difluorobenzene (1,2DfB) |
| 3,4,9,10-Perlenetetracarboxylic diimde (PTCD) |
| Benzo[ghi]perylene (BGP) |
| Cesium Fluoride |

FIG. 17

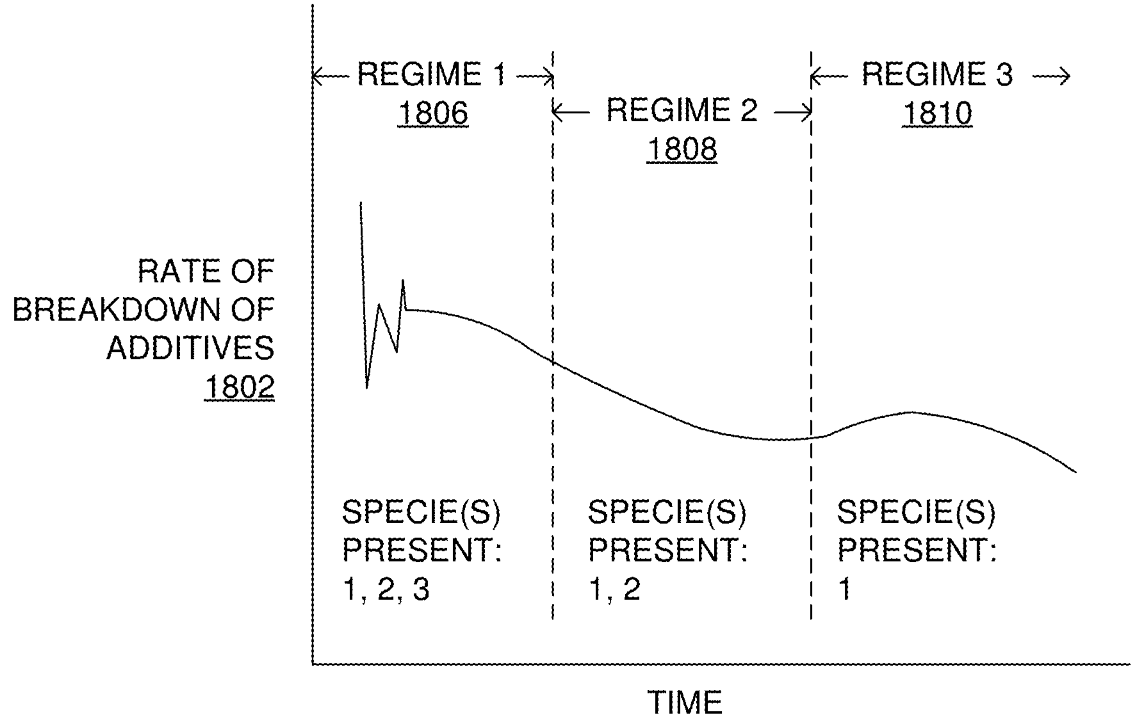
FIG. 18

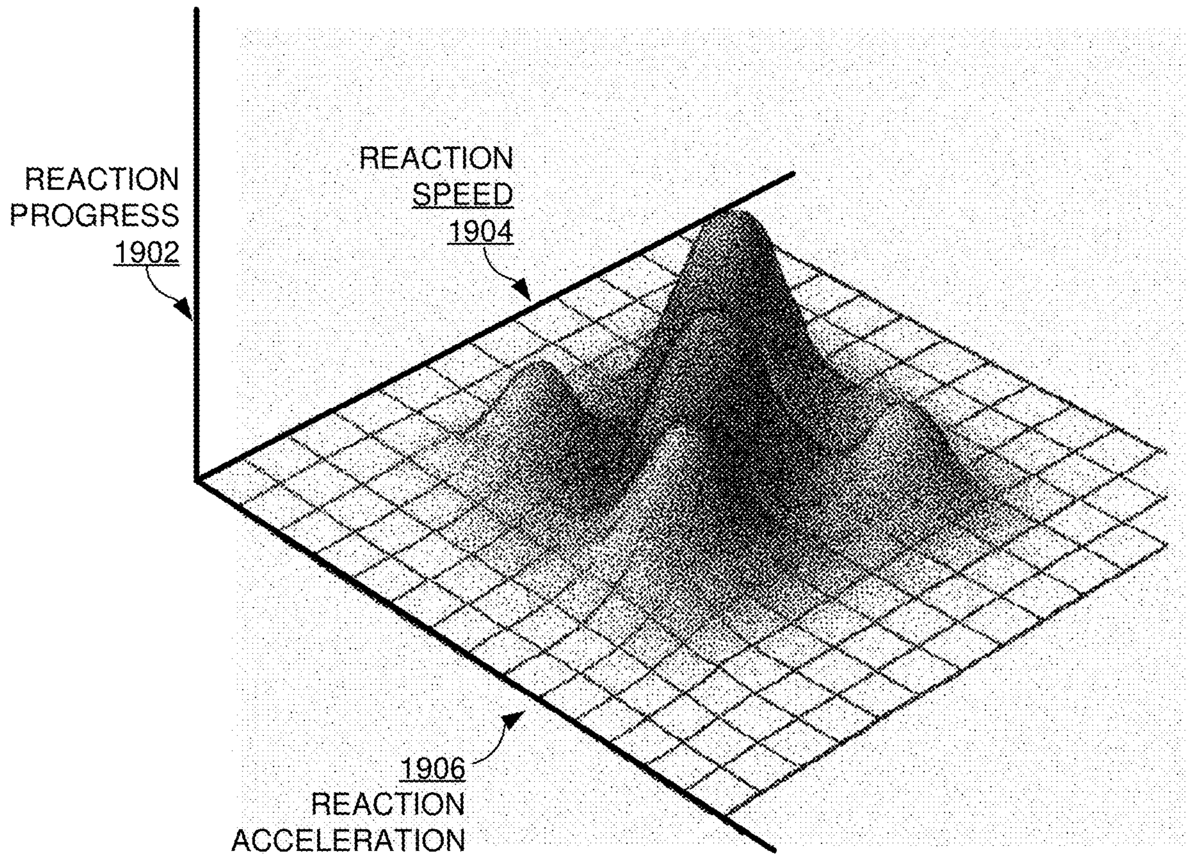
FIG. 19

MULTI-REGIME ELECTROLYTE SYSTEM FOR STATIONARY LITHIUM-SULFUR BATTERIES

RELATED APPLICATIONS

This application is a continuation-in-part of U.S. application Ser. No. 18/764,907, titled "ELECTROLYTE SYSTEMS INCLUDING PERFORMANCE-ENHANCING ADDITIVES, AND ELECTROCHEMICAL CELLS INCLUDING THE SAME", filed Jul. 5, 2024, which claims priority to U.S. Provisional Patent Application No. 63/562,167, filed Mar. 6, 2024, titled "ELECTROLYTE ADDITIVE FOR IMPROVING PERFORMANCE AND CYCLE LIFE OF LITHIUM-BASED SECONDARY BATTERIES", the entire contents of each of which are hereby incorporated by reference.

FIELD OF THE INVENTION

The present disclosure relates to battery technology, and more particularly to electrolyte systems for stationary lithium-sulfur batteries with multiple decomposition regimes for ultra-high cycle life.

BACKGROUND

Stationary energy storage systems face significant challenges in achieving ultra-high cycle life suitable for long-term grid applications. This issue has become increasingly important as renewable energy sources grow more prevalent, necessitating robust and durable energy storage solutions to balance supply and demand fluctuations. The development of electrolyte systems capable of supporting extended cycling without significant capacity fade or performance degradation remains a key hurdle in realizing the full potential of stationary reaction based batteries, including lithium-sulfur batteries.

Existing electrolyte formulations for lithium-sulfur batteries encounter several obstacles when applied to stationary storage scenarios. These include the gradual breakdown of electrolyte components over time, which can lead to capacity loss and increased internal resistance. Additionally, the formation of passivating layers on electrode surfaces and the dissolution of active materials into the electrolyte pose challenges for maintaining stable performance over thousands of cycles. The complex interplay between various electrolyte additives and their degradation products further complicates efforts to optimize long-term cycling stability.

For instance, in large-scale grid storage applications, current electrolyte solutions often exhibit accelerated decomposition rates when subjected to continuous charge-discharge cycles over extended periods. This results in premature capacity fade and reduced overall system lifespan. Another example is the difficulty in mitigating polysulfide shuttling effects in existing formulations, which can lead to irreversible loss of active material and diminished energy density over time. Furthermore, conventional electrolyte systems struggle to maintain solvating ability, as well as consistent ionic conductivity and interfacial stability across the wide range of operating conditions encountered in stationary deployments, limiting their practical utility for grid-scale energy storage.

As such, there is thus a need for addressing these and/or other issues associated with the prior art.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

An electrolyte system for stationary storage application is disclosed, comprising at least one solvent, at least one electron withdrawing compound, at least one lithium ion-transporting compound, and at least one sacrificial additive. Each of the at least one sacrificial additive is selected and arranged based on a respective breakdown rate to decompose in a predetermined sequence during battery cycling. The at least one solvent may comprise at least one ether, which is selected from the group consisting of dimethoxyethane (DME), dioxolane (DOL), and combinations thereof. The at least one electron withdrawing compound may comprise at least one compound characterized by an alpha-hydrogenated, beta-functionalized motif, and is selected from the group consisting of bis(2,2,2-trifluoroethyl) ether (BTFE), 1,1,2,2-tetrafluoroethyl 2,2,3,3-tetrafluororopyl ether (TTE), and combinations thereof.

The at least one lithium ion-transporting compound may comprise at least one lithium salt, which is selected from the group consisting of lithium bis(trifluoromethanesulfonyl) imide (LiTFSI), lithium nitrate (LiNO3), and combinations thereof. The at least one sacrificial additive may be selected from the group consisting of dicyandiamide (DCDA), guanidine nitrate, and combinations thereof, and is present in an amount ranging from about 0.01 M to about 0.2 M. At least one chalcogenide may be included, which is selected from the group consisting of dimethyl diselenide (DMDSe), diphenyl diselenide (DPDSe), and combinations thereof, and is present in an amount ranging from about 0.1 wt % to about 3.0 wt %.

The at least one solvent may be present in an amount ranging from greater than 0 vol % to about 75 vol % of the electrolyte system, the at least one electron withdrawing compound may be present in an amount ranging from greater than 0 vol % to about 75 vol % of the electrolyte system, and the at least one lithium ion-transporting compound may be present in an amount ranging from about 0.1 M to about 10 M. The predetermined sequence may comprise a first regime characterized by rapid breakdown of initial sacrificial additives, a second regime characterized by gradual decomposition of secondary additives, and a third regime characterized by slow, continuous breakdown of long-lasting additives.

The first regime may correspond to formation of a primary solid electrolyte interphase (SEI) layer, the second regime may correspond to reinforcement or modification of the primary SEI layer, and the third regime may correspond to maintenance of a protective interface over extended cycling periods. The electrolyte system may be configured to respond dynamically to changing operational conditions, including temperature fluctuations and varying charge/discharge rates, to maintain optimal additive breakdown and SEI formation throughout battery cycling.

An electrolyte system is also disclosed, comprising at least one solvent, at least one electron withdrawing compound, at least one lithium ion-transporting compound, at least one sacrificial additive, and a self-evolving electrode-electrolyte interface formed on an electrode surface by the breakdown of the at least one sacrificial additive. The electrode-electrolyte interface is configured in an effective amount to enable ultra-high cycle life suitable for stationary storage applications. The self-evolving electrode-electrolyte interface may comprise various forms such as a self-evolving solid electrolyte interphase (SEI), a dynamic interfacial layer, or an adaptive electrode-electrolyte boundary layer, among others.

The self-evolving electrode-electrolyte interface may be configured to mitigate polysulfide shuttling effects, enhance long-term cycling stability, improve capacity retention, and maintain consistent ionic conductivity across a range of operating conditions. The ultra-high cycle life may comprise far higher charge-discharge cycles with significantly less capacity fade compared to conventional systems. The at least one electron withdrawing compound may be selected to optimize electrolyte system performance at elevated temperatures, and the electrolyte system may be configured to utilize natural temperature increases during cycling to enhance mass transport and maintain optimal reaction kinetics.

The foregoing general description of the illustrative embodiments and the following detailed description thereof are merely exemplary aspects of the teachings of this disclosure and are not restrictive.

BRIEF DESCRIPTION OF THE DRAWINGS

FIG. 3 illustrates a simplified schematic of a reaction pathway for chalcogenide materials to form free radicals that facilitate conversion of lithium polysulfides, in accordance with one embodiment.

FIGS. 4A-4E are simplified graphs showing performance characteristics of an electrolyte system 401 including an inventive electrolyte system as disclosed herein and in accordance with one embodiment with reference to a control electrolyte system 404 implementing an electrolyte system otherwise identical to the inventive electrolyte system, but omitting any chalcogenide.

FIG. 4A is a plot showing discharge capacity versus cycle number for the inventive electrolyte system 401 and the control electrolyte system 404, according to one embodiment.

FIG. 4B is a plot showing columbic efficiency versus cycle number for the inventive electrolyte system 401 and the control electrolyte system 404, according to the same embodiment.

FIG. 4C is a plot showing rating capacity for the inventive electrolyte system 401 and the control electrolyte system 404, according to the same embodiment.

FIG. 4D is a plot showing discharge capacity versus charge rate for the inventive electrolyte system 401 and the control electrolyte system 404, according to the same embodiment.

FIG. 4E is a plot showing potential versus capacity for the inventive electrolyte system 401 and the control electrolyte system 404, according to the same embodiment.

FIGS. 6A-6D are simplified schematics of the chemical structures of performance-enhancing additives, in accordance with several embodiments.

FIG. 9A is a simplified schematic of an electrochemical cell characterized by a coin cell arrangement, according to one implementation of the presently disclosed inventive concepts.

FIG. 13 depicts a graph showing the rate of breakdown of additives in an electrolyte system over time, according to aspects of the present disclosure.

FIG. 14 illustrates a graph showing the rate of breakdown of additives in an electrolyte system over time with multiple regimes, according to an embodiment.

FIG. 15 depicts a network configuration of fluoroether additives for an electrolyte system, in accordance with example embodiments.

FIG. 16 illustrates a listing of lithium salt additives for an electrolyte system, according to aspects of the present disclosure.

FIG. 17 depicts a network configuration of sacrificial additives for an electrolyte system, according to an embodiment.

FIG. 18 illustrates a graph showing the rate of breakdown of additives over time in different regimes, in accordance with example embodiments.

FIG. 19 depicts a three-dimensional graph showing relationships between reaction parameters in an electrolyte system, according to aspects of the present disclosure.

DETAILED DESCRIPTION

Figure 1A:
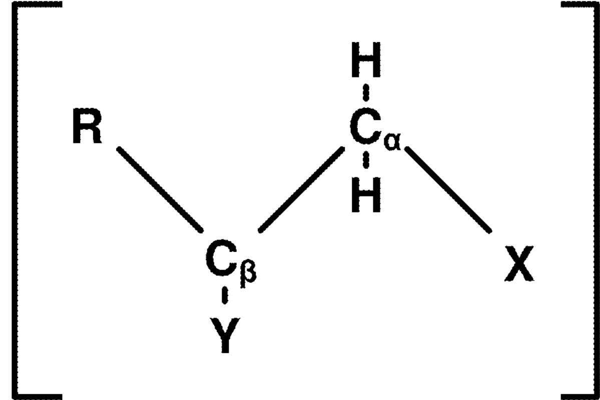
FIGS. 1A-1B are simplified schematics of the chemical structure of the inventive motif characteristic of compounds included in the inventive electrolyte systems described herein, according to various embodiments.

The present disclosure relates to the field of advanced battery technologies, specifically focusing on electrolyte systems for stationary lithium-sulfur batteries designed for long-term grid-scale energy storage applications. This area of technology addresses the growing need for robust and durable energy storage solutions to support the increasing prevalence of renewable energy sources in power grids.

Current electrolyte formulations for lithium-sulfur batteries face significant challenges when applied to stationary storage scenarios. These include gradual breakdown of electrolyte components over time, leading to capacity loss and increased internal resistance. Additionally, the formation of passivating layers on electrode surfaces and the dissolution of active materials into the electrolyte pose obstacles for maintaining stable performance over thousands of cycles. Conventional electrolyte systems also struggle to mitigate polysulfide shuttling effects and maintain consistent ionic conductivity across the wide range of operating conditions encountered in stationary deployments.

The present disclosure introduces a novel multi-regime electrolyte system that addresses these challenges by incorporating a carefully selected combination of solvents, electron withdrawing compounds, performance-enhancing additives, and lithium ion-transporting compounds. This innovative electrolyte composition is designed to undergo controlled decomposition in distinct regimes during battery cycling, enabling ultra-high cycle life suitable for long-term stationary applications. The system's components are selected and arranged based on their respective breakdown rates to form a self-evolving solid electrolyte interface (SEI) that enhances long-term stability and performance.

Furthermore, the disclosed electrolyte system leverages synergistic interactions between its components to optimize various aspects of battery performance. The inclusion of specific chalcogenides facilitates improved sulfur redox kinetics, while the use of alpha-hydrogenated, selectively beta-functionalized electron withdrawing compounds preserves electron density while allowing desired chemical reactions to occur. The system also incorporates heat management strategies that utilize the natural temperature increases during cycling to enhance mass transport and maintain optimal kinetics, particularly beneficial for stationary applications where cooling requirements can be less stringent compared to mobile battery systems.

Additionally, more illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

To address the problems highlighted hereinabove regarding safety and efficiency of electrolyte systems for lithium-based batteries with suitable performance, one principal aspect of the presently disclosed inventive concepts includes an electrolyte system including compounds that contain a motif referred-to herein as an "alpha-hydrogenated, selectively beta-functionalized" (or, equivalently, an "alpha-hydrogenated, selectively beta functionalized") structure. Preferably, the solvent system is capable of satisfying the multitude of stringent requirements for lithium-based batteries noted above.

The inventors propose the exemplary class of alpha-hydrogenated, selectively beta-functionalized compounds advantageously exhibit similar or superior performance because the beta position is not sterically hindered from participating in desired chemical reactions (e.g., facilitating lithium polysulfide conversion via redox reactions, preferential formation of short-chain lithium polysulfide species, robust formation of a SEI, high solvation capability with respect to lithium salts, etc.), while simultaneously preserving the electron density of the electron withdrawing group adjacent to the alpha carbon of the motif. As described in greater detail hereinbelow, without such selective beta modification, solvent compounds otherwise exhibiting a similar (e.g., alpha-hydrogenated but not beta modified) motif undesirably tend to break down into gases in a cascade of reductive decomposition reactions and ultimately evaporate away from the solvent system.

Similarly, the inventive concepts presented herein relate to the use of such electrolyte systems with a lithium-based anode material in an electrochemical cell. As utilized herein, the term "lithium-based" shall be understood as referring to pure lithium metal, as well as lithium alloys or composites (such as Li—Mg, Li—S, Li—C, Li—Al, Li—Fe, and any other suitable equivalent(s) thereof that would be appreciated by skilled artisans upon reading the present descriptions) or combination(s) thereof.

Figure 1B:
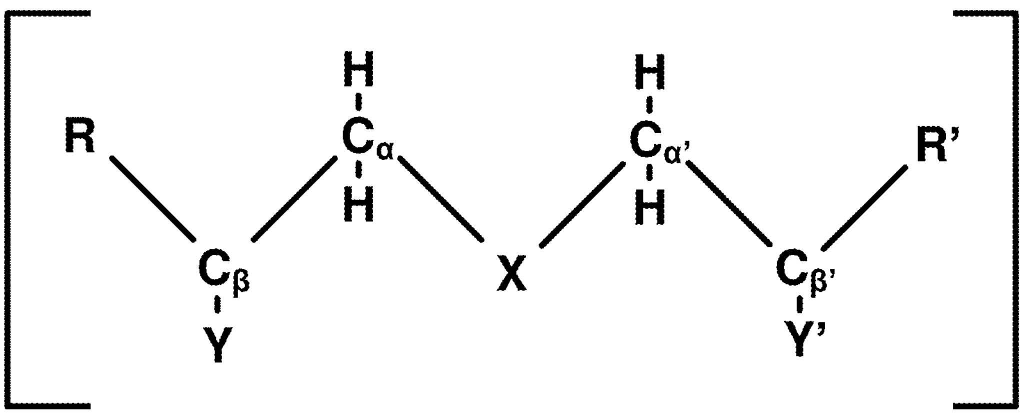

FIGS. 1A-1B are simplified schematics of chemical structures of the motif characteristic of compounds included in the inventive electrolyte systems described herein, according to various embodiments. As an option, the motifs shown in FIGS. 1A-1B may be implemented in the context of any one or more of the embodiments set forth in any previous and/or subsequent figure(s) and/or description thereof. Of course, however, the motifs may be implemented in the context of any desired environment. For instance, solvent systems including amides such as dimethylacetamide (DMA), dimethylformamide (DMF), or any other suitable equivalent(s) thereof that would be appreciated by those having ordinary skill in the art upon reading the present disclosure. Further, the aforementioned definitions may equally apply to the description below.

As shown in FIG. 1A, the motif generally includes an alpha carbon $C_\alpha$ that is hydrogenated (i.e., has at least one hydrogen bonded thereto, preferably is saturated with hydrogen, and more preferably is not directly bonded to another electron withdrawing group other than X), and directly bonded to a beta carbon $C_\beta$ and an electron withdrawing group X. According to various embodiments, the electron withdrawing group is characterized by an electronegativity greater than carbon, and preferably by an electronegativity characterized by an electronegativity greater than the alpha carbon to which X is bonded. Preferably, X is not a halogen. Accordingly, in preferred implementations X may be selected from a group consisting of nitrogen, oxygen, and sulfur.

With continuing reference to FIG. 1A, In embodiments where $C_\alpha$ is not saturated with hydrogen, $C_\alpha$ may be doubly bonded to X, such as for a terminal aldehyde in which $C_\alpha$ is bonded to a single hydrogen and doubly bonded to X, and X is oxygen.

In addition to being bonded to the alpha carbon $C_\alpha$, the beta carbon $C_\beta$ is bonded to a modifying group Y and an aliphatic or aromatic side chain R. Whether R is aliphatic or aromatic, shorter chains, e.g. C1-C20, are preferred to minimize the overall mass of the molecule. Moreover, the backbone of R may, in various implementations, include elements other than carbon, including but not limited to phosphorus, sulfur, oxygen, nitrogen, etc., as would be understood by a person having ordinary skill in the art upon reading the present disclosures. In some approaches, R may be functionalized, such as with halogen(s), amine(s), amide(s), oxide(s), thiol(s), etc., as would be understood by a person having ordinary skill in the art upon reading the present disclosures.

Optionally, depending on the identity of Y and R, and bonding between the beta carbon $C_\beta$, Y, and R, the beta carbon $C_\beta$ may optionally be bonded to a hydrogen (not shown), or doubly bonded to either Y or R.

In accordance with the embodiment depicted in FIG. 1A, the electron withdrawing group X is a terminal functional group of the molecule containing the alpha-hydrogenated, selectively beta-functionalized motif.

Of course, in alternative embodiments, such as shown in FIG. 1B, the electron withdrawing group X may be part of the backbone of the molecule, such as for a secondary or tertiary amine (where X is nitrogen), an ether (where X is oxygen), or an organosulfur (where X is sulfur), etc., as will be appreciated by those having ordinary skill in the art upon reading the present descriptions.

With continuing reference to FIG. 1B, and except as noted immediately hereinabove, the same considerations with respect to bonding and identity of $C_\alpha$, $C_\beta$, Y, and R as described with respect to FIG. 1A apply to the motif as shown in FIG. 1B. In addition, similar considerations apply with respect to $C_{\alpha'}$, $C_{\beta'}$, Y', and R', with the exception that in certain arrangements R and R' may be part of the same aromatic structure connecting the molecule into a ring (or multi-ring) structure. For instance, and as described in greater detail below with respect to FIG. 2B-3, R and R' may form a connected double-ring structure. Of course, it shall be understood that $C_\alpha$, $C_\beta$, Y, R, $C_{\alpha'}$, $C_{\beta'}$, Y', and R' may each independently be defined according to any suitable combination of characteristics (identity, bonding, etc.) described hereinabove, according to various embodiments.

Figures 1, 2, 2A, 2B, 3:
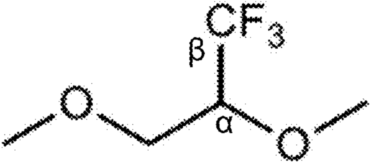
FIGS. 2A-1 through 2B-3 are simplified schematics of the chemical structures of several exemplary species of alpha-hydrogenated, selectively beta-functionalized compounds, according to different approaches.

FIGS. 2A-1 through 2A-3 are simplified schematics of the chemical structures of several exemplary species of alpha-hydrogenated, selectively beta-functionalized compounds, where the beta modifications are fluorine (i.e., Y=F), while FIG. 2B-3 depicts an exemplary alpha-hydrogenated, selectively beta-functionalized compound where the beta modification is not fluorine (i.e., Y=$ONO_2$), according to different approaches. As an option, the exemplary compounds may be implemented in the context of any one or more of the embodiments set forth in any previous and/or subsequent figure(s) and/or description thereof. Of course, however, the compounds may be implemented in the context of any desired environment. Further, the aforementioned definitions may equally apply to the description below.

As shown in FIGS. 2A-1, 2A-2, and 2A-3, the exemplary electron-withdrawing compounds (1,1,1-trifluoro-2,3-dimethyoxypropane (TFDMP), 4-(trifluoromethyl)-1,3-dioxolane (TFDOL), and (3-fluoropyridine) (3F-P), respectively) fit the motif shown in FIG. 1A. In FIG. 2A-3, R forms an aromatic ring that connects back to $C_\alpha$. For the structures shown in FIGS. 2A-1 and 2A-2, X is oxygen, meanwhile for the structure shown in FIG. 2A-3, X is nitrogen.

The exemplary electron withdrawing compounds shown in FIGS. 2B-1, 2B-2, and 2B-3 (monofluoride bis(2-fluoroethyl) ether (BFE), bis(2,2,2-trifluoroethyl) ether (BTFE), and isosorbide dinitrate (ISDN), respectively); fit the motif as shown in FIG. 1B. For the electron withdrawing compounds shown in FIGS. 2B-1, 2B-2, and 2B-3, X is oxygen. For the electron withdrawing compounds shown in FIGS. 2B-1 and 2B-2, Y is fluorine. For the electron withdrawing compound shown in FIG. 2B-3 only, Y is $ONO_2$.

Of course, the exemplary structures shown in FIGS. 2A-1 through 2B-3 are to be understood as illustrative of the scope of electron withdrawing compounds according to various embodiments of the inventive concepts presented herein. Other compounds including the motifs shown in FIGS. 1A and/or 1B may also be suitable electron withdrawing compounds, according to different implementations, such as detailed below with reference to Table 2. In particular, exemplary suitable electron withdrawing compounds such as 2,2-dimethoxy-4-trifluoromethyl-1,3-dioxolane ether (DTDL), 1,1,1-trifluoro-2-(2-(2-(2,2,2-trifluoroethoxy) ethoxy) ethoxy)ethane (FDG), 1,1,1,14,14,14-hexafluoro-3,6,9,12-tetraoxatetradecane (FTrG), 1,1,1,17,17,17-hexafluoro-3,6,9,12,15-pentaoxaheptadecane (FTeG), bis(2,2-difluoroethyl) ether (BDE), 2,2,2-trifluoroethyl 2-fluoroethyl ether (TFFE), 1,1-difluoroethyl-2-fluoroethyl ether (DFE), fluorinated 1,4-dimethoxylbutane (FDMB), 1,1,2,2-tetrafluoroethyl 2,2,3,3-tetrafluororopyl ether (TTE), bis(2,2,3,3-tetrafluoropropyl)ether) (BTFPE), 2,2,2-trifluoroethyl 1,1,2,2-tetrafluoroethyl ether (TFTFE), tris(2,2,2-trifluoroethyl) phosphate, bis(2,2,2-trifluoroethyl) methylphosphonate, or other suitable equivalents and combinations thereof as would be appreciated by those having ordinary skill in the art upon reading the present disclosures may be employed as electron-withdrawing compounds without departing from the scope of the inventive concepts set forth herein. Moreover, combinations of electron withdrawing groups may be employed without departing from the scope of the presently described inventive concepts.

Further still, those having ordinary skill in the art will appreciate that compounds such as shown in FIG. 2B-3, which excludes any fluorine or other halogen, are particularly preferred species of electron withdrawing compounds as they do not raise the environmental concerns associated with heavily halogenated, particularly heavily fluorinated, compounds. Indeed, according to certain approaches, the exemplary electron withdrawing groups discussed hereinabove, analogs thereof, and/or derivatives thereof, may be modified to substitute halide functional groups with —$ONO_2$ functional groups to form nitrate esters, and mitigate or eliminate environmental concerns associated with PFAS and other so-called "forever chemicals".

Similarly, in particularly preferred embodiments the inventive electrolyte solvent systems may include lithiated salts that do not include any halogen component, such as $LiClO_4$, or other suitable equivalents (and combinations) thereof that would be appreciated by a person having ordinary skill in the art upon reading the present disclosure.

Still yet even further, the R and/or R' groups of preferred electron withdrawing compounds in the context of the inventive concepts are characterized by minimal length, again to minimize the mass contribution of the electron withdrawing compound to the electrolyte system overall, and electrochemical cells including such electrolyte systems.

FIG. 3 illustrates a simplified schematic of a reaction pathway for chalcogenide materials to form free radicals that facilitate conversion of lithium polysulfides, in accordance with one embodiment.

FIGS. 4A-4E are simplified graphs showing performance characteristics of an electrolyte system 401 including an inventive electrolyte system as disclosed herein and in accordance with one embodiment with reference to a control electrolyte system 402 implementing an electrolyte system otherwise identical to the inventive electrolyte system, but omitting any chalcogenide.

FIG. 4A is a plot showing discharge capacity versus cycle number for the inventive electrolyte system 401 and the control electrolyte system 402, according to one embodiment.

FIG. 4B is a plot showing columbic efficiency versus cycle number for the inventive electrolyte system 401 and the control electrolyte system 402, according to the same embodiment.

FIG. 4C is a plot showing rating capacity for the inventive electrolyte system 401 and the control electrolyte system 402, according to the same embodiment.

FIG. 4D is a plot showing discharge capacity versus charge/discharge rate for the inventive electrolyte system 401 and the control electrolyte system 402, according to the same embodiment.

Figure 4E:
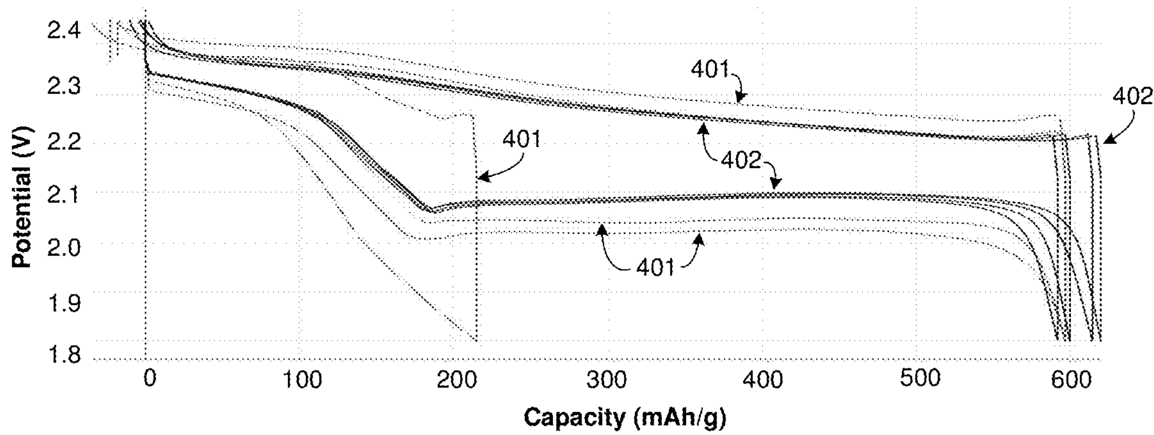

FIG. 4E is a plot showing potential versus capacity for the inventive electrolyte system 401 and the control electrolyte system 402, according to the same embodiment.

The inventive electrolyte system 401 and control electrolyte system 402 each respectively include two solvents, an electron withdrawing compound, and two lithium ion-transporting compounds, in the same amount. The inventive electrolyte system 401 further includes about 1 wt % of a chalcogenide DMDSe.

As can be seen from FIGS. 4A-4E, the inventive electrolyte system 401 exhibits a more pronounced feature corresponding to presence/creation of $Li_2S_{(s)}$ relative to the control electrochemical cell 402. Moreover, capacity of the inventive electrochemical cell 401 is reversibly increased at every rate. Without wishing to be bound to any particular theory, the inventors propose the improved performance of the inventive electrochemical cell may, at least in part, be attributed to increased capacity through the second discharge plateau, owing to improved liquid-solid reaction kinetics of polysulfide conversion (Equation 1(c), above).

Similar experiments including a second inventive electrolyte system 403 which employs an identical formulation as inventive electrolyte system 401, but including DPDSe rather than DMDSe as the chalcogenide component, exhibited improved performance with respect to the control electrolyte system 402, but lesser performance on all metrics relative to inventive electrolyte system 401. Again without wishing to be bound to any particular theory, the inventors propose that DPDSe assists kinetics of liquid-liquid conversion reactions (Equations 1(a)-1(b)), which are not the rate limiting step until removal of the greater barrier presented by liquid-solid conversion (Equation 1(c)), and alleviated by inclusion of DMDSe.

In further experiments the inventors varied the amount of DMDSe in the inventive electrolyte system 401, testing embodiments including 0.5 wt % DMDSe, 1.0 wt % DMDSe, and 2.0 wt % DMDSe, but otherwise being identical to the formulation described hereinabove for inventive electrolyte system 401.

Despite expectations for further increased performance with increasing DMDSe concentration beyond 1 wt %, the opposite relationship was observed, with notable losses in discharge capacity, coulombic efficiency, and rating capacity in amounts greater than 1 wt %. Despite expecting increased improvement of lithium polysulfide conversion reaction kinetics with higher amount of available free radicals (i.e., higher concentration of DMDSe), the inventors postulate that increased DMDSe achieves optimal improvement of liquid-to-solid (and, to a lesser degree, solid-solid) reaction kinetics to the point of no longer being the rate limiting step in the overall pathway when included in an amount of about 1 wt %. Above this concentration, lithium polysulfide shuttling thus may increase without any corresponding benefit to discharge capacity. Put another way, including DMDSe as the chalcogenide improves kinetics of the lower plateau (liquid-to-solid reactions), while including DPDSe improves kinetics of the upper plateau (solid-liquid reaction). When the electrolyte system includes certain electron-withdrawing compounds (such as BTFE) which independently assist with reactions going into liquid state, addition of a chalcogenide that facilitates liquid-to-solid reactions provides a synergistic improvement to overall lithium polysulfide conversion and thus improves sulfur utilization in the resulting electrochemical cell.

The above is merely one example of the aforementioned observations that particular electrolyte system compositions may not necessarily follow conventional trends and expectations with respect to reaction kinetics and corresponding performance characteristics.

In still further experiments, the inventors tested formulations of an inventive electrolyte system similar to inventive electrolyte system 401, but including a combination of DMDSe and DPDSe in equal amounts of 0.5 wt % each, and 1.0 wt % each, since these concentration ranges produced the best results for similar inventive electrolyte systems as shown with reference to FIGS. 4A-4E, and described hereinabove.

In general, the mixed diselenide electrolyte formulation exhibited little difference with respect to cycle life, and a slight improvement to capacity and Coulombic efficiency at 1 wt % concentration, despite expectations for lower Coulombic efficiency due to presence of greater amount of selenide (i.e., a system including 1 wt % each DMDSe and DPDSe is comparable in terms of selenide concentration to a system including 2 wt % DMDSe, which was observed to exhibit poor Coulombic efficiency relative to 1 wt % DMDSe alone, but the combined 1 wt % each of DMDSe and DPDSe did not exhibit the same loss, indeed a slight increase was observed).

In addition to testing various species of chalcogenide, the inventors investigated different electron withdrawing compounds (particularly hydrofluoroethers TTE, BTFE, or FDMB) at different concentrations, in formulations otherwise similar to inventive electrolyte system 401 shown and described hereinabove regarding FIGS. 4A-4E.

Figure 5A:
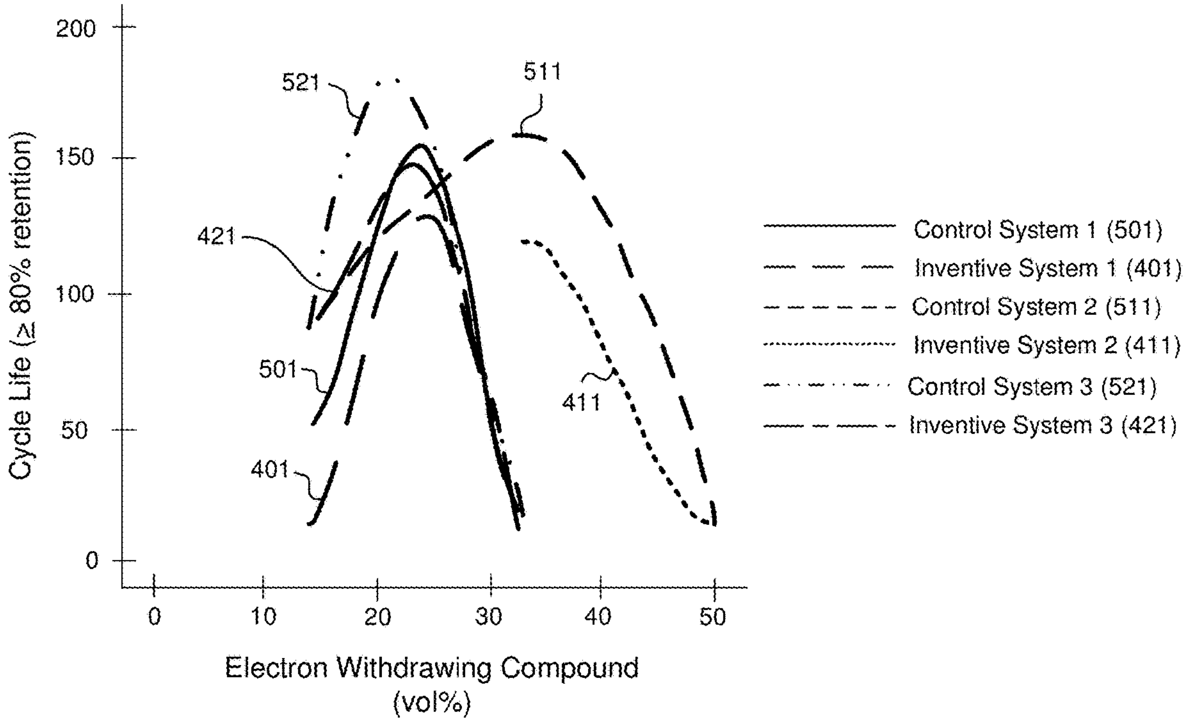
FIG. 5A is a plot showing cycle life versus fluoroether concentration for inventive electrolyte systems 401, 411, and 421 and corresponding control electrolyte systems 402, 412, and 422, according to several exemplary embodiments.
Figure 5B:
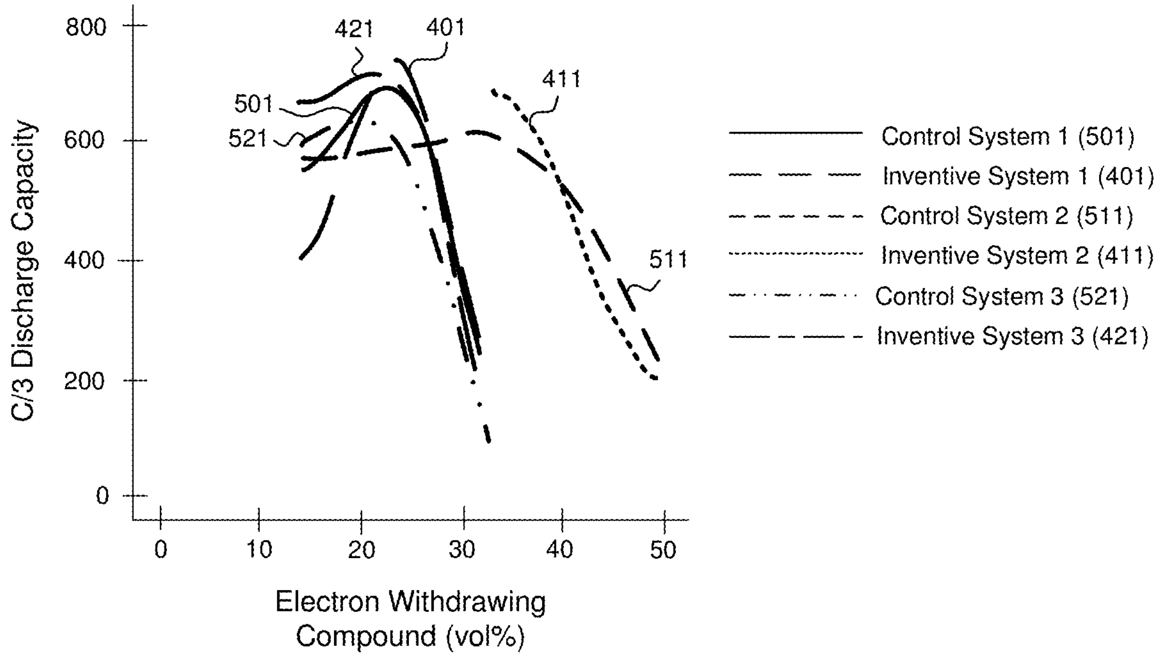
FIG. 5B is a plot showing cycle life versus fluoroether concentration for inventive electrolyte systems 401, 411, and 421 and corresponding control electrolyte systems 402, 412, and 422, according to several exemplary embodiments.

The results of these experiments are summarized in Table 1 and FIGS. 5A-5B.

TABLE 1

Lithium-based battery performance as a function of hydrofluoroether composition

| Electron Withdrawing Compound | Conc (vol %) | Control C/3 Capacity | DMDSe C/3 Capacity | Control Cycle Life | DMDSe Cycle Life |
|---|---|---|---|---|---|
| TTE | 14% | 600 | 660 | 110 | 90 |
| TTE | 25% | 620 | 660 | 170 | 140 |
| TTE | 33% | 150 | 140 | 14 | 0 |
| BTFE | 14% | 550 | 400 | 50 | 14 |
| BTFE | 25% | 660 | 710 | 150 | 125 |
| BTFE | 33% | 200 | 200 | 14 | 0 |
| FDMB | 14% | 565 | Not tested | 90 | Not tested |
| FDMB | 25% | 590 | Not tested | 140 | Not tested |
| FDMB | 33% | 610 | 680 | 160 | 120 |
| FDMB | 50% | 200 | 200 | 14 | 0 |

Note that the capacities shown in Table 1 are reported on an electrode basis rather than on a sulfur basis.

FIGS. 5A-5B depict exemplary curves for the inventive electrolyte systems 401, 411, and 421 and corresponding control electrolyte systems 501, 511, and 521. Per Table 1, the various electrolyte systems included two solvents, one electron withdrawing compound (respectively, BTFE for electrolyte systems 401 and 501, FDMB for electrolyte systems 411 and 511, and TTE for electrolyte systems 421 and 521), two lithium ion-transporting compounds (LITFSI and $LiNO_3$), and a chalcogenide component (DMDSe), in the same amounts, respectively, and within the ranges described herein.

FIG. 5A depicts performance of the cells with respect to cycle life (defined, in accordance with these experiments, by retention of at least 80% capacity following discharge) as a function of hydrofluoroether concentration, while FIG. 5B depicts performance with respect to capacity as a function of hydrofluoroether concentration.

As mentioned briefly above, testing the different hydrofluoroethers, and concentrations thereof, produced surprising results that do not follow the conventional wisdom regarding role of hydrofluoroether (and indeed, fluorine generally) in lithium-based batteries. In general, addition of fluorine in an electrolyte system of a lithium-based battery is correlated with increased life cycle of the resulting battery. This is because, conventionally, it has been understood that added fluorine corresponds to decreased solvation capability and wettability of (typically concentrated, and highly viscous) electrolyte toward electrode surfaces.

Moreover, hydrofluoroethers and similar electron withdrawing compounds are conventionally understood (and indeed designed) to be inert towards both electrodes of lithium-based batteries. Moreover still, for lithium-sulfur battery chemistries, strict limitations on the amount of salt that can be included due to limited solubility in the remaining components of the electrolyte system, and the battery as a whole.

The presently disclosed inventive concepts employ these electron withdrawing compounds in electrolytes with low salt concentration due to lower Lewis acid-base interaction with polysulfides (less solubility), and previous presumptions that these compounds, particularly hydrofluoroethers, were "known" to be inert towards the notoriously reactive, lithium-based anode material.

The presently disclosed inventive concepts employ these electron withdrawing compounds in electrolytes with low salt concentration due to lower Lewis acid-base interaction with polysulfides (less solubility), and previous presumptions that these compounds, particularly hydrofluoroethers, were "known" to be inert towards the notoriously reactive, lithium-based anode material.

FIGS. 6A-6D are simplified schematics of the chemical structures of performance-enhancing additives, in accordance with several embodiments. FIG. 6A shows the structure of dicyandiamide, while FIG. 6B shows the structure of guanine, FIG. 6C shows the chemical structure of guanidine nitrate, and FIG. 6D depicts the chemical structure of lithium dicyanamide, according to illustrative embodiments. Without wishing to be bound to any particular theory, the inventors propose that the inventive electrolyte systems described herein form a protective solid-electrolyte interphase (SEI) on surfaces of both the cathode and anode of the lithium-based electrochemical cells into which the electrolyte systems are introduced.

With respect to the contribution of the solvent(s) and electron withdrawing compound(s) to the SEI, refer to U.S. Provisional Patent Application No. 63/624,202 and its progeny for a detailed investigation and discussion of the mechanism and chemical structure of components of the SEI formed therewith.

With respect to the performance-enhancing additive, and again without wishing to be bound to any particular theory, the inventors propose suitable additives, such as acetonitrile, azobisisobutyronitrile (AIBN), cyanamide, lithium dicyanamide, dicyandiamide (DCDA), guanine, guanidine nitrate, guanidine thiocyante, guanidine p-tolunesulfonate, guanidine trifluoromethanolate, 2-guanidinobenzimidazole, guanidine hydrochloride, guanidine carbonate, guanidine bromide, guanidine iodide, guanidine acetate, guanidine sulfate, guanidine phosphate, succionitrile, or any combination thereof, form a protective thin film polymer on or around surface(s) of the electrodes, and this protective film both mitigates the well-known polysulfide shuttling effect and its detrimental effects as well as protects the anode in particular from delithiation (stripping) during cycling of the electrochemical cell.

Figure 7A:
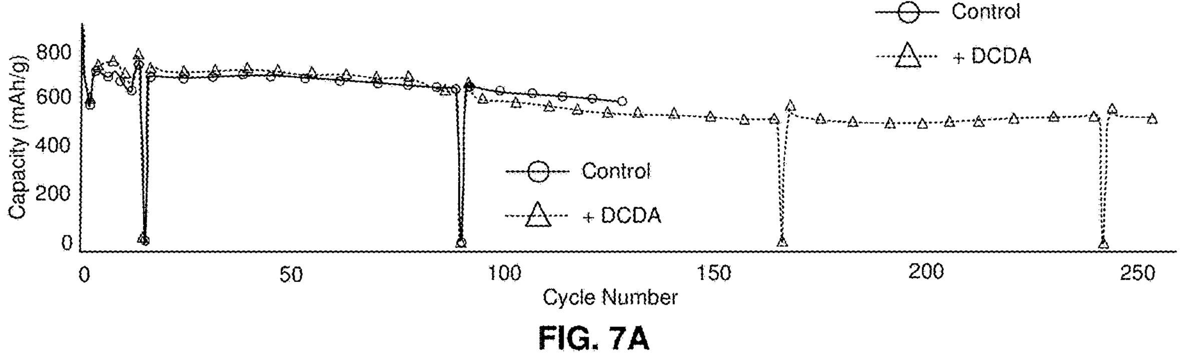
FIG. 7A is a plot comparing capacity retention over cycle life of a lithium-sulfur electrochemical cell having a baseline electrolyte composition (control) versus a lithium-sulfur electrochemical cell having a baseline electrolyte composition but also including DCDA additive (+DCDA), in accordance with one embodiment.
Figure 7B:
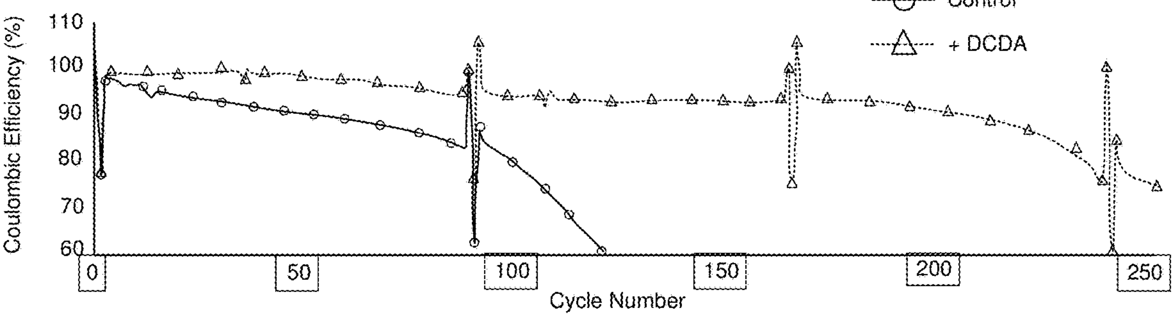
FIG. 7B is a plot comparing Coulombic efficiency of a lithium-sulfur electrochemical cell having a baseline electrolyte composition (control) versus a lithium-sulfur electrochemical cell having a baseline electrolyte composition but also including DCDA additive (+DCDA), in accordance with one embodiment.

As a result, and as reflected in the data shown in FIGS. 7A-7B, both cycle life (FIGS. 7A-7B) and Coulombic efficiency (FIG. 7B) of lithium-based electrochemical cells implementing the inventive electrolyte system are dramatically improved.

For instance, referring again to FIGS. 7A-7B, it is evident that the control electrochemical cell (control, circular data points), which included an electrolyte system without any performance-enhancing additive, experienced dramatic reduction in Coulombic efficiency at around 90 cycles, and failed after about 100 cycles.

By comparison, lithium-based electrochemical cells including the inventive electrolyte system exhibit substantially improved retention of Coulombic efficiency, remaining above 80% for over 225 cycles. Indeed, select embodiments of lithium-based electrochemical cells implementing the inventive electrolyte system presently disclosed remained active (above 80% CE) for over 300 cycles.

Notably, and as shown in FIG. 7A in particular, these benefits were not associated with loss of specific capacity, which remained similar to the control, and stable over the longer cycle life of the inventive electrochemical cells.

Moreover, the electrochemical cell embodiments used to produce the comparative data shown in FIGS. 7A-7B were charged and discharged at a rate of C/3, but additional embodiments showed similar performance characteristics when charged at rates up to about 1 C, indicating the inventive electrolyte system described herein also may facilitate higher charge/discharge rates than typically achievable (e.g., about C/3) using similar electrochemical cells without the inventive electrolyte system described herein.

Figure 7C:
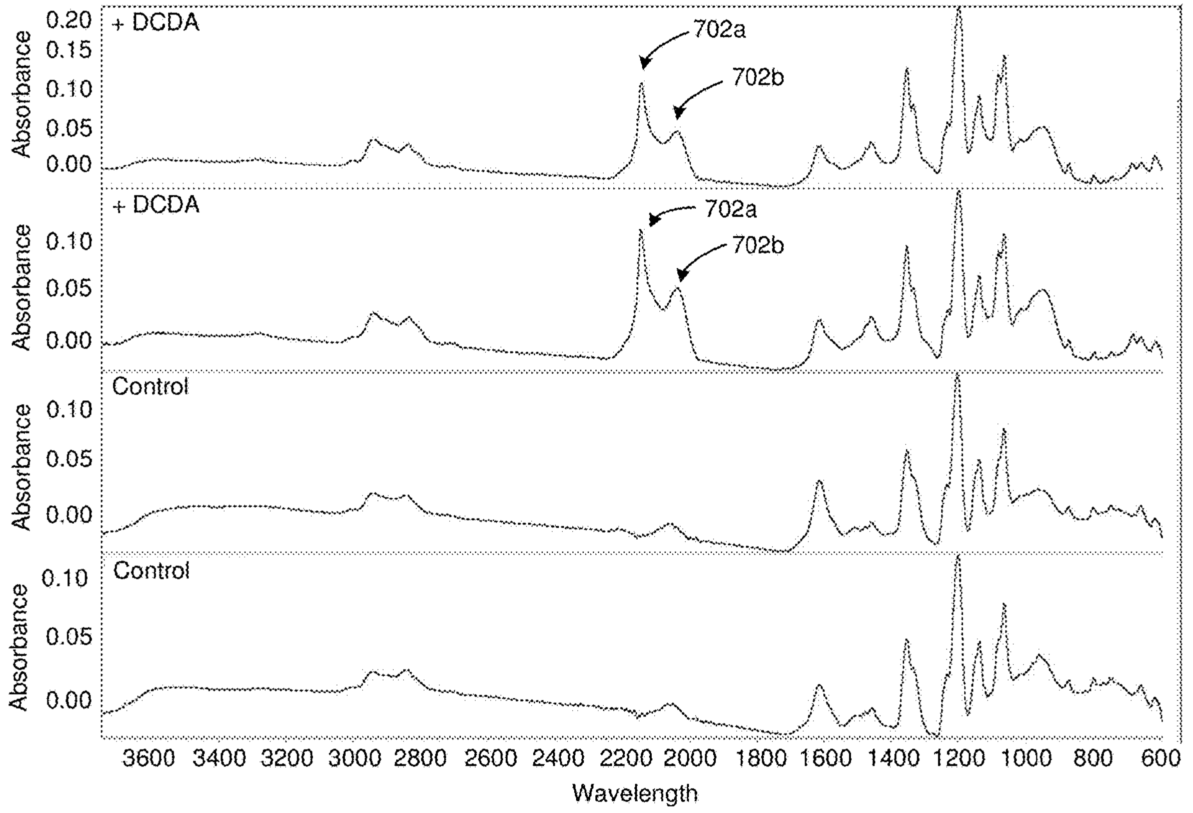
FIG. 7C is a plot showing Fourier-Transform Infrared (FTIR) spectra of the solid-electrolyte interphase (SEI) of two lithium-sulfur electrochemical cells having a baseline electrolyte composition (control) in comparison to the SEI of two lithium-sulfur electrochemical cells having a baseline electrolyte composition but also including DCDA additive (+DCDA), in accordance with one embodiment.

FIG. 7C is a plot showing Fourier-Transform Infrared (FTIR) spectra of the solid-electrolyte interphase (SEI) of two lithium-sulfur electrochemical cells having a baseline electrolyte composition (control) in comparison to the SEI of two inventive lithium-sulfur electrochemical cells having a baseline electrolyte composition but also including DCDA additive (+DCDA), in accordance with one embodiment.

As is apparent from the spectra, the inventive electrochemical cell SEIs exhibit two distinct peaks 702*a*, 702*b* in the vicinity of wavelength 2000-2200. Without wishing to be bound to any particular theory, the inventors postulate these peaks correspond to presence of lithium cyanate and lithium thiocyanate in or on the SEI. These compounds are proposed to form from decomposition of DCDA at the electron supplying anode in the presence of oxidative species such as polysulfides and nitrate in a synergistic manner.

Moreover, in view of the double-ended nature of the cyanate and thiocyanate anions, which each have both an 'anion' end with a Lewis basic negative charge and the other end has a Lewis basic nitrogen with a lone pair, the inventors propose these species are enhancing $Li^+$ transport, and/or increasing $Li^+$ concentration in the SEI, which advantageously enhances robustness against degradation of the interphase, and correspondingly extending cycle life of the electrochemical cell. Put another way, the cyanate and thiocyanate facilitate $Li^+$ ion transport without (or at least with significantly less) degradation of the SEI, allowing $Li^+$ present in the cell to be dedicated to normal cycling rather than rebuilding the SEI. This mechanism is particularly effective in later cycles, thus significantly extending the life of the electrochemical cell.

While FIGS. 6-7C and corresponding descriptions presented hereinabove feature an inventive electrolyte system including one or more compounds selected from acetonitrile, azobisisobutyronitrile (AIBN), cyanamide, lithium dicyanamide, dicyandiamide (DCDA), guanine, guanidine nitrate, guanidine thiocyante, guanidine p-toluenesulfonate, guanidine trifluoromethanolate, 2-guanidinobenzimidazole, guanidine hydrochloride, guanidine carbonate, guanidine bromide, guanidine iodide, guanidine acetate, guanidine sulfate, guanidine phosphate, succionitrile, or any combination thereof as the performance-enhancing additive, those having ordinary skill in the art will appreciate, upon reading the present descriptions, that other suitable equivalent(s) thereof may be implemented as performance-enhancing additive(s), in any suitable permutation, combination or amount, without departing from the scope of the inventive concepts disclosed herein.

For instance, derivatives of performance enhancing additive(s) that may form in the presence of other components of electrolyte systems described herein, isomers of performance enhancing additive(s), compounds with similar chemical motifs and/or structures, larger molecules including performance enhancing additive(s) or substantially similar structures as a portion of the larger molecular structure, etc. may be implemented as performance-enhancing additives while remaining within the scope of the inventive concepts presented herein.

Additionally or alternatively, compounds capable of forming a thin film protective polymer layer with a composition similar to the thin film formed by performance enhancing additive(s) or derivatives thereof (singly, or in combination with other components of the electrolyte system, in various approaches) may be utilized as performance-enhancing additives in the context of the presently disclosed inventive concepts.

Tables 2 and 3 below summarize various suitable compositions of the solvent system and additional components of the inventive electrolyte systems described hereinabove, respectively and according to several exemplary embodiments. It shall be understood that the exemplary embodiments set forth in the tables are provided by way of illustration rather than limitation, and other compositions falling within the scope of the disclosure provided herein may be employed without departing from the scope of the inventive concepts presented herein.

Moreover, for brevity and organizational simplicity, the tables describe different components and suitable amounts individually, and in select combinations, but it shall be understood that any combination of different species may be employed in suitable amounts as informed by the broad ranges presented above may be employed without departing from the scope of the presently described inventive concepts.

For instance, any number of different species of solvent(s) electron withdrawing compound(s) lithium ion-transporting compound(s), and/or performance-enhancing additive(s), may be included in an electrolyte system composition with the only limitation being that the total amount of solvent(s), electron withdrawing compound(s), lithium ion-transporting compound(s), and performance-enhancing additive(s), respectively, fall within the broad ranges set forth hereinabove for the respective component.

TABLE 2

Exemplary Solvent System Components

| Solvent 1 | Vol % Solvent 1 | Solvent 2 | Vol % Solvent 2 | Electron Withdrawing Compound (EWC) | Vol % EWC |
|---|---|---|---|---|---|
| dimethoxyethane (DME) | 25.00 | none | 0 | bis(2-fluoroethyl) ether (BFE) | 75.00 |
| DME | 25.00 | none | 0 | 3-fluoropyridine (3FP) | 75.00 |
| DME | 25.00 | none | 0 | bis(2,2,2, trifluoroethyl) ether (BTFE) | 75.00 |
| DME | 25.00 | none | 0 | fluorinated 1,4-dimethoxylbutane (FDMB) | 75.00 |

TABLE 2-continued

| Exemplary Solvent System Components | | | | | |
|---|---|---|---|---|---|
| Solvent 1 | Vol % Solvent 1 | Solvent 2 | Vol % Solvent 2 | Electron Withdrawing Compound (EWC) | Vol % EWC |
| DME | 25.00 | none | 0 | isosorbide dinitrate (ISDN) | 75.00 |
| DME | 25.00 | none | 0 | 1,1,2,2-tetrafluoroethyl 2,2,3,3-tetrafluororopyl ether (TTE) | 75.00 |
| DME | 33.00 | none | 0 | BFE | 67.00 |
| DME | 33.00 | none | 0 | 3FP | 67.00 |
| DME | 33.00 | none | 0 | BFTE | 67.00 |
| DME | 33.00 | none | 0 | FDMB | 67.00 |
| DME | 33.00 | none | 0 | ISDN | 67.00 |
| DME | 33.00 | none | 0 | TTE | 67.00 |
| DME | 50.00 | none | 0 | BFE | 50.00 |
| DME | 50.00 | none | 0 | 3FP | 50.00 |
| DME | 50.00 | none | 0 | BFTE | 50.00 |
| DME | 50.00 | none | 0 | FDMB | 50.00 |
| DME | 50.00 | none | 0 | ISDN | 50.00 |
| DME | 50.00 | none | 0 | TTE | 50.00 |
| DME | 75.00 | none | 0 | BFE | 25.00 |
| DME | 75.00 | none | 0 | 3FP | 25.00 |
| DME | 75.00 | none | 0 | BFTE | 25.00 |
| DME | 75.00 | none | 0 | FDMB | 25.00 |
| DME | 75.00 | none | 0 | ISDN | 25.00 |
| DME | 75.00 | none | 0 | TTE | 25.00 |
| DME | 10.00 | dioxolane (DOL) | 15.00 | BFE | 75.00 |
| DME | 10.00 | DOL | 25.00 | BFE | 65.00 |
| DME | 10.00 | DOL | 33.00 | BFE | 57.00 |
| DME | 10.00 | DOL | 50.00 | BFE | 40.00 |
| DME | 10.00 | DOL | 65.00 | BFE | 25.00 |
| DME | 10.00 | DOL | 15.00 | 3FP | 75.00 |
| DME | 10.00 | DOL | 25.00 | 3FP | 65.00 |
| DME | 10.00 | DOL | 33.00 | 3FP | 57.00 |
| DME | 10.00 | DOL | 50.00 | 3FP | 40.00 |
| DME | 10.00 | DOL | 65.00 | 3FP | 25.00 |
| DME | 10.00 | DOL | 15.00 | BFTE | 75.00 |
| DME | 10.00 | DOL | 25.00 | BFTE | 65.00 |
| DME | 10.00 | DOL | 33.00 | BFTE | 57.00 |
| DME | 10.00 | DOL | 50.00 | BFTE | 40.00 |
| DME | 10.00 | DOL | 65.00 | BFTE | 25.00 |
| DME | 10.00 | DOL | 15.00 | FDMB | 75.00 |
| DME | 10.00 | DOL | 25.00 | FDMB | 65.00 |
| DME | 10.00 | DOL | 33.00 | FDMB | 57.00 |
| DME | 10.00 | DOL | 50.00 | FDMB | 40.00 |
| DME | 10.00 | DOL | 65.00 | FDMB | 25.00 |
| DME | 10.00 | DOL | 15.00 | ISDN | 75.00 |
| DME | 10.00 | DOL | 25.00 | ISDN | 65.00 |
| DME | 10.00 | DOL | 33.00 | ISDN | 57.00 |
| DME | 10.00 | DOL | 50.00 | ISDN | 40.00 |
| DME | 10.00 | DOL | 65.00 | ISDN | 25.00 |
| DME | 10.00 | DOL | 15.00 | TTE | 75.00 |
| DME | 10.00 | DOL | 25.00 | TTE | 65.00 |
| DME | 10.00 | DOL | 33.00 | TTE | 57.00 |
| DME | 10.00 | DOL | 50.00 | TTE | 40.00 |
| DME | 10.00 | DOL | 65.00 | TTE | 25.00 |
| DME | 10.00 | toluene (TOL) | 15.00 | BFE | 75.00 |
| DME | 10.00 | TOL | 25.00 | BFE | 65.00 |
| DME | 10.00 | TOL | 33.00 | BFE | 57.00 |
| DME | 10.00 | TOL | 50.00 | BFE | 40.00 |
| DME | 10.00 | TOL | 65.00 | BFE | 25.00 |
| DME | 10.00 | TOL | 15.00 | 3FP | 75.00 |
| DME | 10.00 | TOL | 25.00 | 3FP | 65.00 |
| DME | 10.00 | TOL | 33.00 | 3FP | 57.00 |
| DME | 10.00 | TOL | 50.00 | 3FP | 40.00 |
| DME | 10.00 | TOL | 65.00 | 3FP | 25.00 |
| DME | 10.00 | TOL | 15.00 | BFTE | 75.00 |
| DME | 10.00 | TOL | 25.00 | BFTE | 65.00 |
| DME | 10.00 | TOL | 33.00 | BFTE | 57.00 |
| DME | 10.00 | TOL | 50.00 | BFTE | 40.00 |
| DME | 10.00 | TOL | 65.00 | BFTE | 25.00 |
| DME | 10.00 | TOL | 15.00 | FDMB | 75.00 |

TABLE 2-continued

| Exemplary Solvent System Components | | | | | |
|---|---|---|---|---|---|
| Solvent 1 | Vol % Solvent 1 | Solvent 2 | Vol % Solvent 2 | Electron Withdrawing Compound (EWC) | Vol % EWC |
| DME | 10.00 | TOL | 25.00 | FDMB | 65.00 |
| DME | 10.00 | TOL | 33.00 | FDMB | 57.00 |
| DME | 10.00 | TOL | 50.00 | FDMB | 40.00 |
| DME | 10.00 | TOL | 65.00 | FDMB | 25.00 |
| DME | 10.00 | TOL | 15.00 | ISDN | 75.00 |
| DME | 10.00 | TOL | 25.00 | ISDN | 65.00 |
| DME | 10.00 | TOL | 33.00 | ISDN | 57.00 |
| DME | 10.00 | TOL | 50.00 | ISDN | 40.00 |
| DME | 10.00 | TOL | 65.00 | ISDN | 25.00 |
| DME | 10.00 | TOL | 15.00 | TTE | 75.00 |
| DME | 10.00 | TOL | 25.00 | TTE | 65.00 |
| DME | 10.00 | TOL | 33.00 | TTE | 57.00 |
| DME | 10.00 | TOL | 50.00 | TTE | 40.00 |
| DME | 10.00 | TOL | 65.00 | TTE | 25.00 |
| DME | 10.00 | sulfolane (SUL) | 15.00 | BFE | 75.00 |
| DME | 10.00 | SUL | 25.00 | BFE | 65.00 |
| DME | 10.00 | SUL | 33.00 | BFE | 57.00 |
| DME | 10.00 | SUL | 50.00 | BFE | 40.00 |
| DME | 10.00 | SUL | 65.00 | BFE | 25.00 |
| DME | 10.00 | SUL | 15.00 | 3FP | 75.00 |
| DME | 10.00 | SUL | 25.00 | 3FP | 65.00 |
| DME | 10.00 | SUL | 33.00 | 3FP | 57.00 |
| DME | 10.00 | SUL | 50.00 | 3FP | 40.00 |
| DME | 10.00 | SUL | 65.00 | 3FP | 25.00 |
| DME | 10.00 | SUL | 15.00 | BFTE | 75.00 |
| DME | 10.00 | SUL | 25.00 | BFTE | 65.00 |
| DME | 10.00 | SUL | 33.00 | BFTE | 57.00 |
| DME | 10.00 | SUL | 50.00 | BFTE | 40.00 |
| DME | 10.00 | SUL | 65.00 | BFTE | 25.00 |
| DME | 10.00 | SUL | 15.00 | FDMB | 75.00 |
| DME | 10.00 | SUL | 25.00 | FDMB | 65.00 |
| DME | 10.00 | SUL | 33.00 | FDMB | 57.00 |
| DME | 10.00 | SUL | 50.00 | FDMB | 40.00 |
| DME | 10.00 | SUL | 65.00 | FDMB | 25.00 |
| DME | 10.00 | SUL | 15.00 | ISDN | 75.00 |
| DME | 10.00 | SUL | 25.00 | ISDN | 65.00 |
| DME | 10.00 | SUL | 33.00 | ISDN | 57.00 |
| DME | 10.00 | SUL | 50.00 | ISDN | 40.00 |
| DME | 10.00 | SUL | 65.00 | ISDN | 25.00 |
| DME | 10.00 | SUL | 15.00 | TTE | 75.00 |
| DME | 10.00 | SUL | 25.00 | TTE | 65.00 |
| DME | 10.00 | SUL | 33.00 | TTE | 57.00 |
| DME | 10.00 | SUL | 50.00 | TTE | 40.00 |
| DME | 10.00 | SUL | 65.00 | TTE | 25.00 |
| DME | 25.00 | DOL | 15.00 | BFE | 60.00 |
| DME | 25.00 | DOL | 25.00 | BFE | 50.00 |
| DME | 25.00 | DOL | 33.00 | BFE | 42.00 |
| DME | 25.00 | DOL | 50.00 | BFE | 25.00 |
| DME | 25.00 | DOL | 15.00 | 3FP | 60.00 |
| DME | 25.00 | DOL | 25.00 | 3FP | 50.00 |
| DME | 25.00 | DOL | 33.00 | 3FP | 42.00 |
| DME | 25.00 | DOL | 50.00 | 3FP | 25.00 |
| DME | 25.00 | DOL | 15.00 | BFTE | 60.00 |
| DME | 25.00 | DOL | 25.00 | BFTE | 50.00 |
| DME | 25.00 | DOL | 33.00 | BFTE | 42.00 |
| DME | 25.00 | DOL | 50.00 | BFTE | 25.00 |
| DME | 25.00 | DOL | 15.00 | FDMB | 60.00 |
| DME | 25.00 | DOL | 25.00 | FDMB | 50.00 |
| DME | 25.00 | DOL | 33.00 | FDMB | 42.00 |
| DME | 25.00 | DOL | 50.00 | FDMB | 25.00 |
| DME | 25.00 | DOL | 15.00 | ISDN | 60.00 |
| DME | 25.00 | DOL | 25.00 | ISDN | 50.00 |
| DME | 25.00 | DOL | 33.00 | ISDN | 42.00 |
| DME | 25.00 | DOL | 50.00 | ISDN | 25.00 |
| DME | 25.00 | DOL | 15.00 | TTE | 60.00 |
| DME | 25.00 | DOL | 25.00 | TTE | 50.00 |
| DME | 25.00 | DOL | 33.00 | TTE | 42.00 |
| DME | 25.00 | DOL | 50.00 | TTE | 25.00 |
| DME | 25.00 | TOL | 15.00 | BFE | 60.00 |
| DME | 25.00 | TOL | 25.00 | BFE | 50.00 |
| DME | 25.00 | TOL | 33.00 | BFE | 42.00 |
| DME | 25.00 | TOL | 50.00 | BFE | 25.00 |

TABLE 2-continued

Exemplary Solvent System Components

| Solvent 1 | Vol % Solvent 1 | Solvent 2 | Vol % Solvent 2 | Electron Withdrawing Compound (EWC) | Vol % EWC |
|---|---|---|---|---|---|
| DME | 25.00 | TOL | 15.00 | 3FP | 60.00 |
| DME | 25.00 | TOL | 25.00 | 3FP | 50.00 |
| DME | 25.00 | TOL | 33.00 | 3FP | 42.00 |
| DME | 25.00 | TOL | 50.00 | 3FP | 25.00 |
| DME | 25.00 | TOL | 15.00 | BFTE | 60.00 |
| DME | 25.00 | TOL | 25.00 | BFTE | 50.00 |
| DME | 25.00 | TOL | 33.00 | BFTE | 42.00 |
| DME | 25.00 | TOL | 50.00 | BFTE | 25.00 |
| DME | 25.00 | TOL | 15.00 | FDMB | 60.00 |
| DME | 25.00 | TOL | 25.00 | FDMB | 50.00 |
| DME | 25.00 | TOL | 33.00 | FDMB | 42.00 |
| DME | 25.00 | TOL | 50.00 | FDMB | 25.00 |
| DME | 25.00 | TOL | 15.00 | ISDN | 60.00 |
| DME | 25.00 | TOL | 25.00 | ISDN | 50.00 |
| DME | 25.00 | TOL | 33.00 | ISDN | 42.00 |
| DME | 25.00 | TOL | 50.00 | ISDN | 25.00 |
| DME | 25.00 | TOL | 15.00 | TTE | 60.00 |
| DME | 25.00 | TOL | 25.00 | TTE | 50.00 |
| DME | 25.00 | TOL | 33.00 | TTE | 42.00 |
| DME | 25.00 | TOL | 50.00 | TTE | 25.00 |
| DME | 25.00 | SUL | 15.00 | BFE | 60.00 |
| DME | 25.00 | SUL | 25.00 | BFE | 50.00 |
| DME | 25.00 | SUL | 33.00 | BFE | 42.00 |
| DME | 25.00 | SUL | 50.00 | BFE | 25.00 |
| DME | 25.00 | SUL | 15.00 | 3FP | 60.00 |
| DME | 25.00 | SUL | 25.00 | 3FP | 50.00 |
| DME | 25.00 | SUL | 33.00 | 3FP | 42.00 |
| DME | 25.00 | SUL | 50.00 | 3FP | 25.00 |
| DME | 25.00 | SUL | 15.00 | BFTE | 60.00 |
| DME | 25.00 | SUL | 25.00 | BFTE | 50.00 |
| DME | 25.00 | SUL | 33.00 | BFTE | 42.00 |
| DME | 25.00 | SUL | 50.00 | BFTE | 25.00 |
| DME | 25.00 | SUL | 15.00 | FDMB | 60.00 |
| DME | 25.00 | SUL | 25.00 | FDMB | 50.00 |
| DME | 25.00 | SUL | 33.00 | FDMB | 42.00 |
| DME | 25.00 | SUL | 50.00 | FDMB | 25.00 |
| DME | 25.00 | SUL | 15.00 | ISDN | 60.00 |
| DME | 25.00 | SUL | 25.00 | ISDN | 50.00 |
| DME | 25.00 | SUL | 33.00 | ISDN | 42.00 |
| DME | 25.00 | SUL | 50.00 | ISDN | 25.00 |
| DME | 25.00 | SUL | 15.00 | TTE | 60.00 |
| DME | 25.00 | SUL | 25.00 | TTE | 50.00 |
| DME | 25.00 | SUL | 33.00 | TTE | 42.00 |
| DME | 25.00 | SUL | 50.00 | TTE | 25.00 |
| DME | 33.00 | DOL | 15.00 | BFE | 52.00 |
| DME | 33.00 | DOL | 25.00 | BFE | 42.00 |
| DME | 33.00 | DOL | 33.00 | BFE | 34.00 |
| DME | 33.00 | DOL | 50.00 | BFE | 17.00 |
| DME | 33.00 | DOL | 15.00 | 3FP | 52.00 |
| DME | 33.00 | DOL | 25.00 | 3FP | 42.00 |
| DME | 33.00 | DOL | 33.00 | 3FP | 34.00 |
| DME | 33.00 | DOL | 50.00 | 3FP | 17.00 |
| DME | 33.00 | DOL | 15.00 | BFTE | 52.00 |
| DME | 33.00 | DOL | 25.00 | BFTE | 42.00 |
| DME | 33.00 | DOL | 33.00 | BFTE | 34.00 |
| DME | 33.00 | DOL | 50.00 | BFTE | 17.00 |
| DME | 33.00 | DOL | 15.00 | FDMB | 52.00 |
| DME | 33.00 | DOL | 25.00 | FDMB | 42.00 |
| DME | 33.00 | DOL | 33.00 | FDMB | 34.00 |
| DME | 33.00 | DOL | 50.00 | FDMB | 17.00 |
| DME | 33.00 | DOL | 15.00 | ISDN | 52.00 |
| DME | 33.00 | DOL | 25.00 | ISDN | 42.00 |
| DME | 33.00 | DOL | 33.00 | ISDN | 34.00 |
| DME | 33.00 | DOL | 50.00 | ISDN | 17.00 |
| DME | 33.00 | DOL | 15.00 | TTE | 52.00 |
| DME | 33.00 | DOL | 25.00 | TTE | 42.00 |
| DME | 33.00 | DOL | 33.00 | TTE | 34.00 |
| DME | 33.00 | DOL | 50.00 | TTE | 17.00 |
| DME | 33.00 | TOL | 15.00 | BFE | 52.00 |
| DME | 33.00 | TOL | 25.00 | BFE | 42.00 |
| DME | 33.00 | TOL | 33.00 | BFE | 34.00 |
| DME | 33.00 | TOL | 50.00 | BFE | 17.00 |
| DME | 33.00 | TOL | 15.00 | 3FP | 52.00 |

TABLE 2-continued

| Exemplary Solvent System Components | | | | | |
|---|---|---|---|---|---|
| Solvent 1 | Vol % Solvent 1 | Solvent 2 | Vol % Solvent 2 | Electron Withdrawing Compound (EWC) | Vol % EWC |
| DME | 33.00 | TOL | 25.00 | 3FP | 42.00 |
| DME | 33.00 | TOL | 33.00 | 3FP | 34.00 |
| DME | 33.00 | TOL | 50.00 | 3FP | 17.00 |
| DME | 33.00 | TOL | 15.00 | BFTE | 52.00 |
| DME | 33.00 | TOL | 25.00 | BFTE | 42.00 |
| DME | 33.00 | TOL | 33.00 | BFTE | 34.00 |
| DME | 33.00 | TOL | 50.00 | BFTE | 17.00 |
| DME | 33.00 | TOL | 15.00 | FDMB | 52.00 |
| DME | 33.00 | TOL | 25.00 | FDMB | 42.00 |
| DME | 33.00 | TOL | 33.00 | FDMB | 34.00 |
| DME | 33.00 | TOL | 50.00 | FDMB | 17.00 |
| DME | 33.00 | TOL | 15.00 | ISDN | 52.00 |
| DME | 33.00 | TOL | 25.00 | ISDN | 42.00 |
| DME | 33.00 | TOL | 33.00 | ISDN | 34.00 |
| DME | 33.00 | TOL | 50.00 | ISDN | 17.00 |
| DME | 33.00 | TOL | 15.00 | TTE | 52.00 |
| DME | 33.00 | TOL | 25.00 | TTE | 42.00 |
| DME | 33.00 | TOL | 33.00 | TTE | 34.00 |
| DME | 33.00 | TOL | 50.00 | TTE | 17.00 |
| DME | 33.00 | SUL | 15.00 | BFE | 52.00 |
| DME | 33.00 | SUL | 25.00 | BFE | 42.00 |
| DME | 33.00 | SUL | 33.00 | BFE | 34.00 |
| DME | 33.00 | SUL | 50.00 | BFE | 17.00 |
| DME | 33.00 | SUL | 15.00 | 3FP | 52.00 |
| DME | 33.00 | SUL | 25.00 | 3FP | 42.00 |
| DME | 33.00 | SUL | 33.00 | 3FP | 34.00 |
| DME | 33.00 | SUL | 50.00 | 3FP | 17.00 |
| DME | 33.00 | SUL | 15.00 | BFTE | 52.00 |
| DME | 33.00 | SUL | 25.00 | BFTE | 42.00 |
| DME | 33.00 | SUL | 33.00 | BFTE | 34.00 |
| DME | 33.00 | SUL | 50.00 | BFTE | 17.00 |
| DME | 33.00 | SUL | 15.00 | FDMB | 52.00 |
| DME | 33.00 | SUL | 25.00 | FDMB | 42.00 |
| DME | 33.00 | SUL | 33.00 | FDMB | 34.00 |
| DME | 33.00 | SUL | 50.00 | FDMB | 17.00 |
| DME | 33.00 | SUL | 15.00 | ISDN | 52.00 |
| DME | 33.00 | SUL | 25.00 | ISDN | 42.00 |
| DME | 33.00 | SUL | 33.00 | ISDN | 34.00 |
| DME | 33.00 | SUL | 50.00 | ISDN | 17.00 |
| DME | 33.00 | SUL | 15.00 | TTE | 52.00 |
| DME | 33.00 | SUL | 25.00 | TTE | 42.00 |
| DME | 33.00 | SUL | 33.00 | TTE | 34.00 |
| DME | 33.00 | SUL | 50.00 | TTE | 17.00 |
| DME | 50.00 | DOL | 10.00 | BFE | 40.00 |
| DME | 50.00 | DOL | 25.00 | BFE | 25.00 |
| DME | 50.00 | DOL | 33.00 | BFE | 17.00 |
| DME | 50.00 | DOL | 15.00 | 3FP | 35.00 |
| DME | 50.00 | DOL | 25.00 | 3FP | 25.00 |
| DME | 50.00 | DOL | 33.00 | 3FP | 17.00 |
| DME | 50.00 | DOL | 15.00 | BFTE | 35.00 |
| DME | 50.00 | DOL | 25.00 | BFTE | 25.00 |
| DME | 50.00 | DOL | 33.00 | BFTE | 17.00 |
| DME | 50.00 | DOL | 15.00 | FDMB | 35.00 |
| DME | 50.00 | DOL | 25.00 | FDMB | 25.00 |
| DME | 50.00 | DOL | 33.00 | FDMB | 17.00 |
| DME | 50.00 | DOL | 15.00 | ISDN | 35.00 |
| DME | 50.00 | DOL | 25.00 | ISDN | 25.00 |
| DME | 50.00 | DOL | 33.00 | ISDN | 17.00 |
| DME | 50.00 | DOL | 15.00 | TTE | 35.00 |
| DME | 50.00 | DOL | 25.00 | TTE | 25.00 |
| DME | 50.00 | DOL | 33.00 | TTE | 17.00 |
| DME | 50.00 | TOL | 15.00 | BFE | 35.00 |
| DME | 50.00 | TOL | 25.00 | BFE | 25.00 |
| DME | 50.00 | TOL | 33.00 | BFE | 17.00 |
| DME | 50.00 | TOL | 15.00 | 3FP | 35.00 |
| DME | 50.00 | TOL | 25.00 | 3FP | 25.00 |
| DME | 50.00 | TOL | 33.00 | 3FP | 17.00 |
| DME | 50.00 | TOL | 15.00 | BFTE | 35.00 |
| DME | 50.00 | TOL | 25.00 | BFTE | 25.00 |
| DME | 50.00 | TOL | 33.00 | BFTE | 17.00 |
| DME | 50.00 | TOL | 15.00 | FDMB | 35.00 |
| DME | 50.00 | TOL | 25.00 | FDMB | 25.00 |
| DME | 50.00 | TOL | 33.00 | FDMB | 17.00 |

TABLE 2-continued

Exemplary Solvent System Components

| Solvent 1 | Vol % Solvent 1 | Solvent 2 | Vol % Solvent 2 | Electron Withdrawing Compound (EWC) | Vol % EWC |
|---|---|---|---|---|---|
| DME | 50.00 | TOL | 15.00 | ISDN | 35.00 |
| DME | 50.00 | TOL | 25.00 | ISDN | 25.00 |
| DME | 50.00 | TOL | 33.00 | ISDN | 17.00 |
| DME | 50.00 | TOL | 15.00 | TTE | 35.00 |
| DME | 50.00 | TOL | 25.00 | TTE | 25.00 |
| DME | 50.00 | TOL | 33.00 | TTE | 17.00 |
| DME | 50.00 | SUL | 15.00 | BFE | 35.00 |
| DME | 50.00 | SUL | 25.00 | BFE | 25.00 |
| DME | 50.00 | SUL | 33.00 | BFE | 17.00 |
| DME | 50.00 | SUL | 15.00 | 3FP | 35.00 |
| DME | 50.00 | SUL | 25.00 | 3FP | 25.00 |
| DME | 50.00 | SUL | 33.00 | 3FP | 17.00 |
| DME | 50.00 | SUL | 15.00 | BFTE | 35.00 |
| DME | 50.00 | SUL | 25.00 | BFTE | 25.00 |
| DME | 50.00 | SUL | 33.00 | BFTE | 17.00 |
| DME | 50.00 | SUL | 15.00 | FDMB | 35.00 |
| DME | 50.00 | SUL | 25.00 | FDMB | 25.00 |
| DME | 50.00 | SUL | 33.00 | FDMB | 17.00 |
| DME | 50.00 | SUL | 15.00 | ISDN | 35.00 |
| DME | 50.00 | SUL | 25.00 | ISDN | 25.00 |
| DME | 50.00 | SUL | 33.00 | ISDN | 17.00 |
| DME | 50.00 | SUL | 15.00 | TTE | 35.00 |
| DME | 50.00 | SUL | 25.00 | TTE | 25.00 |
| DME | 50.00 | SUL | 33.00 | TTE | 17.00 |
| DOL | 25.00 | none | 0 | BFE | 75.00 |
| DOL | 25.00 | none | 0 | 3FP | 75.00 |
| DOL | 25.00 | none | 0 | BFTE | 75.00 |
| DOL | 25.00 | none | 0 | FDMB | 75.00 |
| DOL | 25.00 | none | 0 | ISDN | 75.00 |
| DOL | 25.00 | none | 0 | TTE | 75.00 |
| DOL | 33.00 | none | 0 | BFE | 67.00 |
| DOL | 33.00 | none | 0 | 3FP | 67.00 |
| DOL | 33.00 | none | 0 | BFTE | 67.00 |
| DOL | 33.00 | none | 0 | FDMB | 67.00 |
| DOL | 33.00 | none | 0 | ISDN | 67.00 |
| DOL | 33.00 | none | 0 | TTE | 67.00 |
| DOL | 50.00 | none | 0 | BFE | 50.00 |
| DOL | 50.00 | none | 0 | 3FP | 50.00 |
| DOL | 50.00 | none | 0 | BFTE | 50.00 |
| DOL | 50.00 | none | 0 | FDMB | 50.00 |
| DOL | 50.00 | none | 0 | ISDN | 50.00 |
| DOL | 50.00 | none | 0 | TTE | 50.00 |
| DOL | 75.00 | none | 0 | BFE | 25.00 |
| DOL | 75.00 | none | 0 | 3FP | 25.00 |
| DOL | 75.00 | none | 0 | BFTE | 25.00 |
| DOL | 75.00 | none | 0 | FDMB | 25.00 |
| DOL | 75.00 | none | 0 | ISDN | 25.00 |
| DOL | 75.00 | none | 0 | TTE | 25.00 |
| DOL | 10.00 | DME | 15.00 | BFE | 75.00 |
| DOL | 10.00 | DME | 25.00 | BFE | 65.00 |
| DOL | 10.00 | DME | 33.00 | BFE | 57.00 |
| DOL | 10.00 | DME | 50.00 | BFE | 40.00 |
| DOL | 10.00 | DME | 65.00 | BFE | 25.00 |
| DOL | 10.00 | DME | 15.00 | 3FP | 75.00 |
| DOL | 10.00 | DME | 25.00 | 3FP | 65.00 |
| DOL | 10.00 | DME | 33.00 | 3FP | 57.00 |
| DOL | 10.00 | DME | 50.00 | 3FP | 40.00 |
| DOL | 10.00 | DME | 65.00 | 3FP | 25.00 |
| DOL | 10.00 | DME | 15.00 | BFTE | 75.00 |
| DOL | 10.00 | DME | 25.00 | BFTE | 65.00 |
| DOL | 10.00 | DME | 33.00 | BFTE | 57.00 |
| DOL | 10.00 | DME | 50.00 | BFTE | 40.00 |
| DOL | 10.00 | DME | 65.00 | BFTE | 25.00 |
| DOL | 10.00 | DME | 15.00 | FDMB | 75.00 |
| DOL | 10.00 | DME | 25.00 | FDMB | 65.00 |
| DOL | 10.00 | DME | 33.00 | FDMB | 57.00 |
| DOL | 10.00 | DME | 50.00 | FDMB | 40.00 |
| DOL | 10.00 | DME | 65.00 | FDMB | 25.00 |
| DOL | 10.00 | DME | 15.00 | ISDN | 75.00 |
| DOL | 10.00 | DME | 25.00 | ISDN | 65.00 |
| DOL | 10.00 | DME | 33.00 | ISDN | 57.00 |
| DOL | 10.00 | DME | 50.00 | ISDN | 40.00 |
| DOL | 10.00 | DME | 65.00 | ISDN | 25.00 |

TABLE 2-continued

| Exemplary Solvent System Components | | | | | |
|---|---|---|---|---|---|
| Solvent 1 | Vol % Solvent 1 | Solvent 2 | Vol % Solvent 2 | Electron Withdrawing Compound (EWC) | Vol % EWC |
| DOL | 10.00 | DME | 15.00 | TTE | 75.00 |
| DOL | 10.00 | DME | 25.00 | TTE | 65.00 |
| DOL | 10.00 | DME | 33.00 | TTE | 57.00 |
| DOL | 10.00 | DME | 50.00 | TTE | 40.00 |
| DOL | 10.00 | DME | 65.00 | TTE | 25.00 |
| DOL | 10.00 | TOL | 15.00 | BFE | 75.00 |
| DOL | 10.00 | TOL | 25.00 | BFE | 65.00 |
| DOL | 10.00 | TOL | 33.00 | BFE | 57.00 |
| DOL | 10.00 | TOL | 50.00 | BFE | 40.00 |
| DOL | 10.00 | TOL | 65.00 | BFE | 25.00 |
| DOL | 10.00 | TOL | 15.00 | 3FP | 75.00 |
| DOL | 10.00 | TOL | 25.00 | 3FP | 65.00 |
| DOL | 10.00 | TOL | 33.00 | 3FP | 57.00 |
| DOL | 10.00 | TOL | 50.00 | 3FP | 40.00 |
| DOL | 10.00 | TOL | 65.00 | 3FP | 25.00 |
| DOL | 10.00 | TOL | 15.00 | BFTE | 75.00 |
| DOL | 10.00 | TOL | 25.00 | BFTE | 65.00 |
| DOL | 10.00 | TOL | 33.00 | BFTE | 57.00 |
| DOL | 10.00 | TOL | 50.00 | BFTE | 40.00 |
| DOL | 10.00 | TOL | 65.00 | BFTE | 25.00 |
| DOL | 10.00 | TOL | 15.00 | FDMB | 75.00 |
| DOL | 10.00 | TOL | 25.00 | FDMB | 65.00 |
| DOL | 10.00 | TOL | 33.00 | FDMB | 57.00 |
| DOL | 10.00 | TOL | 50.00 | FDMB | 40.00 |
| DOL | 10.00 | TOL | 65.00 | FDMB | 25.00 |
| DOL | 10.00 | TOL | 15.00 | ISDN | 75.00 |
| DOL | 10.00 | TOL | 25.00 | ISDN | 65.00 |
| DOL | 10.00 | TOL | 33.00 | ISDN | 57.00 |
| DOL | 10.00 | TOL | 50.00 | ISDN | 40.00 |
| DOL | 10.00 | TOL | 65.00 | ISDN | 25.00 |
| DOL | 10.00 | TOL | 15.00 | TTE | 75.00 |
| DOL | 10.00 | TOL | 25.00 | TTE | 65.00 |
| DOL | 10.00 | TOL | 33.00 | TTE | 57.00 |
| DOL | 10.00 | TOL | 50.00 | TTE | 40.00 |
| DOL | 10.00 | TOL | 65.00 | TTE | 25.00 |
| DOL | 10.00 | SUL | 15.00 | BFE | 75.00 |
| DOL | 10.00 | SUL | 25.00 | BFE | 65.00 |
| DOL | 10.00 | SUL | 33.00 | BFE | 57.00 |
| DOL | 10.00 | SUL | 50.00 | BFE | 40.00 |
| DOL | 10.00 | SUL | 65.00 | BFE | 25.00 |
| DOL | 10.00 | SUL | 15.00 | 3FP | 75.00 |
| DOL | 10.00 | SUL | 25.00 | 3FP | 65.00 |
| DOL | 10.00 | SUL | 33.00 | 3FP | 57.00 |
| DOL | 10.00 | SUL | 50.00 | 3FP | 40.00 |
| DOL | 10.00 | SUL | 65.00 | 3FP | 25.00 |
| DOL | 10.00 | SUL | 15.00 | BFTE | 75.00 |
| DOL | 10.00 | SUL | 25.00 | BFTE | 65.00 |
| DOL | 10.00 | SUL | 33.00 | BFTE | 57.00 |
| DOL | 10.00 | SUL | 50.00 | BFTE | 40.00 |
| DOL | 10.00 | SUL | 65.00 | BFTE | 25.00 |
| DOL | 10.00 | SUL | 15.00 | FDMB | 75.00 |
| DOL | 10.00 | SUL | 25.00 | FDMB | 65.00 |
| DOL | 10.00 | SUL | 33.00 | FDMB | 57.00 |
| DOL | 10.00 | SUL | 50.00 | FDMB | 40.00 |
| DOL | 10.00 | SUL | 65.00 | FDMB | 25.00 |
| DOL | 10.00 | SUL | 15.00 | ISDN | 75.00 |
| DOL | 10.00 | SUL | 25.00 | ISDN | 65.00 |
| DOL | 10.00 | SUL | 33.00 | ISDN | 57.00 |
| DOL | 10.00 | SUL | 50.00 | ISDN | 40.00 |
| DOL | 10.00 | SUL | 65.00 | ISDN | 25.00 |
| DOL | 10.00 | SUL | 15.00 | TTE | 75.00 |
| DOL | 10.00 | SUL | 25.00 | TTE | 65.00 |
| DOL | 10.00 | SUL | 33.00 | TTE | 57.00 |
| DOL | 10.00 | SUL | 50.00 | TTE | 40.00 |
| DOL | 10.00 | SUL | 65.00 | TTE | 25.00 |
| DOL | 25.00 | DME | 15.00 | BFE | 60.00 |
| DOL | 25.00 | DME | 25.00 | BFE | 50.00 |
| DOL | 25.00 | DME | 33.00 | BFE | 42.00 |
| DOL | 25.00 | DME | 50.00 | BFE | 25.00 |
| DOL | 25.00 | DME | 15.00 | 3FP | 60.00 |
| DOL | 25.00 | DME | 25.00 | 3FP | 50.00 |
| DOL | 25.00 | DME | 33.00 | 3FP | 42.00 |
| DOL | 25.00 | DME | 50.00 | 3FP | 25.00 |

TABLE 2-continued

| Exemplary Solvent System Components | | | | | |
|---|---|---|---|---|---|
| Solvent 1 | Vol % Solvent 1 | Solvent 2 | Vol % Solvent 2 | Electron Withdrawing Compound (EWC) | Vol % EWC |
| DOL | 25.00 | DME | 15.00 | BFTE | 60.00 |
| DOL | 25.00 | DME | 25.00 | BFTE | 50.00 |
| DOL | 25.00 | DME | 33.00 | BFTE | 42.00 |
| DOL | 25.00 | DME | 50.00 | BFTE | 25.00 |
| DOL | 25.00 | DME | 15.00 | FDMB | 60.00 |
| DOL | 25.00 | DME | 25.00 | FDMB | 50.00 |
| DOL | 25.00 | DME | 33.00 | FDMB | 42.00 |
| DOL | 25.00 | DME | 50.00 | FDMB | 25.00 |
| DOL | 25.00 | DME | 15.00 | ISDN | 60.00 |
| DOL | 25.00 | DME | 25.00 | ISDN | 50.00 |
| DOL | 25.00 | DME | 33.00 | ISDN | 42.00 |
| DOL | 25.00 | DME | 50.00 | ISDN | 25.00 |
| DOL | 25.00 | DME | 15.00 | TTE | 60.00 |
| DOL | 25.00 | DME | 25.00 | TTE | 50.00 |
| DOL | 25.00 | DME | 33.00 | TTE | 42.00 |
| DOL | 25.00 | DME | 50.00 | TTE | 25.00 |
| DOL | 25.00 | TOL | 15.00 | BFE | 60.00 |
| DOL | 25.00 | TOL | 25.00 | BFE | 50.00 |
| DOL | 25.00 | TOL | 33.00 | BFE | 42.00 |
| DOL | 25.00 | TOL | 50.00 | BFE | 25.00 |
| DOL | 25.00 | TOL | 15.00 | 3FP | 60.00 |
| DOL | 25.00 | TOL | 25.00 | 3FP | 50.00 |
| DOL | 25.00 | TOL | 33.00 | 3FP | 42.00 |
| DOL | 25.00 | TOL | 50.00 | 3FP | 25.00 |
| DOL | 25.00 | TOL | 15.00 | BFTE | 60.00 |
| DOL | 25.00 | TOL | 25.00 | BFTE | 50.00 |
| DOL | 25.00 | TOL | 33.00 | BFTE | 42.00 |
| DOL | 25.00 | TOL | 50.00 | BFTE | 25.00 |
| DOL | 25.00 | TOL | 15.00 | FDMB | 60.00 |
| DOL | 25.00 | TOL | 25.00 | FDMB | 50.00 |
| DOL | 25.00 | TOL | 33.00 | FDMB | 42.00 |
| DOL | 25.00 | TOL | 50.00 | FDMB | 25.00 |
| DOL | 25.00 | TOL | 15.00 | ISDN | 60.00 |
| DOL | 25.00 | TOL | 25.00 | ISDN | 50.00 |
| DOL | 25.00 | TOL | 33.00 | ISDN | 42.00 |
| DOL | 25.00 | TOL | 50.00 | ISDN | 25.00 |
| DOL | 25.00 | TOL | 15.00 | TTE | 60.00 |
| DOL | 25.00 | TOL | 25.00 | TTE | 50.00 |
| DOL | 25.00 | TOL | 33.00 | TTE | 42.00 |
| DOL | 25.00 | TOL | 50.00 | TTE | 25.00 |
| DOL | 25.00 | SUL | 15.00 | BFE | 60.00 |
| DOL | 25.00 | SUL | 25.00 | BFE | 50.00 |
| DOL | 25.00 | SUL | 33.00 | BFE | 42.00 |
| DOL | 25.00 | SUL | 50.00 | BFE | 25.00 |
| DOL | 25.00 | SUL | 15.00 | 3FP | 60.00 |
| DOL | 25.00 | SUL | 25.00 | 3FP | 50.00 |
| DOL | 25.00 | SUL | 33.00 | 3FP | 42.00 |
| DOL | 25.00 | SUL | 50.00 | 3FP | 25.00 |
| DOL | 25.00 | SUL | 15.00 | BFTE | 60.00 |
| DOL | 25.00 | SUL | 25.00 | BFTE | 50.00 |
| DOL | 25.00 | SUL | 33.00 | BFTE | 42.00 |
| DOL | 25.00 | SUL | 50.00 | BFTE | 25.00 |
| DOL | 25.00 | SUL | 15.00 | FDMB | 60.00 |
| DOL | 25.00 | SUL | 25.00 | FDMB | 50.00 |
| DOL | 25.00 | SUL | 33.00 | FDMB | 42.00 |
| DOL | 25.00 | SUL | 50.00 | FDMB | 25.00 |
| DOL | 25.00 | SUL | 15.00 | ISDN | 60.00 |
| DOL | 25.00 | SUL | 25.00 | ISDN | 50.00 |
| DOL | 25.00 | SUL | 33.00 | ISDN | 42.00 |
| DOL | 25.00 | SUL | 50.00 | ISDN | 25.00 |
| DOL | 25.00 | SUL | 15.00 | TTE | 60.00 |
| DOL | 25.00 | SUL | 25.00 | TTE | 50.00 |
| DOL | 25.00 | SUL | 33.00 | TTE | 42.00 |
| DOL | 25.00 | SUL | 50.00 | TTE | 25.00 |
| DOL | 33.00 | DME | 15.00 | BFE | 52.00 |
| DOL | 33.00 | DME | 25.00 | BFE | 42.00 |
| DOL | 33.00 | DME | 33.00 | BFE | 34.00 |
| DOL | 33.00 | DME | 50.00 | BFE | 17.00 |
| DOL | 33.00 | DME | 15.00 | 3FP | 52.00 |
| DOL | 33.00 | DME | 25.00 | 3FP | 42.00 |
| DOL | 33.00 | DME | 33.00 | 3FP | 34.00 |
| DOL | 33.00 | DME | 50.00 | 3FP | 17.00 |
| DOL | 33.00 | DME | 15.00 | BFTE | 52.00 |

TABLE 2-continued

Exemplary Solvent System Components

| Solvent 1 | Vol % Solvent 1 | Solvent 2 | Vol % Solvent 2 | Electron Withdrawing Compound (EWC) | Vol % EWC |
|---|---|---|---|---|---|
| DOL | 33.00 | DME | 25.00 | BFTE | 42.00 |
| DOL | 33.00 | DME | 33.00 | BFTE | 34.00 |
| DOL | 33.00 | DME | 50.00 | BFTE | 17.00 |
| DOL | 33.00 | DME | 15.00 | FDMB | 52.00 |
| DOL | 33.00 | DME | 25.00 | FDMB | 42.00 |
| DOL | 33.00 | DME | 33.00 | FDMB | 34.00 |
| DOL | 33.00 | DME | 50.00 | FDMB | 17.00 |
| DOL | 33.00 | DME | 15.00 | ISDN | 52.00 |
| DOL | 33.00 | DME | 25.00 | ISDN | 42.00 |
| DOL | 33.00 | DME | 33.00 | ISDN | 34.00 |
| DOL | 33.00 | DME | 50.00 | ISDN | 17.00 |
| DOL | 33.00 | DME | 15.00 | TTE | 52.00 |
| DOL | 33.00 | DME | 25.00 | TTE | 42.00 |
| DOL | 33.00 | DME | 33.00 | TTE | 34.00 |
| DOL | 33.00 | DME | 50.00 | TTE | 17.00 |
| DOL | 33.00 | TOL | 15.00 | BFE | 52.00 |
| DOL | 33.00 | TOL | 25.00 | BFE | 42.00 |
| DOL | 33.00 | TOL | 33.00 | BFE | 34.00 |
| DOL | 33.00 | TOL | 50.00 | BFE | 17.00 |
| DOL | 33.00 | TOL | 15.00 | 3FP | 52.00 |
| DOL | 33.00 | TOL | 25.00 | 3FP | 42.00 |
| DOL | 33.00 | TOL | 33.00 | 3FP | 34.00 |
| DOL | 33.00 | TOL | 50.00 | 3FP | 17.00 |
| DOL | 33.00 | TOL | 15.00 | BFTE | 52.00 |
| DOL | 33.00 | TOL | 25.00 | BFTE | 42.00 |
| DOL | 33.00 | TOL | 33.00 | BFTE | 34.00 |
| DOL | 33.00 | TOL | 50.00 | BFTE | 17.00 |
| DOL | 33.00 | TOL | 15.00 | FDMB | 52.00 |
| DOL | 33.00 | TOL | 25.00 | FDMB | 42.00 |
| DOL | 33.00 | TOL | 33.00 | FDMB | 34.00 |
| DOL | 33.00 | TOL | 50.00 | FDMB | 17.00 |
| DOL | 33.00 | TOL | 15.00 | ISDN | 52.00 |
| DOL | 33.00 | TOL | 25.00 | ISDN | 42.00 |
| DOL | 33.00 | TOL | 33.00 | ISDN | 34.00 |
| DOL | 33.00 | TOL | 50.00 | ISDN | 17.00 |
| DOL | 33.00 | TOL | 15.00 | TTE | 52.00 |
| DOL | 33.00 | TOL | 25.00 | TTE | 42.00 |
| DOL | 33.00 | TOL | 33.00 | TTE | 34.00 |
| DOL | 33.00 | TOL | 50.00 | TTE | 17.00 |
| DOL | 33.00 | SUL | 15.00 | BFE | 52.00 |
| DOL | 33.00 | SUL | 25.00 | BFE | 42.00 |
| DOL | 33.00 | SUL | 33.00 | BFE | 34.00 |
| DOL | 33.00 | SUL | 50.00 | BFE | 17.00 |
| DOL | 33.00 | SUL | 15.00 | 3FP | 52.00 |
| DOL | 33.00 | SUL | 25.00 | 3FP | 42.00 |
| DOL | 33.00 | SUL | 33.00 | 3FP | 34.00 |
| DOL | 33.00 | SUL | 50.00 | 3FP | 17.00 |
| DOL | 33.00 | SUL | 15.00 | BFTE | 52.00 |
| DOL | 33.00 | SUL | 25.00 | BFTE | 42.00 |
| DOL | 33.00 | SUL | 33.00 | BFTE | 34.00 |
| DOL | 33.00 | SUL | 50.00 | BFTE | 17.00 |
| DOL | 33.00 | SUL | 15.00 | FDMB | 52.00 |
| DOL | 33.00 | SUL | 25.00 | FDMB | 42.00 |
| DOL | 33.00 | SUL | 33.00 | FDMB | 34.00 |
| DOL | 33.00 | SUL | 50.00 | FDMB | 17.00 |
| DOL | 33.00 | SUL | 15.00 | ISDN | 52.00 |
| DOL | 33.00 | SUL | 25.00 | ISDN | 42.00 |
| DOL | 33.00 | SUL | 33.00 | ISDN | 34.00 |
| DOL | 33.00 | SUL | 50.00 | ISDN | 17.00 |
| DOL | 33.00 | SUL | 15.00 | TTE | 52.00 |
| DOL | 33.00 | SUL | 25.00 | TTE | 42.00 |
| DOL | 33.00 | SUL | 33.00 | TTE | 34.00 |
| DOL | 33.00 | SUL | 50.00 | TTE | 17.00 |
| DOL | 50.00 | DME | 10.00 | BFE | 40.00 |
| DOL | 50.00 | DME | 25.00 | BFE | 25.00 |
| DOL | 50.00 | DME | 33.00 | BFE | 17.00 |
| DOL | 50.00 | DME | 15.00 | 3FP | 35.00 |
| DOL | 50.00 | DME | 25.00 | 3FP | 25.00 |
| DOL | 50.00 | DME | 33.00 | 3FP | 17.00 |
| DOL | 50.00 | DME | 15.00 | BFTE | 35.00 |
| DOL | 50.00 | DME | 25.00 | BFTE | 25.00 |
| DOL | 50.00 | DME | 33.00 | BFTE | 17.00 |
| DOL | 50.00 | DME | 15.00 | FDMB | 35.00 |

TABLE 2-continued

| Exemplary Solvent System Components | | | | | |
|---|---|---|---|---|---|
| Solvent 1 | Vol % Solvent 1 | Solvent 2 | Vol % Solvent 2 | Electron Withdrawing Compound (EWC) | Vol % EWC |
| DOL | 50.00 | DME | 25.00 | FDMB | 25.00 |
| DOL | 50.00 | DME | 33.00 | FDMB | 17.00 |
| DOL | 50.00 | DME | 15.00 | ISDN | 35.00 |
| DOL | 50.00 | DME | 25.00 | ISDN | 25.00 |
| DOL | 50.00 | DME | 33.00 | ISDN | 17.00 |
| DOL | 50.00 | DME | 15.00 | TTE | 35.00 |
| DOL | 50.00 | DME | 25.00 | TTE | 25.00 |
| DOL | 50.00 | DME | 33.00 | TTE | 17.00 |
| DOL | 50.00 | TOL | 15.00 | BFE | 35.00 |
| DOL | 50.00 | TOL | 25.00 | BFE | 25.00 |
| DOL | 50.00 | TOL | 33.00 | BFE | 17.00 |
| DOL | 50.00 | TOL | 15.00 | 3FP | 35.00 |
| DOL | 50.00 | TOL | 25.00 | 3FP | 25.00 |
| DOL | 50.00 | TOL | 33.00 | 3FP | 17.00 |
| DOL | 50.00 | TOL | 15.00 | BFTE | 35.00 |
| DOL | 50.00 | TOL | 25.00 | BFTE | 25.00 |
| DOL | 50.00 | TOL | 33.00 | BFTE | 17.00 |
| DOL | 50.00 | TOL | 15.00 | FDMB | 35.00 |
| DOL | 50.00 | TOL | 25.00 | FDMB | 25.00 |
| DOL | 50.00 | TOL | 33.00 | FDMB | 17.00 |
| DOL | 50.00 | TOL | 15.00 | ISDN | 35.00 |
| DOL | 50.00 | TOL | 25.00 | ISDN | 25.00 |
| DOL | 50.00 | TOL | 33.00 | ISDN | 17.00 |
| DOL | 50.00 | TOL | 15.00 | TTE | 35.00 |
| DOL | 50.00 | TOL | 25.00 | TTE | 25.00 |
| DOL | 50.00 | TOL | 33.00 | TTE | 17.00 |
| DOL | 50.00 | SUL | 15.00 | BFE | 35.00 |
| DOL | 50.00 | SUL | 25.00 | BFE | 25.00 |
| DOL | 50.00 | SUL | 33.00 | BFE | 17.00 |
| DOL | 50.00 | SUL | 15.00 | 3FP | 35.00 |
| DOL | 50.00 | SUL | 25.00 | 3FP | 25.00 |
| DOL | 50.00 | SUL | 33.00 | 3FP | 17.00 |
| DOL | 50.00 | SUL | 15.00 | BFTE | 35.00 |
| DOL | 50.00 | SUL | 25.00 | BFTE | 25.00 |
| DOL | 50.00 | SUL | 33.00 | BFTE | 17.00 |
| DOL | 50.00 | SUL | 15.00 | FDMB | 35.00 |
| DOL | 50.00 | SUL | 25.00 | FDMB | 25.00 |
| DOL | 50.00 | SUL | 33.00 | FDMB | 17.00 |
| DOL | 50.00 | SUL | 15.00 | ISDN | 35.00 |
| DOL | 50.00 | SUL | 25.00 | ISDN | 25.00 |
| DOL | 50.00 | SUL | 33.00 | ISDN | 17.00 |
| DOL | 50.00 | SUL | 15.00 | TTE | 35.00 |
| DOL | 50.00 | SUL | 25.00 | TTE | 25.00 |
| DOL | 50.00 | SUL | 33.00 | TTE | 17.00 |
| SUL | 10.00 | DOL | 15.00 | BFE | 75.00 |
| SUL | 10.00 | DOL | 25.00 | BFE | 65.00 |
| SUL | 10.00 | DOL | 33.00 | BFE | 57.00 |
| SUL | 10.00 | DOL | 50.00 | BFE | 40.00 |
| SUL | 10.00 | DOL | 65.00 | BFE | 25.00 |
| SUL | 10.00 | DOL | 15.00 | 3FP | 75.00 |
| SUL | 10.00 | DOL | 25.00 | 3FP | 65.00 |
| SUL | 10.00 | DOL | 33.00 | 3FP | 57.00 |
| SUL | 10.00 | DOL | 50.00 | 3FP | 40.00 |
| SUL | 10.00 | DOL | 65.00 | 3FP | 25.00 |
| SUL | 10.00 | DOL | 15.00 | BFTE | 75.00 |
| SUL | 10.00 | DOL | 25.00 | BFTE | 65.00 |
| SUL | 10.00 | DOL | 33.00 | BFTE | 57.00 |
| SUL | 10.00 | DOL | 50.00 | BFTE | 40.00 |
| SUL | 10.00 | DOL | 65.00 | BFTE | 25.00 |
| SUL | 10.00 | DOL | 15.00 | FDMB | 75.00 |
| SUL | 10.00 | DOL | 25.00 | FDMB | 65.00 |
| SUL | 10.00 | DOL | 33.00 | FDMB | 57.00 |
| SUL | 10.00 | DOL | 50.00 | FDMB | 40.00 |
| SUL | 10.00 | DOL | 65.00 | FDMB | 25.00 |
| SUL | 10.00 | DOL | 15.00 | ISDN | 75.00 |
| SUL | 10.00 | DOL | 25.00 | ISDN | 65.00 |
| SUL | 10.00 | DOL | 33.00 | ISDN | 57.00 |
| SUL | 10.00 | DOL | 50.00 | ISDN | 40.00 |
| SUL | 10.00 | DOL | 65.00 | ISDN | 25.00 |
| SUL | 10.00 | DOL | 15.00 | TTE | 75.00 |
| SUL | 10.00 | DOL | 25.00 | TTE | 65.00 |
| SUL | 10.00 | DOL | 33.00 | TTE | 57.00 |
| SUL | 10.00 | DOL | 50.00 | TTE | 40.00 |

TABLE 2-continued

| Exemplary Solvent System Components | | | | | |
|---|---|---|---|---|---|
| Solvent 1 | Vol % Solvent 1 | Solvent 2 | Vol % Solvent 2 | Electron Withdrawing Compound (EWC) | Vol % EWC |
| SUL | 10.00 | DOL | 65.00 | TTE | 25.00 |
| SUL | 10.00 | TOL | 15.00 | BFE | 75.00 |
| SUL | 10.00 | TOL | 25.00 | BFE | 65.00 |
| SUL | 10.00 | TOL | 33.00 | BFE | 57.00 |
| SUL | 10.00 | TOL | 50.00 | BFE | 40.00 |
| SUL | 10.00 | TOL | 65.00 | BFE | 25.00 |
| SUL | 10.00 | TOL | 15.00 | 3FP | 75.00 |
| SUL | 10.00 | TOL | 25.00 | 3FP | 65.00 |
| SUL | 10.00 | TOL | 33.00 | 3FP | 57.00 |
| SUL | 10.00 | TOL | 50.00 | 3FP | 40.00 |
| SUL | 10.00 | TOL | 65.00 | 3FP | 25.00 |
| SUL | 10.00 | TOL | 15.00 | BFTE | 75.00 |
| SUL | 10.00 | TOL | 25.00 | BFTE | 65.00 |
| SUL | 10.00 | TOL | 33.00 | BFTE | 57.00 |
| SUL | 10.00 | TOL | 50.00 | BFTE | 40.00 |
| SUL | 10.00 | TOL | 65.00 | BFTE | 25.00 |
| SUL | 10.00 | TOL | 15.00 | FDMB | 75.00 |
| SUL | 10.00 | TOL | 25.00 | FDMB | 65.00 |
| SUL | 10.00 | TOL | 33.00 | FDMB | 57.00 |
| SUL | 10.00 | TOL | 50.00 | FDMB | 40.00 |
| SUL | 10.00 | TOL | 65.00 | FDMB | 25.00 |
| SUL | 10.00 | TOL | 15.00 | ISDN | 75.00 |
| SUL | 10.00 | TOL | 25.00 | ISDN | 65.00 |
| SUL | 10.00 | TOL | 33.00 | ISDN | 57.00 |
| SUL | 10.00 | TOL | 50.00 | ISDN | 40.00 |
| SUL | 10.00 | TOL | 65.00 | ISDN | 25.00 |
| SUL | 10.00 | TOL | 15.00 | TTE | 75.00 |
| SUL | 10.00 | TOL | 25.00 | TTE | 65.00 |
| SUL | 10.00 | TOL | 33.00 | TTE | 57.00 |
| SUL | 10.00 | TOL | 50.00 | TTE | 40.00 |
| SUL | 10.00 | TOL | 65.00 | TTE | 25.00 |
| SUL | 25.00 | DME | 15.00 | BFE | 60.00 |
| SUL | 25.00 | DME | 25.00 | BFE | 50.00 |
| SUL | 25.00 | DME | 33.00 | BFE | 42.00 |
| SUL | 25.00 | DME | 50.00 | BFE | 25.00 |
| SUL | 25.00 | DME | 15.00 | 3FP | 60.00 |
| SUL | 25.00 | DME | 25.00 | 3FP | 50.00 |
| SUL | 25.00 | DME | 33.00 | 3FP | 42.00 |
| SUL | 25.00 | DME | 50.00 | 3FP | 25.00 |
| SUL | 25.00 | DME | 15.00 | BFTE | 60.00 |
| SUL | 25.00 | DME | 25.00 | BFTE | 50.00 |
| SUL | 25.00 | DME | 33.00 | BFTE | 42.00 |
| SUL | 25.00 | DME | 50.00 | BFTE | 25.00 |
| SUL | 25.00 | DME | 15.00 | FDMB | 60.00 |
| SUL | 25.00 | DME | 25.00 | FDMB | 50.00 |
| SUL | 25.00 | DME | 33.00 | FDMB | 42.00 |
| SUL | 25.00 | DME | 50.00 | FDMB | 25.00 |
| SUL | 25.00 | DME | 15.00 | ISDN | 60.00 |
| SUL | 25.00 | DME | 25.00 | ISDN | 50.00 |
| SUL | 25.00 | DME | 33.00 | ISDN | 42.00 |
| SUL | 25.00 | DME | 50.00 | ISDN | 25.00 |
| SUL | 25.00 | DME | 15.00 | TTE | 60.00 |
| SUL | 25.00 | DME | 25.00 | TTE | 50.00 |
| SUL | 25.00 | DME | 33.00 | TTE | 42.00 |
| SUL | 25.00 | DME | 50.00 | TTE | 25.00 |
| SUL | 25.00 | DOL | 15.00 | BFE | 60.00 |
| SUL | 25.00 | DOL | 25.00 | BFE | 50.00 |
| SUL | 25.00 | DOL | 33.00 | BFE | 42.00 |
| SUL | 25.00 | DOL | 50.00 | BFE | 25.00 |
| SUL | 25.00 | DOL | 15.00 | 3FP | 60.00 |
| SUL | 25.00 | DOL | 25.00 | 3FP | 50.00 |
| SUL | 25.00 | DOL | 33.00 | 3FP | 42.00 |
| SUL | 25.00 | DOL | 50.00 | 3FP | 25.00 |
| SUL | 25.00 | DOL | 15.00 | BFTE | 60.00 |
| SUL | 25.00 | DOL | 25.00 | BFTE | 50.00 |
| SUL | 25.00 | DOL | 33.00 | BFTE | 42.00 |
| SUL | 25.00 | DOL | 50.00 | BFTE | 25.00 |
| SUL | 25.00 | DOL | 15.00 | FDMB | 60.00 |
| SUL | 25.00 | DOL | 25.00 | FDMB | 50.00 |
| SUL | 25.00 | DOL | 33.00 | FDMB | 42.00 |
| SUL | 25.00 | DOL | 50.00 | FDMB | 25.00 |
| SUL | 25.00 | DOL | 15.00 | ISDN | 60.00 |
| SUL | 25.00 | DOL | 25.00 | ISDN | 50.00 |

TABLE 2-continued

| Exemplary Solvent System Components | | | | | |
|---|---|---|---|---|---|
| Solvent 1 | Vol % Solvent 1 | Solvent 2 | Vol % Solvent 2 | Electron Withdrawing Compound (EWC) | Vol % EWC |
| SUL | 25.00 | DOL | 33.00 | ISDN | 42.00 |
| SUL | 25.00 | DOL | 50.00 | ISDN | 25.00 |
| SUL | 25.00 | DOL | 15.00 | TTE | 60.00 |
| SUL | 25.00 | DOL | 25.00 | TTE | 50.00 |
| SUL | 25.00 | DOL | 33.00 | TTE | 42.00 |
| SUL | 25.00 | DOL | 50.00 | TTE | 25.00 |
| SUL | 25.00 | TOL | 15.00 | BFE | 60.00 |
| SUL | 25.00 | TOL | 25.00 | BFE | 50.00 |
| SUL | 25.00 | TOL | 33.00 | BFE | 42.00 |
| SUL | 25.00 | TOL | 50.00 | BFE | 25.00 |
| SUL | 25.00 | TOL | 15.00 | 3FP | 60.00 |
| SUL | 25.00 | TOL | 25.00 | 3FP | 50.00 |
| SUL | 25.00 | TOL | 33.00 | 3FP | 42.00 |
| SUL | 25.00 | TOL | 50.00 | 3FP | 25.00 |
| SUL | 25.00 | TOL | 15.00 | BFTE | 60.00 |
| SUL | 25.00 | TOL | 25.00 | BFTE | 50.00 |
| SUL | 25.00 | TOL | 33.00 | BFTE | 42.00 |
| SUL | 25.00 | TOL | 50.00 | BFTE | 25.00 |
| SUL | 25.00 | TOL | 15.00 | FDMB | 60.00 |
| SUL | 25.00 | TOL | 25.00 | FDMB | 50.00 |
| SUL | 25.00 | TOL | 33.00 | FDMB | 42.00 |
| SUL | 25.00 | TOL | 50.00 | FDMB | 25.00 |
| SUL | 25.00 | TOL | 15.00 | ISDN | 60.00 |
| SUL | 25.00 | TOL | 25.00 | ISDN | 50.00 |
| SUL | 25.00 | TOL | 33.00 | ISDN | 42.00 |
| SUL | 25.00 | TOL | 50.00 | ISDN | 25.00 |
| SUL | 25.00 | TOL | 15.00 | TTE | 60.00 |
| SUL | 25.00 | TOL | 25.00 | TTE | 50.00 |
| SUL | 25.00 | TOL | 33.00 | TTE | 42.00 |
| SUL | 25.00 | TOL | 50.00 | TTE | 25.00 |
| SUL | 33.00 | DME | 15.00 | BFE | 52.00 |
| SUL | 33.00 | DME | 25.00 | BFE | 42.00 |
| SUL | 33.00 | DME | 33.00 | BFE | 34.00 |
| SUL | 33.00 | DME | 50.00 | BFE | 17.00 |
| SUL | 33.00 | DME | 15.00 | 3FP | 52.00 |
| SUL | 33.00 | DME | 25.00 | 3FP | 42.00 |
| SUL | 33.00 | DME | 33.00 | 3FP | 34.00 |
| SUL | 33.00 | DME | 50.00 | 3FP | 17.00 |
| SUL | 33.00 | DME | 15.00 | BFTE | 52.00 |
| SUL | 33.00 | DME | 25.00 | BFTE | 42.00 |
| SUL | 33.00 | DME | 33.00 | BFTE | 34.00 |
| SUL | 33.00 | DME | 50.00 | BFTE | 17.00 |
| SUL | 33.00 | DME | 15.00 | FDMB | 52.00 |
| SUL | 33.00 | DME | 25.00 | FDMB | 42.00 |
| SUL | 33.00 | DME | 33.00 | FDMB | 34.00 |
| SUL | 33.00 | DME | 50.00 | FDMB | 17.00 |
| SUL | 33.00 | DME | 15.00 | ISDN | 52.00 |
| SUL | 33.00 | DME | 25.00 | ISDN | 42.00 |
| SUL | 33.00 | DME | 33.00 | ISDN | 34.00 |
| SUL | 33.00 | DME | 50.00 | ISDN | 17.00 |
| SUL | 33.00 | DME | 15.00 | TTE | 52.00 |
| SUL | 33.00 | DME | 25.00 | TTE | 42.00 |
| SUL | 33.00 | DME | 33.00 | TTE | 34.00 |
| SUL | 33.00 | DME | 50.00 | TTE | 17.00 |
| SUL | 33.00 | DOL | 15.00 | BFE | 52.00 |
| SUL | 33.00 | DOL | 25.00 | BFE | 42.00 |
| SUL | 33.00 | DOL | 33.00 | BFE | 34.00 |
| SUL | 33.00 | DOL | 50.00 | BFE | 17.00 |
| SUL | 33.00 | DOL | 15.00 | 3FP | 52.00 |
| SUL | 33.00 | DOL | 25.00 | 3FP | 42.00 |
| SUL | 33.00 | DOL | 33.00 | 3FP | 34.00 |
| SUL | 33.00 | DOL | 50.00 | 3FP | 17.00 |
| SUL | 33.00 | DOL | 15.00 | BFTE | 52.00 |
| SUL | 33.00 | DOL | 25.00 | BFTE | 42.00 |
| SUL | 33.00 | DOL | 33.00 | BFTE | 34.00 |
| SUL | 33.00 | DOL | 50.00 | BFTE | 17.00 |
| SUL | 33.00 | DOL | 15.00 | FDMB | 52.00 |
| SUL | 33.00 | DOL | 25.00 | FDMB | 42.00 |
| SUL | 33.00 | DOL | 33.00 | FDMB | 34.00 |
| SUL | 33.00 | DOL | 50.00 | FDMB | 17.00 |
| SUL | 33.00 | DOL | 15.00 | ISDN | 52.00 |
| SUL | 33.00 | DOL | 25.00 | ISDN | 42.00 |
| SUL | 33.00 | DOL | 33.00 | ISDN | 34.00 |

TABLE 2-continued

Exemplary Solvent System Components

| Solvent 1 | Vol % Solvent 1 | Solvent 2 | Vol % Solvent 2 | Electron Withdrawing Compound (EWC) | Vol % EWC |
|---|---|---|---|---|---|
| SUL | 33.00 | DOL | 50.00 | ISDN | 17.00 |
| SUL | 33.00 | DOL | 15.00 | TTE | 52.00 |
| SUL | 33.00 | DOL | 25.00 | TTE | 42.00 |
| SUL | 33.00 | DOL | 33.00 | TTE | 34.00 |
| SUL | 33.00 | DOL | 50.00 | TTE | 17.00 |
| SUL | 33.00 | TOL | 15.00 | BFE | 52.00 |
| SUL | 33.00 | TOL | 25.00 | BFE | 42.00 |
| SUL | 33.00 | TOL | 33.00 | BFE | 34.00 |
| SUL | 33.00 | TOL | 50.00 | BFE | 17.00 |
| SUL | 33.00 | TOL | 15.00 | 3FP | 52.00 |
| SUL | 33.00 | TOL | 25.00 | 3FP | 42.00 |
| SUL | 33.00 | TOL | 33.00 | 3FP | 34.00 |
| SUL | 33.00 | TOL | 50.00 | 3FP | 17.00 |
| SUL | 33.00 | TOL | 15.00 | BFTE | 52.00 |
| SUL | 33.00 | TOL | 25.00 | BFTE | 42.00 |
| SUL | 33.00 | TOL | 33.00 | BFTE | 34.00 |
| SUL | 33.00 | TOL | 50.00 | BFTE | 17.00 |
| SUL | 33.00 | TOL | 15.00 | FDMB | 52.00 |
| SUL | 33.00 | TOL | 25.00 | FDMB | 42.00 |
| SUL | 33.00 | TOL | 33.00 | FDMB | 34.00 |
| SUL | 33.00 | TOL | 50.00 | FDMB | 17.00 |
| SUL | 33.00 | TOL | 15.00 | ISDN | 52.00 |
| SUL | 33.00 | TOL | 25.00 | ISDN | 42.00 |
| SUL | 33.00 | TOL | 33.00 | ISDN | 34.00 |
| SUL | 33.00 | TOL | 50.00 | ISDN | 17.00 |
| SUL | 33.00 | TOL | 15.00 | TTE | 52.00 |
| SUL | 33.00 | TOL | 25.00 | TTE | 42.00 |
| SUL | 33.00 | TOL | 33.00 | TTE | 34.00 |
| SUL | 33.00 | TOL | 50.00 | TTE | 17.00 |
| SUL | 50.00 | DME | 10.00 | BFE | 40.00 |
| SUL | 50.00 | DME | 25.00 | BFE | 25.00 |
| SUL | 50.00 | DME | 33.00 | BFE | 17.00 |
| SUL | 50.00 | DME | 15.00 | 3FP | 35.00 |
| SUL | 50.00 | DME | 25.00 | 3FP | 25.00 |
| SUL | 50.00 | DME | 33.00 | 3FP | 17.00 |
| SUL | 50.00 | DME | 15.00 | BFTE | 35.00 |
| SUL | 50.00 | DME | 25.00 | BFTE | 25.00 |
| SUL | 50.00 | DME | 33.00 | BFTE | 17.00 |
| SUL | 50.00 | DME | 15.00 | FDMB | 35.00 |
| SUL | 50.00 | DME | 25.00 | FDMB | 25.00 |
| SUL | 50.00 | DME | 33.00 | FDMB | 17.00 |
| SUL | 50.00 | DME | 15.00 | ISDN | 35.00 |
| SUL | 50.00 | DME | 25.00 | ISDN | 25.00 |
| SUL | 50.00 | DME | 33.00 | ISDN | 17.00 |
| SUL | 50.00 | DME | 15.00 | TTE | 35.00 |
| SUL | 50.00 | DME | 25.00 | TTE | 25.00 |
| SUL | 50.00 | DME | 33.00 | TTE | 17.00 |
| SUL | 50.00 | DOL | 15.00 | BFE | 35.00 |
| SUL | 50.00 | DOL | 25.00 | BFE | 25.00 |
| SUL | 50.00 | DOL | 33.00 | BFE | 17.00 |
| SUL | 50.00 | DOL | 15.00 | 3FP | 35.00 |
| SUL | 50.00 | DOL | 25.00 | 3FP | 25.00 |
| SUL | 50.00 | DOL | 33.00 | 3FP | 17.00 |
| SUL | 50.00 | DOL | 15.00 | BFTE | 35.00 |
| SUL | 50.00 | DOL | 25.00 | BFTE | 25.00 |
| SUL | 50.00 | DOL | 33.00 | BFTE | 17.00 |
| SUL | 50.00 | DOL | 15.00 | FDMB | 35.00 |
| SUL | 50.00 | DOL | 25.00 | FDMB | 25.00 |
| SUL | 50.00 | DOL | 33.00 | FDMB | 17.00 |
| SUL | 50.00 | DOL | 15.00 | ISDN | 35.00 |
| SUL | 50.00 | DOL | 25.00 | ISDN | 25.00 |
| SUL | 50.00 | DOL | 33.00 | ISDN | 17.00 |
| SUL | 50.00 | DOL | 15.00 | TTE | 35.00 |
| SUL | 50.00 | DOL | 25.00 | TTE | 25.00 |
| SUL | 50.00 | DOL | 33.00 | TTE | 17.00 |
| SUL | 50.00 | TOL | 15.00 | BFE | 35.00 |
| SUL | 50.00 | TOL | 25.00 | BFE | 25.00 |
| SUL | 50.00 | TOL | 33.00 | BFE | 17.00 |
| SUL | 50.00 | TOL | 15.00 | 3FP | 35.00 |
| SUL | 50.00 | TOL | 25.00 | 3FP | 25.00 |
| SUL | 50.00 | TOL | 33.00 | 3FP | 17.00 |
| SUL | 50.00 | TOL | 15.00 | BFTE | 35.00 |
| SUL | 50.00 | TOL | 25.00 | BFTE | 25.00 |

TABLE 2-continued

Exemplary Solvent System Components

| Solvent 1 | Vol % Solvent 1 | Solvent 2 | Vol % Solvent 2 | Electron Withdrawing Compound (EWC) | Vol % EWC |
|---|---|---|---|---|---|
| SUL | 50.00 | TOL | 33.00 | BFTE | 17.00 |
| SUL | 50.00 | TOL | 15.00 | FDMB | 35.00 |
| SUL | 50.00 | TOL | 25.00 | FDMB | 25.00 |
| SUL | 50.00 | TOL | 33.00 | FDMB | 17.00 |
| SUL | 50.00 | TOL | 15.00 | ISDN | 35.00 |
| SUL | 50.00 | TOL | 25.00 | ISDN | 25.00 |
| SUL | 50.00 | TOL | 33.00 | ISDN | 17.00 |
| SUL | 50.00 | TOL | 15.00 | TTE | 35.00 |
| SUL | 50.00 | TOL | 25.00 | TTE | 25.00 |
| SUL | 50.00 | TOL | 33.00 | TTE | 17.00 |
| TOL | 25.00 | none | 0 | BFE | 75.00 |
| TOL | 25.00 | none | 0 | 3FP | 75.00 |
| TOL | 25.00 | none | 0 | BFTE | 75.00 |
| TOL | 25.00 | none | 0 | FDMB | 75.00 |
| TOL | 25.00 | none | 0 | ISDN | 75.00 |
| TOL | 25.00 | none | 0 | TTE | 75.00 |
| TOL | 33.00 | none | 0 | BFE | 67.00 |
| TOL | 33.00 | none | 0 | 3FP | 67.00 |
| TOL | 33.00 | none | 0 | BFTE | 67.00 |
| TOL | 33.00 | none | 0 | FDMB | 67.00 |
| TOL | 33.00 | none | 0 | ISDN | 67.00 |
| TOL | 33.00 | none | 0 | TTE | 67.00 |
| TOL | 50.00 | none | 0 | BFE | 50.00 |
| TOL | 50.00 | none | 0 | 3FP | 50.00 |
| TOL | 50.00 | none | 0 | BFTE | 50.00 |
| TOL | 50.00 | none | 0 | FDMB | 50.00 |
| TOL | 50.00 | none | 0 | ISDN | 50.00 |
| TOL | 50.00 | none | 0 | TTE | 50.00 |
| TOL | 75.00 | none | 0 | BFE | 25.00 |
| TOL | 75.00 | none | 0 | 3FP | 25.00 |
| TOL | 75.00 | none | 0 | BFTE | 25.00 |
| TOL | 75.00 | none | 0 | FDMB | 25.00 |
| TOL | 75.00 | none | 0 | ISDN | 25.00 |
| TOL | 75.00 | none | 0 | TTE | 25.00 |
| TOL | 10.00 | DME | 15.00 | BFE | 75.00 |
| TOL | 10.00 | DME | 25.00 | BFE | 65.00 |
| TOL | 10.00 | DME | 33.00 | BFE | 57.00 |
| TOL | 10.00 | DME | 50.00 | BFE | 40.00 |
| TOL | 10.00 | DME | 65.00 | BFE | 25.00 |
| TOL | 10.00 | DME | 15.00 | 3FP | 75.00 |
| TOL | 10.00 | DME | 25.00 | 3FP | 65.00 |
| TOL | 10.00 | DME | 33.00 | 3FP | 57.00 |
| TOL | 10.00 | DME | 50.00 | 3FP | 40.00 |
| TOL | 10.00 | DME | 65.00 | 3FP | 25.00 |
| TOL | 10.00 | DME | 15.00 | BFTE | 75.00 |
| TOL | 10.00 | DME | 25.00 | BFTE | 65.00 |
| TOL | 10.00 | DME | 33.00 | BFTE | 57.00 |
| TOL | 10.00 | DME | 50.00 | BFTE | 40.00 |
| TOL | 10.00 | DME | 65.00 | BFTE | 25.00 |
| TOL | 10.00 | DME | 15.00 | FDMB | 75.00 |
| TOL | 10.00 | DME | 25.00 | FDMB | 65.00 |
| TOL | 10.00 | DME | 33.00 | FDMB | 57.00 |
| TOL | 10.00 | DME | 50.00 | FDMB | 40.00 |
| TOL | 10.00 | DME | 65.00 | FDMB | 25.00 |
| TOL | 10.00 | DME | 15.00 | ISDN | 75.00 |
| TOL | 10.00 | DME | 25.00 | ISDN | 65.00 |
| TOL | 10.00 | DME | 33.00 | ISDN | 57.00 |
| TOL | 10.00 | DME | 50.00 | ISDN | 40.00 |
| TOL | 10.00 | DME | 65.00 | ISDN | 25.00 |
| TOL | 10.00 | DME | 15.00 | TTE | 75.00 |
| TOL | 10.00 | DME | 25.00 | TTE | 65.00 |
| TOL | 10.00 | DME | 33.00 | TTE | 57.00 |
| TOL | 10.00 | DME | 50.00 | TTE | 40.00 |
| TOL | 10.00 | DME | 65.00 | TTE | 25.00 |
| TOL | 10.00 | DOL | 15.00 | BFE | 75.00 |
| TOL | 10.00 | DOL | 25.00 | BFE | 65.00 |
| TOL | 10.00 | DOL | 33.00 | BFE | 57.00 |
| TOL | 10.00 | DOL | 50.00 | BFE | 40.00 |
| TOL | 10.00 | DOL | 65.00 | BFE | 25.00 |
| TOL | 10.00 | DOL | 15.00 | 3FP | 75.00 |
| TOL | 10.00 | DOL | 25.00 | 3FP | 65.00 |
| TOL | 10.00 | DOL | 33.00 | 3FP | 57.00 |
| TOL | 10.00 | DOL | 50.00 | 3FP | 40.00 |

TABLE 2-continued

| Exemplary Solvent System Components | | | | | |
|---|---|---|---|---|---|
| Solvent 1 | Vol % Solvent 1 | Solvent 2 | Vol % Solvent 2 | Electron Withdrawing Compound (EWC) | Vol % EWC |
| TOL | 10.00 | DOL | 65.00 | 3FP | 25.00 |
| TOL | 10.00 | DOL | 15.00 | BFTE | 75.00 |
| TOL | 10.00 | DOL | 25.00 | BFTE | 65.00 |
| TOL | 10.00 | DOL | 33.00 | BFTE | 57.00 |
| TOL | 10.00 | DOL | 50.00 | BFTE | 40.00 |
| TOL | 10.00 | DOL | 65.00 | BFTE | 25.00 |
| TOL | 10.00 | DOL | 15.00 | FDMB | 75.00 |
| TOL | 10.00 | DOL | 25.00 | FDMB | 65.00 |
| TOL | 10.00 | DOL | 33.00 | FDMB | 57.00 |
| TOL | 10.00 | DOL | 50.00 | FDMB | 40.00 |
| TOL | 10.00 | DOL | 65.00 | FDMB | 25.00 |
| TOL | 10.00 | DOL | 15.00 | ISDN | 75.00 |
| TOL | 10.00 | DOL | 25.00 | ISDN | 65.00 |
| TOL | 10.00 | DOL | 33.00 | ISDN | 57.00 |
| TOL | 10.00 | DOL | 50.00 | ISDN | 40.00 |
| TOL | 10.00 | DOL | 65.00 | ISDN | 25.00 |
| TOL | 10.00 | DOL | 15.00 | TTE | 75.00 |
| TOL | 10.00 | DOL | 25.00 | TTE | 65.00 |
| TOL | 10.00 | DOL | 33.00 | TTE | 57.00 |
| TOL | 10.00 | DOL | 50.00 | TTE | 40.00 |
| TOL | 10.00 | DOL | 65.00 | TTE | 25.00 |
| TOL | 10.00 | SUL | 15.00 | BFE | 75.00 |
| TOL | 10.00 | SUL | 25.00 | BFE | 65.00 |
| TOL | 10.00 | SUL | 33.00 | BFE | 57.00 |
| TOL | 10.00 | SUL | 50.00 | BFE | 40.00 |
| TOL | 10.00 | SUL | 65.00 | BFE | 25.00 |
| TOL | 10.00 | SUL | 15.00 | 3FP | 75.00 |
| TOL | 10.00 | SUL | 25.00 | 3FP | 65.00 |
| TOL | 10.00 | SUL | 33.00 | 3FP | 57.00 |
| TOL | 10.00 | SUL | 50.00 | 3FP | 40.00 |
| TOL | 10.00 | SUL | 65.00 | 3FP | 25.00 |
| TOL | 10.00 | SUL | 15.00 | BFTE | 75.00 |
| TOL | 10.00 | SUL | 25.00 | BFTE | 65.00 |
| TOL | 10.00 | SUL | 33.00 | BFTE | 57.00 |
| TOL | 10.00 | SUL | 50.00 | BFTE | 40.00 |
| TOL | 10.00 | SUL | 65.00 | BFTE | 25.00 |
| TOL | 10.00 | SUL | 15.00 | FDMB | 75.00 |
| TOL | 10.00 | SUL | 25.00 | FDMB | 65.00 |
| TOL | 10.00 | SUL | 33.00 | FDMB | 57.00 |
| TOL | 10.00 | SUL | 50.00 | FDMB | 40.00 |
| TOL | 10.00 | SUL | 65.00 | FDMB | 25.00 |
| TOL | 10.00 | SUL | 15.00 | ISDN | 75.00 |
| TOL | 10.00 | SUL | 25.00 | ISDN | 65.00 |
| TOL | 10.00 | SUL | 33.00 | ISDN | 57.00 |
| TOL | 10.00 | SUL | 50.00 | ISDN | 40.00 |
| TOL | 10.00 | SUL | 65.00 | ISDN | 25.00 |
| TOL | 10.00 | SUL | 15.00 | TTE | 75.00 |
| TOL | 10.00 | SUL | 25.00 | TTE | 65.00 |
| TOL | 10.00 | SUL | 33.00 | TTE | 57.00 |
| TOL | 10.00 | SUL | 50.00 | TTE | 40.00 |
| TOL | 10.00 | SUL | 65.00 | TTE | 25.00 |
| TOL | 25.00 | DME | 15.00 | BFE | 60.00 |
| TOL | 25.00 | DME | 25.00 | BFE | 50.00 |
| TOL | 25.00 | DME | 33.00 | BFE | 42.00 |
| TOL | 25.00 | DME | 50.00 | BFE | 25.00 |
| TOL | 25.00 | DME | 15.00 | 3FP | 60.00 |
| TOL | 25.00 | DME | 25.00 | 3FP | 50.00 |
| TOL | 25.00 | DME | 33.00 | 3FP | 42.00 |
| TOL | 25.00 | DME | 50.00 | 3FP | 25.00 |
| TOL | 25.00 | DME | 15.00 | BFTE | 60.00 |
| TOL | 25.00 | DME | 25.00 | BFTE | 50.00 |
| TOL | 25.00 | DME | 33.00 | BFTE | 42.00 |
| TOL | 25.00 | DME | 50.00 | BFTE | 25.00 |
| TOL | 25.00 | DME | 15.00 | FDMB | 60.00 |
| TOL | 25.00 | DME | 25.00 | FDMB | 50.00 |
| TOL | 25.00 | DME | 33.00 | FDMB | 42.00 |
| TOL | 25.00 | DME | 50.00 | FDMB | 25.00 |
| TOL | 25.00 | DME | 15.00 | ISDN | 60.00 |
| TOL | 25.00 | DME | 25.00 | ISDN | 50.00 |
| TOL | 25.00 | DME | 33.00 | ISDN | 42.00 |
| TOL | 25.00 | DME | 50.00 | ISDN | 25.00 |
| TOL | 25.00 | DME | 15.00 | TTE | 60.00 |
| TOL | 25.00 | DME | 25.00 | TTE | 50.00 |

TABLE 2-continued

Exemplary Solvent System Components

| Solvent 1 | Vol % Solvent 1 | Solvent 2 | Vol % Solvent 2 | Electron Withdrawing Compound (EWC) | Vol % EWC |
|---|---|---|---|---|---|
| TOL | 25.00 | DME | 33.00 | TTE | 42.00 |
| TOL | 25.00 | DME | 50.00 | TTE | 25.00 |
| TOL | 25.00 | DOL | 15.00 | BFE | 60.00 |
| TOL | 25.00 | DOL | 25.00 | BFE | 50.00 |
| TOL | 25.00 | DOL | 33.00 | BFE | 42.00 |
| TOL | 25.00 | DOL | 50.00 | BFE | 25.00 |
| TOL | 25.00 | DOL | 15.00 | 3FP | 60.00 |
| TOL | 25.00 | DOL | 25.00 | 3FP | 50.00 |
| TOL | 25.00 | DOL | 33.00 | 3FP | 42.00 |
| TOL | 25.00 | DOL | 50.00 | 3FP | 25.00 |
| TOL | 25.00 | DOL | 15.00 | BFTE | 60.00 |
| TOL | 25.00 | DOL | 25.00 | BFTE | 50.00 |
| TOL | 25.00 | DOL | 33.00 | BFTE | 42.00 |
| TOL | 25.00 | DOL | 50.00 | BFTE | 25.00 |
| TOL | 25.00 | DOL | 15.00 | FDMB | 60.00 |
| TOL | 25.00 | DOL | 25.00 | FDMB | 50.00 |
| TOL | 25.00 | DOL | 33.00 | FDMB | 42.00 |
| TOL | 25.00 | DOL | 50.00 | FDMB | 25.00 |
| TOL | 25.00 | DOL | 15.00 | ISDN | 60.00 |
| TOL | 25.00 | DOL | 25.00 | ISDN | 50.00 |
| TOL | 25.00 | DOL | 33.00 | ISDN | 42.00 |
| TOL | 25.00 | DOL | 50.00 | ISDN | 25.00 |
| TOL | 25.00 | DOL | 15.00 | TTE | 60.00 |
| TOL | 25.00 | DOL | 25.00 | TTE | 50.00 |
| TOL | 25.00 | DOL | 33.00 | TTE | 42.00 |
| TOL | 25.00 | DOL | 50.00 | TTE | 25.00 |
| TOL | 25.00 | SUL | 15.00 | BFE | 60.00 |
| TOL | 25.00 | SUL | 25.00 | BFE | 50.00 |
| TOL | 25.00 | SUL | 33.00 | BFE | 42.00 |
| TOL | 25.00 | SUL | 50.00 | BFE | 25.00 |
| TOL | 25.00 | SUL | 15.00 | 3FP | 60.00 |
| TOL | 25.00 | SUL | 25.00 | 3FP | 50.00 |
| TOL | 25.00 | SUL | 33.00 | 3FP | 42.00 |
| TOL | 25.00 | SUL | 50.00 | 3FP | 25.00 |
| TOL | 25.00 | SUL | 15.00 | BFTE | 60.00 |
| TOL | 25.00 | SUL | 25.00 | BFTE | 50.00 |
| TOL | 25.00 | SUL | 33.00 | BFTE | 42.00 |
| TOL | 25.00 | SUL | 50.00 | BFTE | 25.00 |
| TOL | 25.00 | SUL | 15.00 | FDMB | 60.00 |
| TOL | 25.00 | SUL | 25.00 | FDMB | 50.00 |
| TOL | 25.00 | SUL | 33.00 | FDMB | 42.00 |
| TOL | 25.00 | SUL | 50.00 | FDMB | 25.00 |
| TOL | 25.00 | SUL | 15.00 | ISDN | 60.00 |
| TOL | 25.00 | SUL | 25.00 | ISDN | 50.00 |
| TOL | 25.00 | SUL | 33.00 | ISDN | 42.00 |
| TOL | 25.00 | SUL | 50.00 | ISDN | 25.00 |
| TOL | 25.00 | SUL | 15.00 | TTE | 60.00 |
| TOL | 25.00 | SUL | 25.00 | TTE | 50.00 |
| TOL | 25.00 | SUL | 33.00 | TTE | 42.00 |
| TOL | 25.00 | SUL | 50.00 | TTE | 25.00 |
| TOL | 33.00 | DME | 15.00 | BFE | 52.00 |
| TOL | 33.00 | DME | 25.00 | BFE | 42.00 |
| TOL | 33.00 | DME | 33.00 | BFE | 34.00 |
| TOL | 33.00 | DME | 50.00 | BFE | 17.00 |
| TOL | 33.00 | DME | 15.00 | 3FP | 52.00 |
| TOL | 33.00 | DME | 25.00 | 3FP | 42.00 |
| TOL | 33.00 | DME | 33.00 | 3FP | 34.00 |
| TOL | 33.00 | DME | 50.00 | 3FP | 17.00 |
| TOL | 33.00 | DME | 15.00 | BFTE | 52.00 |
| TOL | 33.00 | DME | 25.00 | BFTE | 42.00 |
| TOL | 33.00 | DME | 33.00 | BFTE | 34.00 |
| TOL | 33.00 | DME | 50.00 | BFTE | 17.00 |
| TOL | 33.00 | DME | 15.00 | FDMB | 52.00 |
| TOL | 33.00 | DME | 25.00 | FDMB | 42.00 |
| TOL | 33.00 | DME | 33.00 | FDMB | 34.00 |
| TOL | 33.00 | DME | 50.00 | FDMB | 17.00 |
| TOL | 33.00 | DME | 15.00 | ISDN | 52.00 |
| TOL | 33.00 | DME | 25.00 | ISDN | 42.00 |
| TOL | 33.00 | DME | 33.00 | ISDN | 34.00 |
| TOL | 33.00 | DME | 50.00 | ISDN | 17.00 |
| TOL | 33.00 | DME | 15.00 | TTE | 52.00 |
| TOL | 33.00 | DME | 25.00 | TTE | 42.00 |
| TOL | 33.00 | DME | 33.00 | TTE | 34.00 |

TABLE 2-continued

| Exemplary Solvent System Components | | | | | |
|---|---|---|---|---|---|
| Solvent 1 | Vol % Solvent 1 | Solvent 2 | Vol % Solvent 2 | Electron Withdrawing Compound (EWC) | Vol % EWC |
| TOL | 33.00 | DME | 50.00 | TTE | 17.00 |
| TOL | 33.00 | DOL | 15.00 | BFE | 52.00 |
| TOL | 33.00 | DOL | 25.00 | BFE | 42.00 |
| TOL | 33.00 | DOL | 33.00 | BFE | 34.00 |
| TOL | 33.00 | DOL | 50.00 | BFE | 17.00 |
| TOL | 33.00 | DOL | 15.00 | 3FP | 52.00 |
| TOL | 33.00 | DOL | 25.00 | 3FP | 42.00 |
| TOL | 33.00 | DOL | 33.00 | 3FP | 34.00 |
| TOL | 33.00 | DOL | 50.00 | 3FP | 17.00 |
| TOL | 33.00 | DOL | 15.00 | BFTE | 52.00 |
| TOL | 33.00 | DOL | 25.00 | BFTE | 42.00 |
| TOL | 33.00 | DOL | 33.00 | BFTE | 34.00 |
| TOL | 33.00 | DOL | 50.00 | BFTE | 17.00 |
| TOL | 33.00 | DOL | 15.00 | FDMB | 52.00 |
| TOL | 33.00 | DOL | 25.00 | FDMB | 42.00 |
| TOL | 33.00 | DOL | 33.00 | FDMB | 34.00 |
| TOL | 33.00 | DOL | 50.00 | FDMB | 17.00 |
| TOL | 33.00 | DOL | 15.00 | ISDN | 52.00 |
| TOL | 33.00 | DOL | 25.00 | ISDN | 42.00 |
| TOL | 33.00 | DOL | 33.00 | ISDN | 34.00 |
| TOL | 33.00 | DOL | 50.00 | ISDN | 17.00 |
| TOL | 33.00 | DOL | 15.00 | TTE | 52.00 |
| TOL | 33.00 | DOL | 25.00 | TTE | 42.00 |
| TOL | 33.00 | DOL | 33.00 | TTE | 34.00 |
| TOL | 33.00 | DOL | 50.00 | TTE | 17.00 |
| TOL | 33.00 | SUL | 15.00 | BFE | 52.00 |
| TOL | 33.00 | SUL | 25.00 | BFE | 42.00 |
| TOL | 33.00 | SUL | 33.00 | BFE | 34.00 |
| TOL | 33.00 | SUL | 50.00 | BFE | 17.00 |
| TOL | 33.00 | SUL | 15.00 | 3FP | 52.00 |
| TOL | 33.00 | SUL | 25.00 | 3FP | 42.00 |
| TOL | 33.00 | SUL | 33.00 | 3FP | 34.00 |
| TOL | 33.00 | SUL | 50.00 | 3FP | 17.00 |
| TOL | 33.00 | SUL | 15.00 | BFTE | 52.00 |
| TOL | 33.00 | SUL | 25.00 | BFTE | 42.00 |
| TOL | 33.00 | SUL | 33.00 | BFTE | 34.00 |
| TOL | 33.00 | SUL | 50.00 | BFTE | 17.00 |
| TOL | 33.00 | SUL | 15.00 | FDMB | 52.00 |
| TOL | 33.00 | SUL | 25.00 | FDMB | 42.00 |
| TOL | 33.00 | SUL | 33.00 | FDMB | 34.00 |
| TOL | 33.00 | SUL | 50.00 | FDMB | 17.00 |
| TOL | 33.00 | SUL | 15.00 | ISDN | 52.00 |
| TOL | 33.00 | SUL | 25.00 | ISDN | 42.00 |
| TOL | 33.00 | SUL | 33.00 | ISDN | 34.00 |
| TOL | 33.00 | SUL | 50.00 | ISDN | 17.00 |
| TOL | 33.00 | SUL | 15.00 | TTE | 52.00 |
| TOL | 33.00 | SUL | 25.00 | TTE | 42.00 |
| TOL | 33.00 | SUL | 33.00 | TTE | 34.00 |
| TOL | 33.00 | SUL | 50.00 | TTE | 17.00 |
| TOL | 50.00 | DME | 10.00 | BFE | 40.00 |
| TOL | 50.00 | DME | 25.00 | BFE | 25.00 |
| TOL | 50.00 | DME | 33.00 | BFE | 17.00 |
| TOL | 50.00 | DME | 15.00 | 3FP | 35.00 |
| TOL | 50.00 | DME | 25.00 | 3FP | 25.00 |
| TOL | 50.00 | DME | 33.00 | 3FP | 17.00 |
| TOL | 50.00 | DME | 15.00 | BFTE | 35.00 |
| TOL | 50.00 | DME | 25.00 | BFTE | 25.00 |
| TOL | 50.00 | DME | 33.00 | BFTE | 17.00 |
| TOL | 50.00 | DME | 15.00 | FDMB | 35.00 |
| TOL | 50.00 | DME | 25.00 | FDMB | 25.00 |
| TOL | 50.00 | DME | 33.00 | FDMB | 17.00 |
| TOL | 50.00 | DME | 15.00 | ISDN | 35.00 |
| TOL | 50.00 | DME | 25.00 | ISDN | 25.00 |
| TOL | 50.00 | DME | 33.00 | ISDN | 17.00 |
| TOL | 50.00 | DME | 15.00 | TTE | 35.00 |
| TOL | 50.00 | DME | 25.00 | TTE | 25.00 |
| TOL | 50.00 | DME | 33.00 | TTE | 17.00 |
| TOL | 50.00 | DOL | 15.00 | BFE | 35.00 |
| TOL | 50.00 | DOL | 25.00 | BFE | 25.00 |
| TOL | 50.00 | DOL | 33.00 | BFE | 17.00 |
| TOL | 50.00 | DOL | 15.00 | 3FP | 35.00 |
| TOL | 50.00 | DOL | 25.00 | 3FP | 25.00 |
| TOL | 50.00 | DOL | 33.00 | 3FP | 17.00 |

TABLE 2-continued

Exemplary Solvent System Components

| Solvent 1 | Vol % Solvent 1 | Solvent 2 | Vol % Solvent 2 | Electron Withdrawing Compound (EWC) | Vol % EWC |
|---|---|---|---|---|---|
| TOL | 50.00 | DOL | 15.00 | BFTE | 35.00 |
| TOL | 50.00 | DOL | 25.00 | BFTE | 25.00 |
| TOL | 50.00 | DOL | 33.00 | BFTE | 17.00 |
| TOL | 50.00 | DOL | 15.00 | FDMB | 35.00 |
| TOL | 50.00 | DOL | 25.00 | FDMB | 25.00 |
| TOL | 50.00 | DOL | 33.00 | FDMB | 17.00 |
| TOL | 50.00 | DOL | 15.00 | ISDN | 35.00 |
| TOL | 50.00 | DOL | 25.00 | ISDN | 25.00 |
| TOL | 50.00 | DOL | 33.00 | ISDN | 17.00 |
| TOL | 50.00 | DOL | 15.00 | TTE | 35.00 |
| TOL | 50.00 | DOL | 25.00 | TTE | 25.00 |
| TOL | 50.00 | DOL | 33.00 | TTE | 17.00 |
| TOL | 50.00 | SUL | 15.00 | BFE | 35.00 |
| TOL | 50.00 | SUL | 25.00 | BFE | 25.00 |
| TOL | 50.00 | SUL | 33.00 | BFE | 17.00 |
| TOL | 50.00 | SUL | 15.00 | 3FP | 35.00 |
| TOL | 50.00 | SUL | 25.00 | 3FP | 25.00 |
| TOL | 50.00 | SUL | 33.00 | 3FP | 17.00 |
| TOL | 50.00 | SUL | 15.00 | BFTE | 35.00 |
| TOL | 50.00 | SUL | 25.00 | BFTE | 25.00 |
| TOL | 50.00 | SUL | 33.00 | BFTE | 17.00 |
| TOL | 50.00 | SUL | 15.00 | FDMB | 35.00 |
| TOL | 50.00 | SUL | 25.00 | FDMB | 25.00 |
| TOL | 50.00 | SUL | 33.00 | FDMB | 17.00 |
| TOL | 50.00 | SUL | 15.00 | ISDN | 35.00 |
| TOL | 50.00 | SUL | 25.00 | ISDN | 25.00 |
| TOL | 50.00 | SUL | 33.00 | ISDN | 17.00 |
| TOL | 50.00 | SUL | 15.00 | TTE | 35.00 |
| TOL | 50.00 | SUL | 25.00 | TTE | 25.00 |
| TOL | 50.00 | SUL | 33.00 | TTE | 17.00 |

TABLE 3

Exemplary Additional Components

| Li-Ion Transport Compound 1 | Conc. (mol/L) | Li-Ion Transport Compound 2 | Conc. (mol/L) | Enhancer | Conc. (mol/L) |
|---|---|---|---|---|---|
| lithium bis(trifluoro-methane sulfonyl)imide (LiTFSI) | 0.10 | none | 0.00 | guanidine nitrate | 0.10 |
| LiTFSI | 0.25 | none | 0.00 | guanidine nitrate | 0.10 |
| LiTFSI | 0.40 | none | 0.00 | guanidine nitrate | 0.10 |
| LiTFSI | 0.50 | none | 0.00 | guanidine nitrate | 0.10 |
| LiTFSI | 0.66 | none | 0.00 | guanidine nitrate | 0.10 |
| LiTFSI | 0.75 | none | 0.00 | guanidine nitrate | 0.10 |
| LiTFSI | 1.00 | none | 0.00 | guanidine nitrate | 0.10 |
| LiTFSI | 0.10 | none | 0.00 | guanidine nitrate | 0.15 |
| LiTFSI | 0.25 | none | 0.00 | guanidine nitrate | 0.15 |
| LiTFSI | 0.40 | none | 0.00 | guanidine nitrate | 0.15 |
| LiTFSI | 0.50 | none | 0.00 | guanidine nitrate | 0.15 |
| LiTFSI | 0.66 | none | 0.00 | guanidine nitrate | 0.15 |
| LiTFSI | 0.75 | none | 0.00 | guanidine nitrate | 0.15 |
| LiTFSI | 1.00 | none | 0.00 | guanidine nitrate | 0.15 |

TABLE 3-continued

Exemplary Additional Components

| Li-Ion Transport Compound 1 | Conc. (mol/L) | Li-Ion Transport Compound 2 | Conc. (mol/L) | Enhancer | Conc. (mol/L) |
|---|---|---|---|---|---|
| LiTFSI | 0.10 | lithium nitrate ($LiNO_3$) | 0.10 | dicyanide diamide (DCDA) | 0.10 |
| LiTFSI | 0.10 | $LiNO_3$ | 0.25 | DCDA | 0.10 |
| LiTFSI | 0.10 | $LiNO_3$ | 0.33 | DCDA | 0.10 |
| LiTFSI | 0.10 | $LiNO_3$ | 0.50 | DCDA | 0.10 |
| LiTFSI | 0.10 | $LiNO_3$ | 0.66 | DCDA | 0.10 |
| LiTFSI | 0.10 | $LiNO_3$ | 0.75 | DCDA | 0.10 |
| LiTFSI | 0.10 | $LiNO_3$ | 1.00 | DCDA | 0.10 |
| LiTFSI | 0.10 | $LiNO_3$ | 0.10 | DCDA | 0.15 |
| LiTFSI | 0.10 | $LiNO_3$ | 0.25 | DCDA | 0.15 |
| LiTFSI | 0.10 | $LiNO_3$ | 0.33 | DCDA | 0.15 |
| LiTFSI | 0.10 | $LiNO_3$ | 0.50 | DCDA | 0.15 |
| LiTFSI | 0.10 | $LiNO_3$ | 0.66 | DCDA | 0.15 |
| LiTFSI | 0.10 | $LiNO_3$ | 0.75 | DCDA | 0.15 |
| LiTFSI | 0.10 | $LiNO_3$ | 1.00 | DCDA | 0.15 |
| LiTFSI | 0.25 | $LiNO_3$ | 0.10 | DCDA | 0.10 |
| LiTFSI | 0.25 | $LiNO_3$ | 0.25 | DCDA | 0.10 |
| LiTFSI | 0.25 | $LiNO_3$ | 0.33 | DCDA | 0.10 |
| LiTFSI | 0.25 | $LiNO_3$ | 0.50 | DCDA | 0.10 |
| LiTFSI | 0.25 | $LiNO_3$ | 0.66 | DCDA | 0.10 |
| LiTFSI | 0.25 | $LiNO_3$ | 0.75 | DCDA | 0.10 |
| LiTFSI | 0.25 | $LiNO_3$ | 1.00 | DCDA | 0.10 |
| LiTFSI | 0.25 | $LiNO_3$ | 0.10 | DCDA | 0.15 |
| LiTFSI | 0.25 | $LiNO_3$ | 0.25 | DCDA | 0.15 |
| LiTFSI | 0.25 | $LiNO_3$ | 0.33 | DCDA | 0.15 |
| LiTFSI | 0.25 | $LiNO_3$ | 0.50 | DCDA | 0.15 |
| LiTFSI | 0.25 | $LiNO_3$ | 0.66 | DCDA | 0.15 |
| LiTFSI | 0.25 | $LiNO_3$ | 0.75 | DCDA | 0.15 |
| LiTFSI | 0.25 | $LiNO_3$ | 1.00 | DCDA | 0.15 |
| LiTFSI | 0.40 | $LiNO_3$ | 0.10 | DCDA | 0.10 |

TABLE 3-continued

| Exemplary Additional Components | | | | | |
|---|---|---|---|---|---|
| Li-Ion Transport Compound 1 | Conc. (mol/L) | Li-Ion Transport Compound 2 | Conc. (mol/L) | Enhancer | Conc. (mol/L) |
| LiTFSI | 0.40 | $LiNO_3$ | 0.25 | DCDA | 0.10 |
| LiTFSI | 0.40 | $LiNO_3$ | 0.33 | DCDA | 0.10 |
| LiTFSI | 0.40 | $LiNO_3$ | 0.50 | DCDA | 0.10 |
| LiTFSI | 0.40 | $LiNO_3$ | 0.66 | DCDA | 0.10 |
| LiTFSI | 0.40 | $LiNO_3$ | 0.75 | DCDA | 0.10 |
| LiTFSI | 0.40 | $LiNO_3$ | 1.00 | DCDA | 0.10 |
| LiTFSI | 0.40 | $LiNO_3$ | 0.10 | DCDA | 0.15 |
| LiTFSI | 0.40 | $LiNO_3$ | 0.25 | DCDA | 0.15 |
| LiTFSI | 0.40 | $LiNO_3$ | 0.33 | DCDA | 0.15 |
| LiTFSI | 0.40 | $LiNO_3$ | 0.50 | DCDA | 0.15 |
| LiTFSI | 0.40 | $LiNO_3$ | 0.66 | DCDA | 0.15 |
| LiTFSI | 0.40 | $LiNO_3$ | 0.75 | DCDA | 0.15 |
| LiTFSI | 0.40 | $LiNO_3$ | 1.00 | DCDA | 0.15 |
| LiTFSI | 0.50 | $LiNO_3$ | 0.10 | DCDA | 0.10 |
| LiTFSI | 0.50 | $LiNO_3$ | 0.25 | DCDA | 0.10 |
| LiTFSI | 0.50 | $LiNO_3$ | 0.33 | DCDA | 0.10 |
| LiTFSI | 0.50 | $LiNO_3$ | 0.50 | DCDA | 0.10 |
| LiTFSI | 0.50 | $LiNO_3$ | 0.66 | DCDA | 0.10 |
| LiTFSI | 0.50 | $LiNO_3$ | 0.75 | DCDA | 0.10 |
| LiTFSI | 0.50 | $LiNO_3$ | 1.00 | DCDA | 0.10 |
| LiTFSI | 0.50 | $LiNO_3$ | 0.10 | DCDA | 0.15 |
| LiTFSI | 0.50 | $LiNO_3$ | 0.25 | DCDA | 0.15 |
| LiTFSI | 0.50 | $LiNO_3$ | 0.33 | DCDA | 0.15 |
| LiTFSI | 0.50 | $LiNO_3$ | 0.50 | DCDA | 0.15 |
| LiTFSI | 0.50 | $LiNO_3$ | 0.66 | DCDA | 0.15 |
| LiTFSI | 0.50 | $LiNO_3$ | 0.75 | DCDA | 0.15 |
| LiTFSI | 0.50 | $LiNO_3$ | 1.00 | DCDA | 0.15 |
| LiTFSI | 0.66 | $LiNO_3$ | 0.10 | DCDA | 0.10 |
| LiTFSI | 0.66 | $LiNO_3$ | 0.25 | DCDA | 0.10 |
| LiTFSI | 0.66 | $LiNO_3$ | 0.33 | DCDA | 0.10 |
| LiTFSI | 0.66 | $LiNO_3$ | 0.50 | DCDA | 0.10 |
| LiTFSI | 0.66 | $LiNO_3$ | 0.66 | DCDA | 0.10 |
| LiTFSI | 0.66 | $LiNO_3$ | 0.75 | DCDA | 0.10 |
| LiTFSI | 0.66 | $LiNO_3$ | 1.00 | DCDA | 0.10 |
| LiTFSI | 0.66 | $LiNO_3$ | 0.10 | DCDA | 0.15 |
| LiTFSI | 0.66 | $LiNO_3$ | 0.25 | DCDA | 0.15 |
| LiTFSI | 0.66 | $LiNO_3$ | 0.33 | DCDA | 0.15 |
| LiTFSI | 0.66 | $LiNO_3$ | 0.50 | DCDA | 0.15 |
| LiTFSI | 0.66 | $LiNO_3$ | 0.66 | DCDA | 0.15 |
| LiTFSI | 0.66 | $LiNO_3$ | 0.75 | DCDA | 0.15 |
| LiTFSI | 0.66 | $LiNO_3$ | 1.00 | DCDA | 0.15 |
| LiTFSI | 0.75 | $LiNO_3$ | 0.10 | DCDA | 0.10 |
| LiTFSI | 0.75 | $LiNO_3$ | 0.25 | DCDA | 0.10 |
| LiTFSI | 0.75 | $LiNO_3$ | 0.33 | DCDA | 0.10 |
| LiTFSI | 0.75 | $LiNO_3$ | 0.50 | DCDA | 0.10 |
| LiTFSI | 0.75 | $LiNO_3$ | 0.66 | DCDA | 0.10 |
| LiTFSI | 0.75 | $LiNO_3$ | 0.75 | DCDA | 0.10 |
| LiTFSI | 0.75 | $LiNO_3$ | 1.00 | DCDA | 0.10 |
| LiTFSI | 0.75 | $LiNO_3$ | 0.10 | DCDA | 0.15 |
| LiTFSI | 0.75 | $LiNO_3$ | 0.25 | DCDA | 0.15 |
| LiTFSI | 0.75 | $LiNO_3$ | 0.33 | DCDA | 0.15 |
| LiTFSI | 0.75 | $LiNO_3$ | 0.50 | DCDA | 0.15 |
| LiTFSI | 0.75 | $LiNO_3$ | 0.66 | DCDA | 0.15 |
| LiTFSI | 0.75 | $LiNO_3$ | 0.75 | DCDA | 0.15 |
| LiTFSI | 0.75 | $LiNO_3$ | 1.00 | DCDA | 0.15 |
| LiTFSI | 1.00 | $LiNO_3$ | 0.10 | DCDA | 0.10 |
| LiTFSI | 1.00 | $LiNO_3$ | 0.25 | DCDA | 0.10 |
| LiTFSI | 1.00 | $LiNO_3$ | 0.33 | DCDA | 0.10 |
| LiTFSI | 1.00 | $LiNO_3$ | 0.50 | DCDA | 0.10 |
| LiTFSI | 1.00 | $LiNO_3$ | 0.66 | DCDA | 0.10 |
| LiTFSI | 1.00 | $LiNO_3$ | 0.75 | DCDA | 0.10 |
| LiTFSI | 1.00 | $LiNO_3$ | 1.00 | DCDA | 0.10 |
| LiTFSI | 1.00 | $LiNO_3$ | 0.10 | DCDA | 0.15 |
| LiTFSI | 1.00 | $LiNO_3$ | 0.25 | DCDA | 0.15 |
| LiTFSI | 1.00 | $LiNO_3$ | 0.33 | DCDA | 0.15 |
| LiTFSI | 1.00 | $LiNO_3$ | 0.50 | DCDA | 0.15 |
| LiTFSI | 1.00 | $LiNO_3$ | 0.66 | DCDA | 0.15 |
| LiTFSI | 1.00 | $LiNO_3$ | 0.75 | DCDA | 0.15 |
| LiTFSI | 1.00 | $LiNO_3$ | 1.00 | DCDA | 0.15 |
| LiTFSI | 0.10 | lithium Perchlorate ($LiClO_4$) | 0.10 | guanine | 0.10 |
| LiTFSI | 0.10 | $LiClO_4$ | 0.25 | guanine | 0.10 |
| LiTFSI | 0.10 | $LiClO_4$ | 0.33 | guanine | 0.10 |
| LiTFSI | 0.10 | $LiClO_4$ | 0.50 | guanine | 0.10 |
| LiTFSI | 0.10 | $LiClO_4$ | 0.66 | guanine | 0.10 |
| LiTFSI | 0.10 | $LiClO_4$ | 0.75 | guanine | 0.10 |
| LiTFSI | 0.10 | $LiClO_4$ | 1.00 | guanine | 0.10 |
| LiTFSI | 0.10 | $LiClO_4$ | 0.10 | guanine | 0.15 |
| LiTFSI | 0.10 | $LiClO_4$ | 0.25 | guanine | 0.15 |
| LiTFSI | 0.10 | $LiClO_4$ | 0.33 | guanine | 0.15 |
| LiTFSI | 0.10 | $LiClO_4$ | 0.50 | guanine | 0.15 |
| LiTFSI | 0.10 | $LiClO_4$ | 0.66 | guanine | 0.15 |
| LiTFSI | 0.10 | $LiClO_4$ | 0.75 | guanine | 0.15 |
| LiTFSI | 0.10 | $LiClO_4$ | 1.00 | guanine | 0.15 |
| LiTFSI | 0.25 | $LiClO_4$ | 0.10 | guanine | 0.10 |
| LiTFSI | 0.25 | $LiClO_4$ | 0.25 | guanine | 0.10 |
| LiTFSI | 0.25 | $LiClO_4$ | 0.33 | guanine | 0.10 |
| LiTFSI | 0.25 | $LiClO_4$ | 0.50 | guanine | 0.10 |
| LiTFSI | 0.25 | $LiClO_4$ | 0.66 | guanine | 0.10 |
| LiTFSI | 0.25 | $LiClO_4$ | 0.75 | guanine | 0.10 |
| LiTFSI | 0.25 | $LiClO_4$ | 1.00 | guanine | 0.10 |
| LiTFSI | 0.25 | $LiClO_4$ | 0.10 | guanine | 0.15 |
| LiTFSI | 0.25 | $LiClO_4$ | 0.25 | guanine | 0.15 |
| LiTFSI | 0.25 | $LiClO_4$ | 0.33 | guanine | 0.15 |
| LiTFSI | 0.25 | $LiClO_4$ | 0.50 | guanine | 0.15 |
| LiTFSI | 0.25 | $LiClO_4$ | 0.66 | guanine | 0.15 |
| LiTFSI | 0.25 | $LiClO_4$ | 0.75 | guanine | 0.15 |
| LiTFSI | 0.25 | $LiClO_4$ | 1.00 | guanine | 0.15 |
| LiTFSI | 0.40 | $LiClO_4$ | 0.10 | guanine | 0.10 |
| LiTFSI | 0.40 | $LiClO_4$ | 0.25 | guanine | 0.10 |
| LiTFSI | 0.40 | $LiClO_4$ | 0.33 | guanine | 0.10 |
| LiTFSI | 0.40 | $LiClO_4$ | 0.50 | guanine | 0.10 |
| LiTFSI | 0.40 | $LiClO_4$ | 0.66 | guanine | 0.10 |
| LiTFSI | 0.40 | $LiClO_4$ | 0.75 | guanine | 0.10 |
| LiTFSI | 0.40 | $LiClO_4$ | 1.00 | guanine | 0.10 |
| LiTFSI | 0.40 | $LiClO_4$ | 0.10 | guanine | 0.15 |
| LiTFSI | 0.40 | $LiClO_4$ | 0.25 | guanine | 0.15 |
| LiTFSI | 0.40 | $LiClO_4$ | 0.33 | guanine | 0.15 |
| LiTFSI | 0.40 | $LiClO_4$ | 0.50 | guanine | 0.15 |
| LiTFSI | 0.40 | $LiClO_4$ | 0.66 | guanine | 0.15 |
| LiTFSI | 0.40 | $LiClO_4$ | 0.75 | guanine | 0.15 |
| LiTFSI | 0.40 | $LiClO_4$ | 1.00 | guanine | 0.15 |
| LiTFSI | 0.50 | $LiClO_4$ | 0.10 | guanine | 0.10 |
| LiTFSI | 0.50 | $LiClO_4$ | 0.25 | guanine | 0.10 |
| LiTFSI | 0.50 | $LiClO_4$ | 0.33 | guanine | 0.10 |
| LiTFSI | 0.50 | $LiClO_4$ | 0.50 | guanine | 0.10 |
| LiTFSI | 0.50 | $LiClO_4$ | 0.66 | guanine | 0.10 |
| LiTFSI | 0.50 | $LiClO_4$ | 0.75 | guanine | 0.10 |
| LiTFSI | 0.50 | $LiClO_4$ | 1.00 | guanine | 0.10 |
| LiTFSI | 0.50 | $LiClO_4$ | 0.10 | guanine | 0.15 |
| LiTFSI | 0.50 | $LiClO_4$ | 0.25 | guanine | 0.15 |
| LiTFSI | 0.50 | $LiClO_4$ | 0.33 | guanine | 0.15 |
| LiTFSI | 0.50 | $LiClO_4$ | 0.50 | guanine | 0.15 |
| LiTFSI | 0.50 | $LiClO_4$ | 0.66 | guanine | 0.15 |
| LiTFSI | 0.50 | $LiClO_4$ | 0.75 | guanine | 0.15 |
| LiTFSI | 0.50 | $LiClO_4$ | 1.00 | guanine | 0.15 |
| LiTFSI | 0.66 | $LiClO_4$ | 0.10 | guanine | 0.10 |
| LiTFSI | 0.66 | $LiClO_4$ | 0.25 | guanine | 0.10 |
| LiTFSI | 0.66 | $LiClO_4$ | 0.33 | guanine | 0.10 |
| LiTFSI | 0.66 | $LiClO_4$ | 0.50 | guanine | 0.10 |
| LiTFSI | 0.66 | $LiClO_4$ | 0.66 | guanine | 0.10 |
| LiTFSI | 0.66 | $LiClO_4$ | 0.75 | guanine | 0.10 |
| LiTFSI | 0.66 | $LiClO_4$ | 1.00 | guanine | 0.10 |
| LiTFSI | 0.66 | $LiClO_4$ | 0.10 | guanine | 0.15 |
| LiTFSI | 0.66 | $LiClO_4$ | 0.25 | guanine | 0.15 |
| LiTFSI | 0.66 | $LiClO_4$ | 0.33 | guanine | 0.15 |
| LiTFSI | 0.66 | $LiClO_4$ | 0.50 | guanine | 0.15 |
| LiTFSI | 0.66 | $LiClO_4$ | 0.66 | guanine | 0.15 |
| LiTFSI | 0.66 | $LiClO_4$ | 0.75 | guanine | 0.15 |
| LiTFSI | 0.66 | $LiClO_4$ | 1.00 | guanine | 0.15 |
| LiTFSI | 0.75 | $LiClO_4$ | 0.10 | guanine | 0.10 |
| LiTFSI | 0.75 | $LiClO_4$ | 0.25 | guanine | 0.10 |
| LiTFSI | 0.75 | $LiClO_4$ | 0.33 | guanine | 0.10 |
| LiTFSI | 0.75 | $LiClO_4$ | 0.50 | guanine | 0.10 |
| LiTFSI | 0.75 | $LiClO_4$ | 0.66 | guanine | 0.10 |
| LiTFSI | 0.75 | $LiClO_4$ | 0.75 | guanine | 0.10 |
| LiTFSI | 0.75 | $LiClO_4$ | 1.00 | guanine | 0.10 |

TABLE 3-continued

| Exemplary Additional Components | | | | | |
|---|---|---|---|---|---|
| Li-Ion Transport Compound 1 | Conc. (mol/L) | Li-Ion Transport Compound 2 | Conc. (mol/L) | Enhancer | Conc. (mol/L) |
| LiTFSI | 0.75 | $LiClO_4$ | 0.10 | guanine | 0.15 |
| LiTFSI | 0.75 | $LiClO_4$ | 0.25 | guanine | 0.15 |
| LiTFSI | 0.75 | $LiClO_4$ | 0.33 | guanine | 0.15 |
| LiTFSI | 0.75 | $LiClO_4$ | 0.50 | guanine | 0.15 |
| LiTFSI | 0.75 | $LiClO_4$ | 0.66 | guanine | 0.15 |
| LiTFSI | 0.75 | $LiClO_4$ | 0.75 | guanine | 0.15 |
| LiTFSI | 0.75 | $LiClO_4$ | 1.00 | guanine | 0.15 |
| LiTFSI | 1.00 | $LiClO_4$ | 0.10 | guanine | 0.10 |
| LiTFSI | 1.00 | $LiClO_4$ | 0.25 | guanine | 0.10 |
| LiTFSI | 1.00 | $LiClO_4$ | 0.33 | guanine | 0.10 |
| LiTFSI | 1.00 | $LiClO_4$ | 0.50 | guanine | 0.10 |
| LiTFSI | 1.00 | $LiClO_4$ | 0.66 | guanine | 0.10 |
| LiTFSI | 1.00 | $LiClO_4$ | 0.75 | guanine | 0.10 |
| LiTFSI | 1.00 | $LiClO_4$ | 1.00 | guanine | 0.10 |
| LiTFSI | 1.00 | $LiClO_4$ | 0.10 | guanine | 0.15 |
| LiTFSI | 1.00 | $LiClO_4$ | 0.25 | guanine | 0.15 |
| LiTFSI | 1.00 | $LiClO_4$ | 0.33 | guanine | 0.15 |
| LiTFSI | 1.00 | $LiClO_4$ | 0.50 | guanine | 0.15 |
| LiTFSI | 1.00 | $LiClO_4$ | 0.66 | guanine | 0.15 |
| LiTFSI | 1.00 | $LiClO_4$ | 0.75 | guanine | 0.15 |
| LiTFSI | 1.00 | $LiClO_4$ | 1.00 | guanine | 0.15 |
| LiTFSI | 0.10 | Lithium trifluoro-acetate (LiTFAc) | 0.10 | guanidine nitrate | 0.10 |
| LiTFSI | 0.10 | LiTFAc | 0.25 | guanidine nitrate | 0.10 |
| LiTFSI | 0.10 | LiTFAc | 0.33 | guanidine nitrate | 0.10 |
| LiTFSI | 0.10 | LiTFAc | 0.50 | guanidine nitrate | 0.10 |
| LiTFSI | 0.10 | LiTFAc | 0.66 | guanidine nitrate | 0.10 |
| LiTFSI | 0.10 | LiTFAc | 0.75 | guanidine nitrate | 0.10 |
| LiTFSI | 0.10 | LiTFAc | 1.00 | guanidine nitrate | 0.10 |
| LiTFSI | 0.10 | LiTFAc | 0.10 | guanidine nitrate | 0.15 |
| LiTFSI | 0.10 | LiTFAc | 0.25 | guanidine nitrate | 0.15 |
| LiTFSI | 0.10 | LiTFAc | 0.33 | guanidine nitrate | 0.15 |
| LiTFSI | 0.10 | LiTFAc | 0.50 | guanidine nitrate | 0.15 |
| LiTFSI | 0.10 | LiTFAc | 0.66 | guanidine nitrate | 0.15 |
| LiTFSI | 0.10 | LiTFAc | 0.75 | guanidine nitrate | 0.15 |
| LiTFSI | 0.10 | LiTFAc | 1.00 | guanidine nitrate | 0.15 |
| LiTFSI | 0.25 | LiTFAc | 0.10 | guanidine nitrate | 0.10 |
| LiTFSI | 0.25 | LiTFAc | 0.25 | guanidine nitrate | 0.10 |
| LiTFSI | 0.25 | LiTFAc | 0.33 | guanidine nitrate | 0.10 |
| LiTFSI | 0.25 | LiTFAc | 0.50 | guanidine nitrate | 0.10 |
| LiTFSI | 0.25 | LiTFAc | 0.66 | guanidine nitrate | 0.10 |
| LiTFSI | 0.25 | LiTFAc | 0.75 | guanidine nitrate | 0.10 |
| LiTFSI | 0.25 | LiTFAc | 1.00 | guanidine nitrate | 0.10 |
| LiTFSI | 0.25 | LiTFAc | 0.10 | guanidine nitrate | 0.15 |
| LiTFSI | 0.25 | LiTFAc | 0.25 | guanidine nitrate | 0.15 |
| LiTFSI | 0.25 | LiTFAc | 0.33 | guanidine nitrate | 0.15 |
| LiTFSI | 0.25 | LiTFAc | 0.50 | guanidine nitrate | 0.15 |

TABLE 3-continued

| Exemplary Additional Components | | | | | |
|---|---|---|---|---|---|
| Li-Ion Transport Compound 1 | Conc. (mol/L) | Li-Ion Transport Compound 2 | Conc. (mol/L) | Enhancer | Conc. (mol/L) |
| LiTFSI | 0.25 | LiTFAc | 0.66 | guanidine nitrate | 0.15 |
| LiTFSI | 0.25 | LiTFAc | 0.75 | guanidine nitrate | 0.15 |
| LiTFSI | 0.25 | LiTFAc | 1.00 | guanidine nitrate | 0.15 |
| LiTFSI | 0.40 | LiTFAc | 0.10 | guanidine nitrate | 0.10 |
| LiTFSI | 0.40 | LiTFAc | 0.25 | guanidine nitrate | 0.10 |
| LiTFSI | 0.40 | LiTFAc | 0.33 | guanidine nitrate | 0.10 |
| LiTFSI | 0.40 | LiTFAc | 0.50 | guanidine nitrate | 0.10 |
| LiTFSI | 0.40 | LiTFAc | 0.66 | guanidine nitrate | 0.10 |
| LiTFSI | 0.40 | LiTFAc | 0.75 | guanidine nitrate | 0.10 |
| LiTFSI | 0.40 | LiTFAc | 1.00 | guanidine nitrate | 0.10 |
| LiTFSI | 0.40 | LiTFAc | 0.10 | guanidine nitrate | 0.15 |
| LiTFSI | 0.40 | LiTFAc | 0.25 | guanidine nitrate | 0.15 |
| LiTFSI | 0.40 | LiTFAc | 0.33 | guanidine nitrate | 0.15 |
| LiTFSI | 0.40 | LiTFAc | 0.50 | guanidine nitrate | 0.15 |
| LiTFSI | 0.40 | LiTFAc | 0.66 | guanidine nitrate | 0.15 |
| LiTFSI | 0.40 | LiTFAc | 0.75 | guanidine nitrate | 0.15 |
| LiTFSI | 0.40 | LiTFAc | 1.00 | guanidine nitrate | 0.15 |
| LiTFSI | 0.50 | LiTFAc | 0.10 | guanidine nitrate | 0.10 |
| LiTFSI | 0.50 | LiTFAc | 0.25 | guanidine nitrate | 0.10 |
| LiTFSI | 0.50 | LiTFAc | 0.33 | guanidine nitrate | 0.10 |
| LiTFSI | 0.50 | LiTFAc | 0.50 | guanidine nitrate | 0.10 |
| LiTFSI | 0.50 | LiTFAc | 0.66 | guanidine nitrate | 0.10 |
| LiTFSI | 0.50 | LiTFAc | 0.75 | guanidine nitrate | 0.10 |
| LiTFSI | 0.50 | LiTFAc | 1.00 | guanidine nitrate | 0.10 |
| LiTFSI | 0.50 | LiTFAc | 0.10 | guanidine nitrate | 0.15 |
| LiTFSI | 0.50 | LiTFAc | 0.25 | guanidine nitrate | 0.15 |
| LiTFSI | 0.50 | LiTFAc | 0.33 | guanidine nitrate | 0.15 |
| LiTFSI | 0.50 | LiTFAc | 0.50 | guanidine nitrate | 0.15 |
| LiTFSI | 0.50 | LiTFAc | 0.66 | guanidine nitrate | 0.15 |
| LiTFSI | 0.50 | LiTFAc | 0.75 | guanidine nitrate | 0.15 |
| LiTFSI | 0.50 | LiTFAc | 1.00 | guanidine nitrate | 0.15 |
| LiTFSI | 0.66 | LiTFAc | 0.10 | guanidine nitrate | 0.10 |
| LiTFSI | 0.66 | LiTFAc | 0.25 | guanidine nitrate | 0.10 |
| LiTFSI | 0.66 | LiTFAc | 0.33 | guanidine nitrate | 0.10 |
| LiTFSI | 0.66 | LiTFAc | 0.50 | guanidine nitrate | 0.10 |
| LiTFSI | 0.66 | LiTFAc | 0.66 | guanidine nitrate | 0.10 |
| LiTFSI | 0.66 | LiTFAc | 0.75 | guanidine nitrate | 0.10 |

TABLE 3-continued

| Exemplary Additional Components | | | | | |
|---|---|---|---|---|---|
| Li-Ion Transport Compound 1 | Conc. (mol/L) | Li-Ion Transport Compound 2 | Conc. (mol/L) | Enhancer | Conc. (mol/L) |
| LiTFSI | 0.66 | LiTFAc | 1.00 | guanidine nitrate | 0.10 |
| LiTFSI | 0.66 | LiTFAc | 0.10 | guanidine nitrate | 0.15 |
| LiTFSI | 0.66 | LiTFAc | 0.25 | guanidine nitrate | 0.15 |
| LiTFSI | 0.66 | LiTFAc | 0.33 | guanidine nitrate | 0.15 |
| LiTFSI | 0.66 | LiTFAc | 0.50 | guanidine nitrate | 0.15 |
| LiTFSI | 0.66 | LiTFAc | 0.66 | guanidine nitrate | 0.15 |
| LiTFSI | 0.66 | LiTFAc | 0.75 | guanidine nitrate | 0.15 |
| LiTFSI | 0.66 | LiTFAc | 1.00 | guanidine nitrate | 0.15 |
| LiTFSI | 0.75 | LiTFAc | 0.10 | guanidine nitrate | 0.10 |
| LiTFSI | 0.75 | LiTFAc | 0.25 | guanidine nitrate | 0.10 |
| LiTFSI | 0.75 | LiTFAc | 0.33 | guanidine nitrate | 0.10 |
| LiTFSI | 0.75 | LiTFAc | 0.50 | guanidine nitrate | 0.10 |
| LiTFSI | 0.75 | LiTFAc | 0.66 | guanidine nitrate | 0.10 |
| LiTFSI | 0.75 | LiTFAc | 0.75 | guanidine nitrate | 0.10 |
| LiTFSI | 0.75 | LiTFAc | 1.00 | guanidine nitrate | 0.10 |
| LiTFSI | 0.75 | LiTFAc | 0.10 | guanidine nitrate | 0.15 |
| LiTFSI | 0.75 | LiTFAc | 0.25 | guanidine nitrate | 0.15 |
| LiTFSI | 0.75 | LiTFAc | 0.33 | guanidine nitrate | 0.15 |
| LiTFSI | 0.75 | LiTFAc | 0.50 | guanidine nitrate | 0.15 |
| LiTFSI | 0.75 | LiTFAc | 0.66 | guanidine nitrate | 0.15 |
| LiTFSI | 0.75 | LiTFAc | 0.75 | guanidine nitrate | 0.15 |
| LiTFSI | 0.75 | LiTFAc | 1.00 | guanidine nitrate | 0.15 |
| LiTFSI | 1.00 | LiTFAc | 0.10 | guanidine nitrate | 0.10 |
| LiTFSI | 1.00 | LiTFAc | 0.25 | guanidine nitrate | 0.10 |
| LiTFSI | 1.00 | LiTFAc | 0.33 | guanidine nitrate | 0.10 |
| LiTFSI | 1.00 | LiTFAc | 0.50 | guanidine nitrate | 0.10 |
| LiTFSI | 1.00 | LiTFAc | 0.66 | guanidine nitrate | 0.10 |
| LiTFSI | 1.00 | LiTFAc | 0.75 | guanidine nitrate | 0.10 |
| LiTFSI | 1.00 | LiTFAc | 1.00 | guanidine nitrate | 0.10 |
| LiTFSI | 1.00 | LiTFAc | 0.10 | guanidine nitrate | 0.15 |
| LiTFSI | 1.00 | LiTFAc | 0.25 | guanidine nitrate | 0.15 |
| LiTFSI | 1.00 | LiTFAc | 0.33 | guanidine nitrate | 0.15 |
| LiTFSI | 1.00 | LiTFAc | 0.50 | guanidine nitrate | 0.15 |
| LiTFSI | 1.00 | LiTFAc | 0.66 | guanidine nitrate | 0.15 |
| LiTFSI | 1.00 | LiTFAc | 0.75 | guanidine nitrate | 0.15 |
| LiTFSI | 1.00 | LiTFAc | 1.00 | guanidine nitrate | 0.15 |
| lithium bis(fluoro-sulfonyl)imide (LiFSI) | 0.10 | none | 0.00 | cyanamide | 0.10 |

TABLE 3-continued

| Exemplary Additional Components | | | | | |
|---|---|---|---|---|---|
| Li-Ion Transport Compound 1 | Conc. (mol/L) | Li-Ion Transport Compound 2 | Conc. (mol/L) | Enhancer | Conc. (mol/L) |
| LiFSI | 0.25 | none | 0.00 | cyanamide | 0.10 |
| LiFSI | 0.40 | none | 0.00 | cyanamide | 0.10 |
| LiFSI | 0.50 | none | 0.00 | cyanamide | 0.10 |
| LiFSI | 0.66 | none | 0.00 | cyanamide | 0.10 |
| LiFSI | 0.75 | none | 0.00 | cyanamide | 0.10 |
| LiFSI | 1.00 | none | 0.00 | cyanamide | 0.10 |
| LiFSI | 0.10 | none | 0.00 | cyanamide | 0.15 |
| LiFSI | 0.25 | none | 0.00 | cyanamide | 0.15 |
| LiFSI | 0.40 | none | 0.00 | cyanamide | 0.15 |
| LiFSI | 0.50 | none | 0.00 | cyanamide | 0.15 |
| LiFSI | 0.66 | none | 0.00 | cyanamide | 0.15 |
| LiFSI | 0.75 | none | 0.00 | cyanamide | 0.15 |
| LiFSI | 1.00 | none | 0.00 | cyanamide | 0.15 |
| LiFSI | 0.10 | lithium nitrate ($LiNO_3$) | 0.10 | cyanamide | 0.10 |
| LiFSI | 0.10 | $LiNO_3$ | 0.25 | cyanamide | 0.10 |
| LiFSI | 0.10 | $LiNO_3$ | 0.33 | cyanamide | 0.10 |
| LiFSI | 0.10 | $LiNO_3$ | 0.50 | cyanamide | 0.10 |
| LiFSI | 0.10 | $LiNO_3$ | 0.66 | cyanamide | 0.10 |
| LiFSI | 0.10 | $LiNO_3$ | 0.75 | cyanamide | 0.10 |
| LiFSI | 0.10 | $LiNO_3$ | 1.00 | cyanamide | 0.10 |
| LiFSI | 0.10 | $LiNO_3$ | 0.10 | cyanamide | 0.15 |
| LiFSI | 0.10 | $LiNO_3$ | 0.25 | cyanamide | 0.15 |
| LiFSI | 0.10 | $LiNO_3$ | 0.33 | cyanamide | 0.15 |
| LiFSI | 0.10 | $LiNO_3$ | 0.50 | cyanamide | 0.15 |
| LiFSI | 0.10 | $LiNO_3$ | 0.66 | cyanamide | 0.15 |
| LiFSI | 0.10 | $LiNO_3$ | 0.75 | cyanamide | 0.15 |
| LiFSI | 0.10 | $LiNO_3$ | 1.00 | cyanamide | 0.15 |
| LiFSI | 0.25 | $LiNO_3$ | 0.10 | cyanamide | 0.10 |
| LiFSI | 0.25 | $LiNO_3$ | 0.25 | cyanamide | 0.10 |
| LiFSI | 0.25 | $LiNO_3$ | 0.33 | cyanamide | 0.10 |
| LiFSI | 0.25 | $LiNO_3$ | 0.50 | cyanamide | 0.10 |
| LiFSI | 0.25 | $LiNO_3$ | 0.66 | cyanamide | 0.10 |
| LiFSI | 0.25 | $LiNO_3$ | 0.75 | cyanamide | 0.10 |
| LiFSI | 0.25 | $LiNO_3$ | 1.00 | cyanamide | 0.10 |
| LiFSI | 0.25 | $LiNO_3$ | 0.10 | cyanamide | 0.15 |
| LiFSI | 0.25 | $LiNO_3$ | 0.25 | cyanamide | 0.15 |
| LiFSI | 0.25 | $LiNO_3$ | 0.33 | cyanamide | 0.15 |
| LiFSI | 0.25 | $LiNO_3$ | 0.50 | cyanamide | 0.15 |
| LiFSI | 0.25 | $LiNO_3$ | 0.66 | cyanamide | 0.15 |
| LiFSI | 0.25 | $LiNO_3$ | 0.75 | cyanamide | 0.15 |
| LiFSI | 0.25 | $LiNO_3$ | 1.00 | cyanamide | 0.15 |
| LiFSI | 0.40 | $LiNO_3$ | 0.10 | cyanamide | 0.10 |
| LiFSI | 0.40 | $LiNO_3$ | 0.25 | cyanamide | 0.10 |
| LiFSI | 0.40 | $LiNO_3$ | 0.33 | cyanamide | 0.10 |
| LiFSI | 0.40 | $LiNO_3$ | 0.50 | cyanamide | 0.10 |
| LiFSI | 0.40 | $LiNO_3$ | 0.66 | cyanamide | 0.10 |
| LiFSI | 0.40 | $LiNO_3$ | 0.75 | cyanamide | 0.10 |
| LiFSI | 0.40 | $LiNO_3$ | 1.00 | cyanamide | 0.10 |
| LiFSI | 0.40 | $LiNO_3$ | 0.10 | cyanamide | 0.15 |
| LiFSI | 0.40 | $LiNO_3$ | 0.25 | cyanamide | 0.15 |
| LiFSI | 0.40 | $LiNO_3$ | 0.33 | cyanamide | 0.15 |
| LiFSI | 0.40 | $LiNO_3$ | 0.50 | cyanamide | 0.15 |
| LiFSI | 0.40 | $LiNO_3$ | 0.66 | cyanamide | 0.15 |
| LiFSI | 0.40 | $LiNO_3$ | 0.75 | cyanamide | 0.15 |
| LiFSI | 0.40 | $LiNO_3$ | 1.00 | cyanamide | 0.15 |
| LiFSI | 0.50 | $LiNO_3$ | 0.10 | cyanamide | 0.10 |
| LiFSI | 0.50 | $LiNO_3$ | 0.25 | cyanamide | 0.10 |
| LiFSI | 0.50 | $LiNO_3$ | 0.33 | cyanamide | 0.10 |
| LiFSI | 0.50 | $LiNO_3$ | 0.50 | cyanamide | 0.10 |
| LiFSI | 0.50 | $LiNO_3$ | 0.66 | cyanamide | 0.10 |
| LiFSI | 0.50 | $LiNO_3$ | 0.75 | cyanamide | 0.10 |
| LiFSI | 0.50 | $LiNO_3$ | 1.00 | cyanamide | 0.10 |
| LiFSI | 0.50 | $LiNO_3$ | 0.10 | cyanamide | 0.15 |
| LiFSI | 0.50 | $LiNO_3$ | 0.25 | cyanamide | 0.15 |
| LiFSI | 0.50 | $LiNO_3$ | 0.33 | cyanamide | 0.15 |
| LiFSI | 0.50 | $LiNO_3$ | 0.50 | cyanamide | 0.15 |
| LiFSI | 0.50 | $LiNO_3$ | 0.66 | cyanamide | 0.15 |
| LiFSI | 0.50 | $LiNO_3$ | 0.75 | cyanamide | 0.15 |

TABLE 3-continued

| Exemplary Additional Components | | | | | |
|---|---|---|---|---|---|
| Li-Ion Transport Compound 1 | Conc. (mol/L) | Li-Ion Transport Compound 2 | Conc. (mol/L) | Enhancer | Conc. (mol/L) |
| LiFSI | 0.50 | $LiNO_3$ | 1.00 | cyanamide | 0.15 |
| LiFSI | 0.66 | $LiNO_3$ | 0.10 | cyanamide | 0.10 |
| LiFSI | 0.66 | $LiNO_3$ | 0.25 | cyanamide | 0.10 |
| LiFSI | 0.66 | $LiNO_3$ | 0.33 | cyanamide | 0.10 |
| LiFSI | 0.66 | $LiNO_3$ | 0.50 | cyanamide | 0.10 |
| LiFSI | 0.66 | $LiNO_3$ | 0.66 | cyanamide | 0.10 |
| LiFSI | 0.66 | $LiNO_3$ | 0.75 | cyanamide | 0.10 |
| LiFSI | 0.66 | $LiNO_3$ | 1.00 | cyanamide | 0.10 |
| LiFSI | 0.66 | $LiNO_3$ | 0.10 | cyanamide | 0.15 |
| LiFSI | 0.66 | $LiNO_3$ | 0.25 | cyanamide | 0.15 |
| LiFSI | 0.66 | $LiNO_3$ | 0.33 | cyanamide | 0.15 |
| LiFSI | 0.66 | $LiNO_3$ | 0.50 | cyanamide | 0.15 |
| LiFSI | 0.66 | $LiNO_3$ | 0.66 | cyanamide | 0.15 |
| LiFSI | 0.66 | $LiNO_3$ | 0.75 | cyanamide | 0.15 |
| LiFSI | 0.66 | $LiNO_3$ | 1.00 | cyanamide | 0.15 |
| LiFSI | 0.75 | $LiNO_3$ | 0.10 | cyanamide | 0.10 |
| LiFSI | 0.75 | $LiNO_3$ | 0.25 | cyanamide | 0.10 |
| LiFSI | 0.75 | $LiNO_3$ | 0.33 | cyanamide | 0.10 |
| LiFSI | 0.75 | $LiNO_3$ | 0.50 | cyanamide | 0.10 |
| LiFSI | 0.75 | $LiNO_3$ | 0.66 | cyanamide | 0.10 |
| LiFSI | 0.75 | $LiNO_3$ | 0.75 | cyanamide | 0.10 |
| LiFSI | 0.75 | $LiNO_3$ | 1.00 | cyanamide | 0.10 |
| LiFSI | 0.75 | $LiNO_3$ | 0.10 | cyanamide | 0.15 |
| LiFSI | 0.75 | $LiNO_3$ | 0.25 | cyanamide | 0.15 |
| LiFSI | 0.75 | $LiNO_3$ | 0.33 | cyanamide | 0.15 |
| LiFSI | 0.75 | $LiNO_3$ | 0.50 | cyanamide | 0.15 |
| LiFSI | 0.75 | $LiNO_3$ | 0.66 | cyanamide | 0.15 |
| LiFSI | 0.75 | $LiNO_3$ | 0.75 | cyanamide | 0.15 |
| LiFSI | 0.75 | $LiNO_3$ | 1.00 | cyanamide | 0.15 |
| LiFSI | 1.00 | $LiNO_3$ | 0.10 | cyanamide | 0.10 |
| LiFSI | 1.00 | $LiNO_3$ | 0.25 | cyanamide | 0.10 |
| LiFSI | 1.00 | $LiNO_3$ | 0.33 | cyanamide | 0.10 |
| LiFSI | 1.00 | $LiNO_3$ | 0.50 | cyanamide | 0.10 |
| LiFSI | 1.00 | $LiNO_3$ | 0.66 | cyanamide | 0.10 |
| LiFSI | 1.00 | $LiNO_3$ | 0.75 | cyanamide | 0.10 |
| LiFSI | 1.00 | $LiNO_3$ | 1.00 | cyanamide | 0.10 |
| LiFSI | 1.00 | $LiNO_3$ | 0.10 | cyanamide | 0.15 |
| LiFSI | 1.00 | $LiNO_3$ | 0.25 | cyanamide | 0.15 |
| LiFSI | 1.00 | $LiNO_3$ | 0.33 | cyanamide | 0.15 |
| LiFSI | 1.00 | $LiNO_3$ | 0.50 | cyanamide | 0.15 |
| LiFSI | 1.00 | $LiNO_3$ | 0.66 | cyanamide | 0.15 |
| LiFSI | 1.00 | $LiNO_3$ | 0.75 | cyanamide | 0.15 |
| LiFSI | 1.00 | $LiNO_3$ | 1.00 | cyanamide | 0.15 |
| LiFSI | 0.10 | $LiClO_4$ | 0.10 | cyanamide | 0.10 |
| LiFSI | 0.10 | $LiClO_4$ | 0.25 | cyanamide | 0.10 |
| LiFSI | 0.10 | $LiClO_4$ | 0.33 | cyanamide | 0.10 |
| LiFSI | 0.10 | $LiClO_4$ | 0.50 | cyanamide | 0.10 |
| LiFSI | 0.10 | $LiClO_4$ | 0.66 | cyanamide | 0.10 |
| LiFSI | 0.10 | $LiClO_4$ | 0.75 | cyanamide | 0.10 |
| LiFSI | 0.10 | $LiClO_4$ | 1.00 | cyanamide | 0.10 |
| LiFSI | 0.10 | $LiClO_4$ | 0.10 | cyanamide | 0.15 |
| LiFSI | 0.10 | $LiClO_4$ | 0.25 | cyanamide | 0.15 |
| LiFSI | 0.10 | $LiClO_4$ | 0.33 | cyanamide | 0.15 |
| LiFSI | 0.10 | $LiClO_4$ | 0.50 | cyanamide | 0.15 |
| LiFSI | 0.10 | $LiClO_4$ | 0.66 | cyanamide | 0.15 |
| LiFSI | 0.10 | $LiClO_4$ | 0.75 | cyanamide | 0.15 |
| LiFSI | 0.10 | $LiClO_4$ | 1.00 | cyanamide | 0.15 |
| LiFSI | 0.25 | $LiClO_4$ | 0.10 | cyanamide | 0.10 |
| LiFSI | 0.25 | $LiClO_4$ | 0.25 | cyanamide | 0.10 |
| LiFSI | 0.25 | $LiClO_4$ | 0.33 | cyanamide | 0.10 |
| LiFSI | 0.25 | $LiClO_4$ | 0.50 | cyanamide | 0.10 |
| LiFSI | 0.25 | $LiClO_4$ | 0.66 | cyanamide | 0.10 |
| LiFSI | 0.25 | $LiClO_4$ | 0.75 | cyanamide | 0.10 |
| LiFSI | 0.25 | $LiClO_4$ | 1.00 | cyanamide | 0.10 |
| LiFSI | 0.25 | $LiClO_4$ | 0.10 | cyanamide | 0.15 |
| LiFSI | 0.25 | $LiClO_4$ | 0.25 | cyanamide | 0.15 |
| LiFSI | 0.25 | $LiClO_4$ | 0.33 | cyanamide | 0.15 |
| LiFSI | 0.25 | $LiClO_4$ | 0.50 | cyanamide | 0.15 |
| LiFSI | 0.25 | $LiClO_4$ | 0.66 | cyanamide | 0.15 |
| LiFSI | 0.25 | $LiClO_4$ | 0.75 | cyanamide | 0.15 |
| LiFSI | 0.25 | $LiClO_4$ | 1.00 | cyanamide | 0.15 |
| LiFSI | 0.40 | $LiClO_4$ | 0.10 | cyanamide | 0.10 |
| LiFSI | 0.40 | $LiClO_4$ | 0.25 | cyanamide | 0.10 |
| LiFSI | 0.40 | $LiClO_4$ | 0.33 | cyanamide | 0.10 |
| LiFSI | 0.40 | $LiClO_4$ | 0.50 | cyanamide | 0.10 |
| LiFSI | 0.40 | $LiClO_4$ | 0.66 | cyanamide | 0.10 |
| LiFSI | 0.40 | $LiClO_4$ | 0.75 | cyanamide | 0.10 |
| LiFSI | 0.40 | $LiClO_4$ | 1.00 | cyanamide | 0.10 |
| LiFSI | 0.40 | $LiClO_4$ | 0.10 | cyanamide | 0.15 |
| LiFSI | 0.40 | $LiClO_4$ | 0.25 | cyanamide | 0.15 |
| LiFSI | 0.40 | $LiClO_4$ | 0.33 | cyanamide | 0.15 |
| LiFSI | 0.40 | $LiClO_4$ | 0.50 | cyanamide | 0.15 |
| LiFSI | 0.40 | $LiClO_4$ | 0.66 | cyanamide | 0.15 |
| LiFSI | 0.40 | $LiClO_4$ | 0.75 | cyanamide | 0.15 |
| LiFSI | 0.40 | $LiClO_4$ | 1.00 | cyanamide | 0.15 |
| LiFSI | 0.50 | $LiClO_4$ | 0.10 | cyanamide | 0.10 |
| LiFSI | 0.50 | $LiClO_4$ | 0.25 | cyanamide | 0.10 |
| LiFSI | 0.50 | $LiClO_4$ | 0.33 | cyanamide | 0.10 |
| LiFSI | 0.50 | $LiClO_4$ | 0.50 | cyanamide | 0.10 |
| LiFSI | 0.50 | $LiClO_4$ | 0.66 | cyanamide | 0.10 |
| LiFSI | 0.50 | $LiClO_4$ | 0.75 | cyanamide | 0.10 |
| LiFSI | 0.50 | $LiClO_4$ | 1.00 | cyanamide | 0.10 |
| LiFSI | 0.50 | $LiClO_4$ | 0.10 | cyanamide | 0.15 |
| LiFSI | 0.50 | $LiClO_4$ | 0.25 | cyanamide | 0.15 |
| LiFSI | 0.50 | $LiClO_4$ | 0.33 | cyanamide | 0.15 |
| LiFSI | 0.50 | $LiClO_4$ | 0.50 | cyanamide | 0.15 |
| LiFSI | 0.50 | $LiClO_4$ | 0.66 | cyanamide | 0.15 |
| LiFSI | 0.50 | $LiClO_4$ | 0.75 | cyanamide | 0.15 |
| LiFSI | 0.50 | $LiClO_4$ | 1.00 | cyanamide | 0.15 |
| LiFSI | 0.66 | $LiClO_4$ | 0.10 | cyanamide | 0.10 |
| LiFSI | 0.66 | $LiClO_4$ | 0.25 | cyanamide | 0.10 |
| LiFSI | 0.66 | $LiClO_4$ | 0.33 | cyanamide | 0.10 |
| LiFSI | 0.66 | $LiClO_4$ | 0.50 | cyanamide | 0.10 |
| LiFSI | 0.66 | $LiClO_4$ | 0.66 | cyanamide | 0.10 |
| LiFSI | 0.66 | $LiClO_4$ | 0.75 | cyanamide | 0.10 |
| LiFSI | 0.66 | $LiClO_4$ | 1.00 | cyanamide | 0.10 |
| LiFSI | 0.66 | $LiClO_4$ | 0.10 | cyanamide | 0.15 |
| LiFSI | 0.66 | $LiClO_4$ | 0.25 | cyanamide | 0.15 |
| LiFSI | 0.66 | $LiClO_4$ | 0.33 | cyanamide | 0.15 |
| LiFSI | 0.66 | $LiClO_4$ | 0.50 | cyanamide | 0.15 |
| LiFSI | 0.66 | $LiClO_4$ | 0.66 | cyanamide | 0.15 |
| LiFSI | 0.66 | $LiClO_4$ | 0.75 | cyanamide | 0.15 |
| LiFSI | 0.66 | $LiClO_4$ | 1.00 | cyanamide | 0.15 |
| LiFSI | 0.75 | $LiClO_4$ | 0.10 | cyanamide | 0.10 |
| LiFSI | 0.75 | $LiClO_4$ | 0.25 | cyanamide | 0.10 |
| LiFSI | 0.75 | $LiClO_4$ | 0.33 | cyanamide | 0.10 |
| LiFSI | 0.75 | $LiClO_4$ | 0.50 | cyanamide | 0.10 |
| LiFSI | 0.75 | $LiClO_4$ | 0.66 | cyanamide | 0.10 |
| LiFSI | 0.75 | $LiClO_4$ | 0.75 | cyanamide | 0.10 |
| LiFSI | 0.75 | $LiClO_4$ | 1.00 | cyanamide | 0.10 |
| LiFSI | 0.75 | $LiClO_4$ | 0.10 | cyanamide | 0.15 |
| LiFSI | 0.75 | $LiClO_4$ | 0.25 | cyanamide | 0.15 |
| LiFSI | 0.75 | $LiClO_4$ | 0.33 | cyanamide | 0.15 |
| LiFSI | 0.75 | $LiClO_4$ | 0.50 | cyanamide | 0.15 |
| LiFSI | 0.75 | $LiClO_4$ | 0.66 | cyanamide | 0.15 |
| LiFSI | 0.75 | $LiClO_4$ | 0.75 | cyanamide | 0.15 |
| LiFSI | 0.75 | $LiClO_4$ | 1.00 | cyanamide | 0.15 |
| LiFSI | 1.00 | $LiClO_4$ | 0.10 | cyanamide | 0.10 |
| LiFSI | 1.00 | $LiClO_4$ | 0.25 | cyanamide | 0.10 |
| LiFSI | 1.00 | $LiClO_4$ | 0.33 | cyanamide | 0.10 |
| LiFSI | 1.00 | $LiClO_4$ | 0.50 | cyanamide | 0.10 |
| LiFSI | 1.00 | $LiClO_4$ | 0.66 | cyanamide | 0.10 |
| LiFSI | 1.00 | $LiClO_4$ | 0.75 | cyanamide | 0.10 |
| LiFSI | 1.00 | $LiClO_4$ | 1.00 | cyanamide | 0.10 |
| LiFSI | 1.00 | $LiClO_4$ | 0.10 | cyanamide | 0.15 |
| LiFSI | 1.00 | $LiClO_4$ | 0.25 | cyanamide | 0.15 |
| LiFSI | 1.00 | $LiClO_4$ | 0.33 | cyanamide | 0.15 |
| LiFSI | 1.00 | $LiClO_4$ | 0.50 | cyanamide | 0.15 |
| LiFSI | 1.00 | $LiClO_4$ | 0.66 | cyanamide | 0.15 |
| LiFSI | 1.00 | $LiClO_4$ | 0.75 | cyanamide | 0.15 |
| LiFSI | 1.00 | $LiClO_4$ | 1.00 | cyanamide | 0.15 |
| LiFSI | 0.10 | Lithium trifluoro-acetate (LiTFAc) | 0.10 | lithium dicyanamide | 0.10 |
| LiFSI | 0.10 | LiTFAc | 0.25 | lithium dicyanamide | 0.10 |

TABLE 3-continued

| Exemplary Additional Components | | | | | |
|---|---|---|---|---|---|
| Li-Ion Transport Compound 1 | Conc. (mol/L) | Li-Ion Transport Compound 2 | Conc. (mol/L) | Enhancer | Conc. (mol/L) |
| LiFSI | 0.10 | LiTFAc | 0.33 | lithium dicyanamide | 0.10 |
| LiFSI | 0.10 | LiTFAc | 0.50 | lithium dicyanamide | 0.10 |
| LiFSI | 0.10 | LiTFAc | 0.66 | lithium dicyanamide | 0.10 |
| LiFSI | 0.10 | LiTFAc | 0.75 | lithium dicyanamide | 0.10 |
| LiFSI | 0.10 | LiTFAc | 1.00 | lithium dicyanamide | 0.10 |
| LiFSI | 0.10 | LiTFAc | 0.10 | lithium dicyanamide | 0.15 |
| LiFSI | 0.10 | LiTFAc | 0.25 | lithium dicyanamide | 0.15 |
| LiFSI | 0.10 | LiTFAc | 0.33 | lithium dicyanamide | 0.15 |
| LiFSI | 0.10 | LiTFAc | 0.50 | lithium dicyanamide | 0.15 |
| LiFSI | 0.10 | LiTFAc | 0.66 | lithium dicyanamide | 0.15 |
| LiFSI | 0.10 | LiTFAc | 0.75 | lithium dicyanamide | 0.15 |
| LiFSI | 0.10 | LiTFAc | 1.00 | lithium dicyanamide | 0.15 |
| LiFSI | 0.25 | LiTFAc | 0.10 | lithium dicyanamide | 0.10 |
| LiFSI | 0.25 | LiTFAc | 0.25 | lithium dicyanamide | 0.10 |
| LiFSI | 0.25 | LiTFAc | 0.33 | lithium dicyanamide | 0.10 |
| LiFSI | 0.25 | LiTFAc | 0.50 | lithium dicyanamide | 0.10 |
| LiFSI | 0.25 | LiTFAc | 0.66 | lithium dicyanamide | 0.10 |
| LiFSI | 0.25 | LiTFAc | 0.75 | lithium dicyanamide | 0.10 |
| LiFSI | 0.25 | LiTFAc | 1.00 | lithium dicyanamide | 0.10 |
| LiFSI | 0.25 | LiTFAc | 0.10 | lithium dicyanamide | 0.15 |
| LiFSI | 0.25 | LiTFAc | 0.25 | lithium dicyanamide | 0.15 |
| LiFSI | 0.25 | LiTFAc | 0.33 | lithium dicyanamide | 0.15 |
| LiFSI | 0.25 | LiTFAc | 0.50 | lithium dicyanamide | 0.15 |
| LiFSI | 0.25 | LiTFAc | 0.66 | lithium dicyanamide | 0.15 |
| LiFSI | 0.25 | LiTFAc | 0.75 | lithium dicyanamide | 0.15 |
| LiFSI | 0.25 | LiTFAc | 1.00 | lithium dicyanamide | 0.15 |
| LiFSI | 0.40 | LiTFAc | 0.10 | lithium dicyanamide | 0.10 |
| LiFSI | 0.40 | LiTFAc | 0.25 | lithium dicyanamide | 0.10 |
| LiFSI | 0.40 | LiTFAc | 0.33 | lithium dicyanamide | 0.10 |
| LiFSI | 0.40 | LiTFAc | 0.50 | lithium dicyanamide | 0.10 |
| LiFSI | 0.40 | LiTFAc | 0.66 | lithium dicyanamide | 0.10 |
| LiFSI | 0.40 | LiTFAc | 0.75 | lithium dicyanamide | 0.10 |
| LiFSI | 0.40 | LiTFAc | 1.00 | lithium dicyanamide | 0.10 |
| LiFSI | 0.40 | LiTFAc | 0.10 | lithium dicyanamide | 0.15 |
| LiFSI | 0.40 | LiTFAc | 0.25 | lithium dicyanamide | 0.15 |
| LiFSI | 0.40 | LiTFAc | 0.33 | lithium dicyanamide | 0.15 |
| LiFSI | 0.40 | LiTFAc | 0.50 | lithium dicyanamide | 0.15 |

TABLE 3-continued

| Exemplary Additional Components | | | | | |
|---|---|---|---|---|---|
| Li-Ion Transport Compound 1 | Conc. (mol/L) | Li-Ion Transport Compound 2 | Conc. (mol/L) | Enhancer | Conc. (mol/L) |
| LiFSI | 0.40 | LiTFAc | 0.66 | lithium dicyanamide | 0.15 |
| LiFSI | 0.40 | LiTFAc | 0.75 | lithium dicyanamide | 0.15 |
| LiFSI | 0.40 | LiTFAc | 1.00 | lithium dicyanamide | 0.15 |
| LiFSI | 0.50 | LiTFAc | 0.10 | lithium dicyanamide | 0.10 |
| LiFSI | 0.50 | LiTFAc | 0.25 | lithium dicyanamide | 0.10 |
| LiFSI | 0.50 | LiTFAc | 0.33 | lithium dicyanamide | 0.10 |
| LiFSI | 0.50 | LiTFAc | 0.50 | lithium dicyanamide | 0.10 |
| LiFSI | 0.50 | LiTFAc | 0.66 | lithium dicyanamide | 0.10 |
| LiFSI | 0.50 | LiTFAc | 0.75 | lithium dicyanamide | 0.10 |
| LiFSI | 0.50 | LiTFAc | 1.00 | lithium dicyanamide | 0.10 |
| LiFSI | 0.50 | LiTFAc | 0.10 | lithium dicyanamide | 0.15 |
| LiFSI | 0.50 | LiTFAc | 0.25 | lithium dicyanamide | 0.15 |
| LiFSI | 0.50 | LiTFAc | 0.33 | lithium dicyanamide | 0.15 |
| LiFSI | 0.50 | LiTFAc | 0.50 | lithium dicyanamide | 0.15 |
| LiFSI | 0.50 | LiTFAc | 0.66 | lithium dicyanamide | 0.15 |
| LiFSI | 0.50 | LiTFAc | 0.75 | lithium dicyanamide | 0.15 |
| LiFSI | 0.50 | LiTFAc | 1.00 | lithium dicyanamide | 0.15 |
| LiFSI | 0.66 | LiTFAc | 0.10 | lithium dicyanamide | 0.10 |
| LiFSI | 0.66 | LiTFAc | 0.25 | lithium dicyanamide | 0.10 |
| LiFSI | 0.66 | LiTFAc | 0.33 | lithium dicyanamide | 0.10 |
| LiFSI | 0.66 | LiTFAc | 0.50 | lithium dicyanamide | 0.10 |
| LiFSI | 0.66 | LiTFAc | 0.66 | lithium dicyanamide | 0.10 |
| LiFSI | 0.66 | LiTFAc | 0.75 | lithium dicyanamide | 0.10 |
| LiFSI | 0.66 | LiTFAc | 1.00 | lithium dicyanamide | 0.10 |
| LiFSI | 0.66 | LiTFAc | 0.10 | lithium dicyanamide | 0.15 |
| LiFSI | 0.66 | LiTFAc | 0.25 | lithium dicyanamide | 0.15 |
| LiFSI | 0.66 | LiTFAc | 0.33 | lithium dicyanamide | 0.15 |
| LiFSI | 0.66 | LiTFAc | 0.50 | lithium dicyanamide | 0.15 |
| LiFSI | 0.66 | LiTFAc | 0.66 | lithium dicyanamide | 0.15 |
| LiFSI | 0.66 | LiTFAc | 0.75 | lithium dicyanamide | 0.15 |
| LiFSI | 0.66 | LiTFAc | 1.00 | lithium dicyanamide | 0.15 |
| LiFSI | 0.75 | LiTFAc | 0.10 | lithium dicyanamide | 0.10 |
| LiFSI | 0.75 | LiTFAc | 0.25 | lithium dicyanamide | 0.10 |
| LiFSI | 0.75 | LiTFAc | 0.33 | lithium dicyanamide | 0.10 |
| LiFSI | 0.75 | LiTFAc | 0.50 | lithium dicyanamide | 0.10 |
| LiFSI | 0.75 | LiTFAc | 0.66 | lithium dicyanamide | 0.10 |
| LiFSI | 0.75 | LiTFAc | 0.75 | lithium dicyanamide | 0.10 |

TABLE 3-continued

| Exemplary Additional Components | | | | | |
|---|---|---|---|---|---|
| Li-Ion Transport Compound 1 | Conc. (mol/L) | Li-Ion Transport Compound 2 | Conc. (mol/L) | Enhancer | Conc. (mol/L) |
| LiFSI | 0.75 | LiTFAc | 1.00 | lithium dicyanamide | 0.10 |
| LiFSI | 0.75 | LiTFAc | 0.10 | lithium dicyanamide | 0.15 |
| LiFSI | 0.75 | LiTFAc | 0.25 | lithium dicyanamide | 0.15 |
| LiFSI | 0.75 | LiTFAc | 0.33 | lithium dicyanamide | 0.15 |
| LiFSI | 0.75 | LiTFAc | 0.50 | lithium dicyanamide | 0.15 |
| LiFSI | 0.75 | LiTFAc | 0.66 | lithium dicyanamide | 0.15 |
| LiFSI | 0.75 | LiTFAc | 0.75 | lithium dicyanamide | 0.15 |
| LiFSI | 0.75 | LiTFAc | 1.00 | lithium dicyanamide | 0.15 |
| LiFSI | 1.00 | LiTFAc | 0.10 | lithium dicyanamide | 0.10 |
| LiFSI | 1.00 | LiTFAc | 0.25 | lithium dicyanamide | 0.10 |
| LiFSI | 1.00 | LiTFAc | 0.33 | lithium dicyanamide | 0.10 |
| LiFSI | 1.00 | LiTFAc | 0.50 | lithium dicyanamide | 0.10 |
| LiFSI | 1.00 | LiTFAc | 0.66 | lithium dicyanamide | 0.10 |
| LiFSI | 1.00 | LiTFAc | 0.75 | lithium dicyanamide | 0.10 |
| LiFSI | 1.00 | LiTFAc | 1.00 | lithium dicyanamide | 0.10 |
| LiFSI | 1.00 | LiTFAc | 0.10 | lithium dicyanamide | 0.15 |
| LiFSI | 1.00 | LiTFAc | 0.25 | lithium dicyanamide | 0.15 |
| LiFSI | 1.00 | LiTFAc | 0.33 | lithium dicyanamide | 0.15 |
| LiFSI | 1.00 | LiTFAc | 0.50 | lithium dicyanamide | 0.15 |
| LiFSI | 1.00 | LiTFAc | 0.66 | lithium dicyanamide | 0.15 |
| LiFSI | 1.00 | LiTFAc | 0.75 | lithium dicyanamide | 0.15 |
| LiFSI | 1.00 | LiTFAc | 1.00 | lithium dicyanamide | 0.15 |
| LiTFAc | 0.10 | none | 0.00 | lithium dicyanamide | 0.10 |
| LiTFAc | 0.25 | none | 0.00 | lithium dicyanamide | 0.10 |
| LiTFAc | 0.40 | none | 0.00 | lithium dicyanamide | 0.10 |
| LiTFAc | 0.50 | none | 0.00 | lithium dicyanamide | 0.10 |
| LiTFAc | 0.66 | none | 0.00 | lithium dicyanamide | 0.10 |
| LiTFAc | 0.75 | none | 0.00 | lithium dicyanamide | 0.10 |
| LiTFAc | 1.00 | none | 0.00 | lithium dicyanamide | 0.10 |
| LiTFAc | 0.10 | none | 0.00 | lithium dicyanamide | 0.15 |
| LiTFAc | 0.25 | none | 0.00 | lithium dicyanamide | 0.15 |
| LiTFAc | 0.40 | none | 0.00 | lithium dicyanamide | 0.15 |
| LiTFAc | 0.50 | none | 0.00 | lithium dicyanamide | 0.15 |
| LiTFAc | 0.66 | none | 0.00 | lithium dicyanamide | 0.15 |
| LiTFAc | 0.75 | none | 0.00 | lithium dicyanamide | 0.15 |
| LiTFAc | 1.00 | none | 0.00 | lithium dicyanamide | 0.15 |

TABLE 3-continued

| Exemplary Additional Components | | | | | |
|---|---|---|---|---|---|
| Li-Ion Transport Compound 1 | Conc. (mol/L) | Li-Ion Transport Compound 2 | Conc. (mol/L) | Enhancer | Conc. (mol/L) |
| LiTFAc | 0.10 | Lithium nitrate ($LiNO_3$) | 0.10 | lithium dicyanamide | 0.10 |
| LiTFAc | 0.10 | $LiNO_3$ | 0.25 | lithium dicyanamide | 0.10 |
| LiTFAc | 0.10 | $LiNO_3$ | 0.33 | lithium dicyanamide | 0.10 |
| LiTFAc | 0.10 | $LiNO_3$ | 0.50 | lithium dicyanamide | 0.10 |
| LiTFAc | 0.10 | $LiNO_3$ | 0.66 | lithium dicyanamide | 0.10 |
| LiTFAc | 0.10 | $LiNO_3$ | 0.75 | lithium dicyanamide | 0.10 |
| LiTFAc | 0.10 | $LiNO_3$ | 1.00 | lithium dicyanamide | 0.10 |
| LiTFAc | 0.10 | $LiNO_3$ | 0.10 | lithium dicyanamide | 0.15 |
| LiTFAc | 0.10 | $LiNO_3$ | 0.25 | lithium dicyanamide | 0.15 |
| LiTFAc | 0.10 | $LiNO_3$ | 0.33 | lithium dicyanamide | 0.15 |
| LiTFAc | 0.10 | $LiNO_3$ | 0.50 | lithium dicyanamide | 0.15 |
| LiTFAc | 0.10 | $LiNO_3$ | 0.66 | lithium dicyanamide | 0.15 |
| LiTFAc | 0.10 | $LiNO_3$ | 0.75 | lithium dicyanamide | 0.15 |
| LiTFAc | 0.10 | $LiNO_3$ | 1.00 | lithium dicyanamide | 0.15 |
| LiTFAc | 0.25 | $LiNO_3$ | 0.10 | lithium dicyanamide | 0.10 |
| LiTFAc | 0.25 | $LiNO_3$ | 0.25 | lithium dicyanamide | 0.10 |
| LiTFAc | 0.25 | $LiNO_3$ | 0.33 | lithium dicyanamide | 0.10 |
| LiTFAc | 0.25 | $LiNO_3$ | 0.50 | lithium dicyanamide | 0.10 |
| LiTFAc | 0.25 | $LiNO_3$ | 0.66 | lithium dicyanamide | 0.10 |
| LiTFAc | 0.25 | $LiNO_3$ | 0.75 | lithium dicyanamide | 0.10 |
| LiTFAc | 0.25 | $LiNO_3$ | 1.00 | lithium dicyanamide | 0.10 |
| LiTFAc | 0.25 | $LiNO_3$ | 0.10 | lithium dicyanamide | 0.15 |
| LiTFAc | 0.25 | $LiNO_3$ | 0.25 | lithium dicyanamide | 0.15 |
| LiTFAc | 0.25 | $LiNO_3$ | 0.33 | lithium dicyanamide | 0.15 |
| LiTFAc | 0.25 | $LiNO_3$ | 0.50 | lithium dicyanamide | 0.15 |
| LiTFAc | 0.25 | $LiNO_3$ | 0.66 | lithium dicyanamide | 0.15 |
| LiTFAc | 0.25 | $LiNO_3$ | 0.75 | lithium dicyanamide | 0.15 |
| LiTFAc | 0.25 | $LiNO_3$ | 1.00 | lithium dicyanamide | 0.15 |
| LiTFAc | 0.40 | $LiNO_3$ | 0.10 | lithium dicyanamide | 0.10 |
| LiTFAc | 0.40 | $LiNO_3$ | 0.25 | lithium dicyanamide | 0.10 |
| LiTFAc | 0.40 | $LiNO_3$ | 0.33 | lithium dicyanamide | 0.10 |
| LiTFAc | 0.40 | $LiNO_3$ | 0.50 | lithium dicyanamide | 0.10 |
| LiTFAc | 0.40 | $LiNO_3$ | 0.66 | lithium dicyanamide | 0.10 |
| LiTFAc | 0.40 | $LiNO_3$ | 0.75 | lithium dicyanamide | 0.10 |
| LiTFAc | 0.40 | $LiNO_3$ | 1.00 | lithium dicyanamide | 0.10 |
| LiTFAc | 0.40 | $LiNO_3$ | 0.10 | lithium dicyanamide | 0.15 |

TABLE 3-continued

| Exemplary Additional Components | | | | | |
|---|---|---|---|---|---|
| Li-Ion Transport Compound 1 | Conc. (mol/L) | Li-Ion Transport Compound 2 | Conc. (mol/L) | Enhancer | Conc. (mol/L) |
| LiTFAc | 0.40 | $LiNO_3$ | 0.25 | lithium dicyanamide | 0.15 |
| LiTFAc | 0.40 | $LiNO_3$ | 0.33 | lithium dicyanamide | 0.15 |
| LiTFAc | 0.40 | $LiNO_3$ | 0.50 | lithium dicyanamide | 0.15 |
| LiTFAc | 0.40 | $LiNO_3$ | 0.66 | lithium dicyanamide | 0.15 |
| LiTFAc | 0.40 | $LiNO_3$ | 0.75 | lithium dicyanamide | 0.15 |
| LiTFAc | 0.40 | $LiNO_3$ | 1.00 | lithium dicyanamide | 0.15 |
| LiTFAc | 0.50 | $LiNO_3$ | 0.10 | lithium dicyanamide | 0.10 |
| LiTFAc | 0.50 | $LiNO_3$ | 0.25 | lithium dicyanamide | 0.10 |
| LiTFAc | 0.50 | $LiNO_3$ | 0.33 | lithium dicyanamide | 0.10 |
| LiTFAc | 0.50 | $LiNO_3$ | 0.50 | lithium dicyanamide | 0.10 |
| LiTFAc | 0.50 | $LiNO_3$ | 0.66 | lithium dicyanamide | 0.10 |
| LiTFAc | 0.50 | $LiNO_3$ | 0.75 | lithium dicyanamide | 0.10 |
| LiTFAc | 0.50 | $LiNO_3$ | 1.00 | lithium dicyanamide | 0.10 |
| LiTFAc | 0.50 | $LiNO_3$ | 0.10 | lithium dicyanamide | 0.15 |
| LiTFAc | 0.50 | $LiNO_3$ | 0.25 | lithium dicyanamide | 0.15 |
| LiTFAc | 0.50 | $LiNO_3$ | 0.33 | lithium dicyanamide | 0.15 |
| LiTFAc | 0.50 | $LiNO_3$ | 0.50 | lithium dicyanamide | 0.15 |
| LiTFAc | 0.50 | $LiNO_3$ | 0.66 | lithium dicyanamide | 0.15 |
| LiTFAc | 0.50 | $LiNO_3$ | 0.75 | lithium dicyanamide | 0.15 |
| LiTFAc | 0.50 | $LiNO_3$ | 1.00 | lithium dicyanamide | 0.15 |
| LiTFAc | 0.66 | $LiNO_3$ | 0.10 | lithium dicyanamide | 0.10 |
| LiTFAc | 0.66 | $LiNO_3$ | 0.25 | lithium dicyanamide | 0.10 |
| LiTFAc | 0.66 | $LiNO_3$ | 0.33 | lithium dicyanamide | 0.10 |
| LiTFAc | 0.66 | $LiNO_3$ | 0.50 | lithium dicyanamide | 0.10 |
| LiTFAc | 0.66 | $LiNO_3$ | 0.66 | lithium dicyanamide | 0.10 |
| LiTFAc | 0.66 | $LiNO_3$ | 0.75 | lithium dicyanamide | 0.10 |
| LiTFAc | 0.66 | $LiNO_3$ | 1.00 | lithium dicyanamide | 0.10 |
| LiTFAc | 0.66 | $LiNO_3$ | 0.10 | lithium dicyanamide | 0.15 |
| LiTFAc | 0.66 | $LiNO_3$ | 0.25 | lithium dicyanamide | 0.15 |
| LiTFAc | 0.66 | $LiNO_3$ | 0.33 | lithium dicyanamide | 0.15 |
| LiTFAc | 0.66 | $LiNO_3$ | 0.50 | lithium dicyanamide | 0.15 |
| LiTFAc | 0.66 | $LiNO_3$ | 0.66 | lithium dicyanamide | 0.15 |
| LiTFAc | 0.66 | $LiNO_3$ | 0.75 | lithium dicyanamide | 0.15 |
| LiTFAc | 0.66 | $LiNO_3$ | 1.00 | lithium dicyanamide | 0.15 |
| LiTFAc | 0.75 | $LiNO_3$ | 0.10 | lithium dicyanamide | 0.10 |
| LiTFAc | 0.75 | $LiNO_3$ | 0.25 | lithium dicyanamide | 0.10 |
| LiTFAc | 0.75 | $LiNO_3$ | 0.33 | lithium dicyanamide | 0.10 |

TABLE 3-continued

| Exemplary Additional Components | | | | | |
|---|---|---|---|---|---|
| Li-Ion Transport Compound 1 | Conc. (mol/L) | Li-Ion Transport Compound 2 | Conc. (mol/L) | Enhancer | Conc. (mol/L) |
| LiTFAc | 0.75 | $LiNO_3$ | 0.50 | lithium dicyanamide | 0.10 |
| LiTFAc | 0.75 | $LiNO_3$ | 0.66 | lithium dicyanamide | 0.10 |
| LiTFAc | 0.75 | $LiNO_3$ | 0.75 | lithium dicyanamide | 0.10 |
| LiTFAc | 0.75 | $LiNO_3$ | 1.00 | lithium dicyanamide | 0.10 |
| LiTFAc | 0.75 | $LiNO_3$ | 0.10 | lithium dicyanamide | 0.15 |
| LiTFAc | 0.75 | $LiNO_3$ | 0.25 | lithium dicyanamide | 0.15 |
| LiTFAc | 0.75 | $LiNO_3$ | 0.33 | lithium dicyanamide | 0.15 |
| LiTFAc | 0.75 | $LiNO_3$ | 0.50 | lithium dicyanamide | 0.15 |
| LiTFAc | 0.75 | $LiNO_3$ | 0.66 | lithium dicyanamide | 0.15 |
| LiTFAc | 0.75 | $LiNO_3$ | 0.75 | lithium dicyanamide | 0.15 |
| LiTFAc | 0.75 | $LiNO_3$ | 1.00 | lithium dicyanamide | 0.15 |
| LiTFAc | 1.00 | $LiNO_3$ | 0.10 | lithium dicyanamide | 0.10 |
| LiTFAc | 1.00 | $LiNO_3$ | 0.25 | lithium dicyanamide | 0.10 |
| LiTFAc | 1.00 | $LiNO_3$ | 0.33 | lithium dicyanamide | 0.10 |
| LiTFAc | 1.00 | $LiNO_3$ | 0.50 | lithium dicyanamide | 0.10 |
| LiTFAc | 1.00 | $LiNO_3$ | 0.66 | lithium dicyanamide | 0.10 |
| LiTFAc | 1.00 | $LiNO_3$ | 0.75 | lithium dicyanamide | 0.10 |
| LiTFAc | 1.00 | $LiNO_3$ | 1.00 | lithium dicyanamide | 0.10 |
| LiTFAc | 1.00 | $LiNO_3$ | 0.10 | lithium dicyanamide | 0.15 |
| LiTFAc | 1.00 | $LiNO_3$ | 0.25 | lithium dicyanamide | 0.15 |
| LiTFAc | 1.00 | $LiNO_3$ | 0.33 | lithium dicyanamide | 0.15 |
| LiTFAc | 1.00 | $LiNO_3$ | 0.50 | lithium dicyanamide | 0.15 |
| LiTFAc | 1.00 | $LiNO_3$ | 0.66 | lithium dicyanamide | 0.15 |
| LiTFAc | 1.00 | $LiNO_3$ | 0.75 | lithium dicyanamide | 0.15 |
| LiTFAc | 1.00 | $LiNO_3$ | 1.00 | lithium dicyanamide | 0.15 |
| LiTFAc | 0.10 | $LiClO_4$ | 0.10 | lithium dicyanamide | 0.10 |
| LiTFAc | 0.10 | $LiClO_4$ | 0.25 | lithium dicyanamide | 0.10 |
| LiTFAc | 0.10 | $LiClO_4$ | 0.33 | lithium dicyanamide | 0.10 |
| LiTFAc | 0.10 | $LiClO_4$ | 0.50 | lithium dicyanamide | 0.10 |
| LiTFAc | 0.10 | $LiClO_4$ | 0.66 | lithium dicyanamide | 0.10 |
| LiTFAc | 0.10 | $LiClO_4$ | 0.75 | lithium dicyanamide | 0.10 |
| LiTFAc | 0.10 | $LiClO_4$ | 1.00 | lithium dicyanamide | 0.10 |
| LiTFAc | 0.10 | $LiClO_4$ | 0.10 | lithium dicyanamide | 0.15 |
| LiTFAc | 0.10 | $LiClO_4$ | 0.25 | lithium dicyanamide | 0.15 |
| LiTFAc | 0.10 | $LiClO_4$ | 0.33 | lithium dicyanamide | 0.15 |
| LiTFAc | 0.10 | $LiClO_4$ | 0.50 | lithium dicyanamide | 0.15 |
| LiTFAc | 0.10 | $LiClO_4$ | 0.66 | lithium dicyanamide | 0.15 |

TABLE 3-continued

| Exemplary Additional Components | | | | | |
|---|---|---|---|---|---|
| Li-Ion Transport Compound 1 | Conc. (mol/L) | Li-Ion Transport Compound 2 | Conc. (mol/L) | Enhancer | Conc. (mol/L) |
| LiTFAc | 0.10 | $LiClO_4$ | 0.75 | lithium dicyanamide | 0.15 |
| LiTFAc | 0.10 | $LiClO_4$ | 1.00 | lithium dicyanamide | 0.15 |
| LiTFAc | 0.25 | $LiClO_4$ | 0.10 | lithium dicyanamide | 0.10 |
| LiTFAc | 0.25 | $LiClO_4$ | 0.25 | lithium dicyanamide | 0.10 |
| LiTFAc | 0.25 | $LiClO_4$ | 0.33 | lithium dicyanamide | 0.10 |
| LiTFAc | 0.25 | $LiClO_4$ | 0.50 | lithium dicyanamide | 0.10 |
| LiTFAc | 0.25 | $LiClO_4$ | 0.66 | lithium dicyanamide | 0.10 |
| LiTFAc | 0.25 | $LiClO_4$ | 0.75 | lithium dicyanamide | 0.10 |
| LiTFAc | 0.25 | $LiClO_4$ | 1.00 | lithium dicyanamide | 0.10 |
| LiTFAc | 0.25 | $LiClO_4$ | 0.10 | lithium dicyanamide | 0.15 |
| LiTFAc | 0.25 | $LiClO_4$ | 0.25 | lithium dicyanamide | 0.15 |
| LiTFAc | 0.25 | $LiClO_4$ | 0.33 | lithium dicyanamide | 0.15 |
| LiTFAc | 0.25 | $LiClO_4$ | 0.50 | lithium dicyanamide | 0.15 |
| LiTFAc | 0.25 | $LiClO_4$ | 0.66 | lithium dicyanamide | 0.15 |
| LiTFAc | 0.25 | $LiClO_4$ | 0.75 | lithium dicyanamide | 0.15 |
| LiTFAc | 0.25 | $LiClO_4$ | 1.00 | lithium dicyanamide | 0.15 |
| LiTFAc | 0.40 | $LiClO_4$ | 0.10 | lithium dicyanamide | 0.10 |
| LiTFAc | 0.40 | $LiClO_4$ | 0.25 | lithium dicyanamide | 0.10 |
| LiTFAc | 0.40 | $LiClO_4$ | 0.33 | lithium dicyanamide | 0.10 |
| LiTFAc | 0.40 | $LiClO_4$ | 0.50 | lithium dicyanamide | 0.10 |
| LiTFAc | 0.40 | $LiClO_4$ | 0.66 | lithium dicyanamide | 0.10 |
| LiTFAc | 0.40 | $LiClO_4$ | 0.75 | lithium dicyanamide | 0.10 |
| LiTFAc | 0.40 | $LiClO_4$ | 1.00 | lithium dicyanamide | 0.10 |
| LiTFAc | 0.40 | $LiClO_4$ | 0.10 | lithium dicyanamide | 0.15 |
| LiTFAc | 0.40 | $LiClO_4$ | 0.25 | lithium dicyanamide | 0.15 |
| LiTFAc | 0.40 | $LiClO_4$ | 0.33 | lithium dicyanamide | 0.15 |
| LiTFAc | 0.40 | $LiClO_4$ | 0.50 | lithium dicyanamide | 0.15 |
| LiTFAc | 0.40 | $LiClO_4$ | 0.66 | lithium dicyanamide | 0.15 |
| LiTFAc | 0.40 | $LiClO_4$ | 0.75 | lithium dicyanamide | 0.15 |
| LiTFAc | 0.40 | $LiClO_4$ | 1.00 | lithium dicyanamide | 0.15 |
| LiTFAc | 0.50 | $LiClO_4$ | 0.10 | lithium dicyanamide | 0.10 |
| LiTFAc | 0.50 | $LiClO_4$ | 0.25 | lithium dicyanamide | 0.10 |
| LiTFAc | 0.50 | $LiClO_4$ | 0.33 | lithium dicyanamide | 0.10 |
| LiTFAc | 0.50 | $LiClO_4$ | 0.50 | lithium dicyanamide | 0.10 |
| LiTFAc | 0.50 | $LiClO_4$ | 0.66 | lithium dicyanamide | 0.10 |
| LiTFAc | 0.50 | $LiClO_4$ | 0.75 | lithium dicyanamide | 0.10 |
| LiTFAc | 0.50 | $LiClO_4$ | 1.00 | lithium dicyanamide | 0.10 |

TABLE 3-continued

| Exemplary Additional Components | | | | | |
|---|---|---|---|---|---|
| Li-Ion Transport Compound 1 | Conc. (mol/L) | Li-Ion Transport Compound 2 | Conc. (mol/L) | Enhancer | Conc. (mol/L) |
| LiTFAc | 0.50 | $LiClO_4$ | 0.10 | lithium dicyanamide | 0.15 |
| LiTFAc | 0.50 | $LiClO_4$ | 0.25 | lithium dicyanamide | 0.15 |
| LiTFAc | 0.50 | $LiClO_4$ | 0.33 | lithium dicyanamide | 0.15 |
| LiTFAc | 0.50 | $LiClO_4$ | 0.50 | lithium dicyanamide | 0.15 |
| LiTFAc | 0.50 | $LiClO_4$ | 0.66 | lithium dicyanamide | 0.15 |
| LiTFAc | 0.50 | $LiClO_4$ | 0.75 | lithium dicyanamide | 0.15 |
| LiTFAc | 0.50 | $LiClO_4$ | 1.00 | lithium dicyanamide | 0.15 |
| LiTFAc | 0.66 | $LiClO_4$ | 0.10 | lithium dicyanamide | 0.10 |
| LiTFAc | 0.66 | $LiClO_4$ | 0.25 | lithium dicyanamide | 0.10 |
| LiTFAc | 0.66 | $LiClO_4$ | 0.33 | lithium dicyanamide | 0.10 |
| LiTFAc | 0.66 | $LiClO_4$ | 0.50 | lithium dicyanamide | 0.10 |
| LiTFAc | 0.66 | $LiClO_4$ | 0.66 | lithium dicyanamide | 0.10 |
| LiTFAc | 0.66 | $LiClO_4$ | 0.75 | lithium dicyanamide | 0.10 |
| LiTFAc | 0.66 | $LiClO_4$ | 1.00 | lithium dicyanamide | 0.10 |
| LiTFAc | 0.66 | $LiClO_4$ | 0.10 | lithium dicyanamide | 0.15 |
| LiTFAc | 0.66 | $LiClO_4$ | 0.25 | lithium dicyanamide | 0.15 |
| LiTFAc | 0.66 | $LiClO_4$ | 0.33 | lithium dicyanamide | 0.15 |
| LiTFAc | 0.66 | $LiClO_4$ | 0.50 | lithium dicyanamide | 0.15 |
| LiTFAc | 0.66 | $LiClO_4$ | 0.66 | lithium dicyanamide | 0.15 |
| LiTFAc | 0.66 | $LiClO_4$ | 0.75 | lithium dicyanamide | 0.15 |
| LiTFAc | 0.66 | $LiClO_4$ | 1.00 | lithium dicyanamide | 0.15 |
| LiTFAc | 0.75 | $LiClO_4$ | 0.10 | lithium dicyanamide | 0.10 |
| LiTFAc | 0.75 | $LiClO_4$ | 0.25 | lithium dicyanamide | 0.10 |
| LiTFAc | 0.75 | $LiClO_4$ | 0.33 | lithium dicyanamide | 0.10 |
| LiTFAc | 0.75 | $LiClO_4$ | 0.50 | lithium dicyanamide | 0.10 |
| LiTFAc | 0.75 | $LiClO_4$ | 0.66 | lithium dicyanamide | 0.10 |
| LiTFAc | 0.75 | $LiClO_4$ | 0.75 | lithium dicyanamide | 0.10 |
| LiTFAc | 0.75 | $LiClO_4$ | 1.00 | lithium dicyanamide | 0.10 |
| LiTFAc | 0.75 | $LiClO_4$ | 0.10 | lithium dicyanamide | 0.15 |
| LiTFAc | 0.75 | $LiClO_4$ | 0.25 | lithium dicyanamide | 0.15 |
| LiTFAc | 0.75 | $LiClO_4$ | 0.33 | lithium dicyanamide | 0.15 |
| LiTFAc | 0.75 | $LiClO_4$ | 0.50 | lithium dicyanamide | 0.15 |
| LiTFAc | 0.75 | $LiClO_4$ | 0.66 | lithium dicyanamide | 0.15 |
| LiTFAc | 0.75 | $LiClO_4$ | 0.75 | lithium dicyanamide | 0.15 |
| LiTFAc | 0.75 | $LiClO_4$ | 1.00 | lithium dicyanamide | 0.15 |
| LiTFAc | 1.00 | $LiClO_4$ | 0.10 | lithium dicyanamide | 0.10 |
| LiTFAc | 1.00 | $LiClO_4$ | 0.25 | lithium dicyanamide | 0.10 |

TABLE 3-continued

| Exemplary Additional Components | | | | | |
|---|---|---|---|---|---|
| Li-Ion Transport Compound 1 | Conc. (mol/L) | Li-Ion Transport Compound 2 | Conc. (mol/L) | Enhancer | Conc. (mol/L) |
| LiTFAc | 1.00 | $LiClO_4$ | 0.33 | lithium dicyanamide | 0.10 |
| LiTFAc | 1.00 | $LiClO_4$ | 0.50 | lithium dicyanamide | 0.10 |
| LiTFAc | 1.00 | $LiClO_4$ | 0.66 | lithium dicyanamide | 0.10 |
| LiTFAc | 1.00 | $LiClO_4$ | 0.75 | lithium dicyanamide | 0.10 |
| LiTFAc | 1.00 | $LiClO_4$ | 1.00 | lithium dicyanamide | 0.10 |
| LiTFAc | 1.00 | $LiClO_4$ | 0.10 | lithium dicyanamide | 0.15 |
| LiTFAc | 1.00 | $LiClO_4$ | 0.25 | lithium dicyanamide | 0.15 |
| LiTFAc | 1.00 | $LiClO_4$ | 0.33 | lithium dicyanamide | 0.15 |
| LiTFAc | 1.00 | $LiClO_4$ | 0.50 | lithium dicyanamide | 0.15 |
| LiTFAc | 1.00 | $LiClO_4$ | 0.66 | lithium dicyanamide | 0.15 |
| LiTFAc | 1.00 | $LiClO_4$ | 0.75 | lithium dicyanamide | 0.15 |
| LiTFAc | 1.00 | $LiClO_4$ | 1.00 | lithium dicyanamide | 0.15 |
| LiTFAc | 0.10 | lithium trifilate (LiTf) | 0.10 | lithium dicyanamide | 0.10 |
| LiTFAc | 0.10 | LiTf | 0.25 | lithium dicyanamide | 0.10 |
| LiTFAc | 0.10 | LiTf | 0.33 | lithium dicyanamide | 0.10 |
| LiTFAc | 0.10 | LiTf | 0.50 | lithium dicyanamide | 0.10 |
| LiTFAc | 0.10 | LiTf | 0.66 | lithium dicyanamide | 0.10 |
| LiTFAc | 0.10 | LiTf | 0.75 | lithium dicyanamide | 0.10 |
| LiTFAc | 0.10 | LiTf | 1.00 | lithium dicyanamide | 0.10 |
| LiTFAc | 0.10 | LiTf | 0.10 | lithium dicyanamide | 0.15 |
| LiTFAc | 0.10 | LiTf | 0.25 | lithium dicyanamide | 0.15 |
| LiTFAc | 0.10 | LiTf | 0.33 | lithium dicyanamide | 0.15 |
| LiTFAc | 0.10 | LiTf | 0.50 | lithium dicyanamide | 0.15 |
| LiTFAc | 0.10 | LiTf | 0.66 | lithium dicyanamide | 0.15 |
| LiTFAc | 0.10 | LiTf | 0.75 | lithium dicyanamide | 0.15 |
| LiTFAc | 0.10 | LiTf | 1.00 | lithium dicyanamide | 0.15 |
| LiTFAc | 0.25 | LiTf | 0.10 | lithium dicyanamide | 0.10 |
| LiTFAc | 0.25 | LiTf | 0.25 | lithium dicyanamide | 0.10 |
| LiTFAc | 0.25 | LiTf | 0.33 | lithium dicyanamide | 0.10 |
| LiTFAc | 0.25 | LiTf | 0.50 | lithium dicyanamide | 0.10 |
| LiTFAc | 0.25 | LiTf | 0.66 | lithium dicyanamide | 0.10 |
| LiTFAc | 0.25 | LiTf | 0.75 | lithium dicyanamide | 0.10 |
| LiTFAc | 0.25 | LiTf | 1.00 | lithium dicyanamide | 0.10 |
| LiTFAc | 0.25 | LiTf | 0.10 | lithium dicyanamide | 0.15 |
| LiTFAc | 0.25 | LiTf | 0.25 | lithium dicyanamide | 0.15 |
| LiTFAc | 0.25 | LiTf | 0.33 | lithium dicyanamide | 0.15 |

TABLE 3-continued

| Exemplary Additional Components | | | | | |
|---|---|---|---|---|---|
| Li-Ion Transport Compound 1 | Conc. (mol/L) | Li-Ion Transport Compound 2 | Conc. (mol/L) | Enhancer | Conc. (mol/L) |
| LiTFAc | 0.25 | LiTf | 0.50 | lithium dicyanamide | 0.15 |
| LiTFAc | 0.25 | LiTf | 0.66 | lithium dicyanamide | 0.15 |
| LiTFAc | 0.25 | LiTf | 0.75 | lithium dicyanamide | 0.15 |
| LiTFAc | 0.25 | LiTf | 1.00 | lithium dicyanamide | 0.15 |
| LiTFAc | 0.40 | LiTf | 0.10 | lithium dicyanamide | 0.10 |
| LiTFAc | 0.40 | LiTf | 0.25 | lithium dicyanamide | 0.10 |
| LiTFAc | 0.40 | LiTf | 0.33 | lithium dicyanamide | 0.10 |
| LiTFAc | 0.40 | LiTf | 0.50 | lithium dicyanamide | 0.10 |
| LiTFAc | 0.40 | LiTf | 0.66 | lithium dicyanamide | 0.10 |
| LiTFAc | 0.40 | LiTf | 0.75 | lithium dicyanamide | 0.10 |
| LiTFAc | 0.40 | LiTf | 1.00 | lithium dicyanamide | 0.10 |
| LiTFAc | 0.40 | LiTf | 0.10 | lithium dicyanamide | 0.15 |
| LiTFAc | 0.40 | LiTf | 0.25 | lithium dicyanamide | 0.15 |
| LiTFAc | 0.40 | LiTf | 0.33 | lithium dicyanamide | 0.15 |
| LiTFAc | 0.40 | LiTf | 0.50 | lithium dicyanamide | 0.15 |
| LiTFAc | 0.40 | LiTf | 0.66 | lithium dicyanamide | 0.15 |
| LiTFAc | 0.40 | LiTf | 0.75 | lithium dicyanamide | 0.15 |
| LiTFAc | 0.40 | LiTf | 1.00 | lithium dicyanamide | 0.15 |
| LiTFAc | 0.50 | LiTf | 0.10 | lithium dicyanamide | 0.10 |
| LiTFAc | 0.50 | LiTf | 0.25 | lithium dicyanamide | 0.10 |
| LiTFAc | 0.50 | LiTf | 0.33 | lithium dicyanamide | 0.10 |
| LiTFAc | 0.50 | LiTf | 0.50 | lithium dicyanamide | 0.10 |
| LiTFAc | 0.50 | LiTf | 0.66 | lithium dicyanamide | 0.10 |
| LiTFAc | 0.50 | LiTf | 0.75 | lithium dicyanamide | 0.10 |
| LiTFAc | 0.50 | LiTf | 1.00 | lithium dicyanamide | 0.10 |
| LiTFAc | 0.50 | LiTf | 0.10 | lithium dicyanamide | 0.15 |
| LiTFAc | 0.50 | LiTf | 0.25 | lithium dicyanamide | 0.15 |
| LiTFAc | 0.50 | LiTf | 0.33 | lithium dicyanamide | 0.15 |
| LiTFAc | 0.50 | LiTf | 0.50 | lithium dicyanamide | 0.15 |
| LiTFAc | 0.50 | LiTf | 0.66 | lithium dicyanamide | 0.15 |
| LiTFAc | 0.50 | LiTf | 0.75 | lithium dicyanamide | 0.15 |
| LiTFAc | 0.50 | LiTf | 1.00 | lithium dicyanamide | 0.15 |
| LiTFAc | 0.66 | LiTf | 0.10 | lithium dicyanamide | 0.10 |
| LiTFAc | 0.66 | LiTf | 0.25 | lithium dicyanamide | 0.10 |
| LiTFAc | 0.66 | LiTf | 0.33 | lithium dicyanamide | 0.10 |
| LiTFAc | 0.66 | LiTf | 0.50 | lithium dicyanamide | 0.10 |
| LiTFAc | 0.66 | LiTf | 0.66 | lithium dicyanamide | 0.10 |

TABLE 3-continued

| Exemplary Additional Components | | | | | |
|---|---|---|---|---|---|
| Li-Ion Transport Compound 1 | Conc. (mol/L) | Li-Ion Transport Compound 2 | Conc. (mol/L) | Enhancer | Conc. (mol/L) |
| LiTFAc | 0.66 | LiTf | 0.75 | lithium dicyanamide | 0.10 |
| LiTFAc | 0.66 | LiTf | 1.00 | lithium dicyanamide | 0.10 |
| LiTFAc | 0.66 | LiTf | 0.10 | lithium dicyanamide | 0.15 |
| LiTFAc | 0.66 | LiTf | 0.25 | lithium dicyanamide | 0.15 |
| LiTFAc | 0.66 | LiTf | 0.33 | lithium dicyanamide | 0.15 |
| LiTFAc | 0.66 | LiTf | 0.50 | lithium dicyanamide | 0.15 |
| LiTFAc | 0.66 | LiTf | 0.66 | lithium dicyanamide | 0.15 |
| LiTFAc | 0.66 | LiTf | 0.75 | lithium dicyanamide | 0.15 |
| LiTFAc | 0.66 | LiTf | 1.00 | lithium dicyanamide | 0.15 |
| LiTFAc | 0.75 | LiTf | 0.10 | lithium dicyanamide | 0.10 |
| LiTFAc | 0.75 | LiTf | 0.25 | lithium dicyanamide | 0.10 |
| LiTFAc | 0.75 | LiTf | 0.33 | lithium dicyanamide | 0.10 |
| LiTFAc | 0.75 | LiTf | 0.50 | lithium dicyanamide | 0.10 |
| LiTFAc | 0.75 | LiTf | 0.66 | lithium dicyanamide | 0.10 |
| LiTFAc | 0.75 | LiTf | 0.75 | lithium dicyanamide | 0.10 |
| LiTFAc | 0.75 | LiTf | 1.00 | lithium dicyanamide | 0.10 |
| LiTFAc | 0.75 | LiTf | 0.10 | lithium dicyanamide | 0.15 |
| LiTFAc | 0.75 | LiTf | 0.25 | lithium dicyanamide | 0.15 |
| LiTFAc | 0.75 | LiTf | 0.33 | lithium dicyanamide | 0.15 |
| LiTFAc | 0.75 | LiTf | 0.50 | lithium dicyanamide | 0.15 |
| LiTFAc | 0.75 | LiTf | 0.66 | lithium dicyanamide | 0.15 |
| LiTFAc | 0.75 | LiTf | 0.75 | lithium dicyanamide | 0.15 |
| LiTFAc | 0.75 | LiTf | 1.00 | lithium dicyanamide | 0.15 |
| LiTFAc | 1.00 | LiTf | 0.10 | lithium dicyanamide | 0.10 |
| LiTFAc | 1.00 | LiTf | 0.25 | lithium dicyanamide | 0.10 |
| LiTFAc | 1.00 | LiTf | 0.33 | lithium dicyanamide | 0.10 |
| LiTFAc | 1.00 | LiTf | 0.50 | lithium dicyanamide | 0.10 |
| LiTFAc | 1.00 | LiTf | 0.66 | lithium dicyanamide | 0.10 |
| LiTFAc | 1.00 | LiTf | 0.75 | lithium dicyanamide | 0.10 |
| LiTFAc | 1.00 | LiTf | 1.00 | lithium dicyanamide | 0.10 |
| LiTFAc | 1.00 | LiTf | 0.10 | lithium dicyanamide | 0.15 |
| LiTFAc | 1.00 | LiTf | 0.25 | lithium dicyanamide | 0.15 |
| LiTFAc | 1.00 | LiTf | 0.33 | lithium dicyanamide | 0.15 |
| LiTFAc | 1.00 | LiTf | 0.50 | lithium dicyanamide | 0.15 |
| LiTFAc | 1.00 | LiTf | 0.66 | lithium dicyanamide | 0.15 |
| LiTFAc | 1.00 | LiTf | 0.75 | lithium dicyanamide | 0.15 |
| LiTFAc | 1.00 | LiTf | 1.00 | lithium dicyanamide | 0.15 |

In various approaches, the inventive structures, compositions, configurations, etc. described herein may be implemented in electrochemical cells of various types for practical utilization in a wide variety of applications. Without limitation, exemplary electrochemical cell configurations that may utilize any combination of features described herein, may be in the form of a pouch, a coin, a prismatic cell, a cylindrical configuration, or any suitable equivalent(s) thereof that would be appreciated by those having ordinary skill in the art upon reading the present disclosure.

Figures 8A, 8B, 8C:
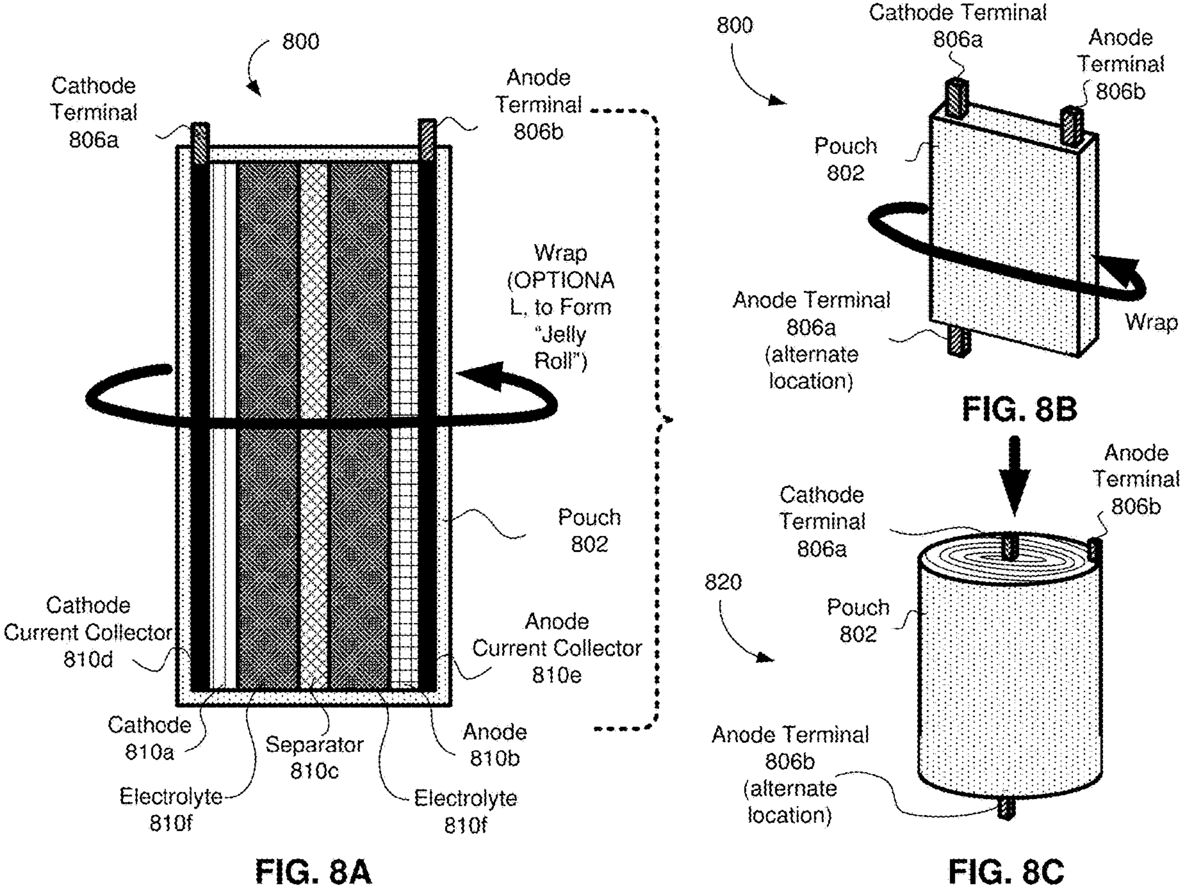
FIG. 8A shows a simplified schematic cross-sectional view of an electrochemical cell characterized by a pouch cell arrangement, according to one embodiment of the presently disclosed inventive concepts.
FIG. 8B is a simplified schematic external view of the electrochemical cell shown in FIG. 8A, according to one embodiment of the presently disclosed inventive concepts.
FIG. 8C depicts a simplified schematic of the pouch cell arrangement shown in FIG. 8B, wrapped into a jelly-roll configuration, according to one approach of the presently disclosed inventive concepts.

With reference to electrochemical cells having a pouch cell arrangement 800, and as shown according to exemplary embodiments in FIGS. 8A-8C, an electrochemical cell includes a cathode 810*a* and an anode 810*b* positioned on opposing sides of the pouch cell arrangement 800, and separated (physically and/or chemically) by a separator 810*c*. The anode 810*c* and cathode 810*a* are electronically coupled via an electrolyte 810*f* present in the pouch cell arrangement 800. Moreover, each electrode is electronically coupled to an external environment of the pouch cell arrangement 800 via a current collector and corresponding terminal, i.e. the cathode 810*a* is coupled to the external environment via cathode current collector 810*d* and cathode terminal 806*a*, while the anode 810*b* is coupled via anode current collector 810*e* and anode terminal 806*b*. The foregoing structures are enclosed, encased, or otherwise spatially fixed and contained via a pouch 802 surrounding the components.

The pouch 802, according to various embodiments, may take any suitable form that would be understood by those having ordinary skill in the art upon reading the present disclosure, such as a wrapping, a coating, an enclosure (soft or hard), a compressive structure (such as a metal band or mesh), etc. as would be understood by those having ordinary skill in the art upon reading the present disclosure.

Moreover, as shown in FIG. 8B, the anode terminal 806*b* and cathode terminal 806*a* extend through the pouch 802, providing electronic coupling between interior and exterior environments of the pouch cell arrangement 800. Note the anode terminal 806*b* may alternatively be positioned on a same side, or an opposite side, of the pouch cell arrangement 800 relative to the cathode terminal 806*a*. Moreover, the relative position of the anode terminal 806*b* and the cathode terminal 806*a* may be switched relative to the arrangement shown in FIGS. 8B and 8C, according to alternative implementations and without departing from the scope of the presently described inventive concepts.

As noted in FIGS. 8A and 8B, the illustrative pouch cell arrangement 800 may be wound around, e.g., its longitudinal axis, to form a spiral, folded, pleated, rolled, or otherwise at least partially overlapping configuration of the above-referenced electrochemical cell components. In preferred implementations, winding the pouch cell arrangement 800 yields a configuration known as a "jellyroll", Shown schematically in FIG. 8C.

Figure 9B:
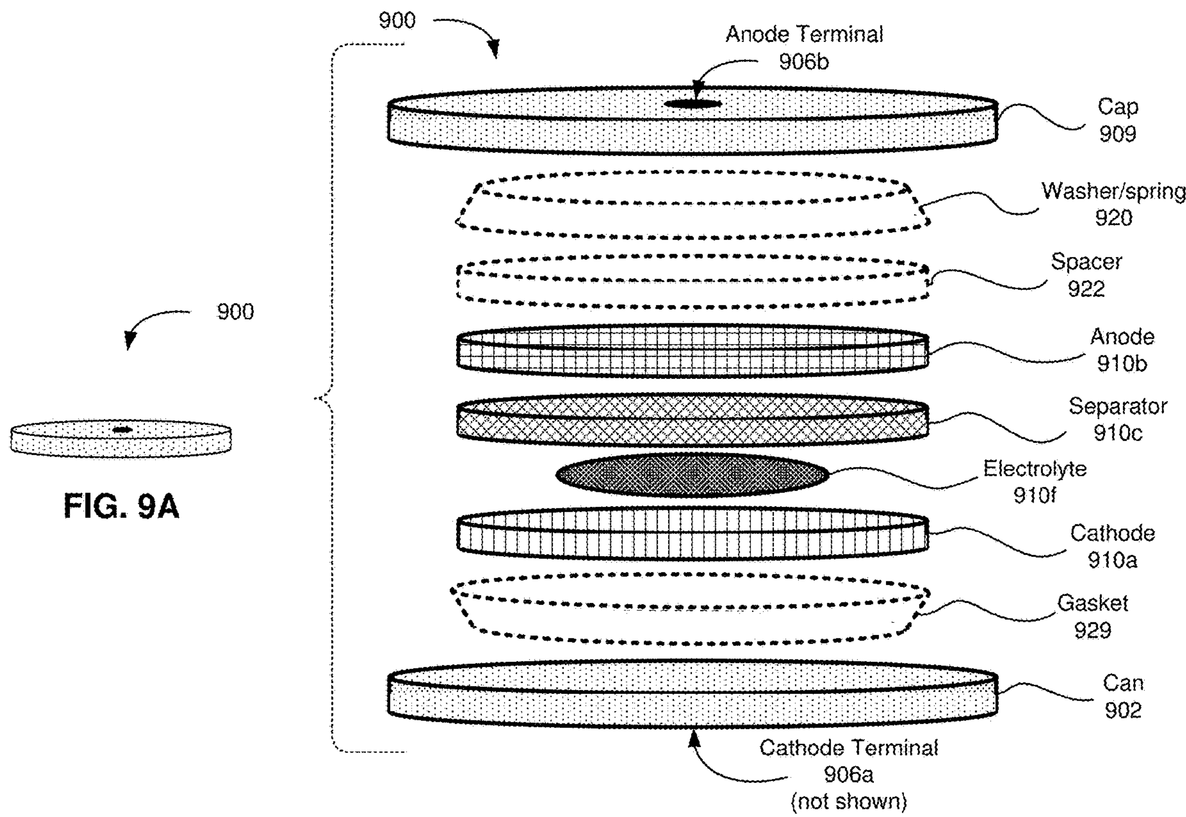
FIG. 9B depicts various components of the coin cell arrangement shown in FIG. 9A, according to a simplified schematic exploded view.

Turning now to FIGS. 9A and 9B, which depict a simplified schematic of an electrochemical cell configured according to a coin cell arrangement 900 is aptly named for its substantially flat, cylindrical shape as shown in FIG. 9A. According to various embodiments, the cylindrical cell arrangement 900 includes a can 902 and cap 904 which protect the components placed therein from mechanical damage, chemical damage (e.g. corrosion, oxidation, etc.) electrical damage, etc. and also prevent leakage of compounds within the cylindrical cell arrangement 900 into the environment.

Coupled to the cap 904 is an anode terminal 906*b*, and likewise coupled to the can 902 is a cathode terminal 906*a* (not shown in FIG. 9B). Preferably, these terminals have a composition suitable for conducting electricity generated within the coin cell arrangement 900 to an appropriately connected or coupled output, and may be inserted into a circuit to provide power thereto, as would be appreciated by those having ordinary skill in the art upon reading the present descriptions. Exemplary compositions suitable for use in cathode terminal 906*a* and anode terminal 906*b* include electrically conductive metals, such as copper, nickel, etc. as known in the art, electrically conductive carbonaceous materials, such as graphene, etc. as known in the art, or any other suitable equivalent thereof that would be appreciated by a skilled artisan upon reading the present disclosures.

Turning now to FIG. 9B, a plurality of components that may be included in a coin cell arrangement 900 are shown according to an exploded view consistent with various embodiments of the presently described inventive concepts. It shall be appreciated that components such as washer/spring 920, spacer 922, and gasket 924, represented by dotted outlines, are optional and may, but need not, be included in accordance with the inventive concepts disclosed herein. However, it shall also be appreciated that, depending on the intended application for the coin cell arrangement 900, washer/spring 920, spacer 922, and/or gasket 924 may advantageously convey mechanical strength, or convey advantageous electrical properties, on the coin cell arrangement 900. For instance, washer/spring 920 and/or gasket 924 may help secure the other depicted components in place, facilitating desired operation of the coin cell arrangement 900. Similarly, spacer 922 may cushion the anode 910*b* from friction or compressive force from the washer/spring 920, and/or be formed from a material that facilitates conduction of heat and/or electricity from within the coin cell arrangement 900 to the anode terminal 906*b*, according to the configuration shown in FIG. 9B. Of course, those having ordinary skill in the art will appreciate various advantages that may be realized via inclusion of washer/spring 920, spacer 922, and/or gasket 924, in various implementations, based on knowledge generally available at the time of the present disclosure's filing date.

With continuing reference to FIG. 9B, illustrative coin cell arrangement 900 features internal components including an anode 910*b* positioned toward an opposing end of the coin cell arrangement as a cathode 910*a*, with a separator 910*c* and electrolyte 910*f* positioned therebetween. As with all electrochemical cell arrangements shown in FIGS. 8A-11 and consistent with corresponding descriptions thereof provided herein, the anode 910*b*, cathode 910*a*, separator 910*c*, and electrolyte 910*f* may each be characterized by any composition as known in the art or as described herein that a skilled artisan would appreciate as suitable for the respective function thereof in an electrochemical cell, upon reading the present disclosure and without departing from the scope of the presently described inventive concepts. Several such exemplary compositions are provided hereinbelow, and others may be set forth elsewhere in the detailed descriptions of the inventive concepts instantly set forth. Unless expressly admitted as being known in the art, it shall be understood that any such exemplary composition described for any of the components of electrochemical cell arrangements 8A-11 is not admitted as being so well-known, but rather is considered part of the inventive concepts presented herein.

Figures 10A, 10B:
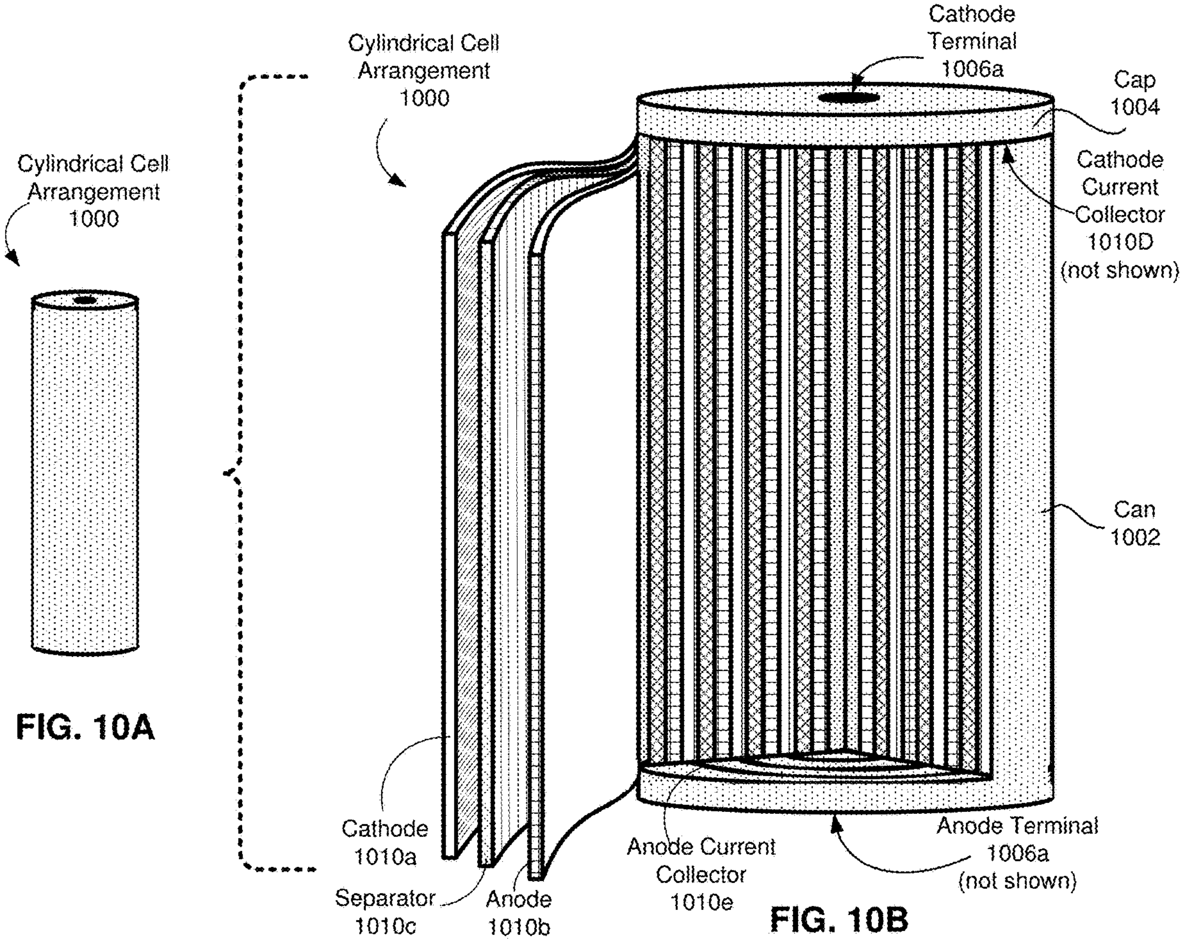
FIG. 10A is a simplified schematic of an electrochemical cell characterized by a cylindrical cell arrangement, according to one aspect of the presently disclosed inventive concepts.
FIG. 10B is a simplified schematic cut-out view of exemplary components of the cylindrical cell arrangement shown in FIG. 10A, according to one implementation of the presently disclosed inventive concepts.

In other approaches, electrochemical cells may be characterized by a cylindrical cell arrangement 1000, e.g., as shown according to illustrative implementations in FIG. 10A (external view) and 10B (cut-out view), includes a can 1002 and a cap 1004 that contain and protect other components internal to the cylindrical cell configuration, in similar manner as described herein regarding coin cell arrangements such as coin cell arrangement 900 shown in FIGS. 9A and 9B. Also similar to other arrangements described herein, the cap 1004 and can 1002 each respectively include a terminal configured to conduct electricity generated within the cylindrical cell arrangement 1000 to an external environment, output device electrically coupled to the cylindrical cell arrangement 1000, etc., according to various embodiments and as would be appreciated by those having ordinary skill in the art upon reading the present disclosure. As shown in FIG. 10B, cap 1004 includes a cathode terminal 1006*a*, while can 1002 includes an anode terminal 1006*b* (not shown in FIG. 10B), positioned at substantially opposite ends of the cylindrical cell arrangement 1000. Of course, the relative position of the cathode terminal 1006*a* and anode terminal 1006*b* may be swapped, according to alternative embodiments of the cylindrical cell arrangement 1000.

With continuing reference to FIG. 10B, the illustrative cylindrical cell arrangement 1000 includes similar components as described herein with reference to other electrochemical cell arrangements, but structurally arranged in a unique manner. Most notably, while the cathode(s) 1010*a* and anode(s) 1010*b* are spatially separated by separator(s) 1010*c*, there are a plurality of such structures arranged in substantially laminar configuration and wound around a central longitudinal axis of the cylindrical cell arrangement 1000. In this manner, the cathode(s) 1010*a* and anode(s) 1010*b* are not positioned proximate to opposing ends of the cylindrical cell arrangement 1000 as is the case for pouch cell arrangement 800 and coin cell arrangement 900, but rather present throughout a volume of the cylindrical cell arrangement 1000. Regardless, consistent with pouch cell arrangement 800, the cylindrical cell arrangement 1000 includes a cathode current collector 1010*d* (not shown in FIG. 10B) and an anode current collector 1010*e* positioned at opposing ends of the cylindrical cell arrangement 1000 and electrically coupled to a corresponding terminal (i.e., either cathode terminal 1006*a* or anode terminal 1006*b*), as would be understood by those having ordinary skill in the art upon reading the present disclosures.

Figure 11:
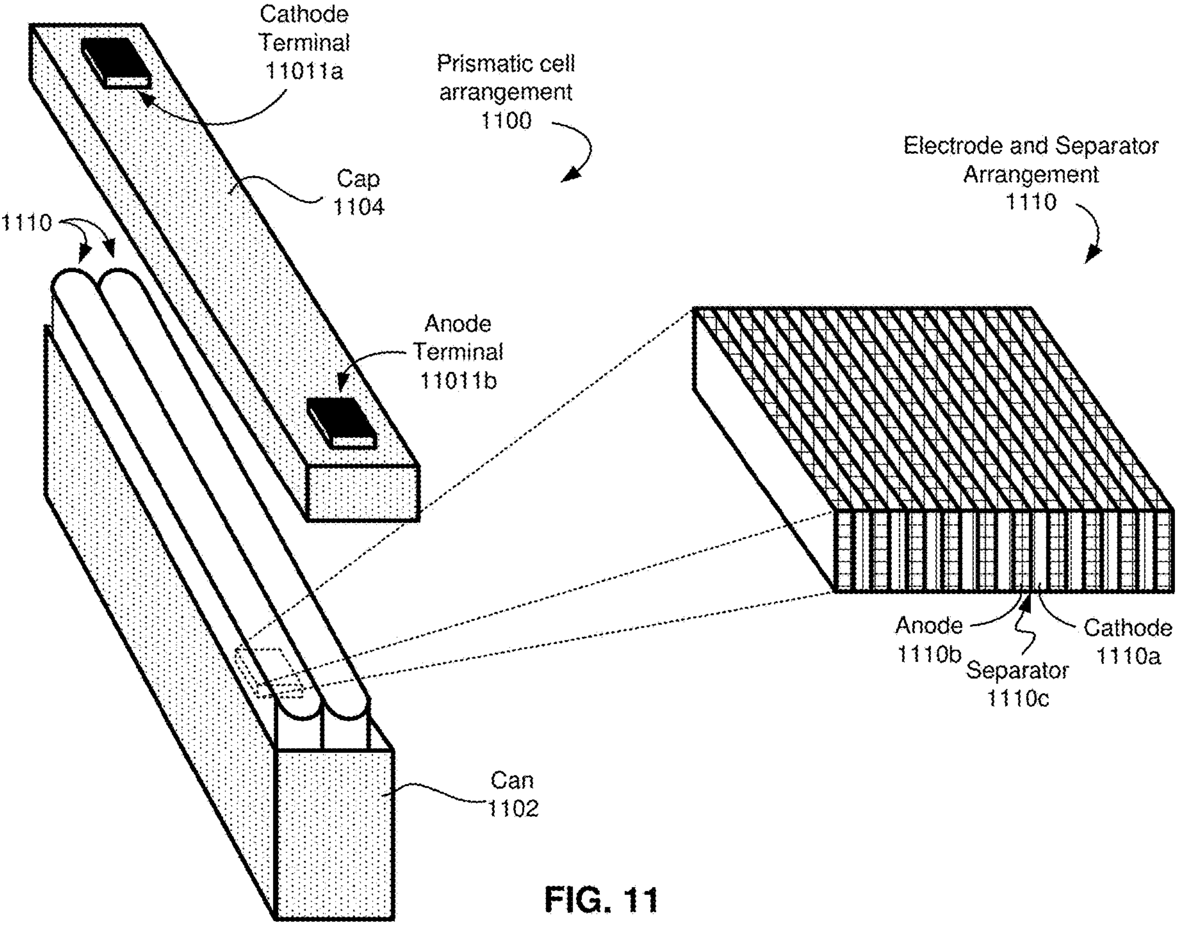
FIG. 11 is a simplified schematic of an electrochemical cell characterized by a cylindrical cell arrangement, according to one aspect of the presently disclosed inventive concepts.

Now regarding FIG. 11, a simplified schematic of an electrochemical cell embodied in a prismatic configuration 1100 is shown, according to one aspect of the presently disclosed inventive concepts. As with other electrochemical cell arrangements described hereinabove, the prismatic cell arrangement 1100 includes a can 1102 and a cap 1104. Unique to the prismatic cell arrangement 1100, the can 1102 and cap 1104 as shown in FIG. 11 are substantially rectangular cuboidal in shape, although those having ordinary skill in the art will appreciate that a unique advantage of prismatic cell arrangements as contemplated herein is nearly unlimited flexibility with respect to the spatial configuration of the can

1102 and cap 1104. The sole limitation on such spatial configuration is the ability to fully enclose and contain the internal components, shown according to one exemplary embodiment with reference to electrode and separator arrangement 1110. This flexibility, in large part, is due to implementation of electrode and separator arrangements 1110 characterized by a laminar structure including anode(s) 1110*a* and cathode(s) 1110*a* physically and/or chemically separated by separator(s) 1110*c*. While the particular electrode and separator arrangement 1110 shown in FIG. 11 is a multi-layered structure (e.g., composed of a series of thin films deposited sequentially one onto the other) those having ordinary skill in the art will appreciate that according to various implementations the components of the electrode and separator arrangement 1110 (which may include components other than anode 1110*b*, cathode 1110*a*, and separator 1110*c* without departing from the scope of the presently disclosed inventive concepts) may be arranged in a "rolled" configuration such as shown in FIGS. 8C and 10B, or in a folded configuration, a pleated configuration, or any other configuration in which at least portion(s) of the components of the electrode and separator arrangement 1110 at least partially overlap themselves, one another, or both. Furthermore, combinations of overlapping arrangements may be implemented in electrode and separator arrangement 1110 without departing from the scope of the presently disclosed inventive concepts.

Returning to the cap 1104 of exemplary prismatic cell arrangement 1100 shown in FIG. 11, in one illustrative implementation a plurality of terminals including cathode terminal 1106*a* and anode terminal 1106*b* are disposed on an external surface of the cap 1104 and electrically coupled to the electrode and separator arrangement 1110, e.g. via one or more current collectors (not shown in FIG. 11) using any suitable means and/or mechanisms that would be understood by those having ordinary skill in the art upon reading the instant descriptions.

Several exemplary electrochemical cell arrangements have been shown and described with reference to FIGS. 8A-11, and shall be understood as illustrative rather than limiting on the scope of the inventive concepts presented herein. Moreover, certain arrangements are depicted as including or omitting certain components not expressly shown or described with reference to other arrangements (such as the washer/spring 820, spacer 822, gasket 824, electrolyte 810*f*, current collectors 810*d* and 810*e*, shown with reference to FIG. 8A but not expressly shown or described with reference to other arrangements set forth herein. Despite the particular components shown in FIGS. 8A-11, it shall be understood that any electrochemical cell arrangement, whether in accordance with FIGS. 8A-11 or according to a different electrochemical cell arrangement, may include any suitable combination of components described with reference to any single Figure, or components not shown in any of the Figures, but which would be appreciated as suitable for creating a functioning electrochemical cell by a person having ordinary skill in the art upon reading the instant descriptions.

Of course, the various exemplary embodiments of electrochemical cells arranged according to different configurations shown in FIGS. 8A-11 and described hereinabove are provided for illustrative purposes, and should not be interpreted as limiting on the scope of electrochemical cells in which the inventive anode structures and compositions presently disclosed may be implemented. For instance, in various approaches different electrochemical cell configurations may be used together, in any combination, to provide power to one or more machines.

Moreover, the exemplary electrochemical cell configurations described hereinabove may be modified in any suitable manner known in the art without departing from the scope of the inventive concepts described herein. For instance, various components shown above in FIGS. 8A-11 may be modified, substituted, omitted, supplemented, etc. in any manner that a skilled artisan reading the present disclosure would appreciate as suitable for producing a working electrochemical cell, without extending beyond the scope of the presently described inventive concepts.

For instance, according to various embodiments, electrochemical cells implemented in accordance with the presently described inventive concepts may include one or more (preferably at least two) electrodes, which may individually be characterized as anode(s), or cathode(s), e.g., according to electrochemical function within the overall cell, and may be formed from any suitable material(s) known in the art and appreciated, upon reading the present disclosure, as suitable for use in combination with other structures and compositions in the exemplary electrochemical cell and in accordance with the inventive concepts provided herein.

In some approaches, either or both electrode types may be configured in the form of a three-dimensional, monolithic structure that is "free-standing". In other words, the "free-standing" electrode is "structurally self-supporting", such that no separate substrate, framework, scaffold, foam, matrix, current collector, supporting fluid, etc. is necessary for the monolith to support its own weight and maintain defining physical characteristics (e.g., density, volume, porosity, physical dimensions, shape, chemical composition, etc.) when deposited, positioned, or otherwise placed in a working environment such as an electrochemical cell. Of course, the inventive concepts presented herein should not be interpreted as being limited in any way to inclusion of or requirement for "free standing" electrode(s), but should be understood as allowing for such structures where advantageous to the specific application(s) or intended utility for the inventive electrochemical cell of interest.

Where a "free standing" electrode structure is implemented, corresponding electrochemical cells may, and preferably do, omit a distinct current collector (or at least a distinct anode current collector), according to select implementations. Indeed, even where no "free standing" electrode structure is present, electrochemical cells in accordance with the inventive concepts described herein may still omit a distinct current collector structure or component.

For instance, according to certain implementations, the electrode itself may serve as the current collector, or the separator(s) may serve as the current collector, in addition to fulfilling additional functions described herein with respect to the separator, such as physically, chemically, electrically, etc. segregating various components of the electrochemical cell from one another to avoid undesirable chemical reactions, physical phenomena, etc. as would be understood by a person having ordinary skill in the art upon reading the present disclosure. Again, the inventive concepts presented herein shall be understood as including, but not requiring, omission of distinct current collector components, according to various embodiments.

Accordingly, electrodes of the illustrative electrochemical cell implementations may be distinct structures, such as three dimensional monoliths, which may optionally be porous, have surface(s) thereof functionalized in order to enhance, suppress, or otherwise modify functional characteristics thereof (such as permeability, reactivity, etc. to select chemical species present within the electrochemical cell) without limitation. Electrodes may optionally or additionally include indeterminate structures, such as solutions that exhibit functional characteristics of monolithic electrode structures, but are present partially or wholly in the form of a solution. Further still, electrodes may be physically arranged in various configurations, such as thin films which may be sprayed or deposited on a suitable substrate; a one or more (flat) layers which may be sprayed or deposited on a suitable substrate or as free-standing structures; as a plurality of rows and/or channels (e.g., as may be formed in a suitable electrode material, or as may be formed as a result of stacking various layers of an electrochemical cell, rolling a multilayered electrochemical cell, etc.) as would be understood by those having ordinary skill in the art upon reading the present disclosure.

Optionally, electrodes may be coated with a protective layer designed to facilitate or mitigate predetermined chemical or physical interactions with other components of the electrochemical cell, such as reactions that consume electrode active material, form dendritic structures extending from the electrode, etc. as would be understood by those having ordinary skill in the art upon reading the present disclosure. In like manner, an electrode may include a plurality of particles (e.g. of active material) dispersed within or throughout the volume of a binder such as a polymer matrix, and the binder may be or include material(s) that facilitate or mitigate desired or undesired interactions within the electrochemical cell, respectively. In still more approaches, electrolyte(s) may be operatively, chemically, or electrically coupled to a membrane or membrane(s) configured (e.g., according to physical characteristics such as porosity, lack of porosity, spatial arrangement, surface area, etc., or chemically configured, e.g. according to chemical composition, specific functionalization (e.g., of surface(s) of the membrane), etc.) to isolate the electrolyte and/or chemical species formed or derived therefrom from other components of the electrochemical cell.

Figure 12:
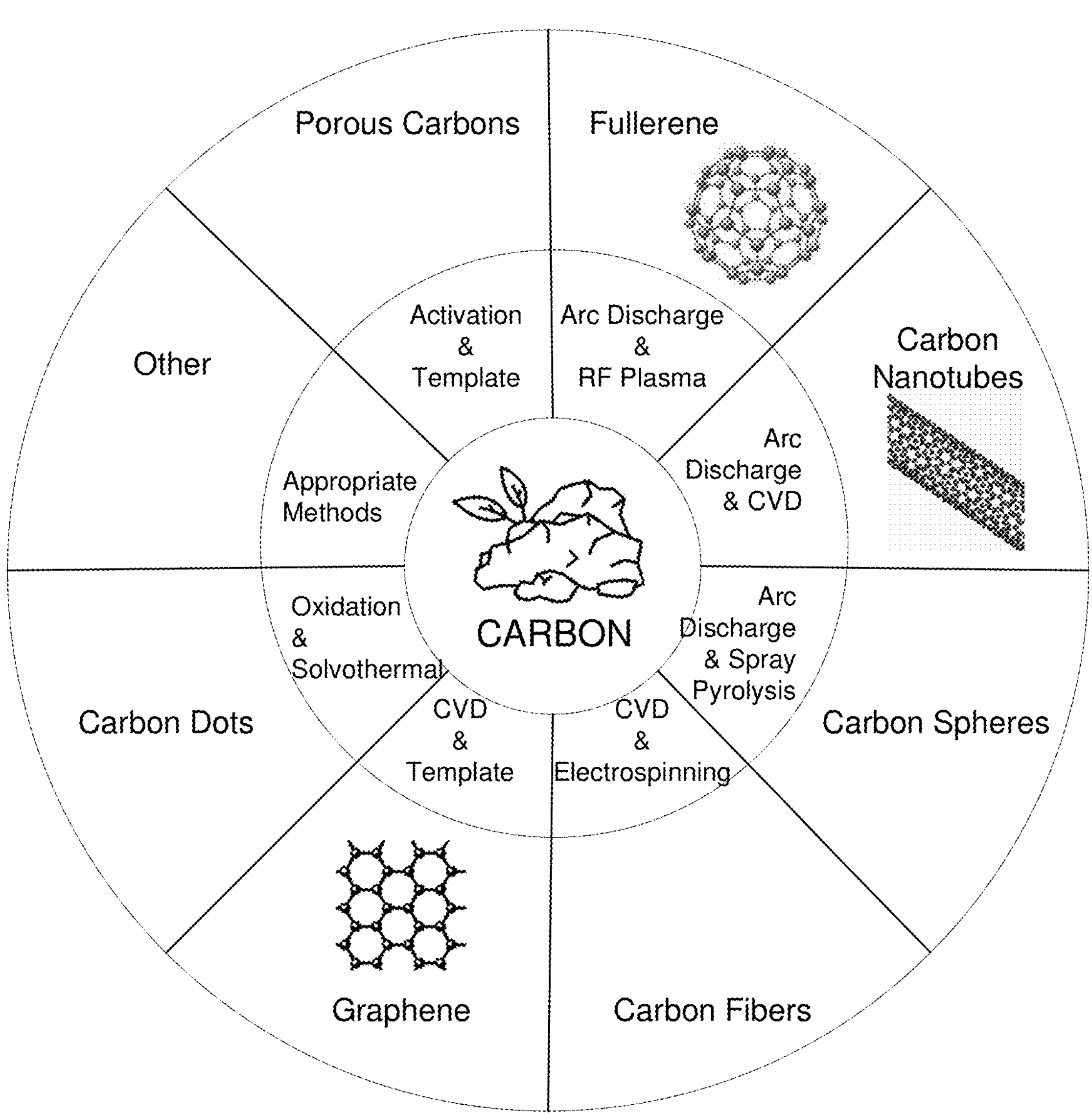
FIG. 12 is a chart showing various forms of carbonaceous material, and methods of producing the same from elemental carbon (e.g., charcoal), which may be included in various components of electrochemical cells such as shown in the foregoing Figures.

In particularly preferred approaches, electrodes may include one or more carbonaceous materials such as shown in FIG. 12 and described in greater detail hereinbelow.

It shall be appreciated that electrolytes in accordance with the presently disclosed inventive concepts may have any suitable chemical composition that would be understood by a person having ordinary skill in the art taking into consideration the particular context of the electrochemical cell, e.g., the chemical composition and structural arrangement of various other components included in the electrochemical cell.

Similarly, electrolyte(s) present in various electrochemical cells may be in liquid form, may be or include solid state electrolyte composition(s), may be or include gel-phase or gel-based electrolytes (such as gel polymer electrolytes), or any combination thereof that would be appreciated by those having ordinary skill in the art upon reading the present disclosure. Similarly, electrolytes may include semi-solid compositions such as gels, slurries, suspensions, etc. as would be appreciated by those having ordinary skill in the art upon reading the instant disclosure.

Separator(s), which may also be omitted in accordance with certain aspects of the inventive concepts described herein, may be or include any suitable composition or structure known in the art and which skilled artisans reading the present disclosure will appreciate are compatible with the inventive compositions and/or structures described herein. For instance, separator(s) may include impermeable, solid structures, semi-permeable membranes, selectively permeable compositions (i.e., compositions that are permeable to one or more predetermined chemical species, but impermeable or substantially impermeable to select, or all, other chemical species, according to various embodiments). For example, separators may be configured to physically, chemically, electrically, or otherwise functionally separate or segregate different components of the electrochemical cell from one another in order to avoid undesirable chemical reactions (such as parasitic reactions between electrolyte or derivatives thereof and electrodes, polysulfide shuttling, dendrite formation, etc. as would be understood by those having ordinary skill in the art upon reading the instant descriptions).

In addition, the exemplary electrochemical cells, in any configuration described herein or equivalents thereof that would be appreciated by those having ordinary skill in the art upon reading the instant disclosure, may include one or more mechanisms for mitigating or preventing polysulfide shuttling, dendrite formation, parasitic reactions between electrode(s) and electrolyte(s) (as well as species formed or derived from electrodes or electrolytes during operation of the electrochemical cell), or other chemical species present in the electrochemical cell environment. These mechanisms may be inherent to one or more of the exemplary structures described hereinabove (e.g., electrodes, separators, electrolytes, etc.), or may be specifically configured via specific modification, functionalization, structural arrangement, etc. of the particular components of the electrochemical cell. Any such characteristics, whether inherently present or specifically configured, are described in greater detail herein in accordance with various exemplary embodiments of the inventive concepts presently disclosed.

From the foregoing general descriptions and corresponding drawings, skilled artisans reviewing the present application will appreciate that, according to different implementations, electrochemical cells as described herein include a variety of components which each have a specific, core role in function of the electrochemical cell as a whole (e.g., electrodes facilitating electrical contact between electrolyte and an environment external to the electrochemical cell; separators serving to isolate or segregate various components, chemical species, etc. from one another within the electrochemical cell environment; and electrolyte facilitating charge transfer between electrodes of the electrochemical cell), the various components may optionally serve or convey one or more additional functions to the electrochemical cell. For instance, and as mentioned above, electrodes or separators may serve, in addition to their respective core roles, as current collectors, allowing omission of separate (often heavy, metal) structures dedicated to collecting current generated by the electrochemical cell.

In various aspects, any one or more component(s) of the electrochemical cell arrangements described herein may include one or more carbonaceous materials, including but not limited to those shown in FIG. 12. For example, certain components may include carbonaceous materials, carbonaceous materials may be included in addition to the various components shown and described with reference to FIGS. 8A-11, or both, as would be appreciated by those having ordinary skill in the art upon reading the present disclosures. In myriad embodiments, exemplary carbonaceous materials may include, without limitation, carbon black, carbon nano-onions (CNOs), necked CNOs, carbon nanospheres, graphite, pyrolytic graphite, graphene, graphene nanoparticles, graphene platelets, three-dimensional (3D) graphene, graphene oxides, fullerenes, hybrid fullerenes, single-walled nanotubes, multi-walled nanotubes, carbon dots, carbon spheres, porous carbons, carbon fibers, etc. as would be understood by skilled artisans upon reading the present descriptions. Additional details regarding the fabrication of select carbonaceous materials and characteristics thereof, particularly those shown in FIG. 12, are provided by Li, et al. "Synthesis, modification strategies and applications of coal-based materials", *Fuel Processing Tech.,* 230:1, 107203 (June 2022) (https://doi.org/10.1016/j.fuproc.2022.107203).

Moreover, the exemplary components of electrochemical cells described hereinabove, particularly as shown in FIGS. 8-11, may be present in a single cell "stack" (e.g., two opposing electrodes with corresponding separator, electrolyte, etc. arranged therebetween) or in a repeating (e.g., laminar) structure, according to various embodiments. A simplified repeating structure may, for example, include a first cathode (optionally coupled to a first cathode current collector) at one end of the electrochemical cell, which is immediately adjacent to a first electrolyte, which in turn is immediately adjacent to a first separator, which in turn is immediately adjacent to a second electrolyte, which in turn is immediately adjacent to a first anode (optionally coupled to a first anode current collector) positioned toward an opposing end of the electrochemical cell as the first cathode, collectively forming a single electrochemical cell layer. The repeating structure may further comprise additional electrolyte, separator, and electrode structures in a similar manner to form a multilayered, repeating pattern within the resulting electrochemical cell.

Whether including repeating structures or not, in various approaches, electrochemical cells may be manipulated, configured, arranged, etc. during fabrication of a larger structure (such as a battery). For instance, and as will be appreciated by those having ordinary skill in the art upon reviewing the inventive concepts described herein, in some approaches an electrochemical cell such as shown in FIG. 8B may be "rolled" around a central axis, forming a so-called "jelly roll" configuration, as shown in FIG. 8C according to one embodiment, which may be particularly suitable for certain arrangements or applications, such as for cylindrical or prismatic electrochemical cell embodiments, among others that skilled artisans will comprehend upon reviewing the present disclosure.

While the foregoing electrode, electrolyte, and separator components are the most common and critical aspects of the exemplary electrochemical cell as described herein, it shall be appreciated that according to various implementations electrochemical cells may, or may not, include any suitable combination or permutation of additional or alternative components, such as membranes, cans, caps, casings, wrappings, springs, wires, spacers, tabs, contacts, leads, gaskets, compressive structures or mechanisms, etc. as would be understood by a person having ordinary skill in the art upon reading the present descriptions.

Moreover, it shall be appreciated that persons having ordinary skill in the art may employ the various electrochemical cell embodiments described herein, including but not limited to coin cell arrangements, cylindrical cell arrangements, pouch cell arrangements, prismatic cell arrangements, etc. or any suitable equivalent(s) thereof that would be understood by said skilled artisan upon reading the present disclosure, in any effective permutation or combination, without departing from the scope of the inventive concepts in this disclosure. For instance, multiple of the same arrangements, combinations of different arrangements, or both, may be employed, e.g., to form a battery, or an assembly (e.g., a battery module, or a battery pack, etc. as would be understood by persons having ordinary skill in the art upon reading the present disclosure).

For example, those having ordinary skill in the art will appreciate that different arrangements described herein may have different advantages or disadvantages in the context of different applications, and may choose to employ the most advantageous arrangements of the particular application of interest. Additionally or alternatively, a skilled artisan may include different arrangements to provide robustness across different applications or working conditions to the resulting structure, providing flexibility of use, redundant failure points, or other advantage that would be understood by those having ordinary skill in the art in light of the particular application in mind.

As a concrete example, cylindrical cells are, relative to other arrangements described herein, are prone to cracking. Accordingly, a cylindrical cell arrangement such as shown in FIGS. 10A and 10B may not be applicable to or compatible with a prismatic cell configuration such as shown in FIG. 11, depending on the intended application for a given electrochemical cell, such as applications involving substantial and/or frequent application of mechanical forces (e.g. rapid acceleration/deceleration, vibration, etc. such as often experienced in vehicular applications. Similarly, pouch cell arrangements are particularly sensitive to volumetric expansion and contraction that occurs during natural operation and cycling of the electrochemical cell, and may require or benefit from additional support such as a compressive structure or internal mechanism (e.g. a polymeric support network such as described in U.S. Pat. No. 12,009,531, granted Jun. 11, 2024 and entitled "Internally enclosed support system for batteries, fabrication techniques and applications for the same", the contents of which are herein incorporated by reference).

Moreover, while exemplary electrochemical cell arrangements expressly described herein and shown in the various Figures include a pouch cell arrangement, a coin cell arrangement, a cylindrical cell arrangement, and a prismatic cell arrangement, other arrangements and/or components may be utilized without departing from the scope of the inventive concepts presented in this disclosure. For example, electrochemical cell arrangements may additionally or alternatively include components or be characterized by arrangements such as chassis, trays, packs, modules, assemblies, casings, etc. as would be understood by those having ordinary skill in the art upon reading the present disclosure.

Of course, the electrochemical cells described herein, according to various embodiments, may include external component(s) at least partially surrounding the electrochemical cell. For instance, exemplary external components may be selected from the group consisting of an external casing enclosing the electrochemical cell, a module operatively coupled to the electrochemical cell, an assembly operatively coupled to the electrochemical cell, a pack enclosing the electrochemical cell, a pouch enclosing the electrochemical cell, a can enclosing the electrochemical cell, a tray operatively coupled to the electrochemical cell, a pan operatively coupled to the electrochemical cell, and combinations thereof. The assembly may comprise: a parallel assembly, an in-series assembly, or a cell-to-chassis assembly. In still further embodiments, an electrochemical cell may be integrated into, or may be a part of, a structural component of the device to which the electrochemical cell is providing power, such as being integrated into a structural component of an electric vehicle.

The presently described inventive concepts include fabricating electrochemical cells of various types using additive manufacturing techniques, injection molding techniques, compression molding techniques, hybrid injection/compression molding techniques, preforming techniques, hand layup techniques, casting techniques, infusion techniques, sintering techniques, or any combination thereof that would be appreciated by a skilled artisan upon reading the present disclosure.

FIG. 13 illustrates a graph showing the rate of breakdown of additives in an electrolyte system over time 1300, in accordance with one embodiment. As an option, the graph showing the rate of breakdown of additives in an electrolyte system over time 1300 may be implemented in the context of any one or more of the embodiments set forth in any previous and/or subsequent Figures and/or description thereof. Of course, however, the graph showing the rate of breakdown of additives in an electrolyte system over time 1300 may be implemented in the context of any desired environment. Further, the aforementioned definitions may equally apply to the description below.

The graph includes a rate breakdown curve 1300 that illustrates how a rate of breakdown of additives 1302 changes along a time 1304 axis, demonstrating the dynamic nature of additive decomposition within the electrolyte system over the course of battery cycling. The rate of breakdown of additives 1302 may vary significantly as the battery undergoes charge and discharge cycles, attributed to factors such as changes in local chemical environment, electrode surface conditions, and evolving electrolyte composition.

The time 1304 axis represents the progression of battery cycling, which may span hundreds or thousands of cycles depending on the specific application and battery chemistry. As the time 1304 increases, the electrolyte system may undergo various phases of additive breakdown, including a distinct regime one 1306 visible on the rate breakdown curve 1300, characterized by an initial high rate of breakdown that subsequently decreases over time.

The high initial rate of breakdown in regime one 1306 may be attributed to the rapid consumption of additives designed to form a protective solid electrolyte interphase (SEI) layer on electrode surfaces. The composition of additives in the electrolyte system may be tailored to achieve specific breakdown profiles across different regimes, with additives of varying chemical stability selected to decompose at different rates and times during battery cycling. The rate of breakdown of additives 1302 in subsequent regimes may exhibit different characteristics compared to regime one 1306, reflecting the diverse roles of various additives in maintaining battery performance over extended cycling.

In various embodiments, the electrolyte system may incorporate temperature-responsive additives that exhibit altered breakdown rates as the battery's operating temperature changes during cycling. This temperature-dependent behavior may contribute to the overall shape of the rate breakdown curve 1300, allowing for adaptive performance optimization across different operational conditions and cycling stages.

In various embodiments, the electrolyte system may incorporate temperature-responsive additives that exhibit altered breakdown rates as the battery's operating temperature changes during cycling. These additives may be designed to leverage the principles of Gibbs free energy, where increasing temperature may lower the activation barrier required for certain reactions to occur. For example, an additive that typically breaks down at 3V vs Li/Li+ at 25° C. may decompose at a lower voltage, such as 2.9V or 2.8V, when the temperature rises to 45° C.

In various embodiments, the electrolyte system may utilize this temperature-dependent behavior to regulate itself and maintain optimal performance across different thermal conditions. For instance, at elevated temperatures, certain additives may be designed to break down within the battery's voltage window, potentially forming a thicker SEI layer. This thicker SEI may help counter the negative effects of high temperature on system longevity, albeit potentially at the cost of a slight reduction in capacity.

In various embodiments, the electrolyte system may include additives that break down in a way that causes the cell to reach its cutoff voltage more quickly at higher temperatures. Alternatively, the system may be designed to allow the charge/discharge rate to change inversely to the rate of reaction within the cell as temperature increases. These strategies may help maintain optimal reaction kinetics across different operating temperatures by self-regulating the cell's behavior.

In various embodiments, this temperature-dependent behavior of the additives may contribute to the overall shape of the rate breakdown curve 1300, allowing for adaptive performance optimization across different operational conditions and cycling stages. By carefully selecting and combining these temperature-responsive additives, the electrolyte system may be able to maintain more consistent performance and longevity across a wide range of operating temperatures, which is particularly beneficial for stationary storage applications where environmental conditions may vary significantly.

FIG. 14 illustrates a graph showing the rate of breakdown of additives in an electrolyte system 1400 over time, in accordance with one embodiment. As an option, the graph showing the rate of breakdown of additives in an electrolyte system 1400 over time may be implemented in the context of any one or more of the embodiments set forth in any previous and/or subsequent Figures and/or description thereof. Of course, however, the graph showing the rate of breakdown of additives in an electrolyte system 1400 over time may be implemented in the context of any desired environment. Further, the aforementioned definitions may equally apply to the description below.

The graph illustrates a rate of breakdown of additives 1402 plotted against a time 1404, with three distinct regimes identified. A regime one 1406 shows an initial period of additive breakdown, followed by a regime two 1408 which demonstrates a different rate of decomposition, and finally a regime three 1410 which exhibits yet another distinct breakdown rate profile. The rate of breakdown of additives 1402 shows varying slopes across the three regimes, with the steepest decline occurring in the regime one 1406 before transitioning to more gradual changes in the regime two 1408 and the regime three 1410.

In some cases, the regime one 1406 may correspond to the rapid breakdown of initial sacrificial additives designed to form a protective layer on electrode surfaces. These additives, selected for their high reactivity and low Lowest Unoccupied Molecular Orbital (LUMO) energies, may decompose quickly to establish an initial solid electrolyte interphase (SEI) layer, which serves as a foundation for subsequent interface development. The regime two 1408 may represent a period where secondary additives begin to break down, potentially reinforcing or modifying the SEI layer formed during the regime one 1406. This controlled decomposition, involving additives with intermediate LUMO energies and reactivity profiles, may contribute to the ongoing evolution of the protective interface, enhancing its stability and functionality.

In the regime three 1410, the rate of breakdown of additives 1402 may further decrease. This final regime may involve the slow, continuous breakdown of long-lasting additives that maintain the protective interface over extended cycling periods. These additives, which may be characterized by higher LUMO energies and lower reactivity, may ensure the longevity of the SEI layer by providing gradual reinforcement and repair mechanisms.

The varying slopes of the rate of breakdown of additives 1402 across the three regimes may reflect the diverse chemical properties and breakdown mechanisms of different additive components in the electrolyte system 1400, including factors such as molecular structure, functional groups, and interactions with other electrolyte components.

This controlled, multi-stage decomposition process may contribute to the formation of a robust and long-lasting SEI layer, optimized for long-term battery performance. The transition points between regimes may be influenced by factors such as battery cycling conditions, temperature fluctuations, and evolving electrode surface characteristics. The electrolyte system 1400 may be designed to respond dynamically to these changing conditions throughout the battery's operational lifetime, with additives selected to exhibit temperature-dependent reactivity and breakdown rates that align with the battery's thermal profile during cycling. This adaptive behavior allows the electrolyte system to maintain optimal SEI characteristics across a wide range of operational scenarios, contributing to enhanced cycle life and performance stability in stationary storage applications.

The multi-regime breakdown profile illustrated in FIG. 14 demonstrates a solution to the challenge of maintaining stable battery performance over extended cycling periods. By carefully selecting additives with complementary breakdown characteristics, the electrolyte system 1400 provides continuous protection and performance enhancement throughout the battery's lifecycle. The composition of additives can be tailored to achieve specific breakdown profiles across different regimes, with compounds of varying chemical stability selected to decompose at different rates and times during cycling. Additionally, the system may incorporate temperature-responsive additives that exhibit altered breakdown rates as the battery's operating temperature changes, contributing to the overall shape of the rate of breakdown curve and the characteristics of each regime.

This multi-regime approach can be optimized for specific battery chemistries, such as lithium-sulfur or lithium-ion systems, by adjusting the selection and combination of additives to address the unique challenges and requirements of different battery technologies. The resulting self-evolving SEI layer maintains its beneficial properties across various battery chemistries and operating conditions. This adaptive electrolyte system enables the formation of a robust and long-lasting protective interface, optimized for long-term performance in stationary storage applications, while responding dynamically to changing conditions throughout the battery's operational lifetime.

In various embodiments, this multi-regime approach may be optimized for specific battery chemistries, such as lithium-sulfur or lithium-ion systems, by adjusting the selection and combination of additives to address the unique challenges and requirements of different battery technologies. The resulting self-evolving electrode-electrolyte interface may maintain its beneficial properties across various battery chemistries and operating conditions.

In various embodiments, the adaptive electrolyte system may enable the formation of a robust and long-lasting protective interface, which may be particularly beneficial for battery chemistries with inherently unstable SEI layers, such as those involving lithium metal anodes. In these systems, where the SEI may grow and diminish with each cycle due to stripping and plating processes, the electrolyte composition may be tailored to enforce proper SEI evolution throughout the battery's operational lifetime.

In various embodiments, for lithium-sulfur batteries, the electrolyte system may incorporate additives specifically designed to mitigate polysulfide shuttling effects. For example, certain additives meant to break down on the anode may interact with sulfides to create a sulfur-rich SEI. This approach may be exemplified by the use of additives such as LiNO3, which may form $SO_x$ species and N2 gas upon decomposition, thereby modifying the SEI composition to better suppress polysulfide shuttling.

In various embodiments, the electrolyte system may also include additives that deposit on the cathode, forming a cathode electrolyte interphase (CEI). For instance, additives like dicyandiamide (DCDA) may contribute to the formation of a protective layer on the cathode surface, which may further help in managing polysulfide species and enhancing overall battery performance.

In various embodiments, this adaptive electrolyte system may respond dynamically to changing conditions throughout the battery's operational lifetime. By carefully selecting and combining additives with different breakdown characteristics and functionalities, the system may continuously optimize the electrode-electrolyte interface for long-term performance in stationary storage applications, while adapting to the specific requirements of different battery chemistries and evolving operational conditions.

Taking a step back, the present electrolyte system may also be designed to form and maintain a cathode electrolyte interface (CEI) in addition to the solid electrolyte interphase (SEI) on the anode. The CEI may play a crucial role in protecting the cathode surface, mitigating unwanted side reactions, and enhancing overall battery performance. Similar to the SEI formation process, the development of the CEI may be influenced by carefully selected additives that decompose in a controlled manner over time.

In various embodiments, the formation and evolution of the CEI may be guided by considerations of the Highest Occupied Molecular Orbital (HOMO) energies of the electrolyte components and additives, as has been discussed hereinabove. Additives with HOMO energies appropriately aligned with the cathode's electrochemical potential may be more likely to participate in oxidative decomposition reactions at the cathode surface, contributing to the formation of a stable and protective CEI. This process may be analogous to how additives with suitable Lowest Unoccupied Molecular Orbital (LUMO) energies contribute to SEI formation on the anode.

Additionally, in various embodiments, the multi-regime breakdown profile of additives may be tailored to support both SEI and CEI formation and maintenance throughout the battery's lifecycle. For example, certain additives may be designed to break down preferentially at the cathode surface during early cycles, establishing an initial CEI layer. Subsequently, other additives may decompose more gradually, reinforcing and modifying the CEI over time to maintain its protective properties. This approach may help to mitigate cathode degradation mechanisms such as transition metal dissolution and unwanted surface reactions, potentially contributing to enhanced long-term cycling stability.

In various embodiments, the electrolyte system may be designed with a predetermined sequence of additive breakdown, comprising multiple distinct regimes. In some embodiments, this sequence includes a first regime characterized by rapid breakdown of initial sacrificial additives, a second regime characterized by gradual decomposition of secondary additives, and a third regime characterized by slow, continuous breakdown of long-lasting additives. This staged decomposition process allows for the formation and evolution of a robust solid electrolyte interphase (SEI) layer over the battery's operational lifetime.

In various embodiments, the electrolyte system may be designed with a predetermined sequence of additive breakdown, comprising multiple distinct regimes. While one exemplary sequence has been described, it is important to note that the invention is not limited to this specific order or number of regimes. The electrolyte system may be configured with various alternative sequences to suit different battery chemistries, operating conditions, or performance requirements.

For example, in some embodiments, the sequence may be reversed, with long-lasting additives breaking down first, followed by secondary additives, and finally rapid-breakdown sacrificial additives. In other embodiments, the system may incorporate more than three regimes, each with its own characteristic breakdown rate and purpose. Some configurations may involve overlapping regimes, where multiple types of additives break down simultaneously but at different rates.

The flexibility in designing these breakdown sequences may allow for fine-tuning of the SEI formation process to optimize various aspects of battery performance, such as initial capacity, long-term stability, or resistance to specific degradation mechanisms. The exact nature and order of these regimes may be adjusted based on factors such as the intended application, expected operating temperature range, desired cycle life, and specific challenges associated with the chosen battery chemistry.

In various embodiments, the electrolyte system may form a self-evolving electrode-electrolyte interface on the electrode surface through the breakdown of sacrificial additives. This interface may take various forms, including but not limited to: a self-evolving solid electrolyte interphase (SEI), a dynamic interfacial layer, an adaptive electrode-electrolyte boundary layer, a self-regenerating protective film, an in-situ formed passivation layer, a continuously evolving electrode surface layer, a self-modifying electrode-electrolyte barrier, an electrochemically-formed interface layer, a dynamically-developing electrode protection layer, or an adaptively-forming electrolyte-electrode interphase. The specific form and properties of this interface may be tailored through careful selection and combination of electrolyte components to optimize battery performance for stationary storage applications.

In various embodiments, the self-evolving electrode-electrolyte interface may be configured to perform multiple functions critical to battery performance and longevity. These functions may include mitigating polysulfide shuttling effects, particularly in lithium-sulfur battery chemistries, enhancing long-term cycling stability, improving capacity retention, and maintaining consistent ionic conductivity across a range of operating conditions. The interface's ability to adapt and evolve in response to changing conditions within the battery may contribute significantly to achieving ultra-high cycle life in stationary storage applications. For instance, additives such as LiNO3 or other nitrates may play a role in suppressing polysulfide shuttling.

In various embodiments, the electrolyte system may enable ultra-high cycle life suitable for long-term stationary storage applications. This ultra-high cycle life may comprise significantly more charge-discharge cycles with less capacity fade compared to conventional systems not including a sacrificial additive. The ability to maintain such performance over extended cycling periods is critical for grid-scale energy storage and other stationary applications where frequent battery replacement is impractical or cost-prohibitive.

In some cases, the electrolyte system may contribute to achieving hundreds or even thousands of charge-discharge cycles with minimal capacity fade. While the exact performance metrics may vary depending on specific operating conditions and battery chemistries, the system is designed to push the boundaries of current energy storage capabilities. This extended cycling ability may translate to significantly reduced maintenance requirements and lower total cost of ownership for large-scale stationary storage installations.

It's important to note that actual performance in real-world applications may differ from laboratory conditions, and ongoing research and development efforts continue to explore the full potential of these advanced electrolyte systems. The goal is to provide a robust foundation for next-generation energy storage solutions that can meet the demanding requirements of long-term grid stability and renewable energy integration.

FIG. 15 illustrates a listing of fluoroether additives 1500, in accordance with one embodiment. As an option, the listing of fluoroether additives 1500 may be implemented in the context of any one or more of the embodiments set forth in any previous and/or subsequent Figures and/or description thereof. Of course, however, the listing of fluoroether additives 1500 may be implemented in the context of any desired environment. Further, the aforementioned definitions may equally apply to the description below.

The listing of fluoroether additives 1500 encompasses a wide range of additives, including tetrafluoro-dimethoxybutanes, fluoroethyl ethers, and fluorinated phosphates, with compounds connected through pathways that indicate similarities in molecular structure and functional groups. Such fluoroether additives may be found below in Table 4.

TABLE 4

| Listing of Fluoroether Additives |
| --- |
| 2,2,3,3-tetrafluoro-1,4-dimethoxybutane (FDMB) |
| bis(2,2,2,trifluoroethyl)ether(BTFE) |
| 1H,1H,5H-octafluoropentyl1,1,2,2-tetrafluoroethylether (OFE) |
| (1,1,2,2-tetrafluoroethyl2,2,3,3-tetrafluoropropylether(TTE) |
| 2,2,2-trifluoroethyl1,1,2,2-tetrafluoroethylether (TFETFE) |
| 1,1,2,2-tetrafluoroethylisobutylether (TFEIE) |
| 1,1,2,3,3,3-hexafluoropropyl2,2,2-trifluoroethylether (THE) |
| methoxyperfluorobutane(MPB) |
| bis(2,2-difluoroethyl)ether(DFE) |
| 2,2,2-trifluoroethylmethylether(TFEME) |
| bis(2-fluoroethyl)ether(BFE) |
| 3-fluoropyridine(3FP |
| 1,2-(1,1,2,2-tetrafluoroethoxy)ethane(TFEE) |
| 1,2-dimethoxy-1,1,2,2-tetrafluoroethane(DMETF) |
| 2-methyl-1(1,1,2,2-tetrafluoroethoxy)propane(TFEIBE) |
| bis(2,2,3,3,3-pentafluoropropyl)ether(BPFPE) |
| allyl2,2,3,3,3-pentafluoropropylether(APFPE) |
| 2,2-dimethoxy-4-trifluoromethyl-1,3-dioxolaneether(DTDL) |
| 1,1,1-trifluoro-2-(2-(2-(2,2,2-trifluoroethoxy)ethoxy)ethoxy)ethane(FDG) |
| 1,1,1,14,14,14-hexafluoro-3,6,9,12-tetraoxatetradecane(FTrG) |
| 1,1,1,17,17,17-hexafluoro-3,6,9,12,15-pentaoxaheptadecane(FTeG) |
| 2,2,2-trifluoroethyl2-fluoroethylether(TFFE) |
| 1,1-difluoroethyl-2-fluoroethylether(DFE) |
| fluorinated1,4-dimethoxylbutane(FDMB) |
| bis(2,2,3,3-tetrafluoropropyl)ether)(BTFPE) |
| 2,2,2-trifluoroethyl1,1,2,2-tetrafluoroethylether(TFTFE) |
| tris(2,2,2-trifluoroethyl)phosphate |

TABLE 4-continued

| Listing of Fluoroether Additives |
| --- |
| bis(2,2,2-trifluoroethyl)methylphosphonate |
| alpha-beta functionalized isosorbide (ISDN) |

The listing of fluoroether additives 1500 may serve multiple purposes in optimizing the electrolyte system's performance. It enables the identification of compounds with complementary properties, potentially leading to synergistic combinations that enhance overall battery performance. The selection of additives can be tailored to address specific challenges, such as improving cycle life, capacity retention, or rate capability. Furthermore, the listing aids in choosing additives with suitable thermal stability and decomposition characteristics for high-temperature operation, which is particularly relevant for stationary storage applications where elevated temperatures may be encountered. It is to be appreciated that other additives of similar chemical types and properties may be likewise included in the Table 4.

FIG. 16 illustrates a lithium salt additive listing 1600, in accordance with one embodiment. As an option, the lithium salt additive listing 1600 may be implemented in the context of any one or more of the embodiments set forth in any previous and/or subsequent Figures and/or description thereof. Of course, however, the lithium salt additive listing 1600 may be implemented in the context of any desired environment. Further, the aforementioned definitions may equally apply to the description below.

The lithium salt additive listing 1600 encompasses a diverse range of lithium-containing compounds that may be used as ion-transporting components in electrolyte compositions. This comprehensive list includes compounds listed below in Table 5.

TABLE 5

| Listing of Lithium Salts Additives |
| --- |
| lithium bis(trifluoromethanesulfonyl)imide (LiTFSI) |
| lithium nitrate (LiNO3) |
| lithium Perchlorate (LiClO4) |
| lithium difluoro(oxalato)borate (LiDFOB) |
| lithium bis (oxalato)borate (LiBOB) |
| lithium trifilate (LiTf) |
| lithium bis(pentafluoroethanesulfonyl)imide (LiBETi) |
| lithium bis(fluorosulfonyl)imide (LiFSI) |
| Lithium trifluoroacetate (LiTFAc) |
| lithium iodide |
| lithium bromide |
| Lithium tetrafluoroborate |

The selection and combination of these salts can be tailored to optimize various aspects of electrolyte performance, including ionic conductivity, electrochemical stability, and compatibility with other system components. Factors such as anion structure, concentration, decomposition behavior, and degree of fluorination play significant roles in determining the properties and effectiveness of the resulting electrolyte system.

The lithium salt additive listing may be used to maintain stable ionic conductivity and electrochemical performance over extended cycling periods in battery applications. By providing a wide array of options, it enables the development of synergistic salt combinations that can simultaneously address multiple performance aspects, such as enhancing both ionic conductivity and solid electrolyte interphase (SEI) stability. This versatility extends to advanced applications, where the listing can be used to create spatially varied salt concentrations within a single cell or to optimize performance across different cells in a battery pack. Furthermore, when used in conjunction with fluoroether additives 1500, the lithium salt additive listing 1600 may facilitate the creation of electrolyte systems with enhanced compatibility between lithium salts and fluorinated components, potentially leading to improved salt dissociation and ionic transport properties. This comprehensive approach to electrolyte formulation allows for the fine-tuning of local electrochemical environments and the leveraging of different salt combinations to optimize overall battery pack performance, addressing the complex requirements of various battery chemistries and applications. It is to be appreciated that other additives of similar chemical types and properties may be likewise included in the Table 5.

FIG. 17 illustrates a sacrificial additive listing 1700, in accordance with one embodiment. As an option, the sacrificial additive listing 1700 may be implemented in the context of any one or more of the embodiments set forth in any previous and/or subsequent Figures and/or description thereof. Of course, however, the sacrificial additive listing 1700 may be implemented in the context of any desired environment. Further, the aforementioned definitions may equally apply to the description below.

The sacrificial additive listing 1700 may include compounds as found in Table 6.

TABLE 6

| Listing of SEI-Forming Additives |
| --- |
| Dicyandiamide (DCDA) |
| acetonitrile |
| azobisisobutyronitrile (AIBN) |
| cyanamide |
| lithium dicyanamide |
| dicyandiamide (DCDA) |
| guanine |
| guanidine nitrate |
| guanidine thiocyante |
| guanidine p-tolunesulfonate |
| guanidine trifluoromethanolate |
| 2-guanidinobenzimidazole |
| guanidine hydrochloride |
| guanidine carbonate |
| guanidine bromide |
| guanidine iodide |
| guanidine acetate |
| guanidine sulfate |
| guanidine phosphate |
| succionitrile |
| 2,5-dichloropyrazine |
| 2,6-dichloropyrazine |
| 4-Mercaptopyridine |
| Pyridine-4-thiol |
| Amyl Nitrate |
| Cerium Nitrate |
| 2-bromoacetamide |
| 1,1,2,2,3,3-hexafluoropropane-1, 3-disulfonimide potassium salt |
| Polyvinylpyrolidine |
| cis-diamminedichloroplatinum(II) (CDDP) |
| H2O |
| 1,3,6-hexanetricarbonitrile |
| dimethylformamide (DMF) |
| Magnesium Nitrate |
| N-Methyl-2-pyrrolidone (NMP |
| N,N-dimethyltrifluoromethanesulfonamide (DMCF3SA) |
| N-Propyl-N-methylpyrrolidinium Bis(fluorosulfonyl)imide (PYR13 TFSI) |
| 2,3-Dichloro-5,6-dicyano-1,4-benzoquinone (DDQ) |
| 2,6-Dichloro-5,6-dicyano-1,4-benzoquinone (DCBQ) |
| 1,2-Dimethyl-3-propylimidazolium Iodide |
| Ethoxy (pentafluoro) cyclotriphosphazene (PFPN) |
| methyl trifluoroacetate |

TABLE 6-continued

| Listing of SEI-Forming Additives |
|---|
| 3,5-Bis(trifluoromethyl)benzenethiol (BTB) |
| 1,2-Difluorobenzene (1,2DfB) |
| 3,4,9,10-Perlenetetracarboxylic diimde (PTCD) |
| Benzo[ghi]perylene (BGP) |
| Cesium Fluoride |

The sacrificial additive listing 1700 includes compounds with varying degrees of reactivity, decomposition rates, molecular weights, solubilities, and other physical properties. This diversity enables the design of electrolyte systems with staged breakdown of sacrificial additives, contributing to the formation and evolution of the solid electrolyte interphase (SEI) layer over time. By providing a wide range of additives with different characteristics, the listing facilitates the formulation of electrolyte systems with optimized SEI formation and evolution throughout the battery's lifecycle, addressing challenges in maintaining stable performance over extended cycling periods. The listing also allows for the development of complementary additive combinations that can enhance both initial SEI formation and long-term stability, as well as the design of electrolyte systems with varying additive concentrations or ratios across different regions of a battery cell to tailor local electrochemical environments and optimize performance at specific interfaces.

In various embodiments, the sacrificial additive listing 1700 may be used in conjunction with the fluoroether additives 1500 and the lithium salt additive listing 1600 to create comprehensive electrolyte systems, potentially leading to enhanced overall performance and stability. Additionally, the listing may be employed in battery packs containing cells with different additive formulations, allowing for optimization of overall pack performance by leveraging the strengths of various additive combinations in specific cells or regions. This approach demonstrates the versatility and potential of the sacrificial additive listing 1700 in addressing the complex requirements of advanced battery systems and enabling the development of more efficient and durable energy storage solutions. It is to be appreciated that other additives of similar chemical types and properties may be likewise included in the Table 6.

In various embodiments, the selection and combination of fluoroether additives (FIG. 15), lithium salt additives (FIG. 16), and sacrificial additives (FIG. 17) may be guided by their molecular orbital characteristics, particularly their Highest Occupied Molecular Orbital (HOMO) and Lowest Unoccupied Molecular Orbital (LUMO) energies. These properties may play a crucial role in determining the breakdown sequence and timing of additives, contributing to the multi-regime profile shown in FIG. 14.

In various embodiments, the HOMO and LUMO energies of the selected additives may be carefully considered to achieve desired decomposition behaviors. The LUMO energy may be particularly relevant for additives intended to break down at the anode, as molecules with lower LUMO energies may be more likely to undergo reduction. Conversely, the HOMO energy may be more critical for additives designed to interact with the cathode, where higher HOMO energies may indicate a greater tendency for oxidation.

In various embodiments, the electrolyte system may incorporate additives with a range of HOMO and LUMO energies to create a staged decomposition process. Additives with lower LUMO energies may be selected for early breakdown, contributing to the initial formation of the solid electrolyte interphase (SEI). Those with higher LUMO energies may be chosen for later stages of cycling, potentially providing long-term stability and protection.

In various embodiments, the selection of additives may also consider the electrochemical window defined by the energy gap (Eg) between the HOMO and LUMO of the electrolyte components. This window may be tailored to ensure compatibility with the Fermi energies of the anode ($\mu A$) and cathode ($\mu C$). For optimal stability, the LUMO of the electrolyte may be designed to be higher than $\mu A$, while the HOMO may be kept lower than $\mu C$, unless intentional SEI or cathode passivation layer formation is desired.

In various embodiments, the Gibbs free energy of the additives may also be taken into account, as it incorporates kinetic factors such as activation barriers. The system may be designed with the hypothesis that the activation barriers for certain additives may be lowered throughout the course of cycling, allowing for their reduction to occur towards the end of the battery's life. This approach may contribute to the multi-regime breakdown profile and help maintain performance over extended cycling periods.

In various embodiments, the combination of additives with varying HOMO and LUMO energies, along with considerations of Gibbs free energy and activation barriers, may allow for the creation of a comprehensive electrolyte system that exhibits the desired multi-regime breakdown profile. This carefully orchestrated decomposition sequence may contribute to enhanced overall performance and stability in advanced battery systems, particularly for long-term stationary storage applications.

FIG. 18 illustrates a graph showing the rate of breakdown of additives over time in different regimes 1800, in accordance with one embodiment. As an option, the graph showing the rate of breakdown of additives over time in different regimes 1800 may be implemented in the context of any one or more of the embodiments set forth in any previous and/or subsequent Figures and/or description thereof. Of course, however, the graph showing the rate of breakdown of additives over time in different regimes 1800 may be implemented in the context of any desired environment. Further, the aforementioned definitions may equally apply to the description below.

The graph illustrates the evolution of additive breakdown rates in an electrolyte system over an extended operational period, potentially spanning several years for stationary energy storage applications. The horizontal axis, denoted by the year indicator 1800, represents the battery's lifespan, while the vertical axis, marked by the breakdown rate indicator 1802, quantifies the decomposition or reaction rate of electrolyte additives. The time indicator 1804 segments the graph into distinct regimes, offering a nuanced view of how various electrolyte components evolve throughout the battery's lifecycle. This temporal segmentation reveals three distinct phases: regime one indicator 1806, regime two indicator 1808, and regime three indicator 1810, each characterized by unique breakdown rate profiles.

In various embodiments, the optimal concentrations and ratios of various additives to achieve the staged decomposition across the three regimes described in FIG. 18 may be determined through a combination of experimental results, literature research, and computational modeling techniques. For example, in various embodiments, Density Functional Theory (DFT) calculations may be employed to predict the chemical stability and decomposition behavior of different additives in the electrolyte system. These computational models may provide insights into the relative decomposition potentials and reaction pathways of various additives, helping to inform the selection and concentration of components for each regime.

In various embodiments, cyclic voltammetry experiments may be conducted to observe the real-world behavior of additive decomposition. While this technique may not always provide highly granular data, it may offer valuable information on the overall decomposition trends and potential interactions between different additives under actual operating conditions.

In various embodiments, extensive literature searches may be performed to gather information on the chemical stability of various additives against common electrolyte components such as LiTFSI or DME. This compiled knowledge from previous studies may contribute to the initial selection and concentration estimates for additives in each regime. Further, iterative experimental testing may be conducted to fine-tune the relative amounts of additives and adjust the timing of each regime. Through careful observation of decomposition patterns and their effects on battery performance, the electrolyte composition may be progressively refined to achieve the desired staged breakdown profile.

In various embodiments, the combination of these methods—computational modeling, experimental testing, and literature review—may allow for the development of a comprehensive understanding of additive behavior within the electrolyte system. This multi-faceted approach may enable the optimization of additive concentrations and ratios to achieve the desired multi-regime decomposition profile, potentially leading to enhanced long-term performance and stability in stationary energy storage applications.

The graph in FIG. 18 illustrates the rate of breakdown of additives over time in different regimes, characterized by the year indicator 1800, breakdown rate indicator 1802, and time indicator 1804. The three distinct regimes—regime one indicator 1806, regime two indicator 1808, and regime three indicator 1810—represent a staged decomposition process of different additive species within the electrolyte system.

In regime one indicator 1806, the electrolyte system is configured to primarily consume species 3. This species is designed to break down rapidly, forming an initial protective layer on electrode surfaces. The high initial breakdown rate of species 3 contributes to the formation of a primary solid electrolyte interphase (SEI) layer. As species 3 is depleted, the overall breakdown rate begins to decrease, transitioning the system into the next regime.

Regime two indicator 1808 is characterized by the consumption of species 2. This species is engineered to decompose more gradually than species 3, resulting in a lower overall breakdown rate. The decomposition of species 2 serves to reinforce and modify the SEI layer formed during the first regime. This process helps to maintain and enhance the protective interface as the battery continues to cycle.

In regime three indicator 1810, the system transitions to consuming species 1. This species is designed for slow, continuous breakdown over extended periods. The decomposition of species 1 results in the lowest breakdown rate among the three regimes, contributing to the long-term maintenance of the protective interface. This regime is crucial for sustaining battery performance over numerous cycles.

As such, the electrolyte system shown is configured so that as each species is reduced or eliminated, the next species in the sequence takes over the role of protective layer formation and maintenance. This staged approach allows for a controlled, gradual decrease in the overall rate of decomposition throughout the battery's lifecycle. By carefully selecting and arranging these species based on their respective breakdown rates, the electrolyte system can maintain optimal additive breakdown and SEI formation throughout extended battery cycling, contributing to enhanced long-term stability and performance in stationary storage applications.

FIG. 19 illustrates a three-dimensional graph showing relationships between reaction parameters in an electrolyte system 1900, in accordance with one embodiment. As an option, the three-dimensional graph showing relationships between reaction parameters in an electrolyte system 1900 may be implemented in the context of any one or more of the embodiments set forth in any previous and/or subsequent Figures and/or description thereof. Of course, however, the three-dimensional graph showing relationships between reaction parameters in an electrolyte system 1900 may be implemented in the context of any desired environment. Further, the aforementioned definitions may equally apply to the description below.

The three-dimensional graph in FIG. 19 illustrates the complex relationships between reaction parameters in the electrolyte system, with each axis representing a key aspect of the system's behavior. First, the reaction progress 1902 axis represents the progression of specific reactions or sets of reactions within the electrolyte system. This axis may correspond to the extent of reaction completion or the concentration of reactants and products over time. It allows tracking of key chemical species evolution throughout the battery's operational lifecycle.

The reaction speed 1904 axis quantifies the speed at which reactions occur within the electrolyte system. This axis reflects factors such as temperature, catalyst presence, or concentration of reactive species that influence reaction kinetics. It can be used to identify rate-limiting steps or optimize reaction conditions for improved battery performance.

Further, the reaction acceleration 1906 axis illustrates how reaction rates evolve over time or in response to changing conditions. This axis captures the dynamic nature of the reaction environment as the battery cycles through different operational states, revealing important transitions or inflection points in the system's behavior.

To balance these parameters and achieve a staged rate of breakdown, the battery composition can be tuned through various strategies. Multiple additive integration allows for the incorporation of additives with different reactivity profiles, maintaining desired reaction rates over time. For instance, highly reactive additives may initiate rapid SEI formation, followed by more stable additives for long-term SEI maintenance. Concentration gradients can create staged breakdown profiles by varying additive concentrations, with higher concentrations of rapidly-reacting species used initially, followed by more stable species. Temperature-responsive additives enable dynamic responses to cycling temperature fluctuations, maintaining optimal reaction rates across various operating conditions.

In various embodiments, the model presented in FIG. 19 may be utilized to predict long-term battery performance in real-world stationary storage applications. By mapping the trajectory of the electrolyte system through the three-dimensional space over time, researchers and engineers may gain insights into how the reaction dynamics evolve throughout the battery's operational lifetime. This approach may allow for the identification of potential performance bottlenecks, degradation mechanisms, or optimal operating conditions that could impact long-term stability and efficiency.

In various embodiments, the model may enable a person of ordinary skill in the art to discern which additives break down at specific times and with what level of aggressiveness. This information may be used for fine-tuning the electrolyte composition to achieve desired performance characteristics over extended periods. The model may also help in predicting how the breakdown of various additives might interact and influence overall system behavior, potentially revealing synergistic or antagonistic effects that could impact battery longevity.

In various embodiments, it is important to note that the breakdown profile of additives may not remain constant from cycle to cycle. The solid electrolyte interphase (SEI) may undergo continuous changes, which could alter the electrode's energy state and subsequently affect how additives break down. These changes may include variations in thickness, material composition, and porosity of the SEI layer. To address this dynamic nature of the system, a diverse array of additives may be incorporated into the electrolyte formulation. This approach may aim to maintain the SEI's protective properties despite its evolving composition and structure throughout the battery's lifecycle.

Further, in various embodiments, the model may be used to simulate and predict these cycle-to-cycle variations in additive breakdown and SEI evolution. By considering a range of possible trajectories through the three-dimensional space, researchers may gain a more comprehensive understanding of the potential long-term behaviors of the electrolyte system. This information may be valuable for developing more robust and adaptive battery management strategies that can respond to the changing characteristics of the electrolyte and SEI over time, potentially extending the useful life of stationary storage systems in real-world applications.

Additionally, synergistic additive combinations can create complex reaction profiles balancing rapid initial SEI formation with long-term stability, potentially producing nonlinear effects visible on the grid of FIG. 19. Spatially varied compositions allow for tuning reactions to progress at different rates in different battery areas, optimizing performance at specific interfaces while maintaining overall stability. Catalytic additives can modulate reaction rates without significant consumption, influencing the reaction speed 1904 axis without substantially altering the reaction progress 1902 progression. Lastly, sacrificial species sequencing, where additives break down in a specific order, can create a stepped profile on the reaction acceleration 1906 axis, enabling precise control over long-term reaction dynamics.

By carefully balancing these approaches, the electrolyte system can be tuned to achieve a desired trajectory through the three-dimensional space represented in FIG. 19. This allows for optimization of the SEI formation process, long-term stability, and overall battery performance across its operational lifetime.

In various embodiments, the grid highlights areas of rapid change, stability, or transition between different reaction states, potentially revealing patterns or trends that correspond to the breakdown regimes of additives observed in previous figures such as FIG. 14. These patterns may inform the design and optimization of the electrolyte system composition, allowing for fine-tuning of additive combinations and concentrations to achieve desired performance characteristics. The three-dimensional graph exemplifies a resolution to challenges in understanding and controlling complex reaction dynamics within battery systems, offering insights into the behavior of the electrolyte system across various operational conditions and time scales.

In various embodiments, the three-dimensional graph may be utilized for multiple purposes in battery system optimization and management. It can be used to identify regions of desirable reaction behavior, which may correspond to optimal additive combinations or concentrations. The graph may also be integrated with a heat management system to identify optimal thermal conditions for desired reaction outcomes and SEI formation. Furthermore, the graph serves as a powerful predictive tool for battery management systems. By mapping the current state of the electrolyte system, the system can anticipate upcoming changes in reaction dynamics and proactively adjust operational parameters to maintain optimal performance throughout the battery's lifecycle. This comprehensive approach to visualizing and analyzing reaction dynamics enables more sophisticated control strategies and performance optimization for advanced battery systems.

In various embodiments, the interpretation and representation of the axes in FIG. 19 may be further refined to provide a more comprehensive view of the reaction dynamics within the electrolyte system. The reaction speed 1904 axis may be understood to indicate both the rate and extent of reactions that have occurred. This axis may provide insights into how quickly reactions are progressing as well as how far they have advanced at any given point.

In various embodiments, to address the temporal aspect of reaction dynamics, the reaction acceleration 1906 axis may be considered in relation to time. This approach may allow for a more nuanced understanding of how reaction rates change over the course of the battery's operational lifetime. By incorporating a time-bound element, either explicitly on one of the axes or implicitly in the interpretation of the reaction acceleration axis, the graph may offer a more dynamic representation of the evolving reaction landscape within the electrolyte system.

In various embodiments, the relationship between the reaction progress 1902, reaction speed 1904, and reaction acceleration 1906 axes may be conceptualized as a time-dependent trajectory through the three-dimensional space. This perspective may enable researchers and engineers to visualize how the reaction dynamics evolve over time, potentially revealing patterns or cycles that correspond to different stages of battery operation or degradation.

In various embodiments, the time-bound nature of the reaction dynamics may be incorporated into the analysis and interpretation of the graph, even if not explicitly represented on an axis. This approach may involve considering how the position of a point in the three-dimensional space changes over time, effectively adding a fourth dimension to the analysis. Such an interpretation may provide valuable insights into the long-term behavior of the electrolyte system and its components, aiding in the prediction and optimization of battery performance over extended operational periods.

Figure 20:
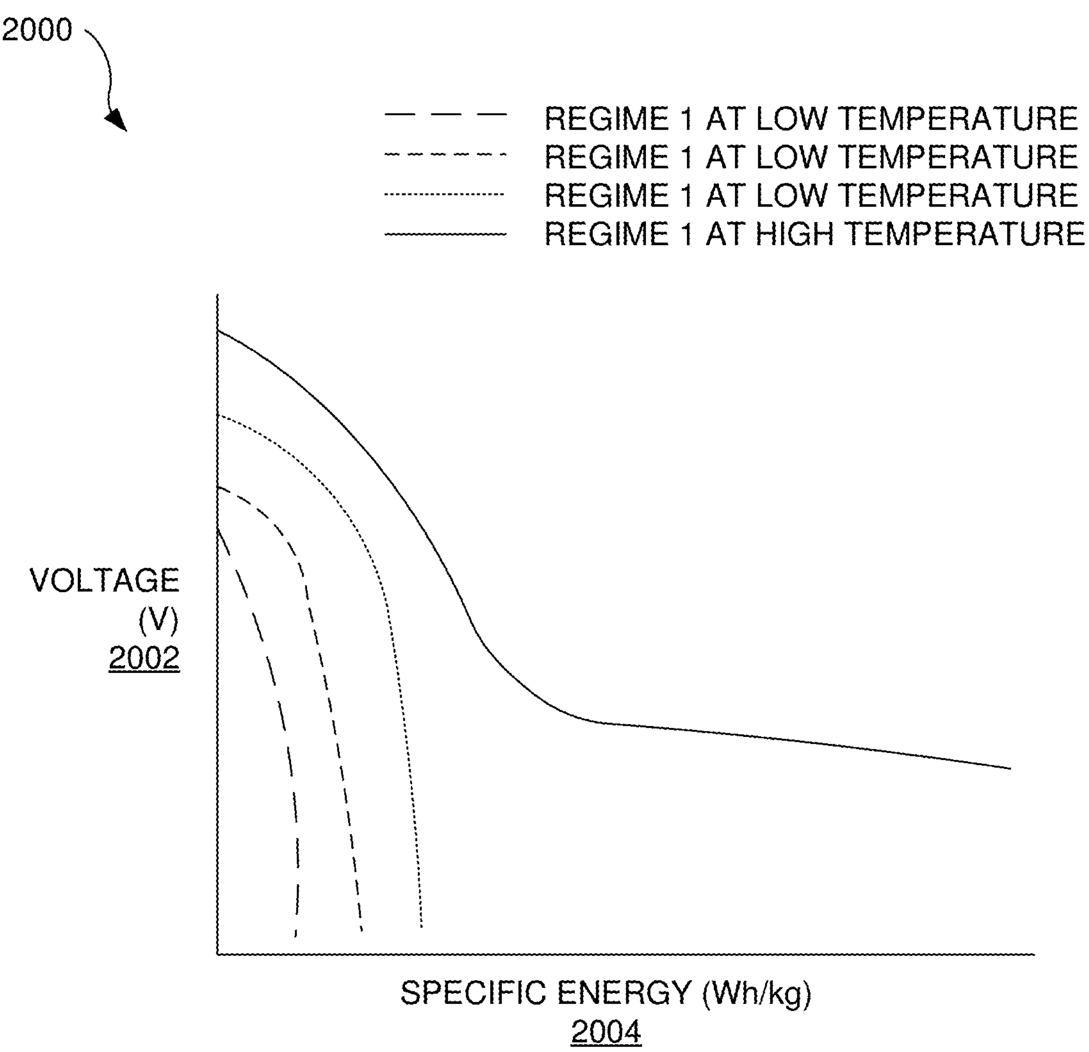
FIG. 20 illustrates a graph showing voltage versus specific energy characteristics at different temperatures for an electrolyte system, in accordance with one embodiment.

FIG. 20 illustrates a graph 2000 showing voltage versus specific energy characteristics at different temperatures for an electrolyte system, in accordance with one embodiment. As an option, the graph 2000 may be implemented in the context of any one or more of the embodiments set forth in any previous and/or subsequent Figures and/or description thereof. Of course, however, the graph 2000 may be implemented in the context of any desired environment. Further, the aforementioned definitions may equally apply to the description below.

As shown, FIG. 20 depicts a graph showing voltage versus specific energy characteristics at different temperatures for the inventive electrolyte system, all based on a single regime (indicated as "Regime 1"). The graph 2000 plots voltage along the voltage axis 2002 against specific energy along the specific energy axis 2004. Multiple curves are shown representing discharge behavior under different temperature conditions, including low temperature 1, low temperature 2, low temperature 3, and high temperature.

The graph demonstrates distinct discharge profiles across the specific energy axis 2004, with the high temperature curve maintaining higher voltage levels compared to the low temperature curves. The curves corresponding with lower temperature conditions show earlier voltage drops and shorter plateau regions. This behavior demonstrates the challenges faced by the electrolyte system at lower temperatures, where reaction kinetics and mass transport processes may be slowed.

In various embodiments, at elevated temperatures, the mobility of lithium ions and the solubility of active species may be increased, leading to more efficient utilization of the electrode materials and resulting in higher specific energy output. In various embodiments, the electrolyte system's performance across different temperatures may be further optimized by adjusting the concentrations and ratios of its components. For example, the content of temperature-responsive additives may be tuned to flatten the performance curve across a wider temperature range, or to specifically enhance low-temperature performance for applications in cooler climates.

In various embodiments, the graph of FIG. 20 may illustrate the phenomenon of voltage hysteresis, where lower temperatures can lead to increased polarization and a consequent reduction in voltage. This effect may be attributed to the sluggish reaction kinetics and poor mass transport processes that occur at lower temperatures, which can significantly impact the overall performance of the battery system.

In various embodiments, the temperature-dependent behavior observed in the discharge profiles may have implications beyond just the cathode performance. The anode surface may also be affected by these temperature variations, potentially leading to suboptimal solid electrolyte interphase (SEI) formation at lower temperatures. In one particular embodiment, the SEI layer may be thick and uniform to provide effective protection and stable performance. However, at lower temperatures, the formation of this critical interface may be compromised, which could have long-term effects on battery life and performance. Additionally, in various embodiments, the electrolyte system may be designed to mitigate these temperature-related challenges. For instance, the composition may be tailored to maintain adequate ionic conductivity and reaction kinetics even at lower temperatures. This could involve the incorporation of low-temperature additives that help to reduce the activation energy for key reactions or improve the solubility of active species in colder conditions.

In various embodiments, the system may also be engineered to take advantage of the improved performance at higher temperatures while mitigating potential negative effects. This could include the use of thermally responsive additives that become more active as temperature increases, helping to manage the accelerated reaction rates and potential side reactions that might occur under elevated temperature conditions.

In various embodiments, the insights gained from analyzing these temperature-dependent discharge profiles may inform the development of advanced battery management systems. These systems could potentially adjust charging and discharging protocols based on real-time temperature data, optimizing performance across a wide range of operating conditions and extending the practical operating temperature range of the battery system.

Use-Case Scenario

By way of a use-case scenario, and in various embodiments, a grid-scale energy storage facility implements the multi-regime electrolyte system in a large array of stationary lithium-sulfur batteries. The facility utilizes the electrolyte composition comprising carefully selected solvents, electron withdrawing compounds, performance-enhancing additives, and lithium ion-transporting compounds to achieve ultra-high cycle life. As the batteries undergo charge and discharge cycles over several years, the electrolyte system's components break down in a controlled manner across multiple regimes, forming a self-evolving solid electrolyte interface (SEI) that enhances long-term stability and performance. The facility's battery management system utilizes the three-dimensional reaction parameter graph to monitor and predict changes in the electrolyte system's behavior. By mapping the current state of each battery onto the reaction grid, the system anticipates upcoming changes in reaction dynamics and adjusts operational parameters such as charging rates and temperature profiles to maintain optimal performance. This adaptive approach, combined with the synergistic interactions between electrolyte components, enables the energy storage facility to maintain high capacity and efficiency over an extended operational lifespan, providing reliable grid support and renewable energy integration for over a decade without significant degradation or the need for frequent battery replacements.

In various embodiments, the battery management system may utilize advanced monitoring and control strategies to optimize the performance and longevity of the energy storage facility. For instance, the system may periodically conduct diagnostic cycles, including resistance measurements and DCIR (Direct Current Internal Resistance) pulses, to gather data for populating and refining the three-dimensional reaction parameter graph. This information may be used to track the evolution of the electrolyte system and predict upcoming changes in battery behavior.

Additionally, the management system may implement conditioning cycles as part of its maintenance routine. These cycles may involve slower charge and discharge rates, or exploration of wider voltage ranges than typical operational cycles. For example, the system may occasionally perform deep discharge cycles to lower voltages or charge to higher voltages than normal. These conditioning cycles may serve to reactivate lost active material, break down accumulated byproducts, or reset certain aspects of the solid electrolyte interphase (SEI). Further, in some cases, charging to higher voltages may be used to reactivate any disconnected active material back into an electrochemically active state, potentially recovering capacity that would otherwise be lost. While such techniques may draw inspiration from current systems, particularly in the realm of Li2S reactivation, their application in this advanced, multi-regime electrolyte system may yield unique benefits for maintaining ultra-high cycle life in stationary storage applications.

In various embodiments, while the "Regime 1" period shown in FIGS. 14 and 18 could potentially demonstrate flatter, more stable cycling characteristics, the current representation may effectively highlight the dynamic nature of the electrolyte system's evolution. The depicted profile emphasizes the initial rapid changes that occur as the system establishes its protective interfaces and settles into a more stable operating state. This representation may be valuable for illustrating the adaptive capabilities of the multi-regime electrolyte system and its potential to respond to early-life stresses in battery operation. However, it's important to note that the exact shape and duration of each regime may vary depending on specific electrolyte compositions and operating conditions, and could be tailored to meet the requirements of different applications or cell designs.

Figure 21:
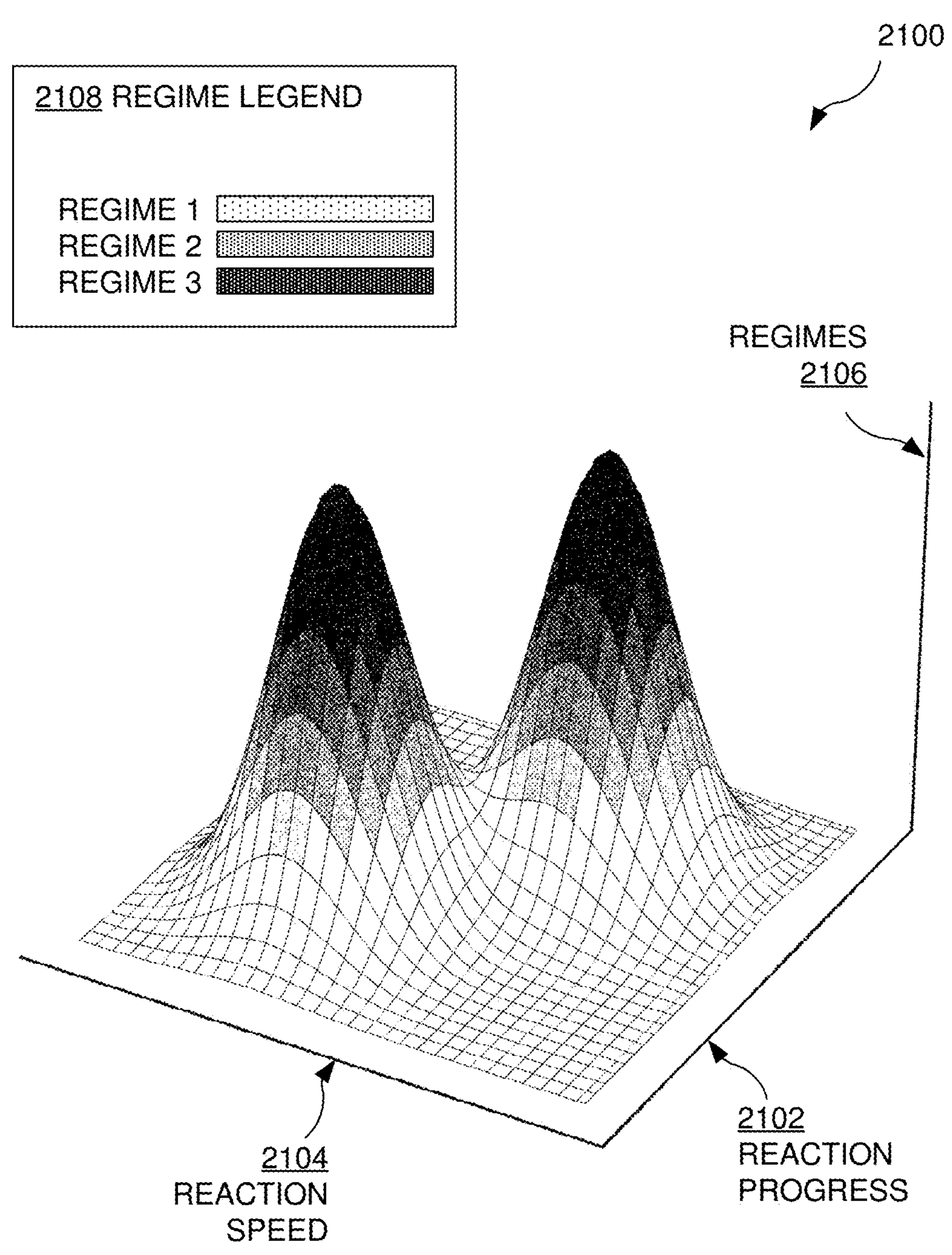
FIG. 21 depicts a three-dimensional graph showing relationships between reaction parameters and regimes in an electrolyte system, according to aspects of the present disclosure.

FIG. 21 depicts a three-dimensional graph 2100 showing relationships between reaction parameters and regimes in an electrolyte system, according to aspects of the present disclosure. As an option, the three-dimensional graph 2100 may be implemented in the context of any one or more of the embodiments set forth in any previous and/or subsequent Figures and/or description thereof. Of course, however, the three-dimensional graph 2100 may be implemented in the context of any desired environment. Further, the aforementioned definitions may equally apply to the description below.

As shown, FIG. 21 depicts a three-dimensional graph 2100 showing the relationship between reaction progress and reaction speed across different regimes. The graph 2100 plots reaction progress 2102 against reaction speed 2104, with regimes 2106 indicated along a third axis. A regime legend 2108 is positioned in the upper portion of the graph 2100, identifying three distinct regimes characterized by different reaction kinetics. The reaction speed 2104 exhibits varying profiles across the reaction progress 2102 axis, with two prominent peaks visible in the three-dimensional surface of the graph 2100.

The reaction progress 2102 axis extends horizontally across the graph, representing the extent of chemical reactions or transformations occurring within the electrolyte system over time. This axis may correspond to the concentration changes of reactants and products, or the degree of completion for specific electrochemical processes. The reaction speed 2104 axis is oriented vertically, quantifying the rate at which these reactions are proceeding. This axis reflects factors such as temperature, catalyst activity, and reactant availability that influence the kinetics of the system.

The regimes 2106 axis introduces a third dimension to the graph, illustrating how the relationship between reaction progress and speed evolves across different phases of the battery's operational lifecycle. This axis is divided into three distinct sections, each representing a unique regime with characteristic reaction dynamics. The regime legend 2108 provides a clear reference for interpreting these divisions, potentially correlating them with specific stages of battery operation or electrolyte evolution.

The three-dimensional surface of the graph reveals complex patterns in reaction behavior across the different regimes. Two prominent peaks are visible, suggesting periods of accelerated reaction rates at specific points in the reaction progress. These peaks may correspond to critical transitions in the electrolyte system, such as the formation of protective interfaces or the onset of specific degradation mechanisms. The varying heights and shapes of the surface between these peaks indicate how reaction speeds fluctuate as the system progresses through different stages of its lifecycle.

The first regime, likely corresponding to the initial stages of battery operation, shows a rapid increase in reaction speed leading to the first peak. This may represent the formation of primary protective layers or the initial breakdown of highly reactive additives. The second regime displays a more moderate profile, potentially indicating a period of stabilization where reaction speeds are more controlled. The third regime shows another increase in reaction speed leading to the second peak, which could represent long-term evolution of the electrolyte system or the activation of secondary protective mechanisms.

The varying contours and gradients across the surface of the graph may provide insights into the complex interplay between reaction progress, speed, and the different operational regimes of the battery system. Areas of steep gradient may indicate rapid transitions or critical points in the system's behavior, while flatter regions might represent periods of more stable or gradual change. This comprehensive visualization allows for a nuanced understanding of how reaction dynamics evolve throughout the battery's lifecycle, potentially informing strategies for optimizing long-term performance and stability.

Overcoming Present Challenges

The present disclosure addresses significant challenges in stationary lithium-sulfur battery technology that have hindered the widespread adoption of these systems for long-term grid-scale energy storage applications. Prior art electrolyte formulations have struggled to maintain stable performance over extended cycling periods, often suffering from gradual breakdown of components, formation of passivating layers on electrode surfaces, and dissolution of active materials. These issues have led to capacity loss, increased internal resistance, and shortened battery lifespans. Additionally, conventional electrolyte systems have failed to effectively mitigate polysulfide shuttling effects and maintain consistent ionic conductivity across the wide range of operating conditions encountered in stationary deployments, limiting their practical utility for grid-scale energy storage.

In various embodiments, the multi-regime electrolyte system may address the challenge of component breakdown in a novel way. Rather than attempting to prevent breakdown entirely, which has proven difficult in prior art formulations, this system may be designed to manage and control the breakdown process over time. The carefully selected combination of additives may be engineered to decompose in a predetermined sequence, with each stage of breakdown contributing to the formation and evolution of a protective solid electrolyte interphase (SEI) layer. This approach may allow for the maintenance of desirable electrochemical properties even as individual components gradually break down. By embracing and harnessing the inevitability of component degradation, the system may achieve more stable long-term performance compared to conventional formulations that rely solely on preventing breakdown. This controlled, multi-stage decomposition strategy may be particularly beneficial for real-world applications, where batteries are subject to varied and often unpredictable operating conditions that can accelerate component degradation.

The disclosed multi-regime electrolyte system overcomes these deficiencies through a novel approach that incorporates carefully selected combinations of solvents, electron withdrawing compounds, performance-enhancing additives, and lithium ion-transporting compounds. By designing the electrolyte components to undergo controlled decomposition in distinct regimes during battery cycling, the system enables the formation of a self-evolving solid electrolyte interface (SEI) that enhances long-term stability and performance. The inclusion of specific chalcogenides facilitates improved sulfur redox kinetics, while the use of alpha-hydrogenated, selectively beta-functionalized electron withdrawing compounds preserves electron density while allowing desired chemical reactions to occur. Furthermore, the system's heat management strategies utilize natural temperature increases during cycling to enhance mass transport and maintain optimal kinetics. This innovative approach not only addresses the challenges of maintaining stable performance over hundreds or even thousands of cycles but also enables ultra-high cycle life suitable for long-term stationary applications, providing a significant advancement over prior art solutions for grid-scale energy storage.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

For instance, in accordance with one implementation, the inventive concepts presented herein include one or more of the following compounds, features, configurations, etc., in any suitable combination or permutation that would be understood by a person having ordinary skill in the art upon reading the present disclosures: an electrolyte system comprising: at least one solvent; at least one electron withdrawing compound; at least one performance enhancing additive; and at least one lithium ion-transporting compound. The at least one solvent may include at least one ether, and preferably is selected from the group consisting of: dimethoxyethane (DME), dioxolane (DOL), dimethyl sulfoxide (DMSO), dimethyl formamide (DMF), toluene, tetramethyl urea (TMU), tetrabutylammonium hydroxide (TBA), dimethylacetamide (DMA), tetrahydrofuran (THF), diethylene glycol dimethyl ether (diglyme or DEGDME), acetonitrile (ACN), dimethyl trisulfide (DMTS), diisopropyl ether (DIPE), tetrahydrofuran (THF), 1,2-diaminopropane (DAP), triethylene glycol dimethyl ether (Triglyme/trigDME), tetraethylene glycol dimethyl ether (Tetraglyme/TEGDME), sulfolane (SUL), methyl tert-butyl ether (MTBE), 2,2,3,3-tetrafluoro-1,4-dimethoxybutane (FDMB), bis(2,2,2, trifluoroethyl) ether (BTFE), 1H,1H,5H-octafluoropentyl 1,1,2,2-tetrafluoroethyl ether (OFE), (1,1,2,2-tetrafluoroethyl 2,2,3,3-tetrafluoropropyl ether (TTE), 2,2,2-trifluoroethyl 1,1,2,2-tetrafluoroethyl ether (TFETFE), 1,1,2,2-tetrafluoroethyl isobutyl ether (TFEIE), 1,1,2,3,3,3-hexafluoropropyl 2,2,2-trifluoroethyl ether (THE), methoxyperfluorobutane (MPB), bis(2,2-difluoroethyl) ether (DFE), 2,2,2-trifluoroethyl methyl ether (TFEME), bis(2-fluoroethyl) ether (BFE), bis (2,2,2, trifluoroethyl) ether (BTFE), 3-fluoropyridine (3FP), 1,2-(1,1,2,2-tetrafluoroethoxy) ethane (TFEE), 1,2-dimethoxy-1,1,2,2-tetrafluoroethane (DMETF), 2-methyl-1(1,1,2,2-tetrafluoroethoxy) propane (TFEIBE), bis(2,2,3,3,3-pentafluoropropyl) ether (BPFPE), allyl 2,2,3,3,3-pentafluoropropyl ether (APFPE), hydrocarbons, and combinations thereof. The at least one solvent is cumulatively present in an amount ranging from greater than 0 vol % of the electrolyte system to about 75 vol % of the electrolyte system. Moreover, the at least one electron withdrawing group comprises at least one compound characterized by an alpha-hydrogenated, beta-functionalized motif, and preferably includes at least one electron withdrawing compound is selected from the group consisting of: 2,2-dimethoxy-4-trifluoromethyl-1,3-dioxolane ether (DTDL), 1,1,1-trifluoro-2-(2-(2-(2,2,2-trifluoroethoxy) ethoxy) ethoxy)ethane (FDG), 1,1,1,14,14,14-hexafluoro-3,6,9,12-tetraoxatetradecane (FTrG), 1,1,1,17,17,17-hexafluoro-3,6,9,12,15-pentaoxaheptadecane (FTeG), bis(2,2-difluoroethyl) ether (BDE), bis(2,2,2, trifluoroethyl) ether (BTFE), 2,2,2-trifluoroethyl 2-fluoroethyl ether (TFFE), 1,1-difluoroethyl-2-fluoroethyl ether (DFE), fluorinated 1,4-dimethoxylbutane (FDMB), 3-fluoropyridine (3FP), 1,1,2,2-tetrafluoroethyl 2,2,3,3-tetrafluororopyl ether (TTE), bis (2,2,3,3-tetrafluoropropyl)ether) (BTFPE), 2,2,2-trifluoroethyl 1,1,2,2-tetrafluoroethyl ether (TFTFE), tris(2,2,2-trifluoroethyl) phosphate, bis(2,2,2-trifluoroethyl) methylphosphonate, isosorbide dinitrate (ISDN), bis(2-fluoroethyl) ether (BFE), and combinations thereof. The at least one electron withdrawing compound is cumulatively present in an amount preferably ranging from greater than 0 vol % of the electrolyte system to about 75 vol % of the electrolyte system. The at least one performance-enhancing additive comprises dicyandiamide (DCDA), and is present in an amount ranging from about 0.01 M to about 0.2 M. The at least one lithium ion-transporting compound comprises at least one lithium salt, and preferably is selected from the group consisting of: lithium bis(trifluoromethanesulfonyl) imide (LiTFSI), lithium nitrate ($LiNO_3$), lithium Perchlorate ($LiClO_4$), lithium difluoro(oxalato)borate (LiFOB), lithium bis (oxalato)borate (LiBOB), lithium trifilate (LiTf), lithium bis(pentafluoroethanesulfonyl)imide (LiBETi), lithium bis (fluorosulfonyl)imide (LiFSI), lithium trifluoroacetate (LiTFAc), and combinations thereof. The lithium ion-transporting compound is present in an amount ranging from about 0.1 M to about 10 M. Moreover, the electrolyte system may include at least one chalcogenide, which is preferably selected from the group consisting of: dimethyl diselenide (DMDSe), dipheyl diselenide (DPDSe), dimethyl ditelluride (DMDTe), diphenyl ditelluride (DPDTe), and combination(s) thereof, and is preferably present in an amount ranging from about 0.1 wt % to about 3.0 wt %. The inventive electrolyte system may be embodied in an electrochemical cell, which may have a configuration such as described herein, including a pouch configuration, a coin configuration, a cylindrical configuration, or a prismatic configuration. Said electrochemical cells may or may not include a distinct structure serving as a current collector.

According to another implementation, the inventive concepts presented herein include one or more of the following compounds, features, configurations, etc., in any suitable combination or permutation that would be understood by a person having ordinary skill in the art upon reading the present disclosures: an electrolyte system comprising: a solvent system; at least one electron withdrawing compound; and at least one lithium ion-transporting compound. The solvent system includes at least one solvent, which preferably is selected from the group consisting of: dimethoxyethane (DME), dioxolane (DOL), dimethyl sulfoxide (DMSO), dimethyl formamide (DMF), toluene, tetramethyl urea (TMU), tetrabutylammonium hydroxide (TBA), dimethylacetamide (DMA), tetrahydrofuran (THF), diethylene glycol dimethyl ether (diglyme or DEGDME), acetonitrile (ACN), dimethyl trisulfide (DMTS), diisopropyl ether (DIPE), tetrahydrofuran (THF), 1,2-diaminopropane (DAP), triethylene glycol dimethyl ether (Triglyme/trigDME), tetraethylene glycol dimethyl ether (Tetraglyme/TEGDME), sulfolane (SUL), methyl tert-butyl ether (MTBE), 2,2,3,3-tetrafluoro-1,4-dimethoxybutane (FDMB), bis(2,2,2, trifluoroethyl) ether (BTFE), 1H,1H,5H-octafluoropentyl 1,1,2,2-tetrafluoroethyl ether (OFE), (1,1,2,2-tetrafluoroethyl 2,2,3,3-tetrafluoropropyl ether (TTE), 2,2,2-trifluoroethyl 1,1,2,2-tetrafluoroethyl ether (TFETFE), 1,1,2,2-tetrafluoroethyl isobutyl ether (TFEIE), 1,1,2,3,3,3-hexafluoropropyl 2,2,2-trifluoroethyl ether (THE), methoxyperfluorobutane (MPB), bis(2,2-difluoroethyl) ether (DFE), 2,2,2-trifluoroethyl methyl ether (TFEME), bis(2-fluoroethyl) ether (BFE), bis (2,2,2, trifluoroethyl) ether (BTFE), 3-fluoropyridine (3FP), 1,2-(1,1,2,2-tetrafluoroethoxy) ethane (TFEE), 1,2-dimethoxy-1,1,2,2-tetrafluoroethane (DMETF), 2-methyl-1(1,1,2,2-tetrafluoroethoxy) propane (TFEIBE), bis(2,2,3,3,3-pentafluoropropyl) ether (BPFPE), allyl 2,2,3,3,3-pentafluoropropyl ether (APFPE), hydrocarbons, and combinations thereof. The solvent system comprises greater than 0 vol % of the electrolyte system to about 75 vol % of the electrolyte system. Moreover, the at least one electron withdrawing group comprises at least one compound characterized by an alpha-hydrogenated, beta-functionalized motif, and preferably includes at least one electron withdrawing compound is selected from the group consisting of: 2,2-dimethoxy-4-trifluoromethyl-1,3-dioxolane ether (DTDL), 1,1,1-trifluoro-2-(2-(2-(2,2,2-trifluoroethoxy) ethoxy) ethoxy)ethane (FDG), 1,1,1,14,14,14-hexafluoro-3,6,9,12-tetraoxatetradecane (FTrG), 1,1,1,17,17,17-hexafluoro-3,6,9,12,15-pentaoxaheptadecane (FTeG), bis(2,2-difluoroethyl) ether (BDE), bis(2,2,2, trifluoroethyl) ether (BTFE), 2,2,2-trifluoroethyl 2-fluoroethyl ether (TFFE), 1,1-difluoroethyl-2-fluoroethyl ether (DFE), fluorinated 1,4-dimethoxylbutane (FDMB), 3-fluoropyridine (3FP), 1,1,2,2-tetrafluoroethyl 2,2,3,3-tetrafluororopyl ether (TTE), bis (2,2,3,3-tetrafluoropropyl)ether) (BTFPE), 2,2,2-trifluoroethyl 1,1,2,2-tetrafluoroethyl ether (TFTFE), tris(2,2,2-trifluoroethyl) phosphate, bis(2,2,2-trifluoroethyl) methylphosphonate, isosorbide dinitrate (ISDN), bis(2-fluoroethyl) ether (BFE), and combinations thereof. The at least one electron withdrawing compound is cumulatively present in an amount preferably ranging from greater than 0 vol % of the electrolyte system to about 75 vol % of the electrolyte system. The at least one electron withdrawing compound comprises at least one alpha-hydrogenated, selectively beta-modified motif, and the at least one alpha-hydrogenated, selectively beta-modified motif excludes fluorine. In other aspects, the at least one electron withdrawing compound excludes fluorine. The at least one lithium ion-transporting compound comprises at least one lithium salt, and preferably is selected from the group consisting of: lithium bis(trifluoromethanesulfonyl)imide (LiTFSI), lithium nitrate ($LiNO_3$), lithium Perchlorate ($LiClO_4$), lithium difluoro(oxalato)borate (LiFOB), lithium bis (oxalato)borate (LiBOB), lithium trifilate (LiTf), lithium bis(pentafluoroethanesulfonyl)imide (LiBETi), lithium bis(fluorosulfonyl)imide (LiFSI), lithium trifluoroacetate (LiTFAc), and combinations thereof. The at least one lithium ion-transporting compound is present in an amount ranging from about 0.1 M to about 10 M. The inventive electrolyte system may be embodied in an electrochemical cell, which may have a configuration such as described herein, including a pouch configuration, a coin configuration, a cylindrical configuration, or a prismatic configuration. Said electrochemical cells may or may not include a distinct structure serving as a current collector.

In still yet more implementations, a lithium-based anode includes one or more of the following compounds, features, configurations, etc., in any suitable combination or permutation that would be understood by a person having ordinary skill in the art upon reading the present disclosures: an interphase formed on surface(s) of the lithium-based anode, wherein the interphase is formed by interaction between an active material of the lithium-based anode and a derivative of at least one electron withdrawing compound. The at least one electron withdrawing compound preferably comprises at least one alpha-hydrogenated, selectively beta-modified motif, where the at least one alpha-hydrogenated, selectively beta-modified motif excludes fluorine and/or the at least one electron withdrawing compound excludes fluorine as a whole. Preferably, the at least one electron withdrawing compound is includes at least one electron withdrawing compound that is selected from the group consisting of: 2,2-dimethoxy-4-trifluoromethyl-1,3-dioxolane ether (DTDL), 1,1,1-trifluoro-2-(2-(2-(2,2,2-trifluoroethoxy) ethoxy) ethoxy)ethane (FDG), 1,1,1,14,14,14-hexafluoro-3, 6,9,12-tetraoxatetradecane (FTrG), 1,1,1,17,17,17-hexafluoro-3,6,9,12,15-pentaoxaheptadecane (FTeG), bis(2, 2-difluoroethyl) ether (BDE), bis(2,2,2, trifluoroethyl) ether (BTFE), 2,2,2-trifluoroethyl 2-fluoroethyl ether (TFFE), 1,1-difluoroethyl-2-fluoroethyl ether (DFE), fluorinated 1,4-dimethoxylbutane (FDMB), 3-fluoropyridine (3FP), 1,1,2, 2-tetrafluoroethyl 2,2,3,3-tetrafluororopyl ether (TTE), bis (2,2,3,3-tetrafluoropropyl)ether) (BTFPE), 2,2,2-trifluoroethyl 1,1,2,2-tetrafluoroethyl ether (TFTFE), tris(2, 2,2-trifluoroethyl) phosphate, bis(2,2,2-trifluoroethyl) methylphosphonate, isosorbide dinitrate (ISDN), bis(2-fluoroethyl) ether (BFE), and combinations thereof. An active material of the lithium-based anode preferably comprises elemental lithium or a lithium alloy, where the lithium alloy comprises lithium-magnesium, lithium-sulfur, or a combination thereof. The inventive anode may be embodied in an electrochemical cell, which may have a configuration such as described herein, including a pouch configuration, a coin configuration, a cylindrical configuration, or a prismatic configuration. Said electrochemical cells may or may not include a distinct structure serving as a current collector.

In still yet more implementations, a electrolyte system includes one or more of the following compounds, features, configurations, etc., in any suitable combination or permutation that would be understood by a person having ordinary skill in the art upon reading the present disclosures: a solvent system; at least one electron withdrawing compound; at least one lithium ion-transporting compound; and at least one chalcogenide. The solvent system includes at least one solvent, which preferably is selected from the group consisting of: dimethoxyethane (DME), dioxolane (DOL), dimethyl sulfoxide (DMSO), dimethyl formamide (DMF), toluene, tetramethyl urea (TMU), tetrabutylammonium hydroxide (TBA), dimethylacetamide (DMA), tetrahydrofuran (THF), diethylene glycol dimethyl ether (diglyme or DEGDME), acetonitrile (ACN), dimethyl trisulfide (DMTS), diisopropyl ether (DIPE), tetrahydrofuran (THF), 1,2-diaminopropane (DAP), triethylene glycol dimethyl ether (Triglyme/trigDME), tetraethylene glycol dimethyl ether (Tetraglyme/TEGDME), sulfolane (SUL), methyl tert-butyl ether (MTBE), 2,2,3,3-tetrafluoro-1,4-dimethoxybutane (FDMB), bis(2,2,2, trifluoroethyl) ether (BTFE), 1H,1H,5H-octafluoropentyl 1,1,2,2-tetrafluoroethyl ether (OFE), (1,1,2,2-tetrafluoroethyl 2,2,3,3-tetrafluoropropyl ether (TTE), 2,2,2-trifluoroethyl 1,1,2,2-tetrafluoroethyl ether (TFETFE), 1,1,2,2-tetrafluoroethyl isobutyl ether (TFEIE), 1,1,2,3,3,3-hexafluoropropyl 2,2,2-trifluoroethyl ether (THE), methoxyperfluorobutane (MPB), bis(2,2-difluoroethyl) ether (DFE), 2,2,2-trifluoroethyl methyl ether (TFEME), bis(2-fluoroethyl) ether (BFE), bis(2,2,2, trifluoroethyl) ether (BTFE), 3-fluoropyridine (3FP), 1,2-(1,1,2,2-tetrafluoroethoxy) ethane (TFEE), 1,2-dimethoxy-1,1,2,2-tetrafluoroethane (DMETF), 2-methyl-1(1,1,2,2-tetrafluoroethoxy) propane (TFEIBE), bis(2,2,3,3,3-pentafluoropropyl) ether (BPFPE), allyl 2,2,3,3,3-pentafluoropropyl ether (APFPE), hydrocarbons, and combinations thereof. The solvent system comprises greater than 0 vol % of the electrolyte system to about 75 vol % of the electrolyte system. Moreover, the at least one electron withdrawing group comprises at least one compound characterized by an alpha-hydrogenated, beta-functionalized motif, and preferably includes at least one electron withdrawing compound is selected from the group consisting of: 2,2-dimethoxy-4-trifluoromethyl-1,3-dioxolane ether (DTDL), 1,1,1-trifluoro-2-(2-(2-(2,2,2-trifluoroethoxy) ethoxy) ethoxy)ethane (FDG), 1,1,1,14,14,14-hexafluoro-3, 6,9,12-tetraoxatetradecane (FTrG), 1,1,1,17,17,17-hexafluoro-3,6,9,12,15-pentaoxaheptadecane (FTeG), bis(2, 2-difluoroethyl) ether (BDE), bis(2,2,2, trifluoroethyl) ether (BTFE), 2,2,2-trifluoroethyl 2-fluoroethyl ether (TFFE), 1,1-difluoroethyl-2-fluoroethyl ether (DFE), fluorinated 1,4-dimethoxylbutane (FDMB), 3-fluoropyridine (3FP), 1,1,2, 2-tetrafluoroethyl 2,2,3,3-tetrafluororopyl ether (TTE), bis (2,2,3,3-tetrafluoropropyl)ether) (BTFPE), 2,2,2-trifluoroethyl 1,1,2,2-tetrafluoroethyl ether (TFTFE), tris(2, 2,2-trifluoroethyl) phosphate, bis(2,2,2-trifluoroethyl) methylphosphonate, isosorbide dinitrate (ISDN), bis(2-fluoroethyl) ether (BFE), and combinations thereof. The at least one electron withdrawing compound is cumulatively present in an amount preferably ranging from greater than 0 vol % of the electrolyte system to about 75 vol % of the electrolyte system. The at least one electron withdrawing compound comprises at least one alpha-hydrogenated, selectively beta-modified motif, and the at least one alpha-hydrogenated, selectively beta-modified motif excludes fluorine. In other aspects, the at least one electron withdrawing compound excludes fluorine. The at least one lithium ion-transporting compound comprises at least one lithium salt, and preferably is selected from the group consisting of: lithium bis(trifluoromethanesulfonyl)imide (LiTFSI), lithium nitrate ($LiNO_3$), lithium Perchlorate ($LiClO_4$), lithium difluoro(oxalato)borate (LiFOB), lithium bis (oxalato)borate (LiBOB), lithium trifilate (LiTf), lithium bis(pentafluoroethanesulfonyl)imide (LiBETi), lithium bis(fluorosulfonyl)imide (LiFSI), lithium trifluoroacetate (LiTFAc), and combinations thereof. The lithium ion-transporting compound is present in an amount ranging from about 0.1 M to about 10 M. The at least one chalcogenide is selected from the group consisting of: dimethyl diselenide (DMDSe), dipheyl diselenide (DPDSe), dimethyl ditelluride (DMDTe), diphenyl ditelluride (DPDTe), and combination(s) thereof, and is preferably present in an amount ranging from about 0.1 wt % to about 3.0 wt %. The inventive electrolyte system may be embodied in an electrochemical cell, which may have a configuration such as described herein, including a pouch configuration, a coin configuration, a cylindrical configuration, or a prismatic configuration. Said electrochemical cells may or may not include a distinct structure serving as a current collector.

What is claimed is:

1. An electrolyte system for stationary storage application, comprising:

at least one solvent comprising at least one ether, wherein the at least one ether is selected from the group consisting of dimethoxyethane (DME), dioxolane (DOL), and combinations thereof;

at least one electron withdrawing compound;

at least one lithium ion-transporting compound; and at least one sacrificial additive comprising dicyandiamide (DCDA), wherein the at least one sacrificial additive is configured to undergo sequential decomposition during battery cycling, wherein the sequential decomposition is controlled by respective breakdown rates of each sacrificial additive;

wherein the electrolyte system is configured to facilitate lithium polysulfide conversion via redox reactions.

2. The electrolyte system of claim 1, wherein:

the at least one solvent comprises at least one ether; and the at least one ether is selected from the group consisting of dimethoxyethane (DME), dioxolane (DOL), and combinations thereof.

3. The electrolyte system of claim 1, wherein:

the at least one electron withdrawing compound comprises at least one compound characterized by an alpha-hydrogenated, beta-functionalized motif; and the at least one electron withdrawing compound is selected from the group consisting of bis(2,2,2-trifluoroethyl) ether (BTFE), 1,1,2,2-tetrafluoroethyl 2,2,3,3-tetrafluororopyl ether (TTE), and combinations thereof.

4. The electrolyte system of claim 1, wherein:

the at least one lithium ion-transporting compound comprises at least one lithium salt; and the at least one lithium salt is selected from the group consisting of lithium bis(trifluoromethanesulfonyl) imide (LiTFSI), lithium nitrate (LiNO3), and combinations thereof.

5. The electrolyte system of claim 1, wherein:

the at least one sacrificial additive is selected from the group consisting of dicyandiamide (DCDA), guanidine nitrate, and combinations thereof; and the at least one sacrificial additive is present in an amount ranging from about 0.01 M to about 0.2 M.

6. The electrolyte system of claim 1, further comprising at least one chalcogenide, wherein:

the at least one chalcogenide is selected from the group consisting of dimethyl diselenide (DMDSe), diphenyl diselenide (DPDSe), and combinations thereof; and the at least one chalcogenide is present in an amount ranging from about 0.1 wt % to about 3.0 wt %.

7. The electrolyte system of claim 6, wherein:

the at least one solvent is present in an amount ranging from greater than 0 vol % to about 75 vol % of the electrolyte system;

the at least one electron withdrawing compound is present in an amount ranging from greater than 0 vol % to about 75 vol % of the electrolyte system; and the at least one lithium ion-transporting compound is present in an amount ranging from about 0.1 M to about 10 M.

8. The electrolyte system of claim 1, wherein the sequential decomposition is predetermined and comprises:

a first regime characterized by rapid breakdown of initial sacrificial additives;

a second regime characterized by gradual decomposition of secondary additives; and a third regime characterized by slow, continuous breakdown of long-lasting additives.

9. The electrolyte system of claim 8, wherein:

the first regime corresponds to formation of a primary solid electrolyte interphase (SEI) layer;

the second regime corresponds to reinforcement or modification of the primary SEI layer; and the third regime corresponds to maintenance of a protective interface over extended cycling periods.

10. The electrolyte system of claim 9, wherein the electrolyte system is configured to respond dynamically to changing operational conditions, including temperature fluctuations and varying charge/discharge rates, to maintain optimal additive breakdown and SEI formation throughout battery cycling.

11. An electrolyte system, comprising:

at least one solvent comprising at least one ether, wherein the at least one ether is selected from the group consisting of dimethoxyethane (DME), dioxolane (DOL), and combinations thereof;

at least one electron withdrawing compound;

at least one lithium ion-transporting compound;

at least one sacrificial additive comprising dicyandiamide (DCDA); and a self-evolving electrode-electrolyte interface formed on an electrode surface by a breakdown of the at least one sacrificial additive, wherein the electrode-electrolyte interface provides ultra-high cycle life comprising greater charge-discharge cycles with less capacity fade compared to conventional electrolyte systems for stationary storage applications;

wherein the electrolyte system is configured to facilitate lithium polysulfide conversion via redox reactions.

12. The electrolyte system of claim 11, wherein:

the at least one solvent comprises at least one ether selected from the group consisting of dimethoxyethane (DME) and dioxolane (DOL); and the at least one electron withdrawing compound comprises at least one compound characterized by an alpha-hydrogenated, beta-functionalized motif.

13. The electrolyte system of claim 12, wherein:

the at least one lithium ion-transporting compound comprises at least one lithium salt selected from the group consisting of lithium bis(trifluoromethanesulfonyl) imide (LiTFSI) and lithium nitrate (LiNO3); and the at least one sacrificial additive is selected from the group consisting of dicyandiamide (DCDA) and guanidine nitrate.

14. The electrolyte system of claim 13, wherein:

the at least one solvent is present in an amount ranging from greater than 0 vol % to about 75 vol % of the electrolyte system;

the at least one electron withdrawing compound is present in an amount ranging from greater than 0 vol % to about 75 vol % of the electrolyte system; and the at least one lithium ion-transporting compound is present in an amount ranging from about 0.1 M to about 10 M.

15. The electrolyte system of claim 14, further comprising at least one chalcogenide selected from the group consisting of dimethyl diselenide (DMDSe) and diphenyl diselenide (DPDSe), wherein:

the at least one chalcogenide is present in an amount ranging from about 0.1 wt % to about 3.0 wt %; and the at least one sacrificial additive is present in an amount ranging from about 0.01 M to about 0.2 M.

16. The electrolyte system of claim 15, wherein the self-evolving electrode-electrolyte interface comprises:

a self-evolving solid electrolyte interphase (SEI);

a dynamic interfacial layer;

an adaptive electrode-electrolyte boundary layer;

a self-regenerating protective film;

an in-situ formed passivation layer;

a continuously evolving electrode surface layer;

a self-modifying electrode-electrolyte barrier;

an electrochemically-formed interface layer;

a dynamically-developing electrode protection layer; or an adaptively-forming electrolyte-electrode interphase.

17. The electrolyte system of claim 16, wherein the self-evolving electrode-electrolyte interface is configured to:

mitigate polysulfide shuttling effects;

enhance long-term cycling stability;

improve capacity retention; and maintain consistent ionic conductivity across a range of operating conditions.

18. The electrolyte system of claim 17, wherein the ultra-high cycle life comprises greater charge-discharge cycles with less capacity fade compared to conventional electrolyte systems without the at least one sacrificial additive.

19. The electrolyte system of claim 18, wherein:

the at least one electron withdrawing compound is selected to optimize electrolyte system performance at elevated temperatures; and the electrolyte system is configured to utilize natural temperature increases during cycling to enhance mass transport and maintain optimal reaction kinetics.

20. The electrolyte system of claim 19, wherein the electrolyte system is configured to respond dynamically to changing operational conditions, including temperature fluctuations and varying charge/discharge rates, to maintain optimal additive breakdown and self-evolving electrode-electrolyte interface formation throughout battery cycling.

21. The electrolyte system of claim 1, wherein:

the at least one sacrificial additive comprises a combination of dicyandiamide (DCDA) and guanidine nitrate;

the guanidine nitrate is consumed preferentially during initial cycling to establish a foundational protective layer on an anode surface;

the dicyandiamide (DCDA) undergoes decomposition subsequent to substantial consumption of the guanidine nitrate, wherein the DCDA reacts with polysulfide species to generate nitrogen-containing and sulfur-containing compounds that modify the protective layer; and wherein the electrolyte system exhibits a two-plateau discharge profile characteristic of lithium polysulfide conversion reactions.

22. The electrolyte system of claim 1, further comprising:

a selenium-containing compound present in an amount from about 0.1 wt % to about 3.0 wt %, wherein the selenium-containing compound is selected from the group consisting of dimethyl diselenide (DMDSe) and diphenyl diselenide (DPDSe);

wherein the at least one electron withdrawing compound comprises a fluorinated ether co-solvent having the structure R1-O—R2, where R1 and R2 independently comprise C1-C4 alkyl groups with at least one hydrogen atom substituted by fluorine;

wherein the selenium-containing compound catalyzes reduction of soluble polysulfide intermediates to insoluble lithium sulfide species;

wherein the fluorinated ether co-solvent enhances solvation of long-chain polysulfides to maintain solution-phase reaction kinetics; and wherein the electrolyte system exhibits a discharge profile having an upper plateau corresponding to solid-liquid polysulfide reactions and a lower plateau corresponding to liquid-to-solid polysulfide reactions, and wherein the selenium-containing compound improves kinetics of the lower plateau.

* * * * *